US012689533B2

(12) United States Patent
Kwon et al.

(10) Patent No.: US 12,689,533 B2
(45) Date of Patent: Jul. 21, 2026

(54) MULTICAST SIGNAL PROCESSING METHOD AND DEVICE

(71) Applicant: LG ELECTRONICS INC., Seoul (KR)

(72) Inventors: Woosuk Kwon, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 18/277,187

(22) PCT Filed: Feb. 28, 2022

(86) PCT No.: PCT/KR2022/095043
§ 371 (c)(1),
(2) Date: Aug. 14, 2023

(87) PCT Pub. No.: WO2022/197169
PCT Pub. Date: Sep. 22, 2022

(65) Prior Publication Data
US 2024/0121123 A1      Apr. 11, 2024

(30) Foreign Application Priority Data

Mar. 16, 2021      (KR) ........................ 10-2021-0034137
Jun. 18, 2021      (KR) ........................ 10-2021-0079486

(51) Int. Cl.
*H04L 12/18*      (2006.01)
*H04L 65/1023*      (2022.01)
(Continued)

(52) U.S. Cl.
CPC ............ *H04L 12/18* (2013.01); *H04L 12/184* (2013.01); *H04L 65/1033* (2013.01);
(Continued)

(58) Field of Classification Search
CPC ... H04L 12/18; H04L 65/611; H04L 12/1886; H04L 12/184; H04L 65/1026;
(Continued)

(56) References Cited

U.S. PATENT DOCUMENTS

2012/0331508 A1* 12/2012 Vare ........................ H04H 60/72
725/50
2013/0034032 A1* 2/2013 Vare ........................ H04W 4/06
370/310
(Continued)

FOREIGN PATENT DOCUMENTS

CN      102098167      6/2011
CN      104205766      12/2014
(Continued)

OTHER PUBLICATIONS

PCT International Application No. PCT/KR2022/095043, International Search Report dated Jun. 13, 2022, 19 pages.
(Continued)

*Primary Examiner* — Angela Widhalm De Rodriguez
(74) *Attorney, Agent, or Firm* — LEE, HONG, DEGERMAN, KANG & WAIMEY

(57)      ABSTRACT

Disclosed herein is an apparatus for receiving a multicast signal. The apparatus may include a multicast gateway configured to receive a multicast signal based on an interface from a multicast server, and a content playback configured to display a multicast service in the multicast signal. Disclosed herein is a method of receiving a multicast signal. The method may include receiving a multicast signal based on an interface from a multicast server, and displaying a multicast service in the multicast signal.

11 Claims, 95 Drawing Sheets

(51) Int. Cl.

| | |
|---|---|
| *H04L 65/1033* | (2022.01) |
| *H04L 65/611* | (2022.01) |
| *H04L 65/70* | (2022.01) |
| *H04L 69/04* | (2022.01) |
| *H04L 69/16* | (2022.01) |
| *H04L 69/22* | (2022.01) |
| *H04N 21/643* | (2011.01) |

(52) U.S. Cl.

CPC ............ *H04L 65/611* (2022.05); *H04L 65/70* (2022.05); *H04L 69/04* (2013.01); *H04L 69/161* (2013.01); *H04L 69/22* (2013.01); *H04N 21/64322* (2013.01); *H04L 12/1886* (2013.01); *H04L 65/1026* (2013.01)

(58) Field of Classification Search

CPC ..... H04L 65/1033; H04L 65/70; H04L 69/04; H04L 69/161; H04L 69/22; H04N 21/64322

See application file for complete search history.

(56) References Cited

U.S. PATENT DOCUMENTS

| | | | |
|---|---|---|---|
| 2014/0095924 A1 | 4/2014 | Holden | |
| 2014/0204940 A1 | 7/2014 | Bestler et al. | |
| 2018/0139650 A1* | 5/2018 | Kwon ..................... | H04L 69/04 |
| 2018/0234187 A1 | 8/2018 | Zhang et al. | |
| 2020/0021867 A1* | 1/2020 | Park ................. | H04N 21/85406 |

FOREIGN PATENT DOCUMENTS

| | | |
|---|---|---|
| CN | 105165018 | 12/2015 |
| EP | 3448043 | 2/2019 |
| KR | 101995314 | 7/2019 |
| WO | 2016-160944 | 10/2016 |

OTHER PUBLICATIONS

ETSI, "Digital Video Broadcasting (DVB); Generic Stream Encapsulation (GSE); Part 1: Protocol," ETSI TS 102 606-1, V1.2.1, Jul. 2014, 36 pages.

ETSI, "Digital Video Broadcasting (DVB); Generic Stream Encapsulation (GSE); Part 2: Logical Link Control (LLC)," ETSI TS 102 606-2, V1.2.1, Dec. 2016, 50 pages.

ETSI, "Digital Video Broadcasting (DVB); Generic Stream Encapsulation (GSE); Part 3: Robust Header Compression (ROHC) for IP," ETSI TS 102 606-3, V1.1.1, Jul. 2014, 10 pages.

European Patent Office Application Serial No. 22162376.2, Search Report dated Aug. 2, 2022, 9 pages.

ETSI, "Digital Video Broadcasting (DVB); Generic Stream Encapsulation (GSE); Part 2: Logical Link Control (LLC)," ETSI dTS 102 606-2, V1.1.1, Oct. 2013, 36 pages.

Korean Intellectual Property Office Application No. 10-2023-7025946, Office Action dated Jan. 14, 2025, 5 pages.

The State Intellectual Property Office of the People's Republic of China Application Serial No. 202280020660.9, Office Action dated Dec. 25, 2025, 16 pages.

Technical Specification, "LTE; Multimedia Broadcast/Multicast Service (MBMS); Application Programming Interface and URL (3GPP TS 26.347 version 14.0.0 Release 14)," ETSI TS 126 347 V14.0.0, Apr. 2017, 126 pages.

* cited by examiner

FIG. 2

FIG. 6 http[s]://<Host>/<ManifestPath>[?<field>=<value>[&<field>=<value>]*

| URL element | | Use | Data type | Description |
|---|---|---|---|---|
| Host | | 1 | String | The FQDN (or the IP address) and optionally the port number of the Multicast rendezvous service. |
| ManifestPath | | 1 | String | The resource path for retrieving the presentation manifest from the specified host. |
| field | | 0..n | | |
| | AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| | MGstatus | 0..1 | Integer | The value is the current status of the Multicast gateway. 0 = inactive 1 = active |
| | MGid | 0..1 | String | The value is the port number of the Multicast gateway, optionally preceded by its IP address. The format shall be [IP address:]port. |
| | MGhost | 0..1 | String | The value is the Multicast gateway host name. |
| | Ori | 0..1 | String | The value is the host name (FQDN) of the original targeted host. the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

FIG. 7 http[s]://<Host>[/session ID]/<ManifestPath>[?conf=<multicast session parameters>]

| URL element | Use | Data type | Description |
|---|---|---|---|
| Host | 1 | String | The IP address or FQDN of the Multicast gateway and optionally the port number (for example "router.example:8088" or "192.0.2.1:8088"). |
| Session ID | 0..1 | String | A unique presentation session identifier communicated (and possibly generated) by the Multicast rendezvous service comprising one or more URL path elements. |
| ManifestPath | 1 | String | The resource path for retrieving the presentation manifest from the specified host. |
| conf | 0..1 | String | The multicast session parameters shall take the form of a multicast gateway configuration instance document comprising one multicast session. The document shall be compressed using Gzip and base64-url-encoded prior to inclusion as a URL query string parameter. |

HTTP/1.1 307 Temporary Redirect
Server: <Multicast gateway>
Location: http[s]://<Multicast gateway>/<ManifestPath>

Figure 18C:
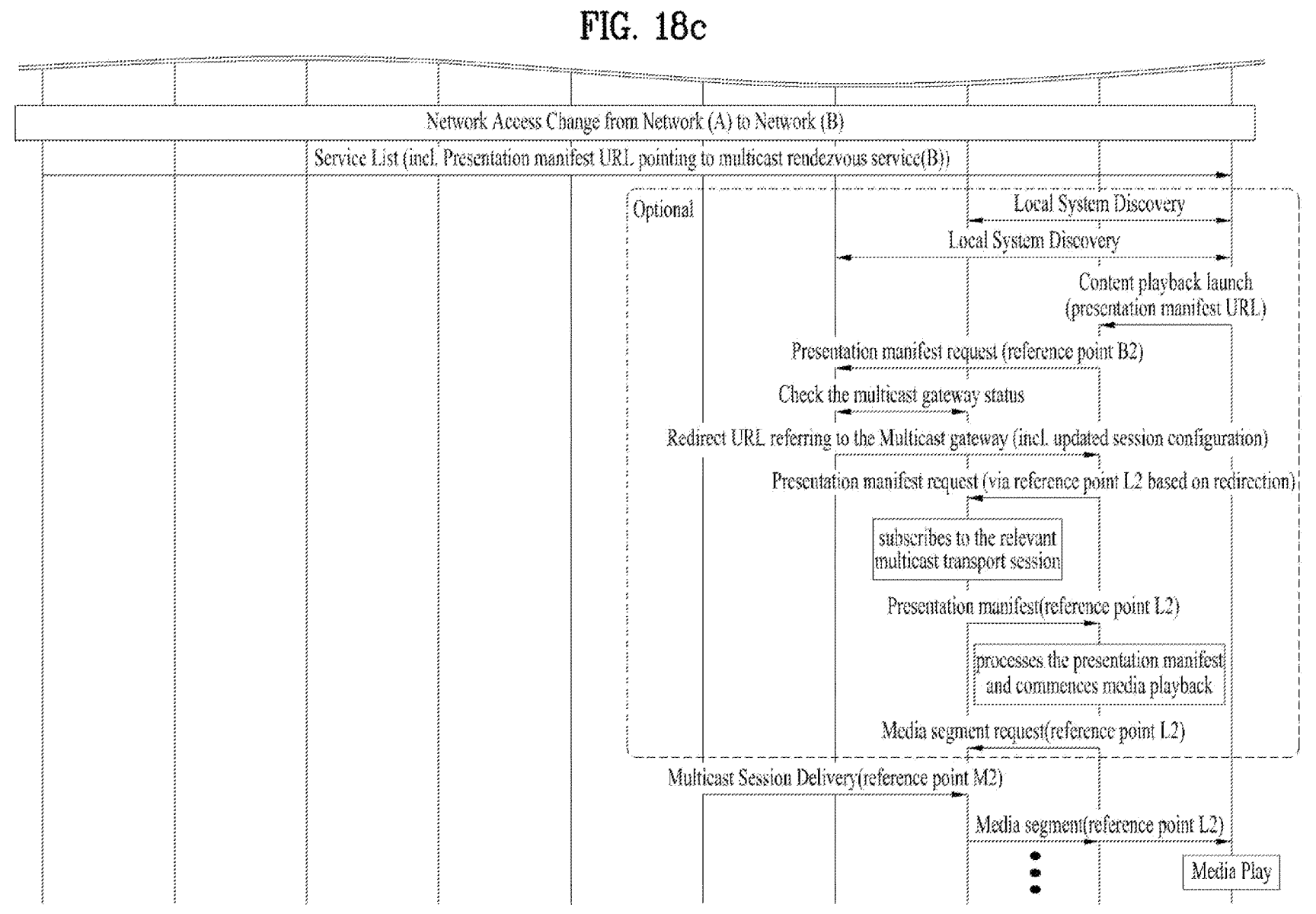

Network Access Change from Network (A) to Network (B)

Service List (incl. Presentation manifest URL pointing to multicast rendezvous service(B))

Optional

Local System Discovery

Local System Discovery

Content playback launch (presentation manifest URL)

Presentation manifest request (reference point B2)

Check the multicast gateway status

Redirect URL referring to the Multicast gateway (incl. updated session configuration)

Presentation manifest request (via reference point L2 based on redirection)

subscribes to the relevant multicast transport session

Presentation manifest(reference point L2)

processes the presentation manifest and commences media playback

Media segment request(reference point L2)

Multicast Session Delivery(reference point M2)

Media segment(reference point L2)

Media Play

Figure 27:
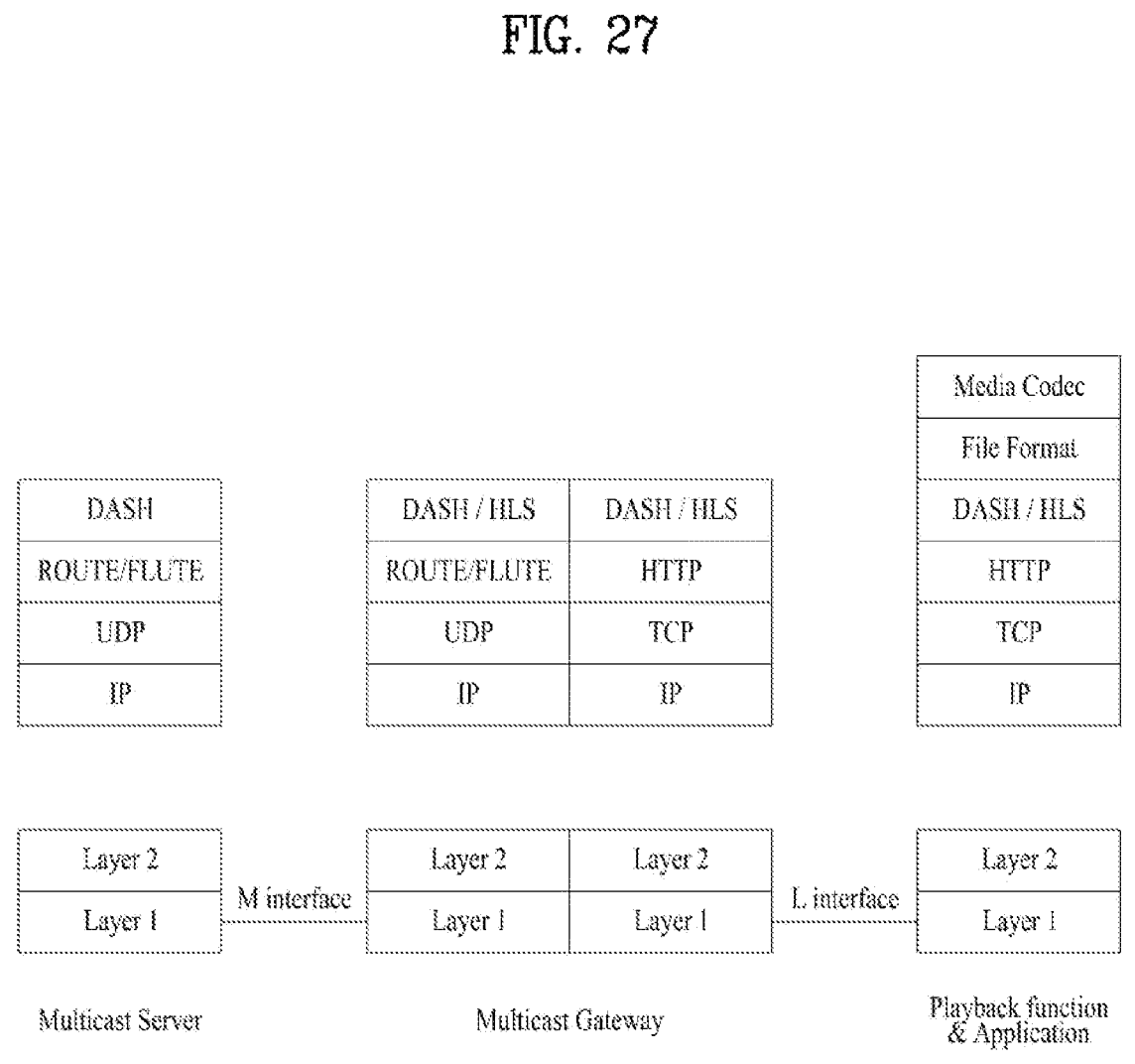

| Media Codec |
| File Format |

| DASH |
| --- |
| ROUTE/FLUTE |
| UDP |
| IP |

| DASH / HLS | DASH / HLS |
| --- | --- |
| ROUTE/FLUTE | HTTP |
| UDP | TCP |
| IP | IP |

| DASH / HLS |
| --- |
| HTTP |
| TCP |
| IP |

| Layer 2 |
| --- |
| Layer 1 |

M interface

| Layer 2 | Layer 2 |
| --- | --- |
| Layer 1 | Layer 1 |

L interface

| Layer 2 |
| --- |
| Layer 1 |

Multicast Server                Multicast Gateway                Playback function
                                                                & Application

FIG. 29

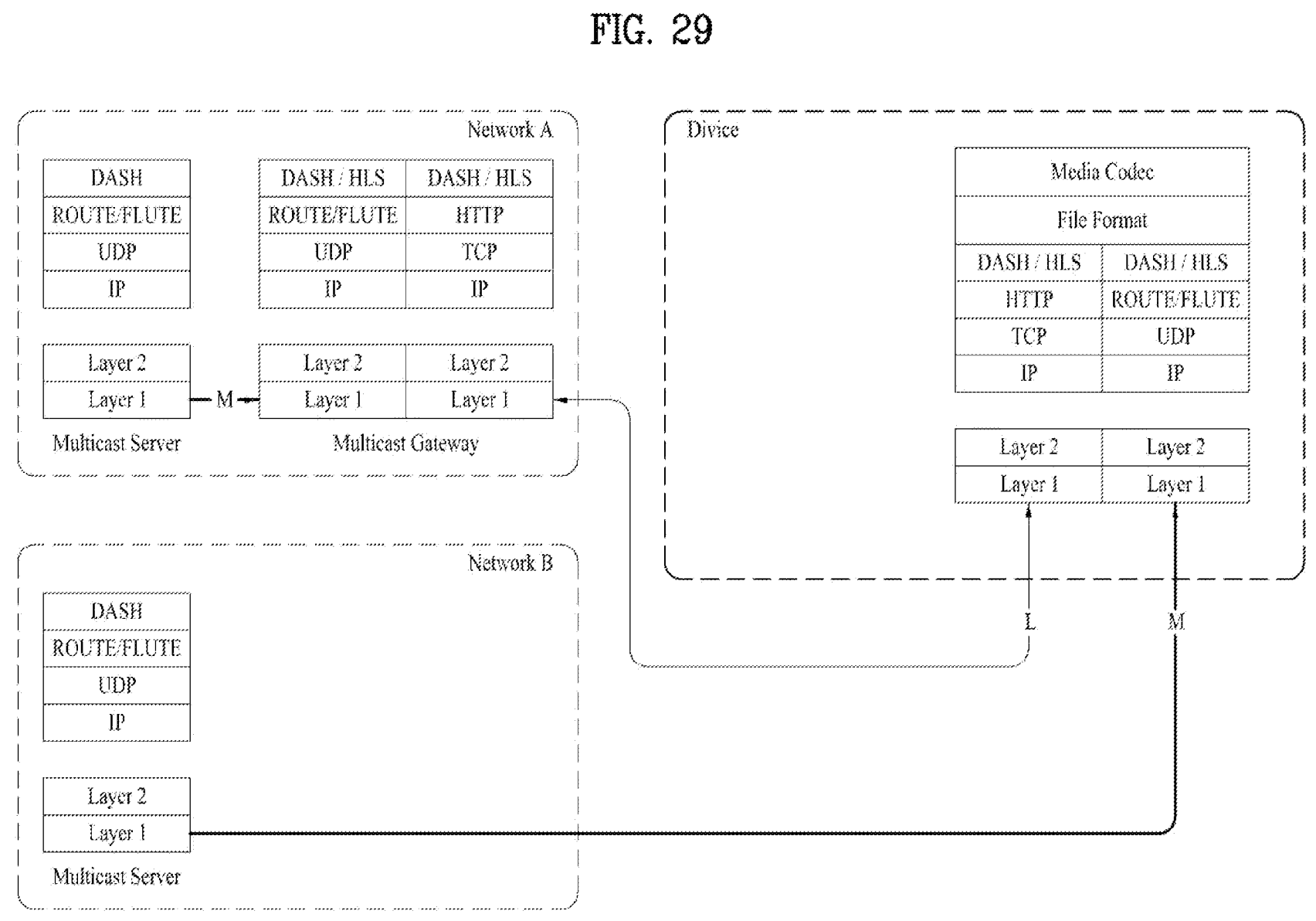

Device

| | Media Codec | | |
|---|---|---|---|
| | File Format | | |
| DASH / HLS | DASH / HLS | DASH / HLS | ROUTE/FLUTE |
| HTTP | | | |
| TCP | UDP | | |
| IP | IP | | |

| Layer 2 | Layer 2 |
|---|---|
| Layer 1 | Layer 1 |

M

L

Network A

| DASH / HLS | DASH / HLS |
|---|---|
| ROUTE/FLUTE | HTTP |
| UDP | TCP |
| IP | IP |

| Layer 2 |
|---|
| Layer 1 |

Multicast Gateway

| DASH |
|---|
| ROUTE/FLUTE |
| UDP |
| IP |

| Layer 2 |
|---|
| Layer 1 |

Multicast Server

M

Network B

| DASH |
|---|
| ROUTE/FLUTE |
| UDP |
| IP |

| Layer 2 |
|---|
| Layer 1 |

Multicast Server

| Element or attribute name | Use | Data type | Description |
|---|---|---|---|
| ServiceList | | | |
| @serviceIdentifier | 1..n | URI string | Service identifier for the logical service with which this session is associated. |
| PresentationManifest RequestURL | 1..n | URI string | URL of a multicast rendezvous service for the linear service. |
| @NetworkType | 0..1 | Unsigned Integer | Network type of deployed the multicast rendezvous service |
| @HostAddress | 1 | String | The FQDN (or the IP address) and optionally the port number of the Multicast rendezvous service. |
| @RendezvousServerType | 0..1 | Unsigned Integer | The Multicast rendezvous service type (regular, co-located) |
| MulticastTransportSession | 0..n | | Container for multicast transport session parameters. |

FIG. 34

| Element or attribute name | Use | Data type | Description |
|---|---|---|---|
| MulticastSession | | | |
| @serviceIdentifier | 1 | URI string | Service identifier for the logical service with which this session is associated. |
| @contentPlaybackAvailabilityOffset | 0..1 | Duration string | Availability time offset adjustment applied to the original presentation manifest when passed to instances of the Content playback function. |
| @networkIdentifier | 0..n | URI string | Identifier of network which current multicast session is transmitted |
| PresentationManifestLocator | 1..n | URI string | URL of a presentation manifest for the linear service. |
| @manifestId | 1 | Name Token string | Uniquely identifies this presentation manifest within the scope of a multicast session. |
| @contentType | 1 | MPEG-7 mimeType | The MIME content type of this presentation manifest. |
| MulticastTransportSession | 0..n | | Container for multicast transport session parameters. |

FIG. 35 http[s]://<Host> / <ManifestPath>[?<field>=<value>[&<field>=<value>]*]

| URL element | | Use | Data type | Description |
|---|---|---|---|---|
| Host | | 1 | String | The FQDN (or the IP address) and optionally the port number of the Multicast rendezvous service. |
| ManifestPath | | 1 | String | The resource path for retrieving the presentation manifest from the specified host. |
| field | | 0..n | | |
| | AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| | Priority | 0..1 | Integer | Priority of retrieving presentation when multiple network deployment |
| | MGstatus | 0..1 | Integer | The value is the current status of the Multicast gateway.<br>0 = inactive<br>1 = active |
| | MGid | 0..1 | String | The value is the port number of the Multicast gateway, optionally preceded by its IP address.<br>The format shall be [IP address:]port. |
| | MGhost | 0..1 | String | The value is the Multicast gateway host name. |
| | Ori | 0..1 | String | The value is the host name (FQDN) of the original targeted host. the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

FIG. 36 http[s]://<Host>[/session ID]/<ManifestPath>[?conf=<multicast session parameters>]

| URL element | Use | Data type | Description |
|---|---|---|---|
| Host | 1 | String | The IP address or FQDN of the Multicast gateway and optionally the port number (for example "router.example:8088" or "192.0.2.1:8088") |
| Session ID | 0.1 | String | A unique presentation session identifier communicated (and possibly generated) by the Multicast rendezvous service comprising one or more URL path elements. |
| ManifestPath | 1 | String | The resource path for retrieving the presentation manifest from the specified host. |
| RequestedPriority | 0.1 | String | Requested priority value from content playback |
| conf | 0.1 | String | The multicast session parameters shall take the form of a multicast gateway configuration instance document comprising one multicast session. The document shall be compressed using Gzip and base64url-encoded prior to inclusion as a URL query string parameter. |

HTTP/1.1 307 Temporary Redirect
Server: <Multicast gateway>
Location: http[s]://<Multicast gateway>/<ManifestPath>[?[<requestedPriority]*]

Figure 39C:
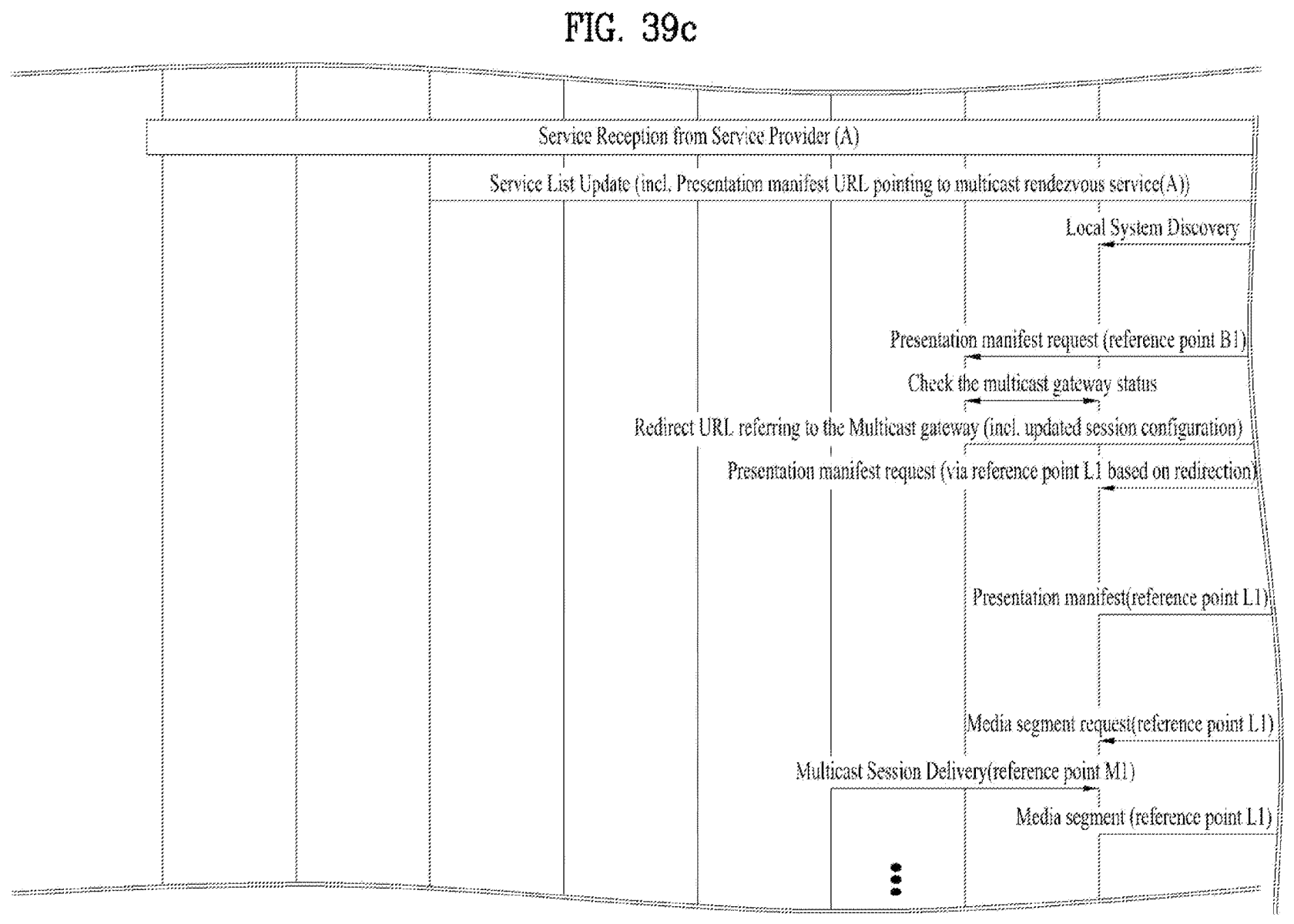

Service Reception from Service Provider (A)

Service List Update (incl. Presentation manifest URL pointing to multicast rendezvous service(A))

Local System Discovery

Presentation manifest request (reference point B1)

Check the multicast gateway status

Redirect URL referring to the Multicast gateway (incl. updated session configuration)

Presentation manifest request (via reference point L1 based on redirection)

Presentation manifest(reference point L1)

Media segment request(reference point L1)

Multicast Session Delivery(reference point M1)

Media segment (reference point L1)

Figure 39D:
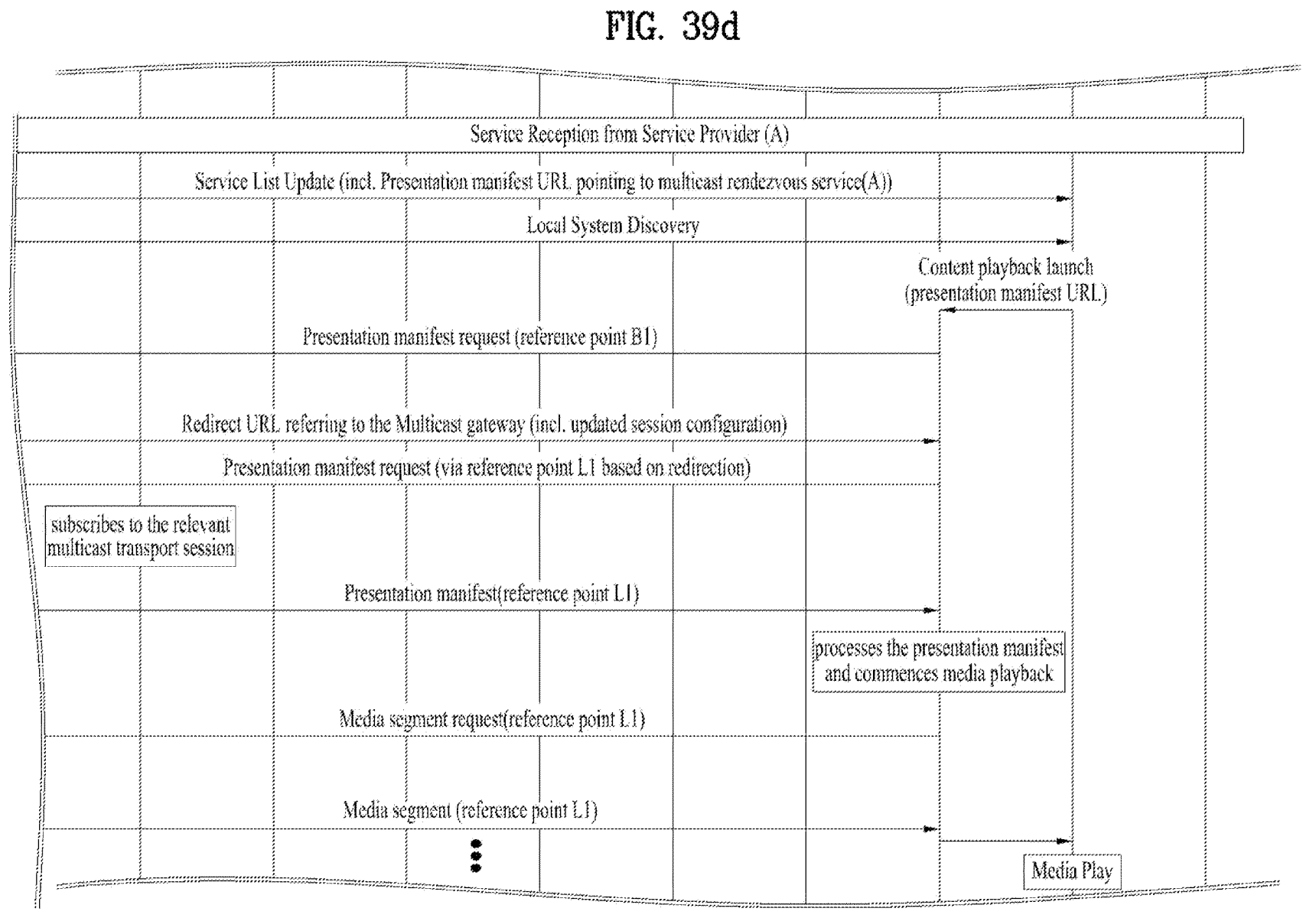

Service Reception from Service Provider (A)

Service List Update (incl. Presentation manifest URL pointing to multicast rendezvous service(A))

Local System Discovery

Presentation manifest request (reference point B1)

Redirect URL referring to the Multicast gateway (incl. updated session configuration)

Presentation manifest request (via reference point L1 based on redirection)

subscribes to the relevant multicast transport session

Content playback launch (presentation manifest URL)

Presentation manifest(reference point L1)

Media segment request(reference point L1)

processes the presentation manifest and commences media playback

Media segment (reference point L1)

•••

Media Play

Network Change and Service Reception from Service Provider (B)

FIG. 39f

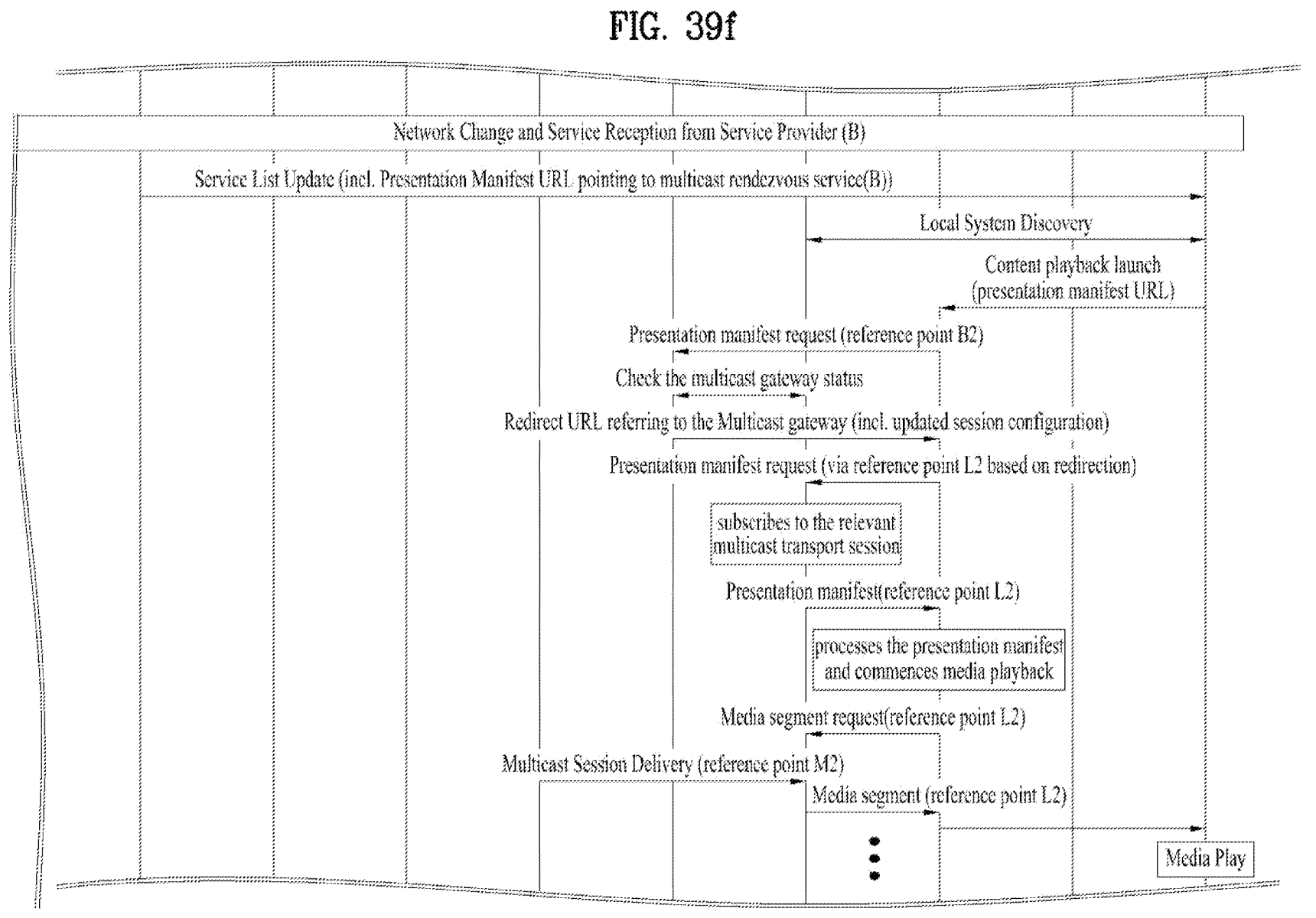

Network Change and Service Reception from Service Provider (B)

Service List Update (incl. Presentation Manifest URL pointing to multicast rendezvous service(B))

Local System Discovery

Content playback launch
(presentation manifest URL)

Presentation manifest request (reference point B2)

Check the multicast gateway status

Redirect URL referring to the Multicast gateway (incl. updated session configuration)

Presentation manifest request (via reference point L2 based on redirection)

subscribes to the relevant
multicast transport session

Presentation manifest(reference point L2)

processes the presentation manifest
and commences media playback

Media segment request(reference point L2)

Multicast Session Delivery (reference point M2)

Media segment (reference point L2)

· · ·

Media Play

FIG. 44

| Syntax | No. of bits | Mnemonic |
|---|---|---|
| LCD ( ) { | | |
|    PHY_descriptors() | variable | bslbf |
|    number_of_links | 16 | uimsbf |
|    for (i=0; i<N; i++){ | | |
|       link_id | 16 | uimsbf |
|       link_association_descriptors() | variable | bslbf |
|    } | | |
| } | | |

FIG. 45

| Syntax | No. of bits | Mnemonic |
|---|---|---|
| Link_association_descriptor() { | | |
| descriptor_tag | 8 | uimsbf |
| descriptor_length | 8 | uimsbf |
| modulation_system_type | 8 | uimsbf |
| modulation_system_id | 16 | uimsbf |
| PHY_stream_id | 16 | uimsbf |
| } | | |

FIG. 46

| Syntax | No. of bits | Mnemonic |
|---|---|---|
| NCD () { | | |
| platform_descriptors() | variable | bslbf |
| for(i=0;i<N;i++){ | variable | bslbf |
| target_descriptors() | variable | bslbf |
| operational_descriptors() | variable | bslbf |
| } | | |

FIG. 48

| Syntax | No. of bits | Mnemonic |
|---|---|---|
| mABR_IPv6_transport_session_descriptor () { | | |
|    descriptor_tag | 8 | uimsbf |
|    descriptor_length | 8 | uimsbf |
|    multicast_transport_session_id_length | 16 | uimsbf |
|    for(i=0;i<N;i++){ | | |
|       multicast_transport_session_id | variable | string |
|    } | | |
|    source_IPv6_address | 128 | uimsbf |
|    destination_IPv6_address | 128 | uimsbf |
|    source_UDP_port | 8 | |
|    destination_UDP_port | 8 | |
| } | | |

FIG. 49

| Syntax | No. of bits | Mnemonic |
|---|---|---|
| mABR_IPv4_transport_session_descriptor () { | | |
| descriptor_tag | 8 | uimsbf |
| descriptor_length | 8 | uimsbf |
| multicast_transport_session_id_length | 16 | uimsbf |
| for(i=0;i<N;i++){ | | |
| multicast_transport_session_id | variable | string |
| } | | |
| source_IPv4_address | 128 | uimsbf |
| destination_IPv4_address | 128 | uimsbf |
| source_UDP_port | 8 | |
| destination_UDP_port | 8 | |
| } | | |

| Profile identifier | Used for | Reference |
|---|---|---|
| 0x0001 | RTP/UDP/IP | RFC 3095 [4] and RFC 4815[5] |
| 0x0002 | UDP/IP | RFC 3095 [4] and RFC 4815[5] |
| 0x0003 | ESP/IP | RFC 3095 [4] and RFC 4815[5] |
| 0x0004 | IP | RFC 3843 [6] and RFC 4815[5] |

MULTICAST SIGNAL PROCESSING METHOD AND DEVICE

CROSS-REFERENCE TO RELATED APPLICATIONS

This application is the National Stage filing under 35 U.S.C. 371 of International Application No. PCT/KR2022/095043, filed on Feb. 28, 2022, which claims the benefit of earlier filing date and right of priority to Korean Application Nos. 10-2021-0034137, filed on Mar. 16, 2021, and 10-2021-0079486, filed on Jun. 18, 2021, the contents of which are all incorporated by reference herein in their entireties.

TECHNICAL FIELD

The present disclosure relates to an apparatus and method for processing a multicast signal.

BACKGROUND ART

With the development of digital technology and communication technology, distribution and demand of audio/video-oriented multimedia contents are rapidly expanding in various areas such as broadcasting, movies, Internet and personal media. In addition, as the size of TV screens at home increases with the development of display technology, ultra high definition (UHD) broadcasting services are increasingly discussed.

Regarding a broadcast service, a multicast transmission scheme for transmitting the same content to a plurality of users is effective because it may take advantage of both unicast and broadcast. However, the conventional multicast transmission scheme is available within a single network, and cannot support a multicast service between heterogeneous networks. As a result, when a multicast reception device establishes and releases connection to different access networks, a new multicast service is required to start after the existing multicast service is terminated. In addition, when a plurality of delivery protocols are used, a protocol constituting payload on IP/UDP or IP/TCP cannot be identified with a port number if it is not registered in IANA. In the case of IP multicast, valued assigned to multicast are used as the destination address and port number, and thus all receivers receive the corresponding packet. If an unknown protocol is used at this time, multicast of the packet may not be processed.

DISCLOSURE

Technical Problem

An object of the present disclosure is to provide a multicast signal transmission method and apparatus which are capable of improving transmission efficiency.

An object of the present disclosure is to efficiently provide a multicast service between multiple networks.

The technical scope of the embodiments is not limited to the aforementioned technical objects, and may be extended to other technical objects that may be inferred by those skilled in the art based on the entire contents disclosed herein.

Technical Solution

According to embodiments, an apparatus for receiving a multicast signal may include a multicast gateway configured to receive a multicast signal based on an interface from a multicast server, and a content playback function configured to display a multicast service in the multicast signal. According to embodiments, a method of receiving a multicast signal may include receiving a multicast signal based on an interface from a multicast server, and displaying a multicast service in the multicast signal.

Advantageous Effects

According to an embodiment of the present disclosure, a multicast service may be provided between multiple networks.

According to the embodiments, a media architecture for multicast media streaming based on multiple networks may be provided, thereby enabling the same level of media service over multiple networks to which the DVB multicast ABR structure may be applied.

According to embodiments, multicast content may be received through various access methods without depending on a network to which a reception device is connected during multicast streaming.

According to embodiments, even when various devices are connected to separate networks, the same level of ABR multicast service may be provided.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 2 illustrates a multicast rendezvous service-based presentation manifest acquisition process according to embodiments;

FIG. 6 shows elements included in a URL according to embodiments;

FIG. 7 shows elements included in a URL according to embodiments;

FIG. 9 shows a multicast streaming structure for both multicast network streaming and communication network streaming according to embodiments;

FIG. 13 illustrates an example of multiple networks to which an apparatus connects according to embodiments;

FIG. 17 illustrates an example in which a multicast server and a multicast gateway are configured in each network according to embodiments;

FIG. 21 illustrates an example in which the service of a single multicast server is provided for a plurality of heterogeneous networks, and a multicast gateway therefor configures each network according to the embodiments;

FIG. 23 illustrates an example in which all multicast rendezvous services are configured in co-located deployment when a multicast server and a multicast gateway are configured in each network according to the embodiments;

FIG. 27 illustrates a protocol configuration for ABR multicast according to embodiments;

FIG. 29 illustrates a protocol according to embodiments;

FIG. 32 illustrates service list and presentation manifest management according to embodiments;

FIG. 33 shows a service list according to embodiments;

FIG. 34 shows a multicast session according to embodiments;

FIG. 35 shows elements included in a Request URL of an HTTP message according to embodiments;

FIG. 36 shows information included in a Redirect URL of a Location response header according to embodiments;

FIG. 44 illustrates a link control data (LCD) configuration according to embodiments;

FIG. 45 illustrates a link related descriptor according to embodiments;

FIG. 46 illustrates network control data (NCD) according to embodiments;

FIG. 48 illustrates a mABR IPv6 transport session descriptor according to embodiments;

FIG. 49 illustrates a mABR IPv4 transport session descriptor according to embodiments;

FIG. 51 illustrates a 5G system structure in a reference point representation according to embodiments;

FIG. 52 illustrates a 5G system structure for multiple PDU sessions according to embodiments;

FIG. 58 shows a reference architecture according to embodiments;

FIG. 59 shows a reference architecture according to embodiments;

FIG. 63 illustrates a hybrid broadcast reception device according to embodiments;

BEST MODE

Figure 1:
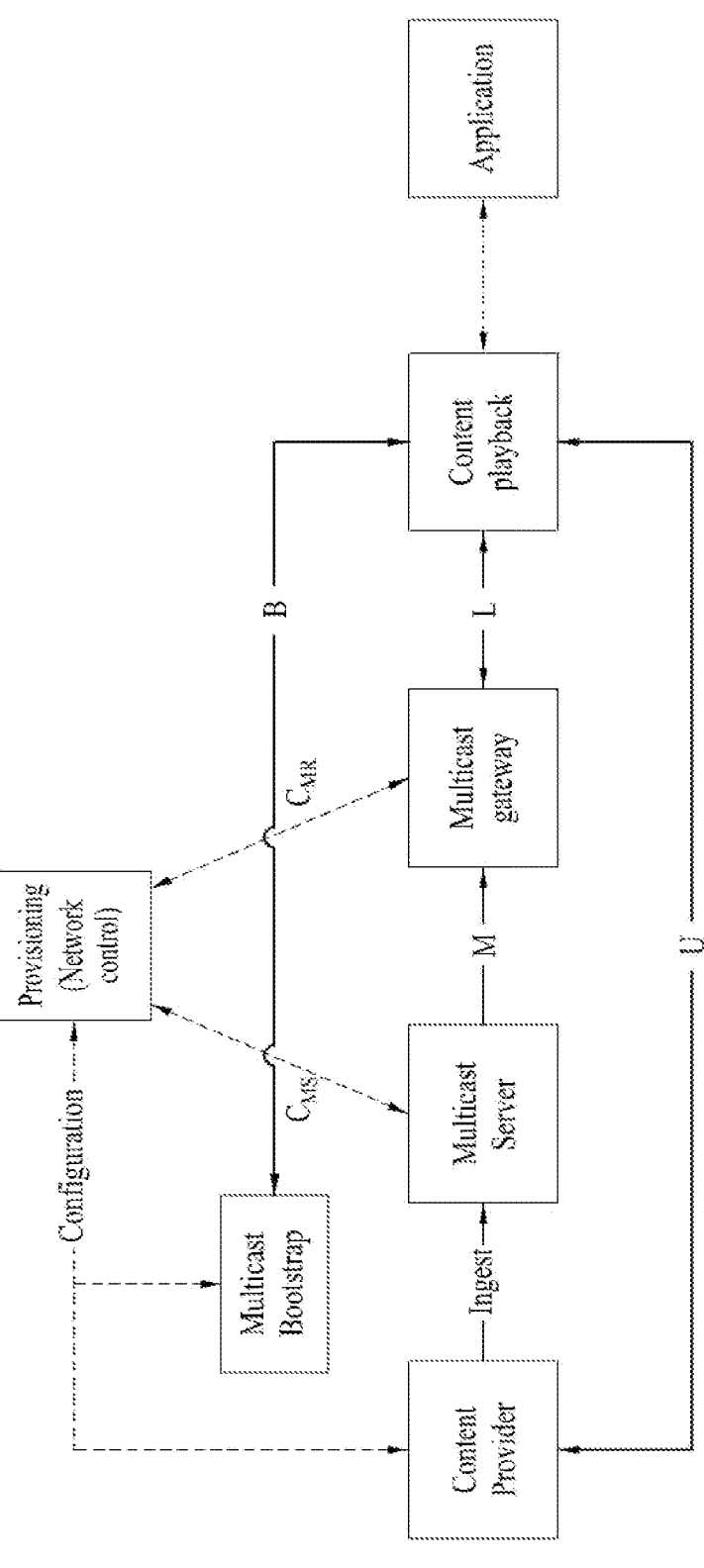
FIG. 1 illustrates a multicast Adaptive Bitrate (ABR) structure according to embodiments.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

A multicast signal processing method and apparatus according to the embodiments may include a multicast signal transmission method, a multicast signal reception method, a multicast signal transmission device, and a multicast signal reception device, and may be referred to simply as a method/apparatus according to the embodiments.

The method/apparatus according to the embodiments relates to a method of media delivery in an adaptive bitrate multicast network based on unidirectional delivery.

Media according to embodiments may be referred to as a media signal, media data, or the like, and may be construed as a term corresponding to a service or service data or including a service.

Embodiments propose an architecture for media streaming in an Internet Protocol (IP)-based media delivery system.

Embodiments propose a media streaming architecture for multicast application when an IP-based media delivery system is configured with a plurality of networks.

Embodiments propose an ABR multicast method used when an IP-based media delivery system is configured with a plurality of networks.

Embodiments propose a service list reception method (flow) and an operation of a device (multicast signal processing apparatus according to embodiments) when an IP-based media delivery system is configured with a plurality of networks.

Embodiments propose signaling information necessary for a receiver (device) on a plurality of networks.

Embodiments propose a multicast ABR architecture according to the configuration of a content provider and a service provider corresponding to a multicast signal processing apparatus.

Embodiments provide a media architecture for multicast media streaming based on a plurality of networks. Thus, the DVB multicast ABR structure may be applied and the same level of media service is available in multiple networks. In particular, during multicast streaming, multicast content may be received by various access methods without depending on the network to which the reception device is connected.

Therefore, when various devices are connected to separate networks, the same level of ABR multicast service may be provided.

The method/apparatus according to the embodiments may provide a multicast transport session mapping method for adaptive bitrate multicast media delivery in a unidirectional delivery network.

In a unidirectional delivery network such as terrestrial broadcast or satellite broadcast, in order to support adaptive bitrate multicast media delivery configured for application to an existing ISP network, a multicast transport session may be mapped to a resource of a unidirectional delivery network.

When the unidirectional delivery network is applied to an interface between the multicast server and the multicast gateway, transparent transmission may be supported.

With the diversity of networks, as various devices access a network, it is necessary to provide media streaming to various devices and multiple users. In such an environment, if transmission is performed only in a unicast manner for all streaming sessions, the quality of the media streaming service as well as other services using the network may deteriorate due to an increase in the load on the network. Therefore, multicast-efficient multicast streaming transmission is needed. Currently, the ABR multicast structure defined in DVB is mainly defined when the multicast providing network is a single network. In order to provide the same service over various networks including the 5G network (wireless network), it is necessary for the device to operate smoothly over each network. To this end, it may be necessary to update the interface and architecture. In addition, if excessively many network changes are made for the existing service provider to support ABR multicast, the actual ABR multicast service may not be provided due to implementation difficulties and cost issues.

Multicast technology is providing services in various network environments for universal media streaming, and transmission is possible in most IP-based networks. In addition, in order to provide the ABR multicast service using the same function for a plurality of heterogeneous networks, a function and architecture adapted to each network are required. When the ABR multicast service is provided over multiple networks, it is necessary to define the transmission of the service list and the management plan therefor in order to provide continuity of the service from the user perspective.

In the present disclosure, a description will be given of an architecture allowing the DVB ABR multicast structure to be provided over various networks, and an interface therefor. Also, a description will be given of a method of providing a service list over a plurality of networks and an interface and flow for processing the service list in a device.

In addition, the method/apparatus according to the embodiments may provide an interface and signaling flow for linking a multicast transport session to a broadcast stream in order to transmit a media object of DVB ABR multicast in a unidirectional delivery network, such as terrestrial broadcast and satellite broadcast links defined in the DVB standard.

FIG. 1 illustrates a multicast Adaptive Bitrate (ABR) structure according to embodiments.

The multicast signal processing method/apparatus according to the embodiments may transmit media contents by multicast based on the structure shown in FIG. 1. The media contents may be referred to as multicast media, multicast media data, service data, or the like. Each component in FIG. 1 corresponds to hardware, software, a processor, and/or a combination thereof.

The interfaces in FIG. 1 may be defined as follows.

L: A unicast HTTP(S) interface between a content playback function and a multicast gateway.

B: A bootstrap unicast HTTP(S) interface between the content playback function and a multicast bootstrap function. It may be used to request an initial presentation manifest.

M: An interface for the multicast server to transmit multicast IP contents and for the multicast gateway to receive the contents.

U: An interface for the content playback function to receive media content directly from the content provider by unicast.

Ingest: An interface to provide media contents to the multicast server.

CMS: A control interface for configuration of the multicast server.

CMR: A control interface for configuration of the multicast gateway.

Configuration: A control interface for exchange of configuration information between the content provider, the provisioning, and the multicast bootstrap function.

The modules in FIG. 1 may be defined as disclosed below. Each module may correspond to hardware, software, a processor, and/or a combination thereof.

Content Provider: Creates media content or stores created media content, and delivers the content to users over a network. It may use transmission schemes such as multicast and unicast to transmit media content to users, and provides media content data and control information to the multicast server via the ingest interface for multicast transmission. The media content data may be packaged in a format such as DASH or HLS, and may configure a presentation manifest according to the packaging format.

Multicast Server: receives media content from the content provider and transmits the same to the multicast gateway via the interface M using the IP multicast transport scheme. In this case, some control information may be transmitted as well. As the multicast protocol, ROUTE, FLUTE, QUIC, RTP, and the like may be considered.

Multicast Gateway: Receives a packaged content segment transmitted by multicast, and provides the same to the content playback function via the interface L in a manner of HTTP(S) or the like. To this end, the content segment is cached. The content segment may represent segmented media data. The segmented media data may be stored (cached).

Provisioning (Network Control): Provides configuration information about a network and a multicast streaming session to the multicast server and the multicast gateway.

Multicast Bootstrap: May target and process address information (url or address) for the content playback function to access first via the interface B. It processes an initial request for the presentation manifest received from the content playback function via the reference point B. In the case of multicast, redirection information for receiving the manifest via the interface L is provided. In the case of unicast, redirection information for receiving the manifest via the interface U is provided. A multicast rendezvous service function may be performed in the DVB ABR multicast structure.

Content Playback: The content playback function manages content request, reception, decoding, presentation, and the like. Unicast transport via the interface L may be considered.

Application: The application controls the content playback function based on user input. For example, it may be a built-in control application (EPG application) of a TV or set-top box, or a third-party application provided by the content provider. The interface used by the application to control the content playback may be implemented as a separate API or the like according to each device.

The multicast signal processing method/apparatus according to the embodiments may include a multicast server and a multicast gateway, and further include a content provider, provisioning and a multicast bootstrap function, in terms of an operation of transmitting media.

The multicast signal processing method/apparatus according to the embodiments may include a content playback function and an application in terms of an operation of receiving media.

Figure 2:
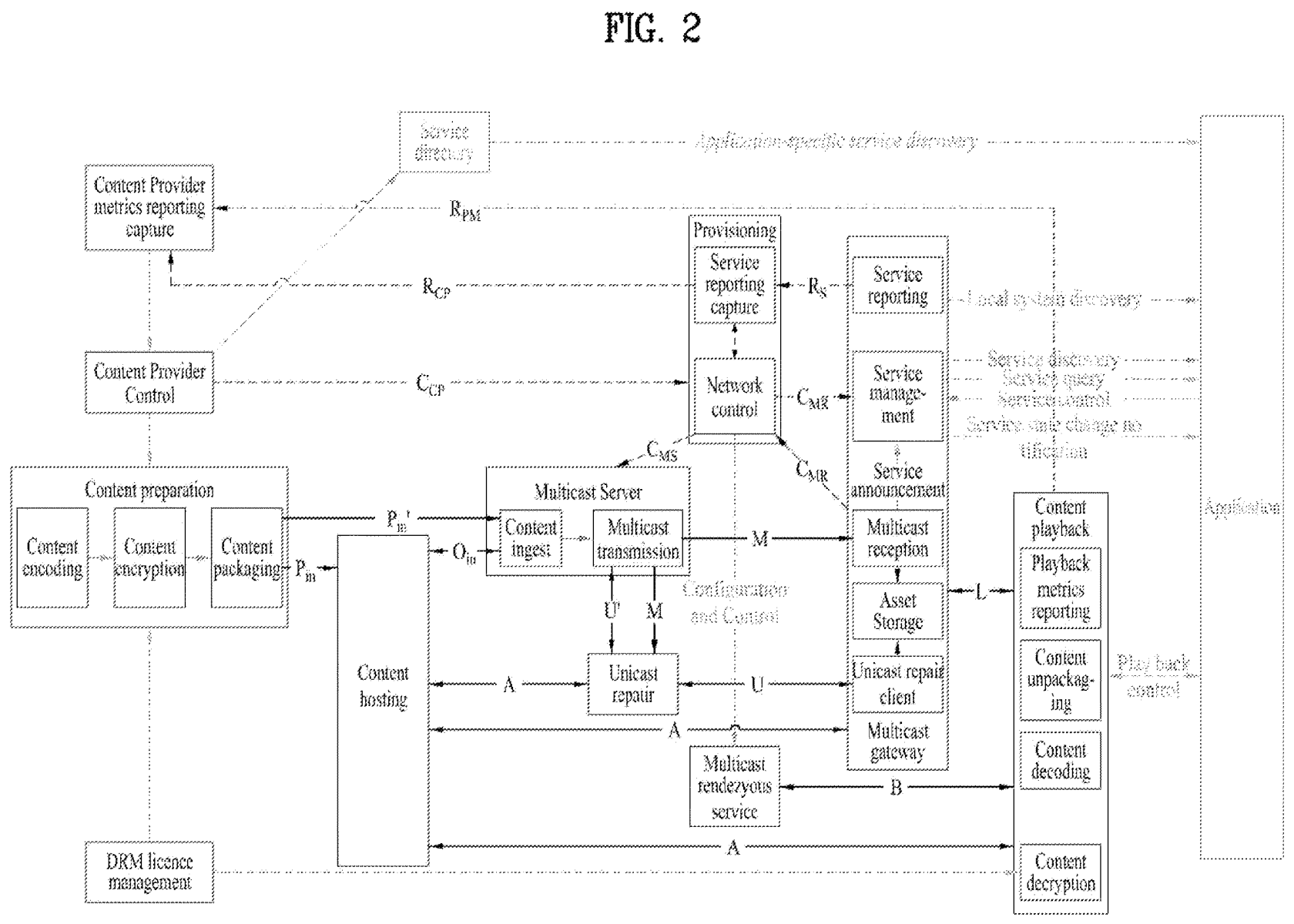

FIG. 2 illustrates a multicast rendezvous service-based presentation manifest acquisition process according to embodiments.

The multicast signal processing method/apparatus according to the embodiments of FIG. 1 may carry out a multicast rendezvous service as shown in FIG. 2. Each component in FIG. 2 corresponds to hardware, software, a processor, and/or a combination thereof.

The content playback function makes a request for contents to the multicast gateway when receiving multicast. In the case of unicast reception, the content playback function receives content from content hosting. To this end, in order to acquire a presentation manifest for receiving media contents, the initial content playback function may access a multicast rendezvous service first via a reference point B. The multicast rendezvous service may provide the content playback function with a URL from which a presentation manifest may be appropriately acquired according to multicast and unicast.

Figure 3:
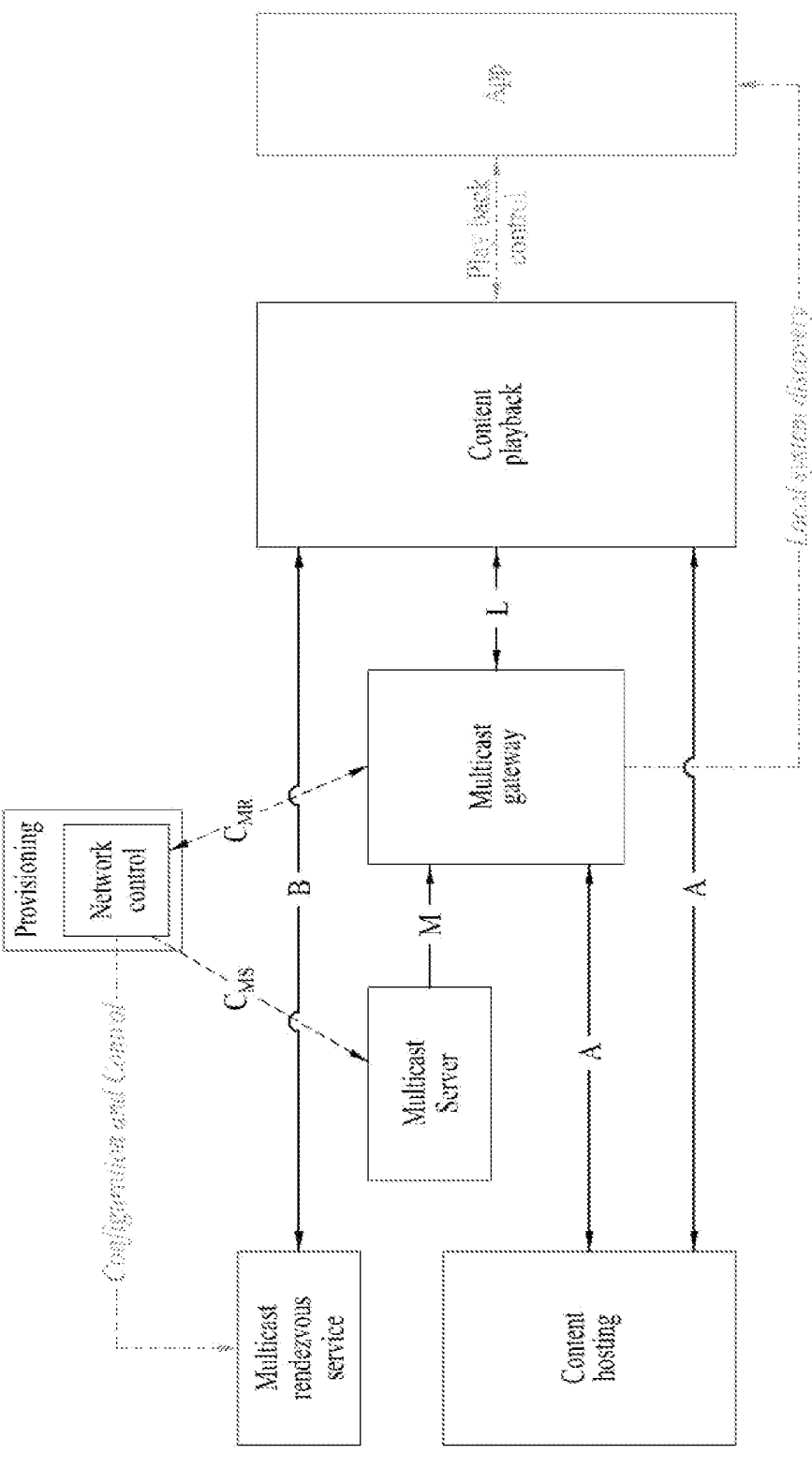
FIG. 3 shows a structure for a multicast rendezvous service according to embodiments.

FIG. 3 shows a structure for a multicast rendezvous service according to embodiments.

In the structure of FIGS. 1 and 2, the multicast method/apparatus according to the embodiments may execute a rendezvous service as shown in FIG. 3. Each component in FIG. 3 corresponds to hardware, software, a processor, and/or a combination thereof.

Deployment of Multicast Rendezvous Service:

The multicast rendezvous service may be divided into regular deployment and co-located deployment depending on whether HTTP(s) and unidirectional transmission are supported.

The content playback function of the multicast signal processing apparatus according to the embodiments may acquire manifest url information and perform configuration for media reception through the following operations.

Regular deployment: The multicast rendezvous service is configured in a network and managed by a system operator.

Co-located deployment: The multicast rendezvous service is implemented in the same device as the multicast gateway Regular Deployment Referring to FIG. 3, the multicast rendezvous service corresponds to an element positioned in a network and managed and controlled by a system operator.

The content playback function may acquire manifest url information for reception of contents from the multicast rendezvous service via the reference point B when making an initial access to the contents to be received. To this end, the following configuration may be implemented.

A configuration for a set of basic parameters (e.g., the endpoint address of a multicast gateway configuration transport session) may be applied to the multicast gateway. For this configuration, an in-band multicast gateway configuration method may be used.

A configuration for a set of currently provisioned multicast sessions may be applied to the multicast gateway via a reference point CMR or a reference point CMS and M. For this configuration, out-of-band pushed configuration, out-of-band pulled configuration, and Just-in-time configuration methods as well as the in-band multicast gateway configuration method may be applied.

Figure 4:
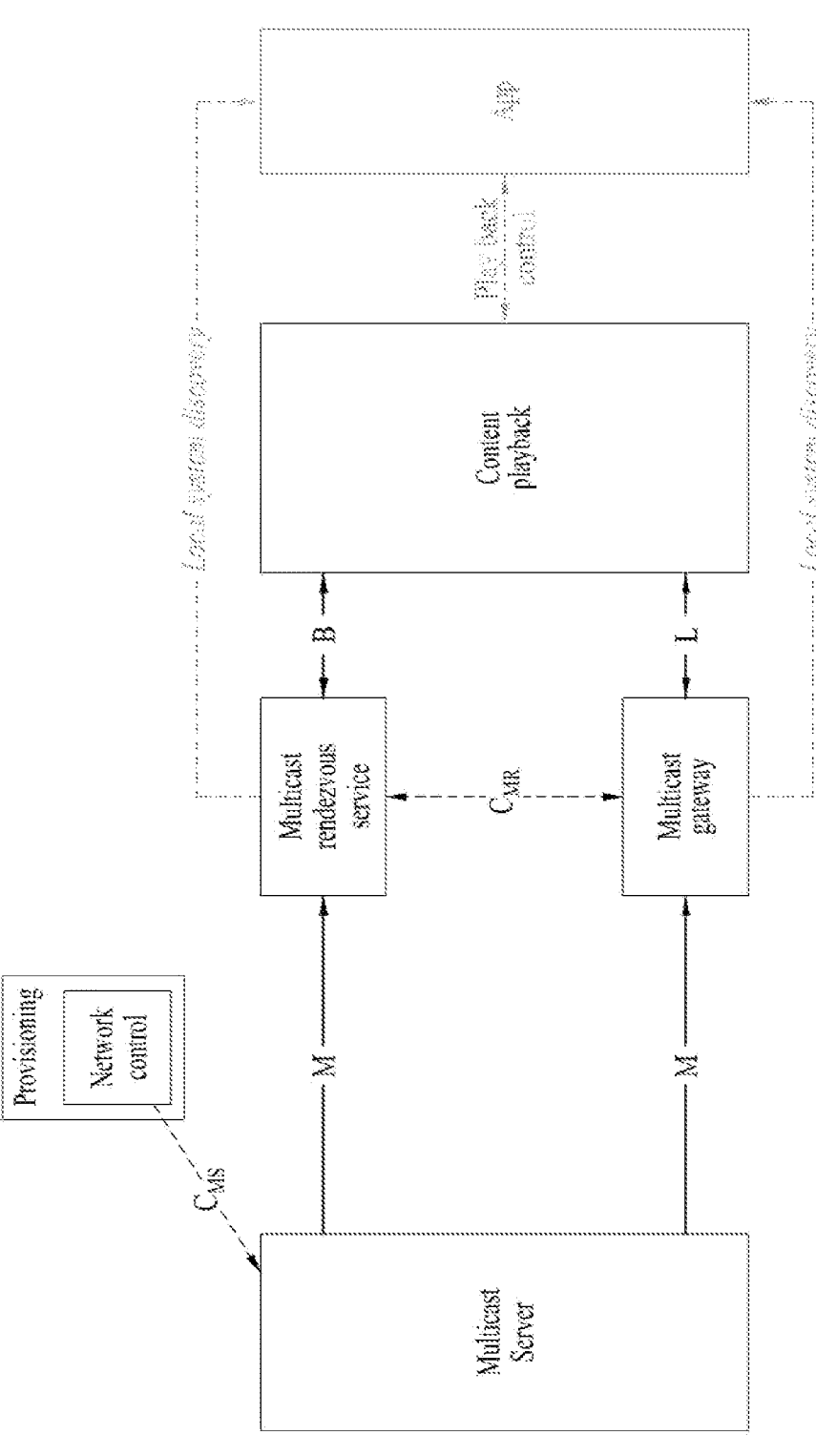
FIG. 4 shows a structure for a multicast rendezvous service according to embodiments.

FIG. 4 shows a structure for a multicast rendezvous service according to embodiments.

FIG. 4 illustrates co-located deployment in FIG. 3.

Co-Located Deployment:

As shown in FIG. 4, a multicast rendezvous service may be configured in the same device as the multicast gateway (the multicast processing apparatus according to embodiments). It may be mainly used when the multicast ABR network is configured in unidirectional deployment. Each component in FIG. 4 corresponds to hardware, software, a processor, and/or a combination thereof.

The content playback function may acquire manifest url information for reception of contents from the multicast rendezvous service via the reference point B when making an initial access to the contents to be received. To this end, the following configuration may be implemented.

A configuration for a set of basic parameters (e.g., the endpoint address of a multicast gateway configuration transport session) may be applied to the multicast rendezvous service.

A configuration for a set of currently provisioned multicast sessions may be applied to the multicast gateway via the reference point M.

In this case, an in-band multicast gateway configuration method may be used for each configuration.

Figure 5A:
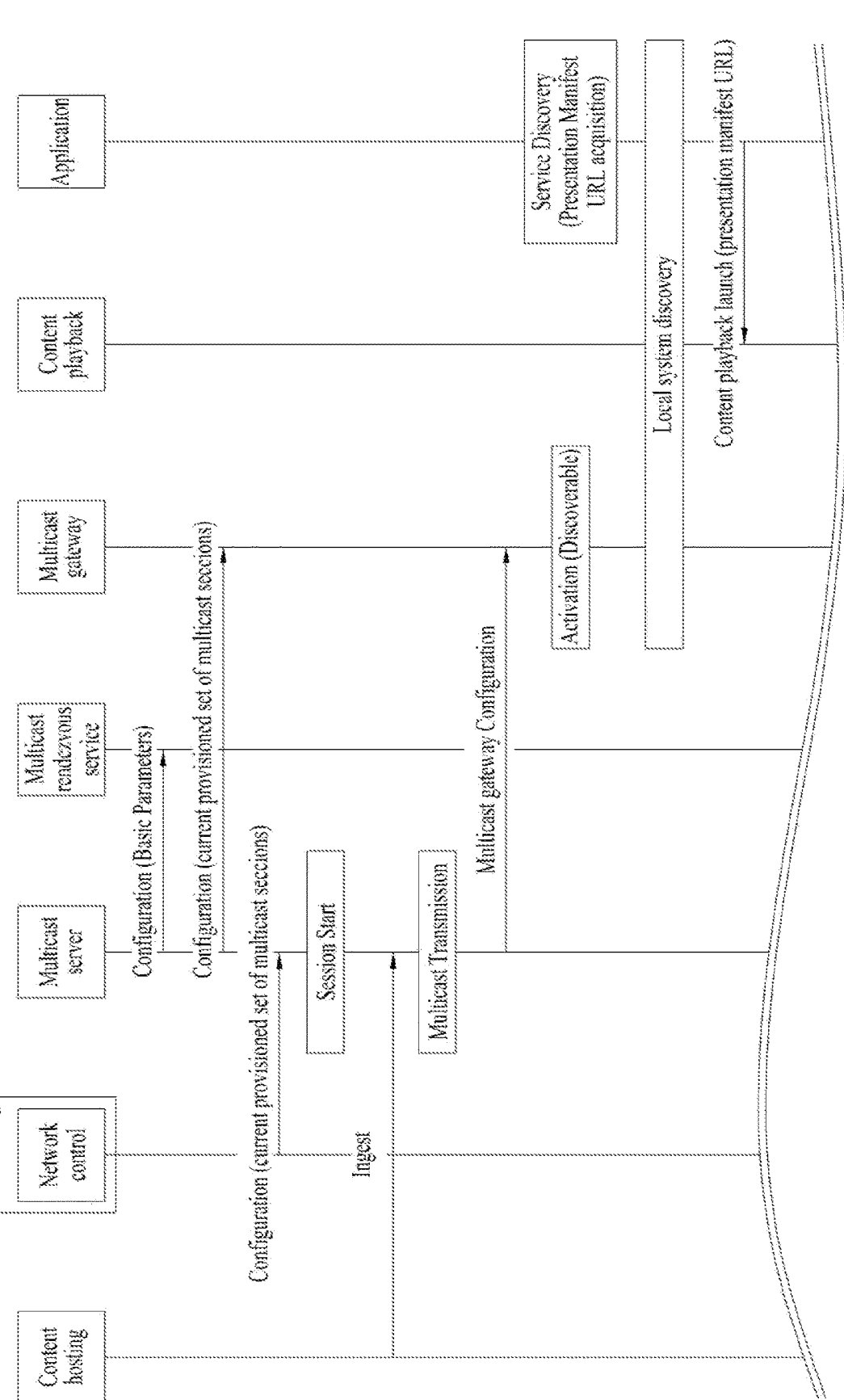
FIG. 5 shows a flow diagram of multicast-based media reception according to embodiments.
Figure 5B:
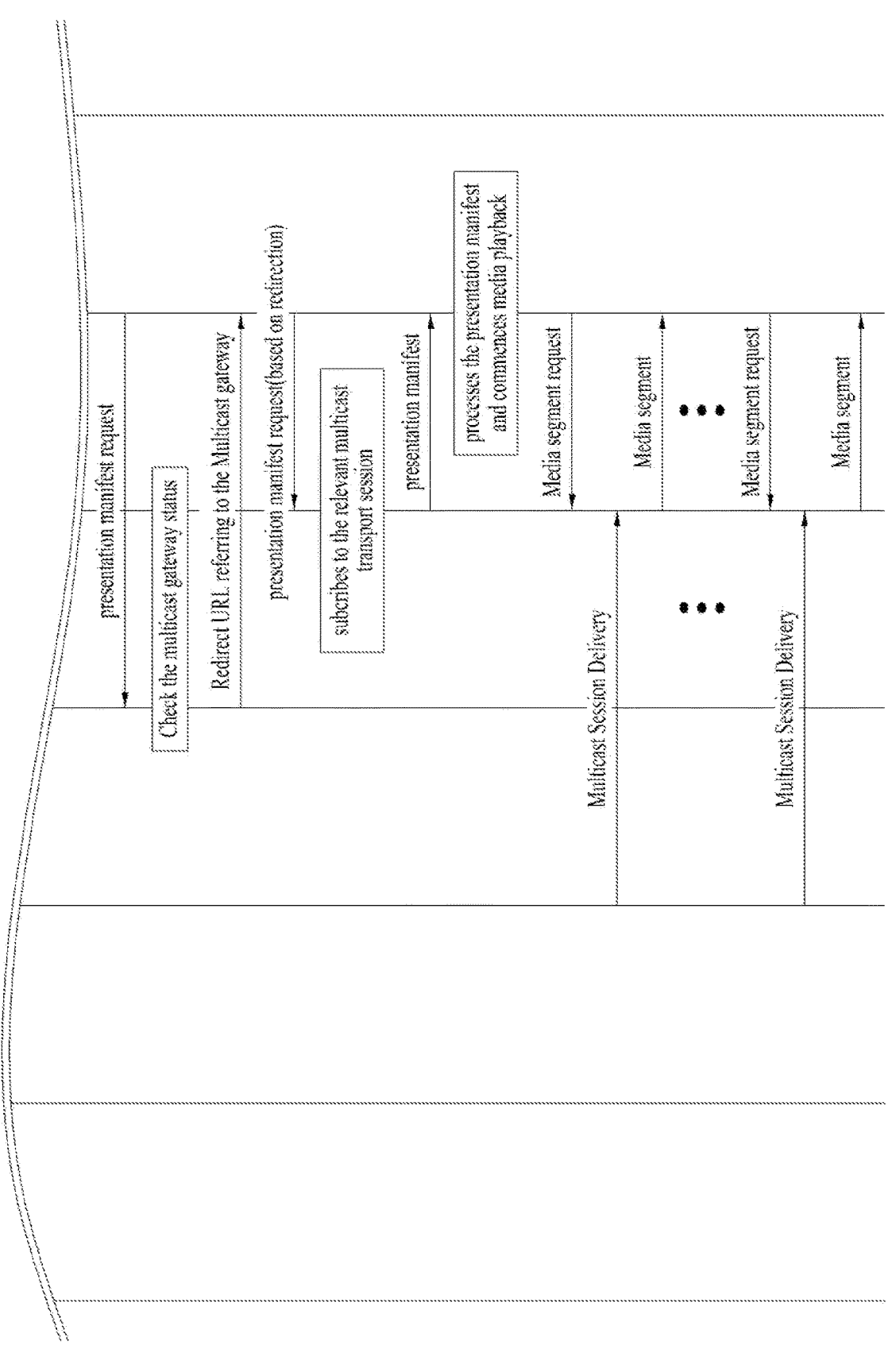

FIG. 5 shows a flow diagram of multicast-based media reception according to embodiments.

The multicast signal processing method/apparatus (FIGS. 1 to 4) according to the embodiments may receive multicast media based on the following flow diagram.

Multicast Operation According to Embodiments:

When a user or the multicast signal processing apparatus selects multicast contents to be received, the application may acquire a URL for requesting an initial presentation manifest through a service directory, or the like (5000). Here, the URL indicates a multicast rendezvous service.

The application controls the content playback function to start an operation for content reception. In this case, it may deliver the URL for the multicast rendezvous service.

The content playback function makes a request for a presentation manifest to the multicast rendezvous service via the reference point B using the URL acquired from the application (5001).

The multicast rendezvous service checks the status of the multicast gateway and transmits, when the service for the requested presentation manifest is defined in the multicast configuration, the redirection URL for the multicast gateway to the content playback function (5002). In this case, a multicast session configuration may be contained in the transmitted redirection message.

Upon receiving the redirection message, the content playback function makes a request for a presentation manifest to the multicast gateway according to the redirection (5003).

When the multicast gateway has a pre-cached presentation manifest, it transmits the presentation manifest to the content playback function (5004).

When the multicast gateway has no cached presentation manifest, it may obtain a presentation manifest from the content hosting function via reference point A, and transmit the same to the content playback function.

The content playback function may receive a media segment for the contents via the multicast gateway based on the received presentation manifest.

In this operation, the syntax of the Request URL of the HTTP message sent by the content playback function to the multicast rendezvous service is configured as follows:

http[s]://<Host>/<ManifestPath>[?<field>=<value>
   [&<field>=<value>]*]

FIG. 6 shows elements included in a URL according to embodiments.

The elements included in the URL are shown in FIG. 6.

Host: FQDN (or IP address) and optionally the port number of the multicast rendezvous service.

ManifestPath: The resource path for retrieving the presentation manifest from the specified host.

AToken: The value is an authentication token that authorizes access to the multicast rendezvous service, if required by the system operator. This may have been included in the original presentation manifest URL, or it may have been added by a third-party CDN broker as part of an earlier HTTP redirect URL, or it may be generated locally by the application.

MGstatus: The value is the current status of the multicast gateway: 0=inactive; 1=active.

MGid: The value is the port number of the multicast gateway, optionally preceded by its IP address. The format is [IP address]:port.

MGhost: The value is the multicast gateway host name.

On: The value is the host name (FQDN) of the original targeted host.

The application may substitute the original targeted host (FQDN) with the local multicast rendezvous service host name or address. Moreover, in case of relying on a third-party CDN broker, the latter may indicate here the original targeted host name (FQDN) before redirecting the request to the multicast rendezvous service.

When the multicast rendezvous service receives this request URL, it may send a 307 Temporary Redirect response. Here, the syntax of the Redirect URL in the Location response header is configured as follows:

http[s]://<Host>[/session    ID]/<ManifestPath>[?conf=
<multicast session.

FIG. 7 shows elements included in a URL according to embodiments.

Elements included in the URL are shown in FIG. 7.

Host: The IP address or FQDN of the multicast gateway and optionally the port number (e.g., "router.example:8088" or "192.0.2.1:8088").

Session ID: A unique presentation session identifier communicated and possibly generated by the multicast rendezvous service including one or more URL path elements.

ManifestPath: The resource path for retrieving the presentation manifest from the specified host.

conf: The multicast session parameters shall take the form of a multicast gateway configuration instance document comprising one multicast session.

The document may be compressed using Gzip and base64url-encoded prior to inclusion as a URL query string parameter.

When the presentation manifest is related to the multicast session in the multicast session configuration (the service is transmittable by multicast), the multicast rendezvous service may redirect the request to the multicast gateway as follows:

HTTP/1.1 307 Temporary Redirect
Server: <Multicast gateway>
Location: http[s]://<Multicast gateway>/<ManifestPath>

The URL corresponding to the Location field in the HTTP header may include a query parameter for piggybacking a multicast gateway configuration instance document including a session identifier and a multicast session corresponding to the requested presentation manifest.

The multicast ABR according to the embodiments may be connected to a 5G network (communication network).

Figure 8:
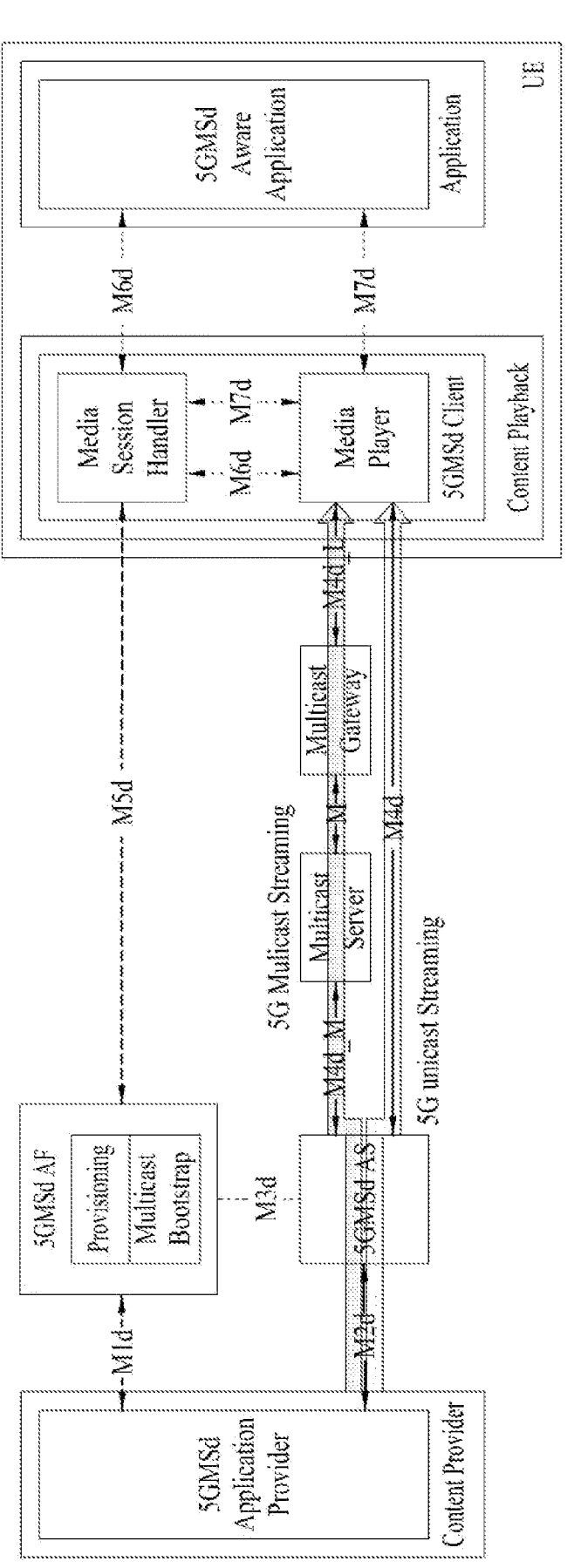
FIG. 8 shows a multicast application scheme for 5G media streaming according to embodiments.

FIG. 8 shows a multicast application scheme for 5G media streaming according to embodiments.

Figure 9:
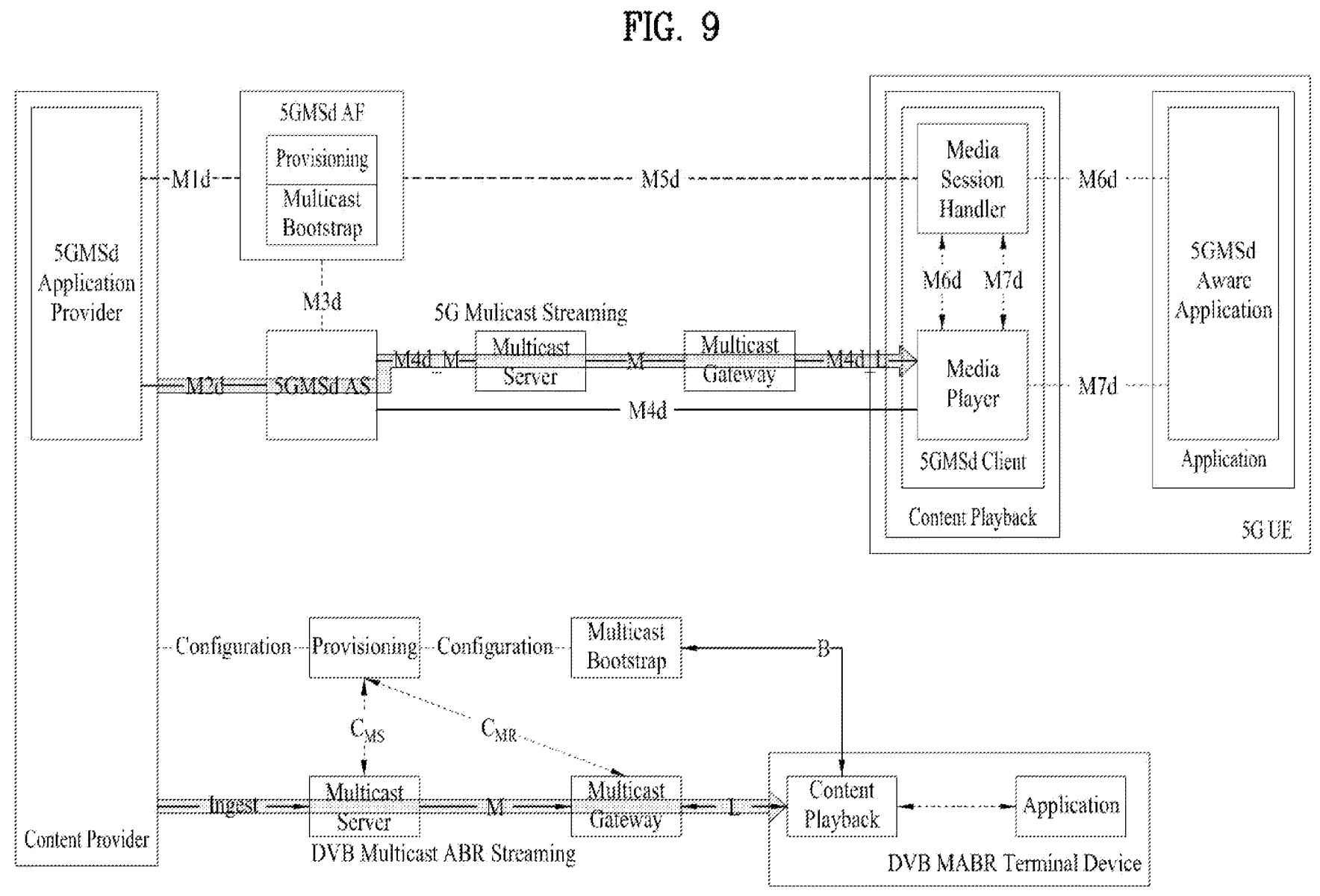

The multicast signal processing method/apparatus according to the embodiments may support multicast in a 5G media streaming structure (Multicast ABR architecture). FIG. 9 shows an embodiment of a 5G media streaming architecture to which the multicast ABR architecture is applied. That is, the 5G structure and the DVB structure may be combined with each other.

The 5G application provider (5GMSd Application Provider) may be the same as the content provider of the multicast ABR shown in FIGS. 1 to 6, or may be a part of the content provider. The application for receiving 5G media streaming (i.e., 5GMSd Aware Application) may be the same as the Multicast ABR Application of FIGS. 1 to 6, or may be a part of the Application. The client (5GMSd Client) may be the same as the content playback function of the multicast ABR of FIGS. 1 to 5, or may be a part of the content playback function. A controller (5GMSd AF) may include a provisioning function including a network control sub function of the multicast ABR shown in FIGS. 1-6, and a multicast bootstrap function including a multicast rendezvous service.

Access information (presentation manifest url) for initial multicast transmission may be requested and received by the 5GMSd client via the interface M5d, which may correspond to the interface B of the multicast ABR shown in FIGS. 1 to 6.

Unicast streaming may be transmitted from the 5GMSd AS to the media player via the interface M4d. In this operation, HTTP(s) may be used.

The multicast server and multicast gateway may be configured for multicast transmission between the 5GMSd AS and the media player. Since data is communicated between the multicast gateway and the media player through 5G RAN, only unicast may be supported.

For multicast transmission, interfaces M4d_M and M4d_L may be defined as follows.

M4d_M—Multicast streaming may be transmitted from 5GMSd AS to the multicast server via the interface M4d_M, and the interface M defined in the multicast ABR may be used between the multicast server and the multicast gateway. As another embodiment, the multicast server function may be included in the 5GMS AS. In this case, the interface M4d_M may be omitted. As the multicast protocol, a protocol defined in the interface M may be used.

M4d_L—The M4d_L interface may be used between the multicast gateway and the media player. Here, M4d_M and M4d_L may use a protocol based on HTTP(s). From the perspective of DVB Multicast ABR, M4d_M may correspond to the ingest interface, and M4d_L may correspond to the interface L.

FIG. 9 shows a multicast streaming structure for both multicast network streaming and communication network streaming according to embodiments.

The multicast signal processing method/apparatus according to the embodiments may transmit/receive and process media contents when multicast streaming is simultaneously provided in the DVB multicast ABR network and 5G media streaming. Each component in FIG. 9 corresponds to hardware, software, a processor, and/or a combination thereof.

There may be a plurality of networks in which multicast streaming is provided. When a 5G network is one of such networks, a use case of simultaneous provision of a multicast service through the 5G mobile network and another other IP network from the same content provider according to the embodiments may be considered. FIG. 9 illustrates an embodiment in which multicast streaming is provided through the 5G network and the DVB multicast ABR network simultaneously.

Provisioning for multicast session configuration may be separately defined according to characteristics of each network. The multicast interface M via which media is delivered from the multicast server to the multicast gateway may be configured in the same way.

In this case, the interfaces M2d and M4d_M defined in the 5G network may be the same as the Ingest interface. For this reason, the content provider may maintain the same protocol for transmission over each network.

Figure 10:
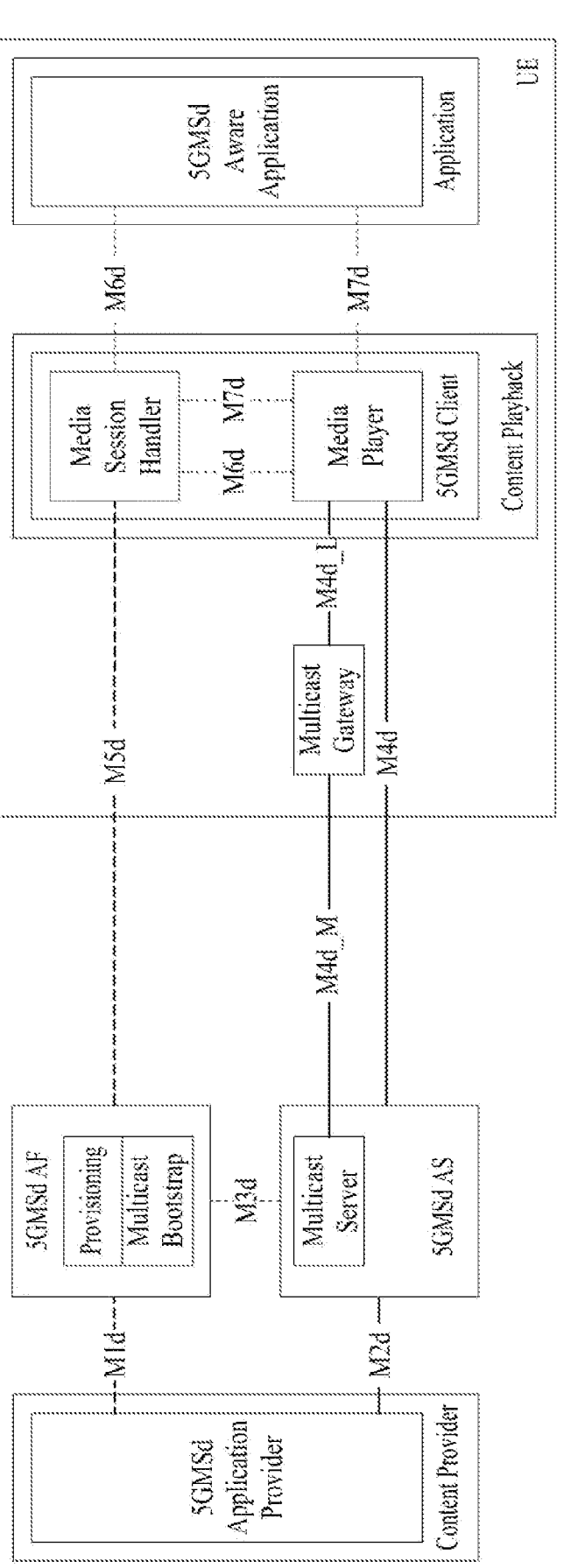
FIG. 10 shows an architecture for wireless media transmission based on multicast and broadcast in a communication network according to embodiments.

FIG. 10 shows an architecture for wireless media transmission based on multicast and broadcast in a communication network according to embodiments.

When wireless multicast and broadcast transmissions are supported in the 5G RAN, a multicast gateway may be configured inside the 5G UE. Each component in FIG. 10 corresponds to hardware, software, a processor, and/or a combination thereof.

The 5GMSd application provider may be the same as the content provider of the multicast ABR or may be a part of the content provider. The 5GMSd aware application for receiving the 5G media streaming may be the same as the multicast ABR application or may be a part of the application. The 5GMSd client may be the same as the content playback function of Multicast ABR, or may be a part of the content playback function. The 5GMSd AF may include a provisioning function including a network control sub function of the multicast ABR, and a multicast bootstrap function including a multicast rendezvous service.

Access information (presentation manifest url) for initial multicast transmission may be requested and received by the 5GMSd client via the interface M5d, which may correspond to the interface B of the multicast ABR.

Unicast streaming may be transmitted from the 5GMSd AS to the media player via the interface M4d. In this operation, HTTP(s) may be used.

The multicast server and multicast gateway may be configured for multicast transmission between the 5GMSd AS and the media player. In this case, the interface M4d_L between the multicast gateway and the media player may be implemented as an interface inside the UE.

The interface M4d_M between the multicast server and the multicast gateway may be defined as the same interface as the interface M defined in the multicast ABR. Therefore, as the multicast protocol, the protocol defined in the interface M may be used.

The method/apparatus/processor (multicast signal processing method/apparatus) according to the embodiments may perform the above-described network control operations, and provides a media architecture for 5G network-based multicast media streaming based on the related signaling information. With the operations according to the embodiments, multicast content may be received by various access methods without depending on a network to which a reception device is connected during multicast streaming. In addition, by presenting a multicast transmission structure, network resources may be efficiently used in transmitting the same content to multiple receivers.

Embodiments include a MABR architecture based on multiple IP networks.

The multiple IP networks according to the embodiments may include various networks such as communication and broadcasting networks.

In order for the ABR multicast structure and interfaces according to the embodiments to be applied to each network in order to be actually provided, an additional architecture configuration and an application method for corresponding interfaces will be described. Each component included in the architecture according to the embodiments may correspond to hardware, software, a processor, and/or a combination thereof.

FIGS. 8 to 10 correspond to the multicast signal processing method/apparatus according to the embodiments shown in FIGS. 1 to 6.

Figure 11A:
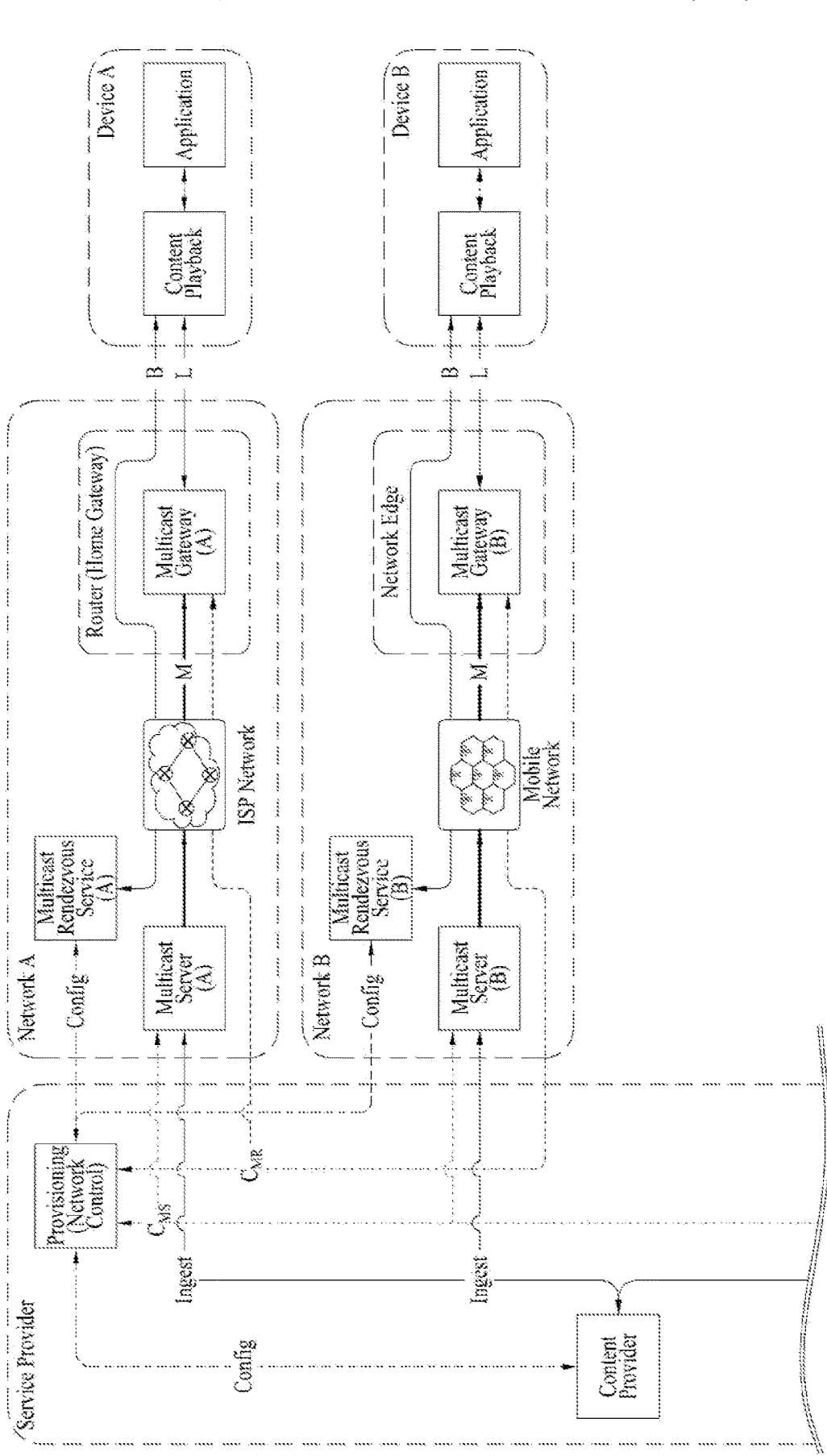
FIG. 11 illustrates an example of a multicast server configuration in each network according to the embodiments.
Figure 11B:
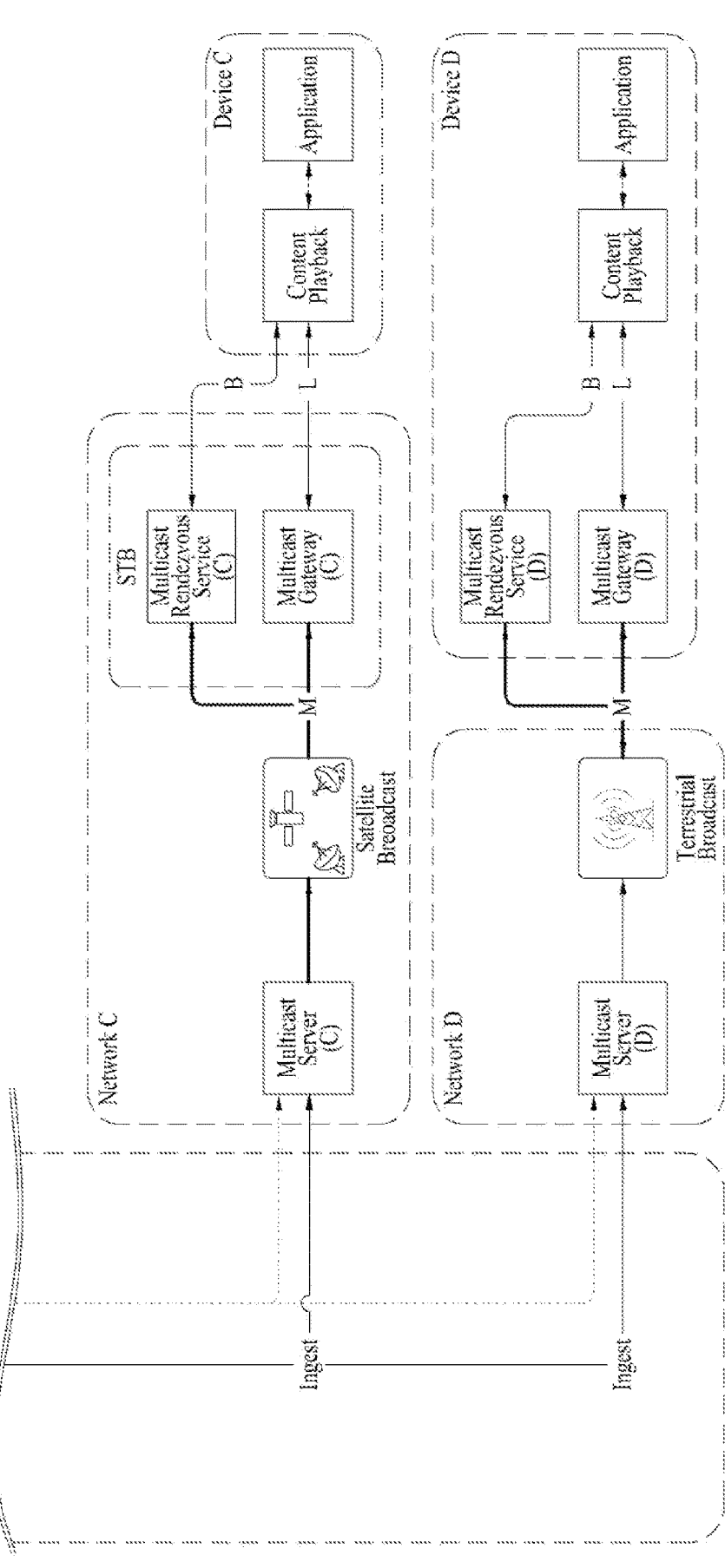

FIG. 11 illustrates an example of a multicast server configuration in each network according to the embodiments.

FIG. 11 shows an embodiment of a structure in which a multicast server is configured for each network to provide an ABR multicast service. This embodiment corresponds to a case where the multicast service server is mainly deployed by the network operator. The transmission/reception device according to the embodiments may provide an ABR multicast service based on the multicast server structure shown in the figure. Each component in FIG. 11 corresponds to hardware, software, a processor, and/or a combination thereof.

When the ABR multicast service is provided through multiple heterogeneous networks, deployment of a multicast gateway to receive the ABR multicast may be implemented separately.

Multicast gateway (A)—When a multicast gateway is configured for the ABR multicast service in the ISP network, it may be configured within a router or home gateway provided by the ISP operator.

Multicast gateway (B)—When a multicast gateway is configured for the ABR multicast service in a mobile network such as a 5G system, it may be configured within the edge of the mobile network.

Multicast gateway (C)—When a multicast gateway is configured for the ABR multicast service in the satellite broadcasting network, it may be configured within an STB capable of receiving satellite broadcasting.

Multicast gateway (D)—When a multicast gateway is configured for the ABR multicast service in terrestrial broadcast network, it may be configured within a broadcast receiver.

Even when the ABR multicast service is provided over multiple heterogeneous networks, the ABR multicast function may be configured independently for each network.

Figure 12A:
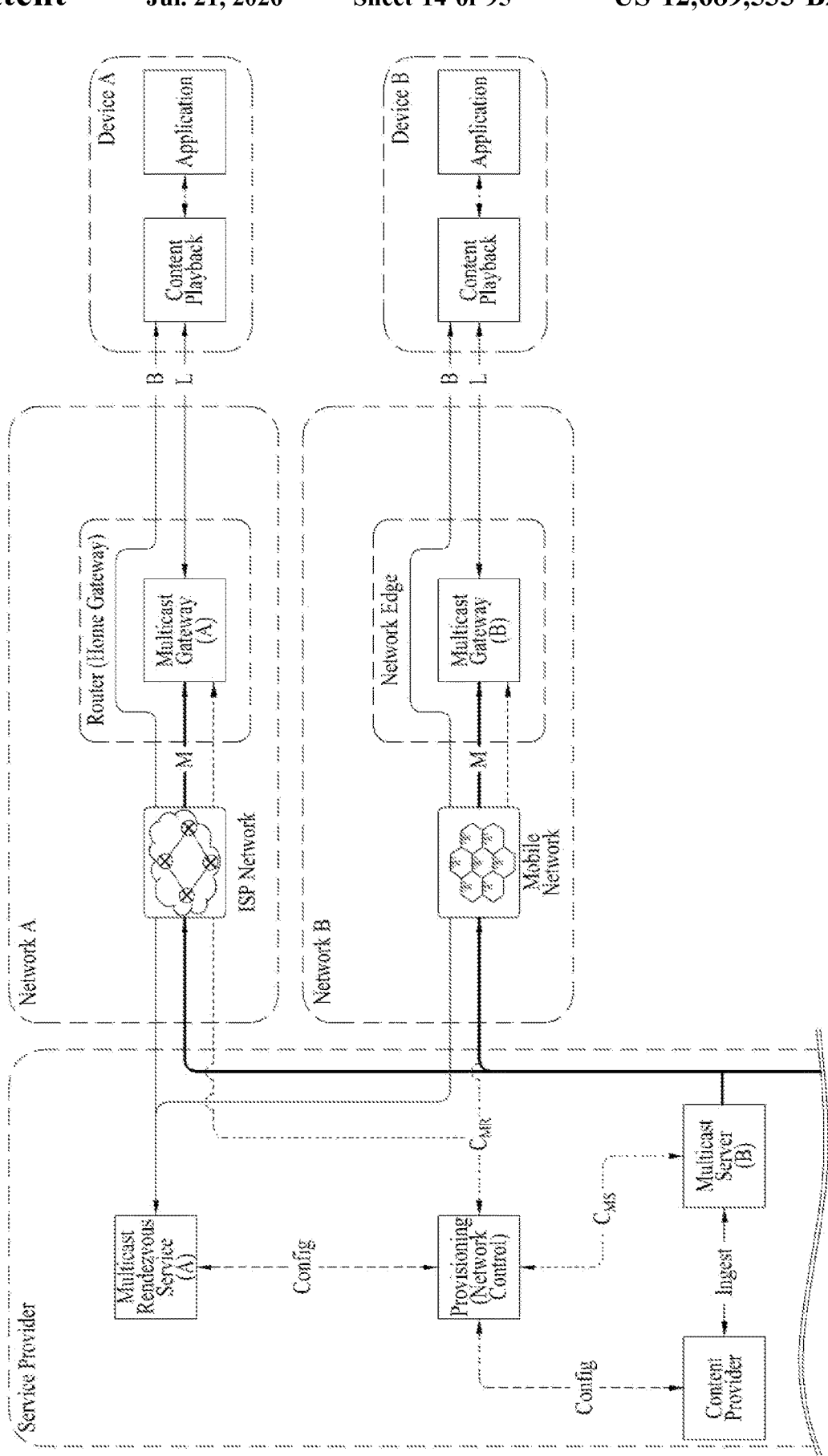
FIG. 12 illustrates an example of a multicast server configuration for all networks according to embodiments.
Figure 12B:
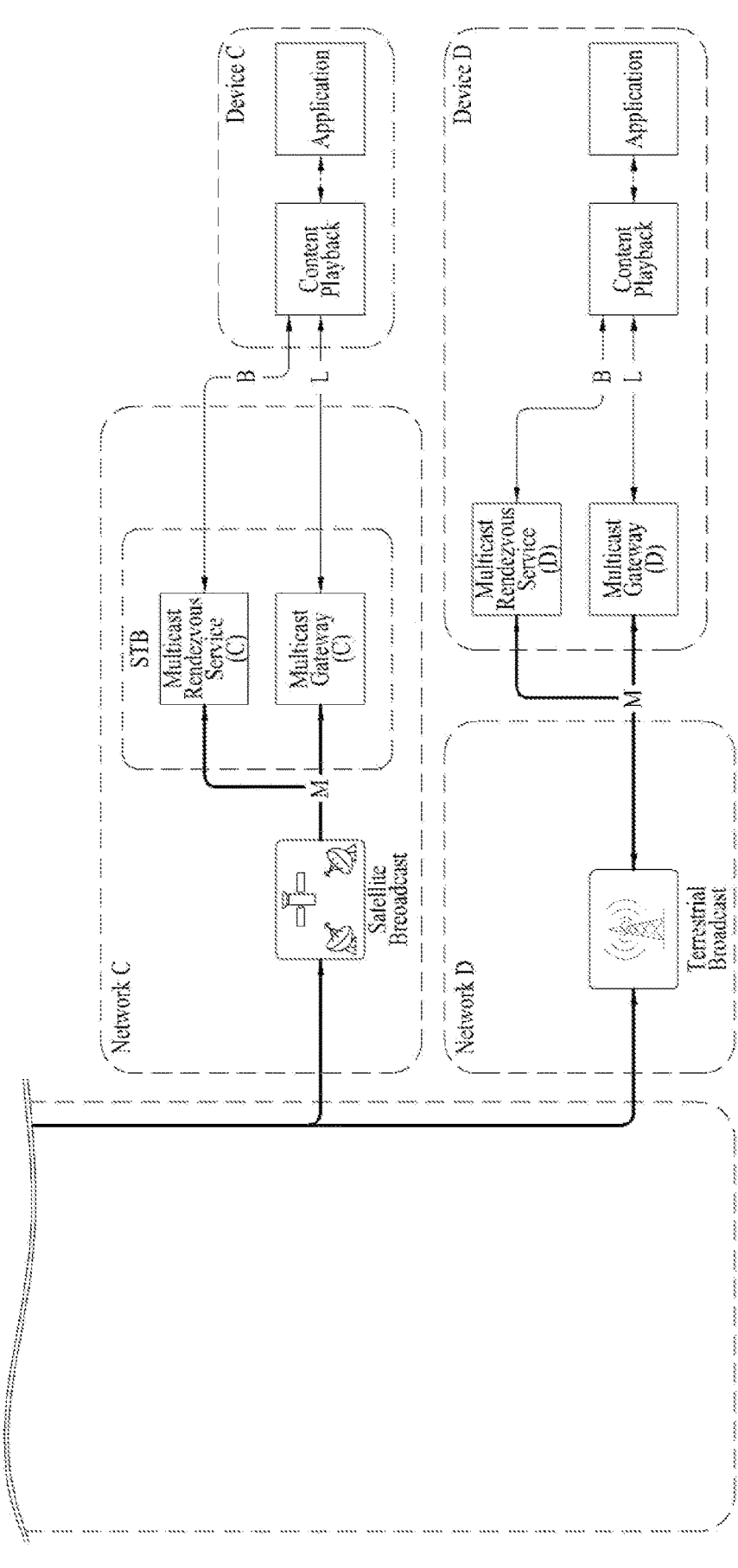

FIG. 12 illustrates an example of a multicast server configuration for all networks according to embodiments.

The figure illustrates an embodiment of a structure in which a single multicast server provides an ABR multicast service over multiple heterogeneous networks. The embodiment corresponds to a case where the multicast service server is mainly deployed by the content provider. The transmission/reception device according to the embodiments may provide an ABR multicast service based on the multicast server structure shown in the figure.

Each component in FIG. 12 corresponds to hardware, software, a processor, and/or a combination thereof.

When the ABR multicast service is provided through multiple heterogeneous networks, deployment of a multicast gateway to receive the ABR multicast may be implemented separately.

Multicast gateway (A)—When a multicast gateway is configured for the ABR multicast service in the ISP network, it may be configured within a router or home gateway provided by the ISP operator.

Multicast gateway (B)—When a multicast gateway is configured for the ABR multicast service in a mobile network such as a 5G system, it may be configured within the edge of the mobile network.

Multicast gateway (C)—When a multicast gateway is configured for the ABR multicast service in the satellite broadcasting network, it may be configured within an STB capable of receiving satellite broadcasting.

Multicast gateway (D)—When a multicast gateway is configured for the ABR multicast service in terrestrial broadcast network, it may be configured within a broadcast receiver.

Even when the ABR multicast service is provided over multiple heterogeneous networks, the ABR multicast function may be configured independently for each network.

Figure 13:
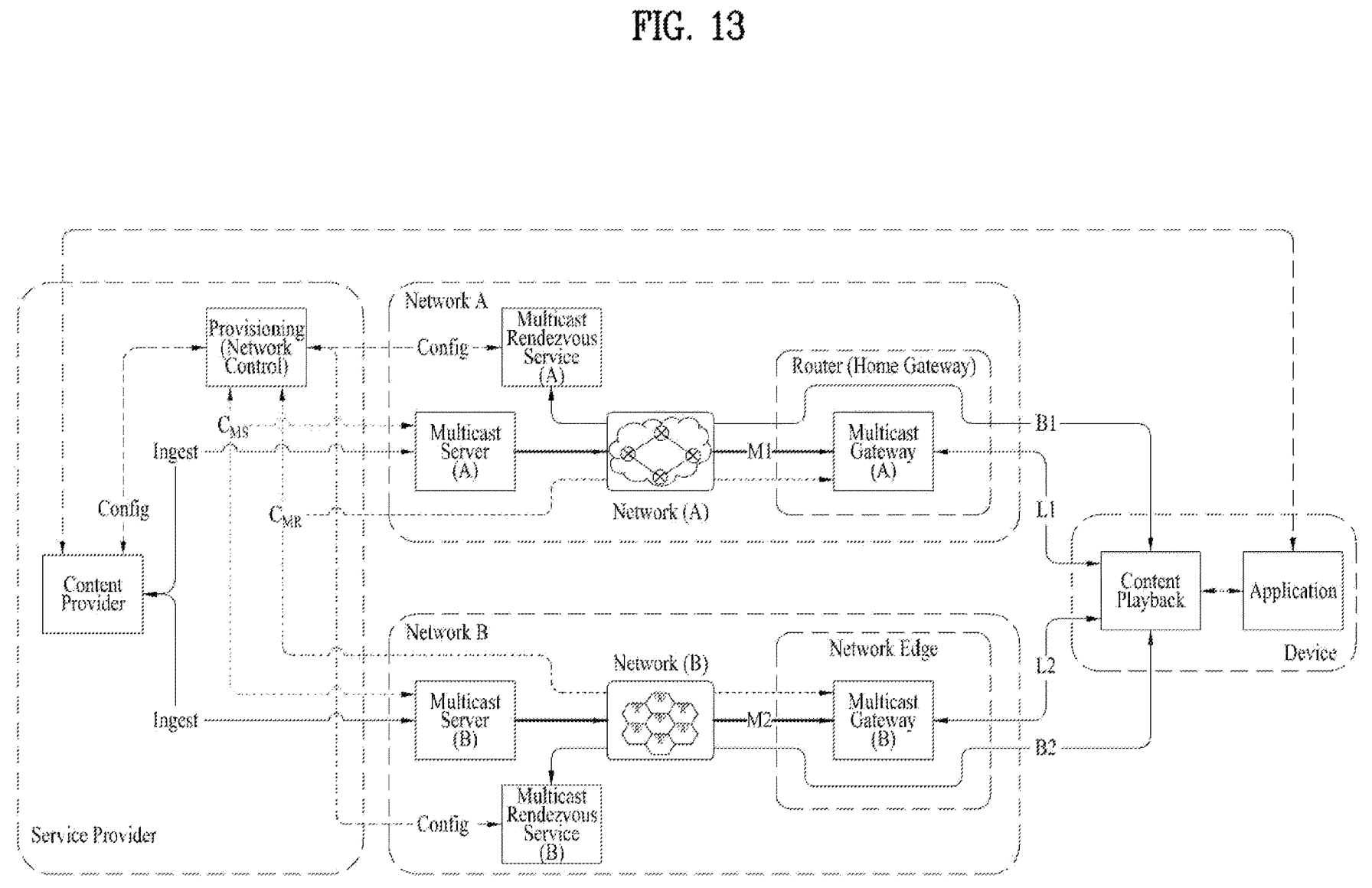

FIG. 13 illustrates an example of multiple networks to which an apparatus connects according to embodiments.

In the network structure according to the embodiments, a multicast signal processing method/apparatus for receiving the same multicast media service by accessing multiple networks according to embodiments may be considered. An embodiment of an architecture and an ABR multicast interface for the multicast signal processing method/apparatus according to embodiments for receiving the same multicast streaming service by accessing a multiple networks will be described. Embodiments may be implemented in various architectures.

The figure illustrates an embodiment of a case where all multicast rendezvous services are configured in regular deployment when multicast servers and multicast gateways are configured in corresponding networks. The system according to the embodiments may include a service provider, network(s), and a device. The service provider, network(s), and device are configured as shown in FIG. 13. Each component in FIG. 13 corresponds to hardware, software, a processor, and/or a combination thereof.

In the architecture according to the embodiments, a multicast server, a multicast gateway, and a multicast rendezvous service for each network provide a service to the content playback function connected to the respective networks. For example, the device may access the mobile network, while accessing Wi-Fi over the ISP network at the same time.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

FIGS. 11 to 13 show an example in which the multicast signal processing apparatus according to the embodiments as shown in FIGS. 1 to 6, 9 and 10 is configured according to the types of networks according to embodiments.

The figure shows the flow of the procedure of receiving the same service even after a network change is made, following the procedure of acquiring the manifest and receiving multicast media by the device for the above-described architecture.

The network change according to the embodiments may include, for example, a change between network A (WI-FI) and network B (5G).

Figure 14A:
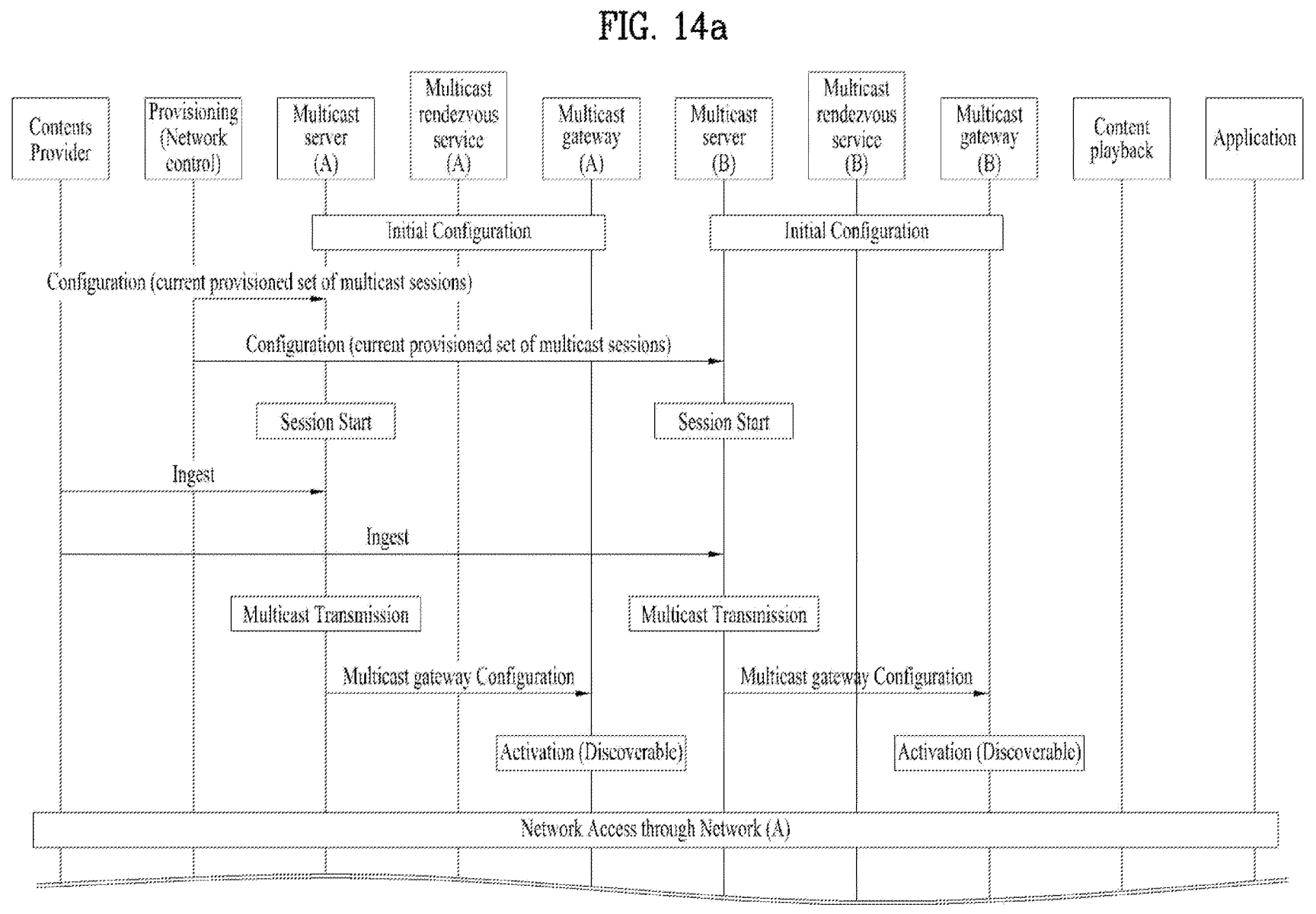
Figure 14B:
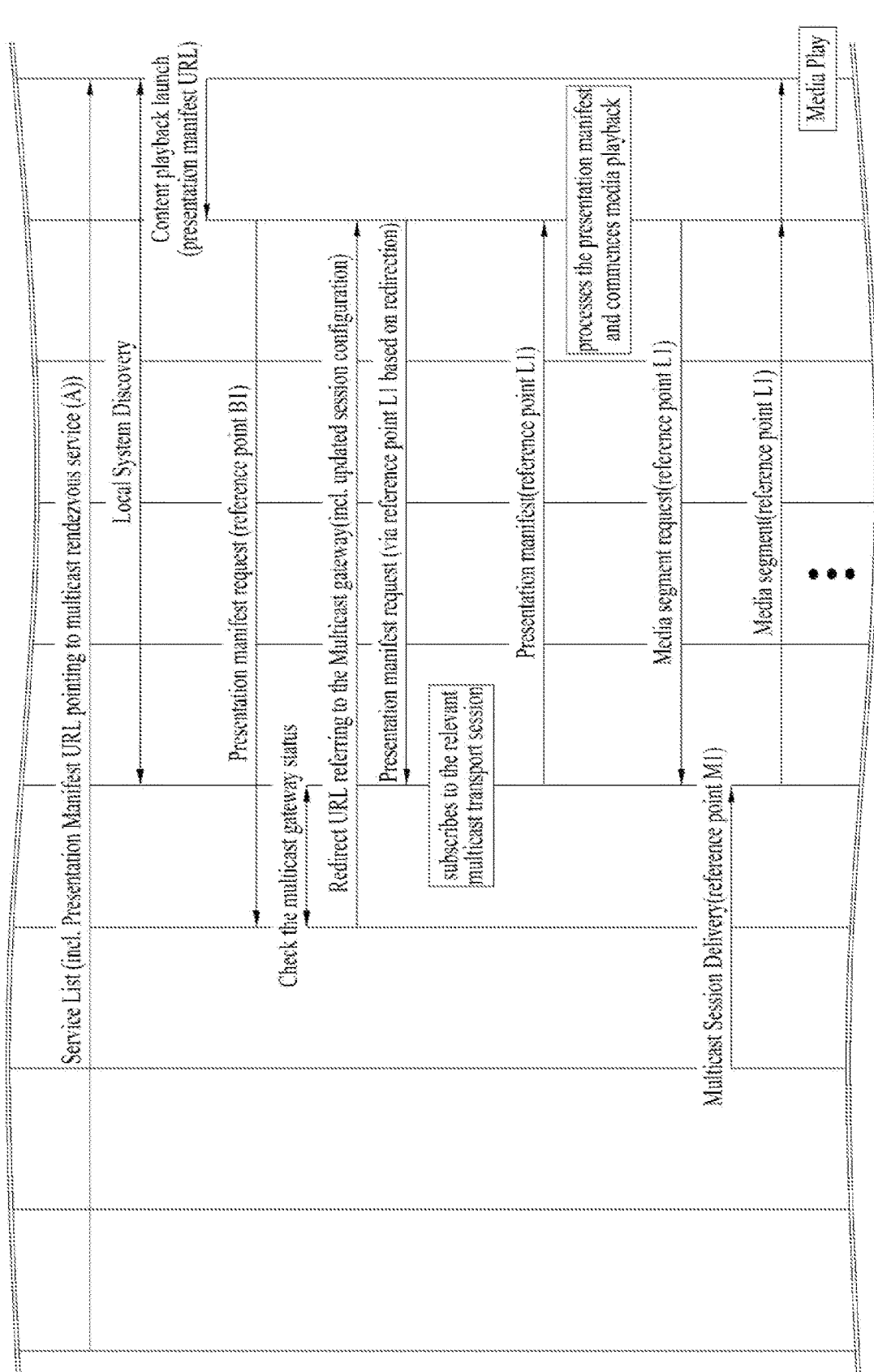
FIG. 14 is a flow diagram of network change according to embodiments.
Figure 14C:
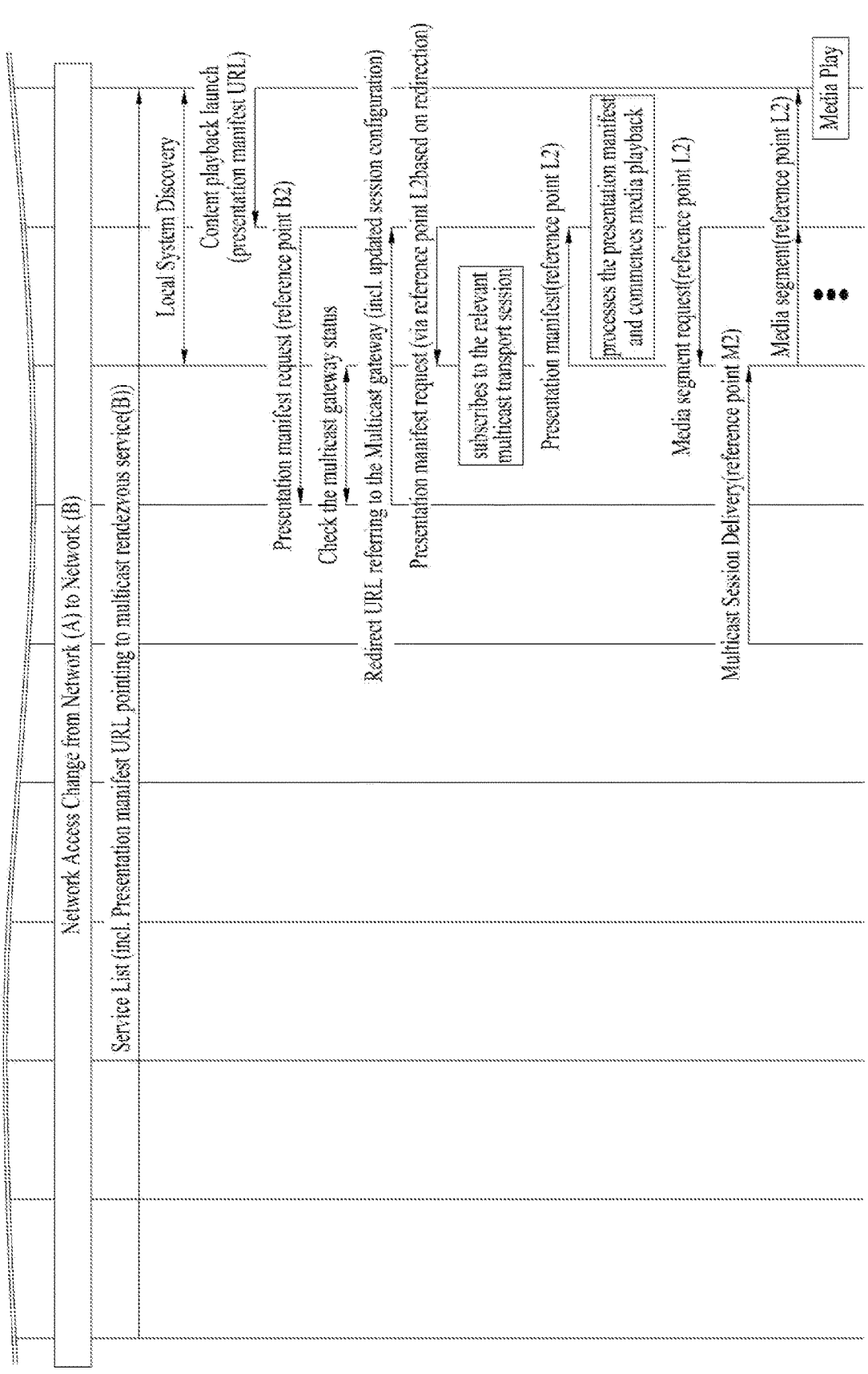

FIG. 14 is a flow diagram of network change according to embodiments.

The flow in the flow diagram of FIG. 14 may be carried out according to the embodiments shown in FIGS. 1 to 5, 8 to 13, and the like. Each component constituting the embodiments corresponds to hardware, software, a processor, and/or a combination thereof.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to a multicast server (A) and a multicast server (B) through network control.

Configuration information about the multicast session may be delivered through the multicast session element.

When the multicast session starts, the media segment is ingested from the content provider to the multicast server (A) and the multicast server (B), multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include a url for requesting the presentation manifest mapped to the service ID.

The service list may be delivered through a service list element.

When the user selects multicast contents to receive, the application may acquire the URL for requesting the initial presentation manifest through the service directory, or the like. In this case, the URL indicates the multicast rendezvous service (A).

The application may control the content playback function to start an operation for content reception. In this case, it may deliver a URL for the multicast rendezvous service (A).

The content playback function makes a request for the presentation manifest to the multicast rendezvous service (A) via the reference point B1 using the URL delivered from the application.

A manifest may be requested through the manifest request and redirection information.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

Redirection may be performed through the manifest request and redirection information.

Upon receiving the redirection message, the content playback function makes a request for a presentation manifest to the multicast gateway (A) via the reference point L1 according to the redirection.

A presentation manifest may be requested.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server (A) to the multicast gateway (A) via the interface M1.

The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

For the service being received, the application may acquire a URL for requesting the presentation manifest. In this case, the URL indicates the multicast rendezvous service (B).

The application may control the content playback function to start an operation for content reception. In this case, it may deliver the URL for the multicast rendezvous service (B).

The content playback function makes a request for the presentation manifest to the multicast rendezvous service (B) via the reference point B2 using the URL delivered from the application.

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

Upon receiving the redirection message, the content playback function makes a request for the presentation manifest to the multicast gateway (B) via the reference point L2 according to the redirection.

When the multicast gateway (B) has a pre-cached presentation manifest, it transmits the presentation manifest to the content playback function.

The content playback function requests a media segment for the contents based on the received presentation manifest.

Multicast streaming is transmitted from the multicast server (B) to the multicast gateway (B) via the interface M2.

The content playback function may receive the requested media segment via the multicast gateway (B) and the media is played. When there is no separate control, the media continues to be played.

Figure 15:
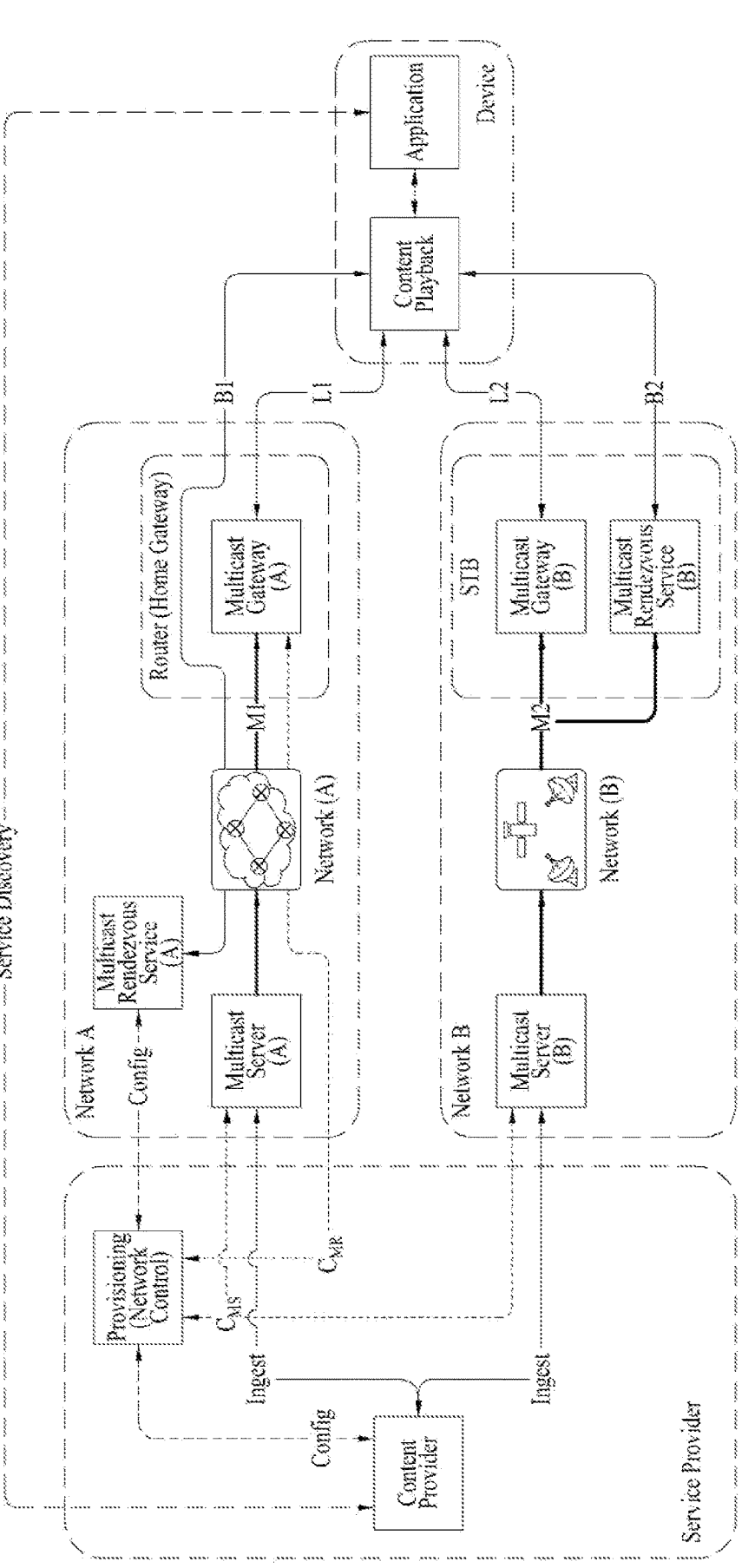
FIG. 15 illustrates an example in which a multicast server and a multicast gateway are configured in each network according to embodiments.

FIG. 15 illustrates an example in which a multicast server and a multicast gateway are configured in each network according to embodiments.

Embodiments may further include a network server and a gateway, as shown in FIG. 15, in addition to the configuration of FIG. 13.

The figure illustrates an embodiment of a case where multicast rendezvous services are configured in regular deployment and co-located deployment when multicast servers and multicast gateways are configured in corresponding networks. The system according to the embodiments may include a service provider, network(s), and a device. The service provider, network(s), and device are configured as shown in FIG. 15. Each component in FIG. 15 corresponds to hardware, software, a processor, and/or a combination thereof.

In the above-described architecture, for each network, a multicast server, a multicast gateway, and a multicast rendezvous service for each network provide a service to the content playback function connected to the respective networks. For example, the device may access a set-top box over a satellite broadcast network, while accessing Wi-Fi over the ISP network at the same time.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Figure 16A:
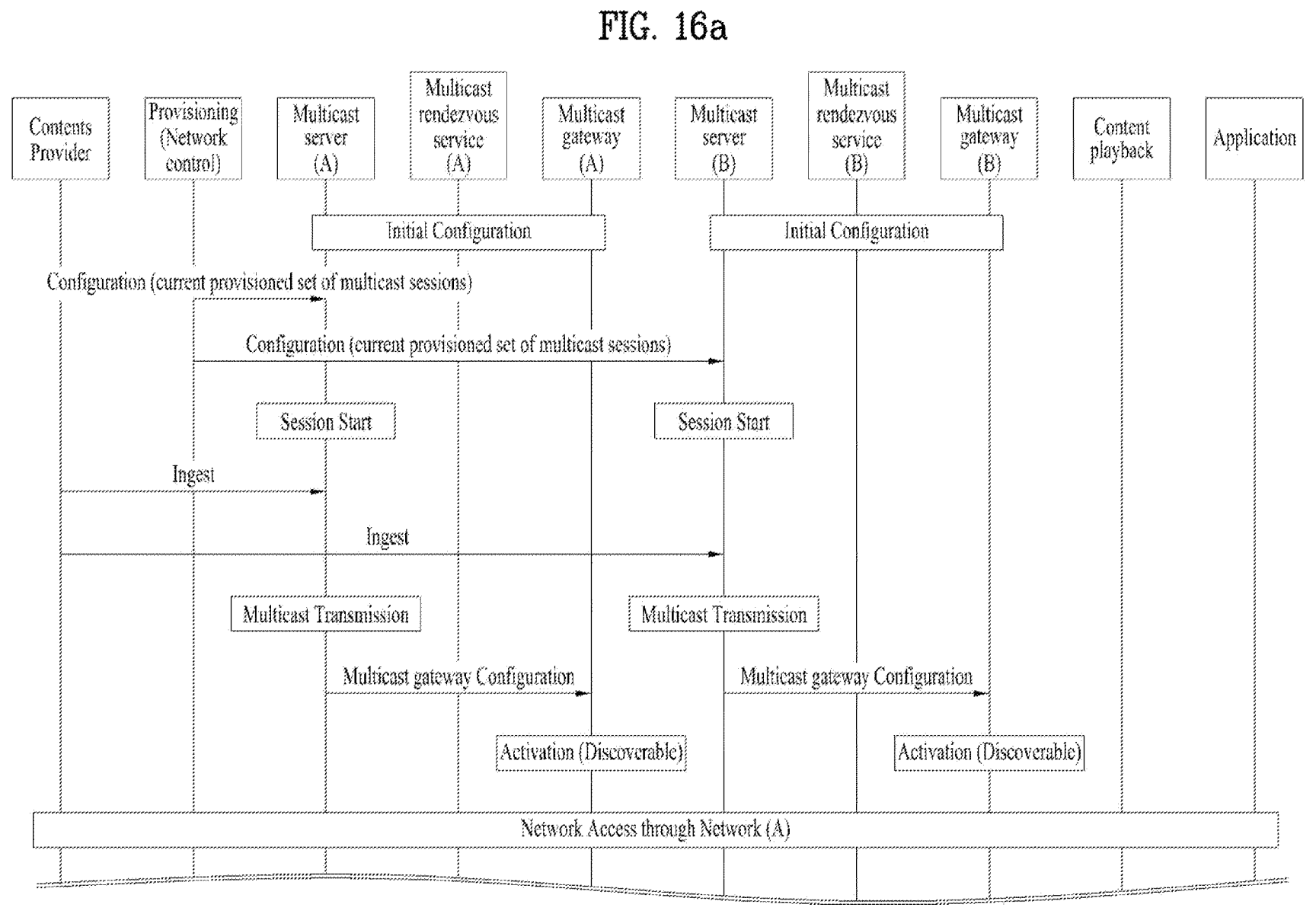
Figure 16B:
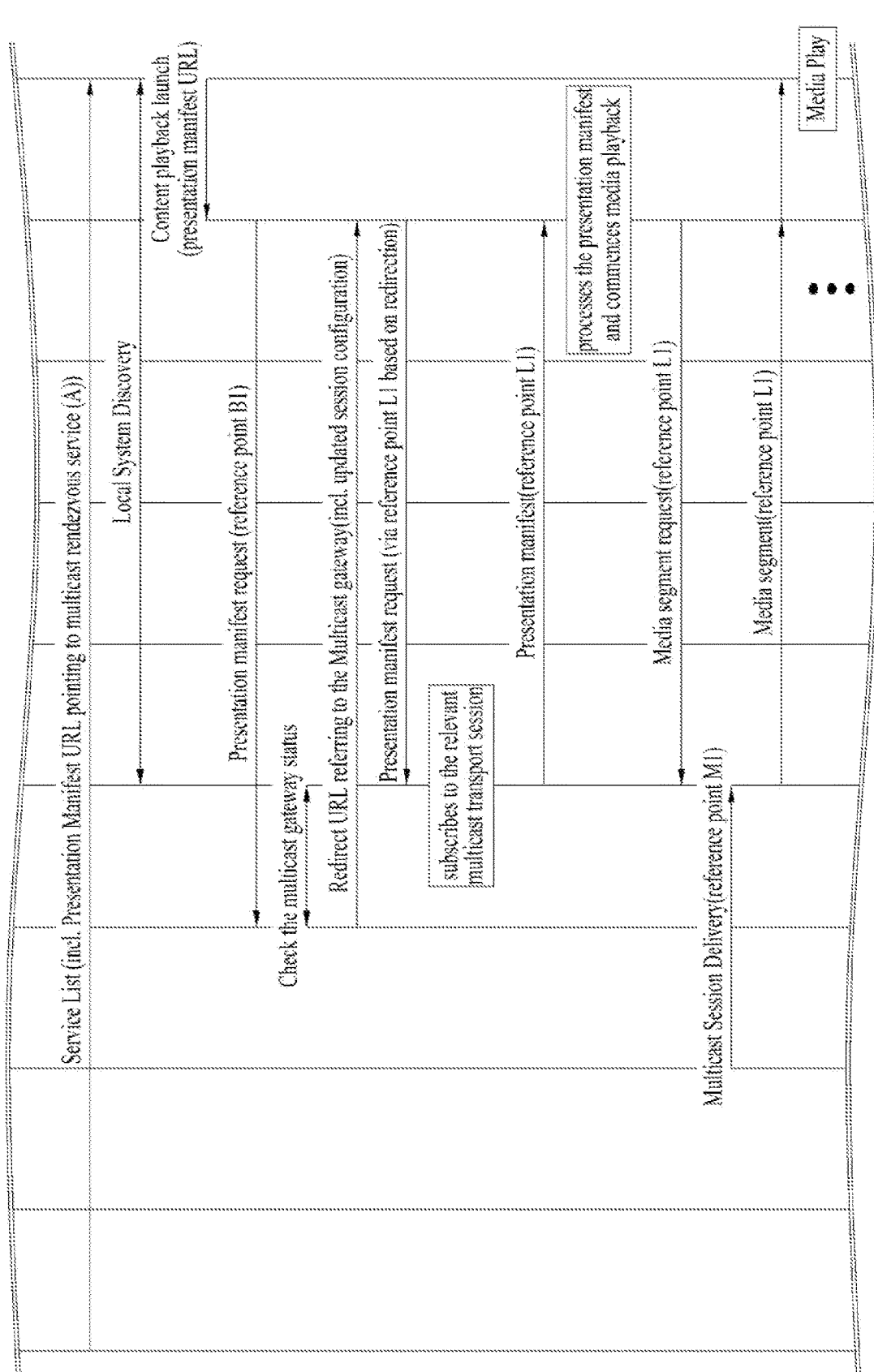
FIG. 16 is a flow diagram of network change according to embodiments.
Figure 16C:
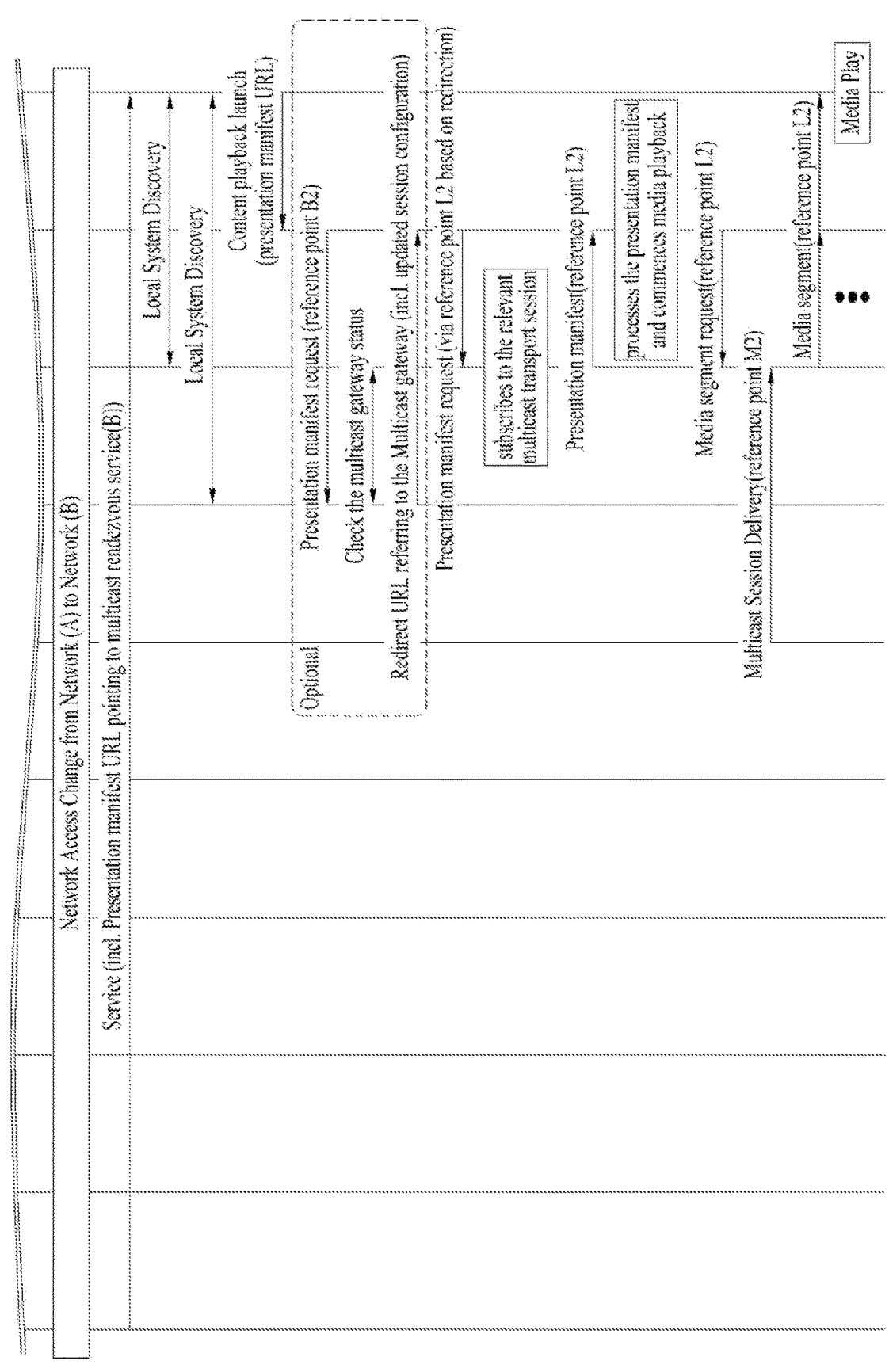

FIG. 16 is a flow diagram of network change according to embodiments.

The flow in the flow diagram of FIG. 16 may be carried out according to the embodiments shown in FIGS. 1 to 5, 8 to 15, and the like. Each component constituting the embodiments corresponds to hardware, software, a processor, and/or a combination thereof.

The figure shows the flow of the procedure of receiving the same service even after a network change is made, following the procedure of acquiring the manifest and receiving multicast media by the device for the architecture according to the embodiments. The difference from FIG. 14 is that the network of FIG. 16 includes a case where one network is not a bidirectional network.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to a multicast server (A) and a multicast server (B) through network control.

When the multicast session starts, the media segment is ingested from the content provider to the multicast server (A) and the multicast server (B), multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include the url to request the presentation manifest mapped to the service ID.

When the user selects multicast contents to receive, the application may acquire the URL for requesting the initial presentation manifest through the service directory, or the like. In this case, the URL indicates the multicast rendezvous service (A).

The application may control the content playback function to start an operation for content reception. In this case, it may deliver the URL for the multicast rendezvous service (A).

The content playback function makes a request for the presentation manifest to the multicast rendezvous service (A) via the reference point B1 using the URL delivered from the application.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

Upon receiving the redirection message, the content playback function makes a request for a presentation manifest to the multicast gateway (A) via the reference point L1 according to the redirection.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server (A) to the multicast gateway (A) via the interface M1. The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

For the service being received, the application may acquire a URL for requesting the presentation manifest. In this case, the URL indicates the multicast gateway (B) and the rendezvous service (B).

When the user selects multicast contents to receive, the application may acquire the URL for requesting the initial presentation manifest through the service directory, or the like. In this case, the URL indicates the multicast gateway (B) or the multicast rendezvous service (B).

The application may control the content playback function to start an operation for content reception. In this case, it may deliver the URL for the multicast gateway (B) or the multicast rendezvous service (B).

Since the multicast gateway and the multicast rendezvous service are configured in the same device (co-located deployment), the following procedure may be optionally performed.

The content playback function makes a request for the presentation manifest to the multicast rendezvous service (B) via the reference point B2 using the URL delivered from the application.

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

The content playback function receiving the redirection message follows the redirection.

Using the acquired URL, a request for a presentation manifest is made to the multicast gateway (B) via the reference point L2.

When the multicast gateway (B) has a pre-cached presentation manifest, it transmits the presentation manifest to the content playback function.

The content playback function requests a media segment for the contents based on the received presentation manifest. Multicast streaming is transmitted from the multicast server (B) to the multicast gateway (B) via the interface M2.

The content playback function may receive the requested media segment via the multicast gateway (B) and the media is played. When there is no separate control, the media continues to be played.

Figure 17:
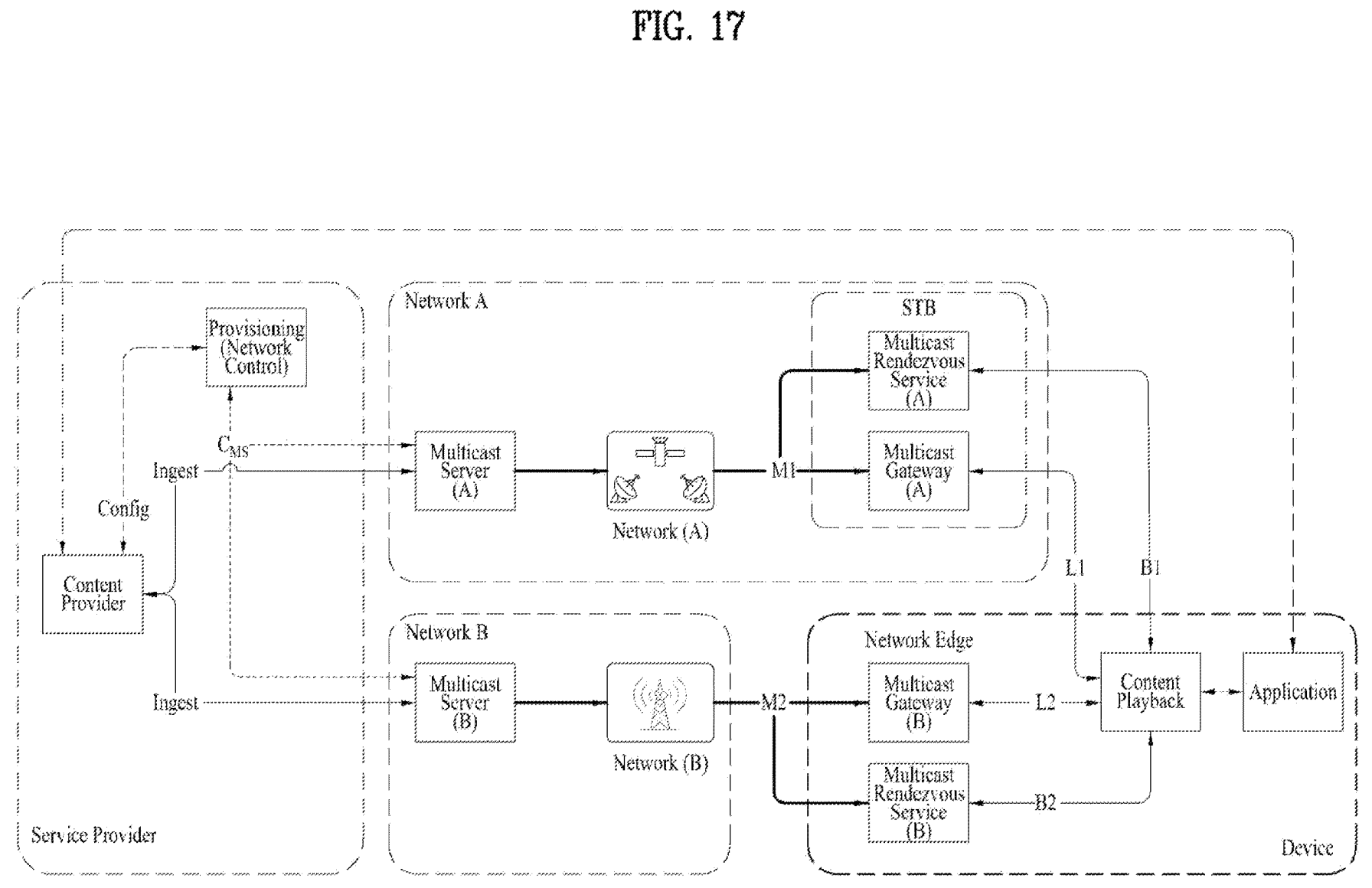

FIG. 17 illustrates an example in which a multicast server and a multicast gateway are configured in each network according to embodiments.

Figure 24A:
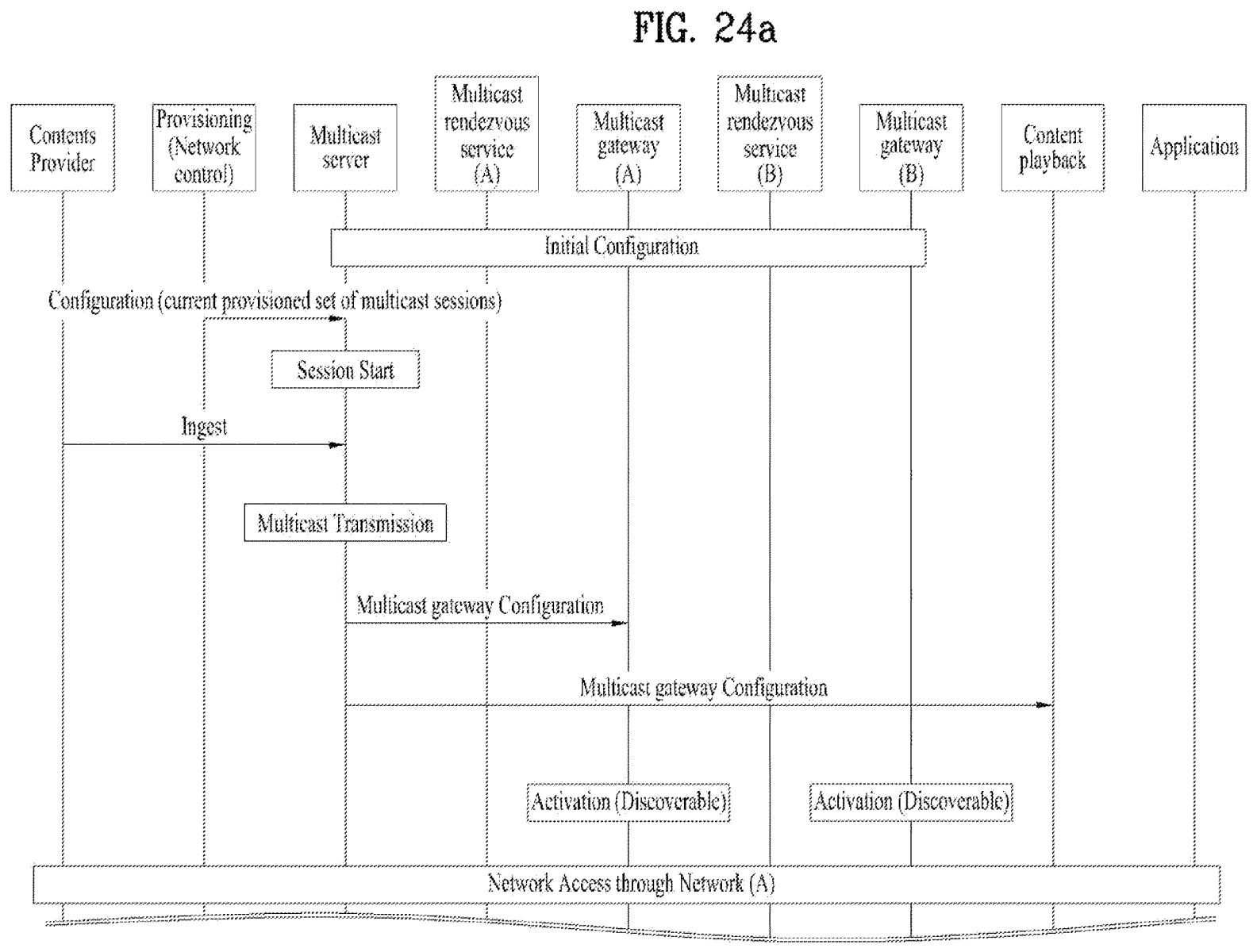
Figure 24B:
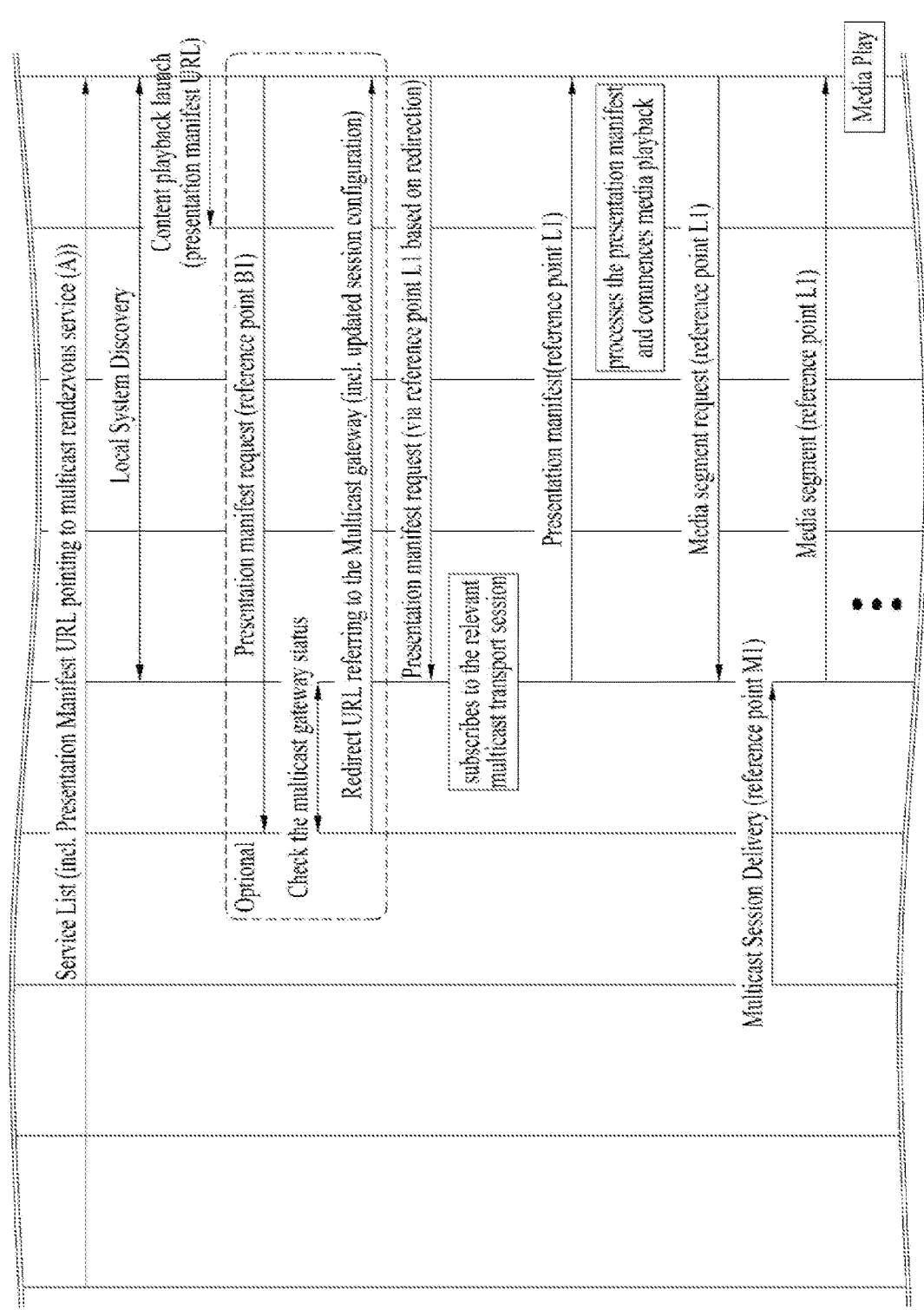
FIG. 24 is a flow diagram of network change according to embodiments.
Figure 24C:
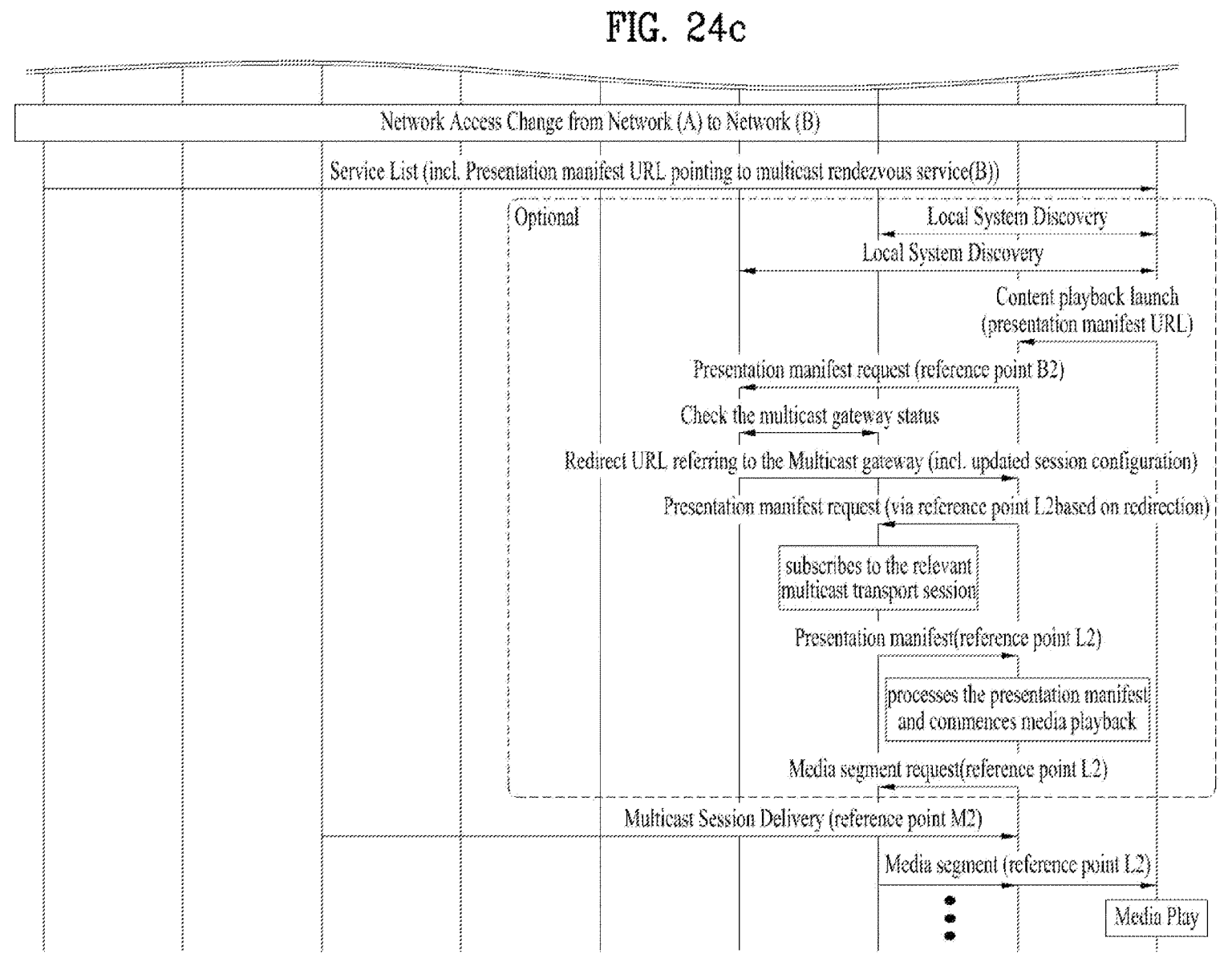

The figure illustrates an embodiment of a case where all multicast rendezvous services are configured in co-located deployment when multicast servers and multicast gateways are configured in corresponding networks. The system according to the embodiments may include a service provider, network(s), and a device. The service provider, network(s), and device are configured as shown in FIG. 24. Each component in FIG. 24 corresponds to hardware, software, a processor, and/or a combination thereof.

In the architecture according to the embodiments, a multicast server, a multicast gateway, and a multicast rendezvous service for each network provide a service to the content playback function connected to the respective networks. For example, the device may receive a broadcast over a terrestrial broadcast network, while accessing a set-top box over a satellite broadcast network. The types of the networks according to the embodiments may be different. Both networks may be unidirectional networks.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2. Here, the multicast gateway (B) and the multicast rendezvous service (B) are configured in the device, and therefore the interfaces L2 and B2 may be replaced with internal interfaces of the device.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Figure 18A:
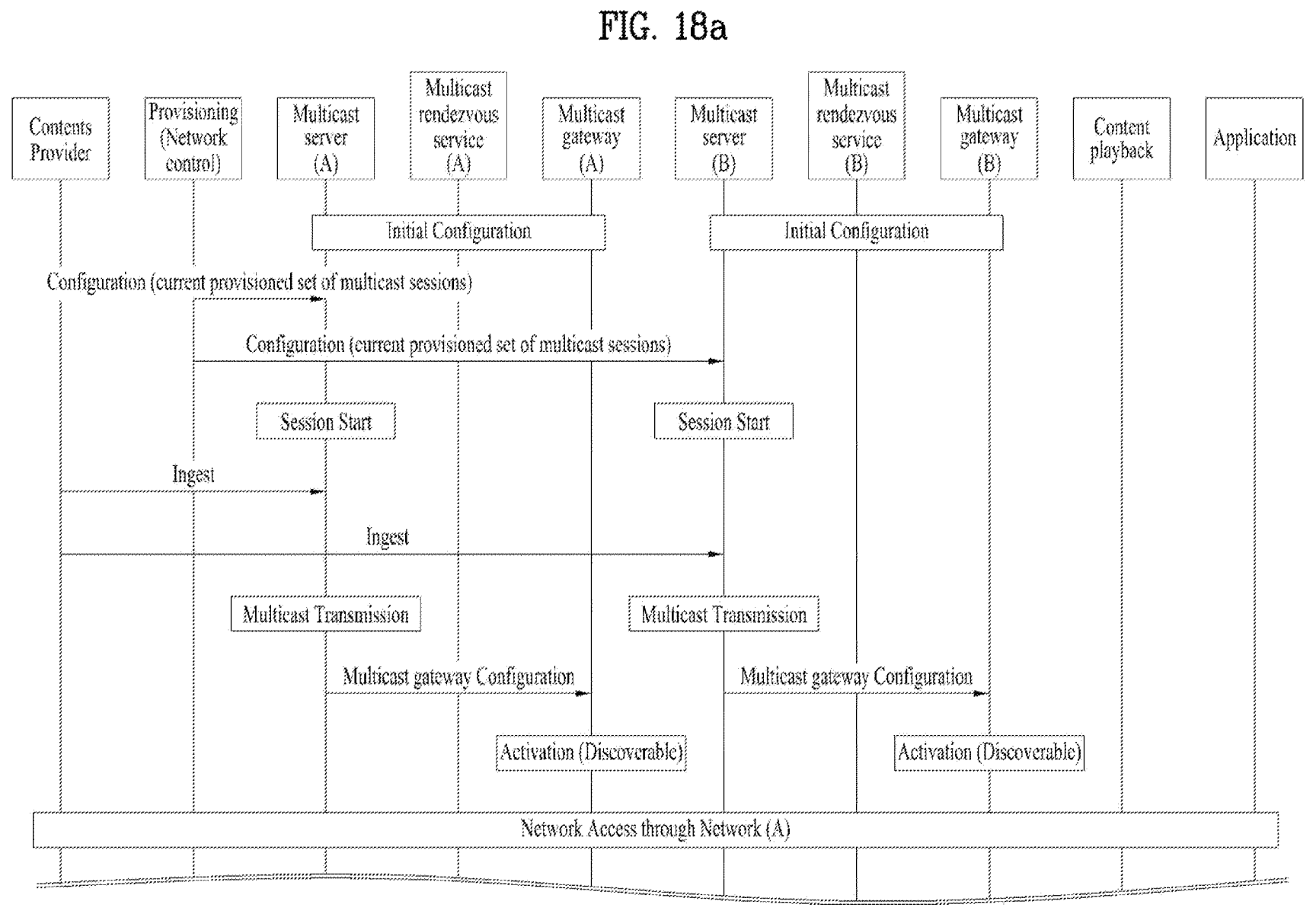
Figure 18B:
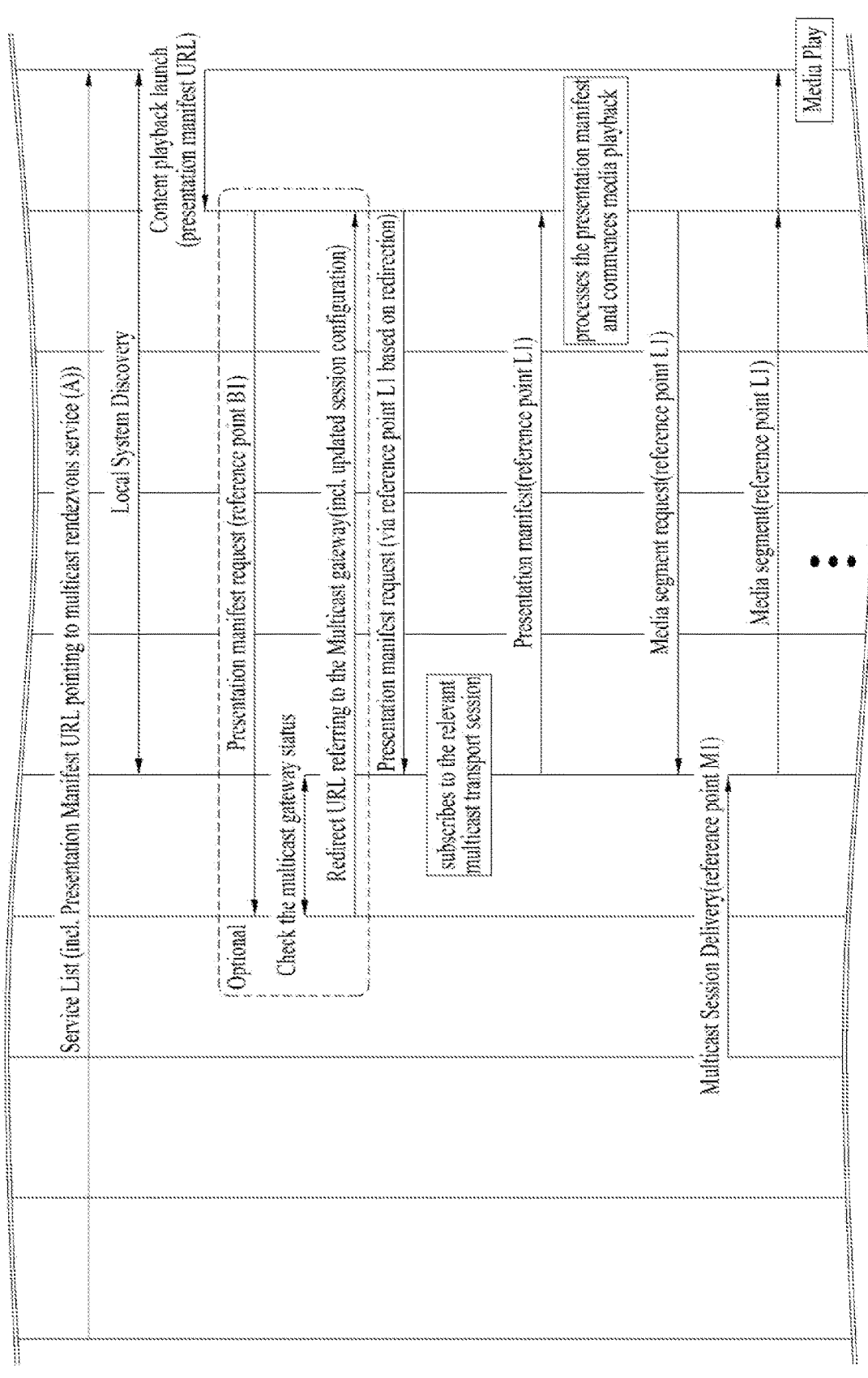
FIG. 18 is is a flow diagram of network change according to embodiments.

FIG. 18 s is a flow diagram of network change according to embodiments.

The flow in the flow diagram of FIG. 18 may be carried out according to the embodiments shown in FIGS. 1 to 5, 8 to 17, and the like. Each component constituting the embodiments corresponds to hardware, software, a processor, and/ or a combination thereof.

The figure shows the flow of the procedure of receiving the same service even after a network change is made, following the procedure of acquiring the manifest and receiving multicast media by the device for the architecture according to the embodiments.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to a multicast server (A) and a multicast server (B) through network control.

When the multicast session starts, the media segment is ingested from the content provider to the multicast server (A) and the multicast server (B), multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include the url to request the presentation manifest mapped to the service ID.

When the user selects multicast contents to receive, the application may acquire the URL for requesting the initial presentation manifest through the service directory, or the like. In this case, the URL indicates multicast gateway (A) or the multicast rendezvous service (A).

The application may control the content playback function to start an operation for content reception. In this case, it may deliver the URL for the multicast gateway (A) or the multicast rendezvous service (A).

Since the multicast gateway and the multicast rendezvous service are configured in the same device (co-located deployment), the following procedure may be optionally performed.

The content playback function makes a request for the presentation manifest to the multicast rendezvous service (A) via the reference point B1 using the URL delivered from the application.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

The content playback function receiving the redirection message follows the redirection.

Using the acquired URL, a request for a presentation manifest is made to the multicast gateway (A) via the reference point L1.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server (A) to the multicast gateway (A) via the interface M1.

The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

Since the multicast gateway and the multicast rendezvous service are configured in the device, operations related to the interfaces L2 and B2 may be optionally performed.

For the service being received, the application may acquire a URL for requesting the presentation manifest. In this case, the URL indicates the multicast rendezvous service (B).

The application may control the content playback function to start an operation for content reception. In this case, it may deliver the URL for the multicast rendezvous service (B).

The content playback function makes a request for the presentation manifest to the multicast rendezvous service (B) via the reference point B2 using the URL delivered from the application.

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

Upon receiving the redirection message, the content playback function makes a request for the presentation manifest to the multicast gateway (B) via the reference point L2 according to the redirection.

When the multicast gateway (B) has a pre-cached presentation manifest, it transmits the presentation manifest to the content playback function.

The content playback function requests a media segment for the contents based on the received presentation manifest.

Multicast streaming is transmitted from the multicast server (B) to the multicast gateway (B) via the interface M2.

The content playback function may receive the requested media segment via the multicast gateway (B) and the media is played. When there is no separate control, the media continues to be played.

Hereinafter, a further description will be given of the multicast signal processing method/apparatus of the embodiments capable of accessing multiple networks. In the network structure described according to the embodiments, a device capable of receiving the same multicast media service by accessing multiple networks may be considered. An embodiment of the architecture and ABR multicast interface for the device capable of receiving the same multicast streaming service by accessing multiple networks will be described.

The multicast rendezvous service according to the embodiments is different from the broadcast bootstrap. The rendezvous flow in a network is a procedure of providing a network initial address to a user equipment (UE) when the UE intends to access the network.

The rendezvous function may be performed by the network according to the embodiments. The bootstrap may be carried out by the UE. The rendezvous service may have a fixed address or URL. When the receiver is outside the network, the address for the media is redirected to the UE because the UE is connected in the initial access to receive media. The UE may receive the manifest for the actual media with the redirected address. Since media transmission and reception is based on the multicast scheme, and thus the media is already being watched by someone else, the multicast rendezvous service is required.

Figure 19:
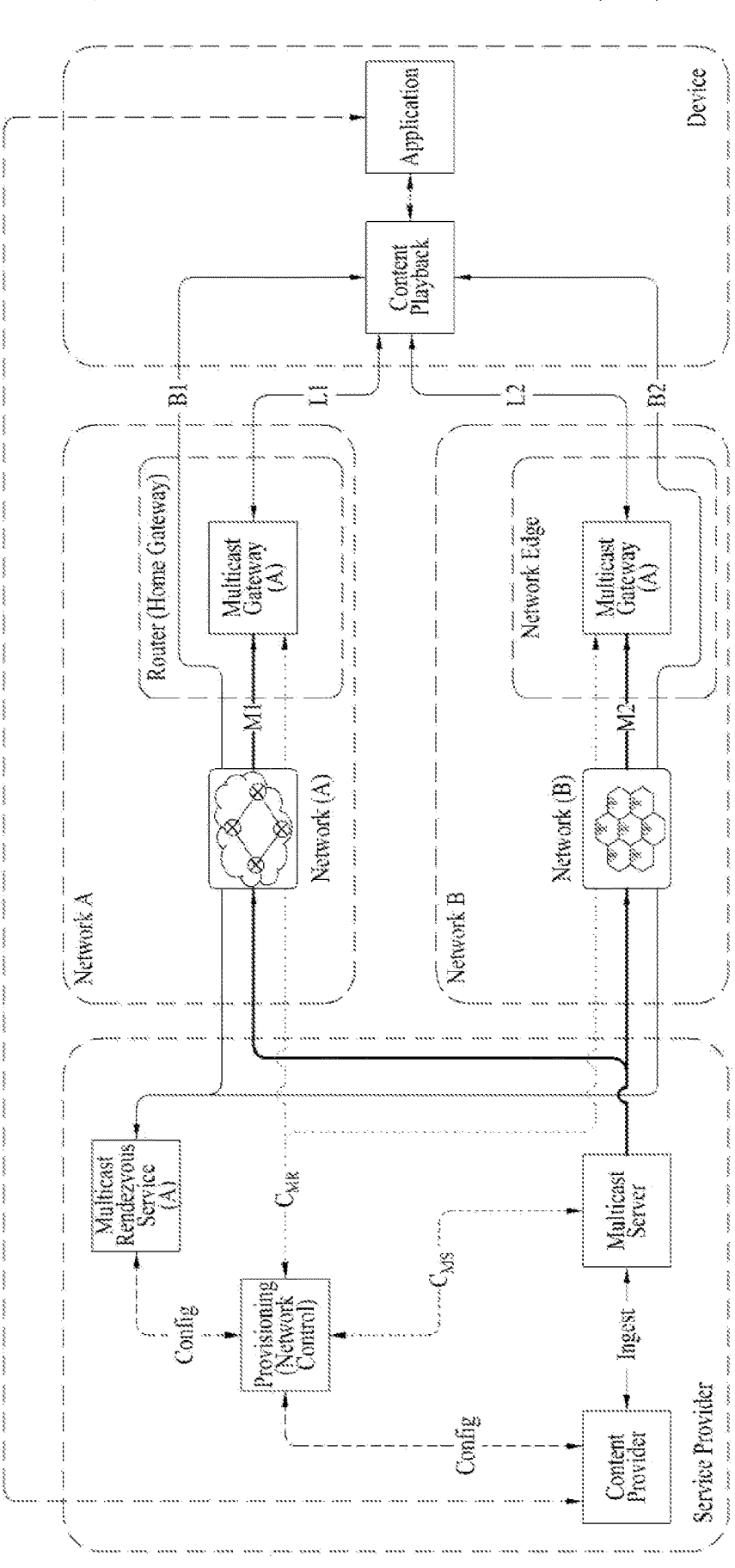
FIG. 19 illustrates an example in which the service of a single multicast server is provided for multiple heterogeneous networks, and a multicast gateway therefor is configured in each network according to the embodiments.

FIG. 19 illustrates an example in which the service of a single multicast server is provided for multiple heterogeneous networks, and a multicast gateway therefor is configured in each network according to the embodiments.

The figure illustrates an embodiment in which all multicast rendezvous services are configured in regular deployment when the service of a single multicast server is provided for multiple heterogeneous networks, and a multicast gateway therefor is configured in each network. The system according to the embodiments may include a service provider, network(s), and a device. The service provider, network(s), and device are configured as shown in FIG. 19. Each component in FIG. 19 corresponds to hardware, software, a processor, and/or a combination thereof.

In the architecture according to the embodiments, a multicast server, a multicast gateway, and a multicast rendezvous service for each network provide a service to the content playback function connected to the respective networks. For example, the device may access the mobile network, while accessing Wi-Fi over the ISP network at the same time.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Figure 20A:
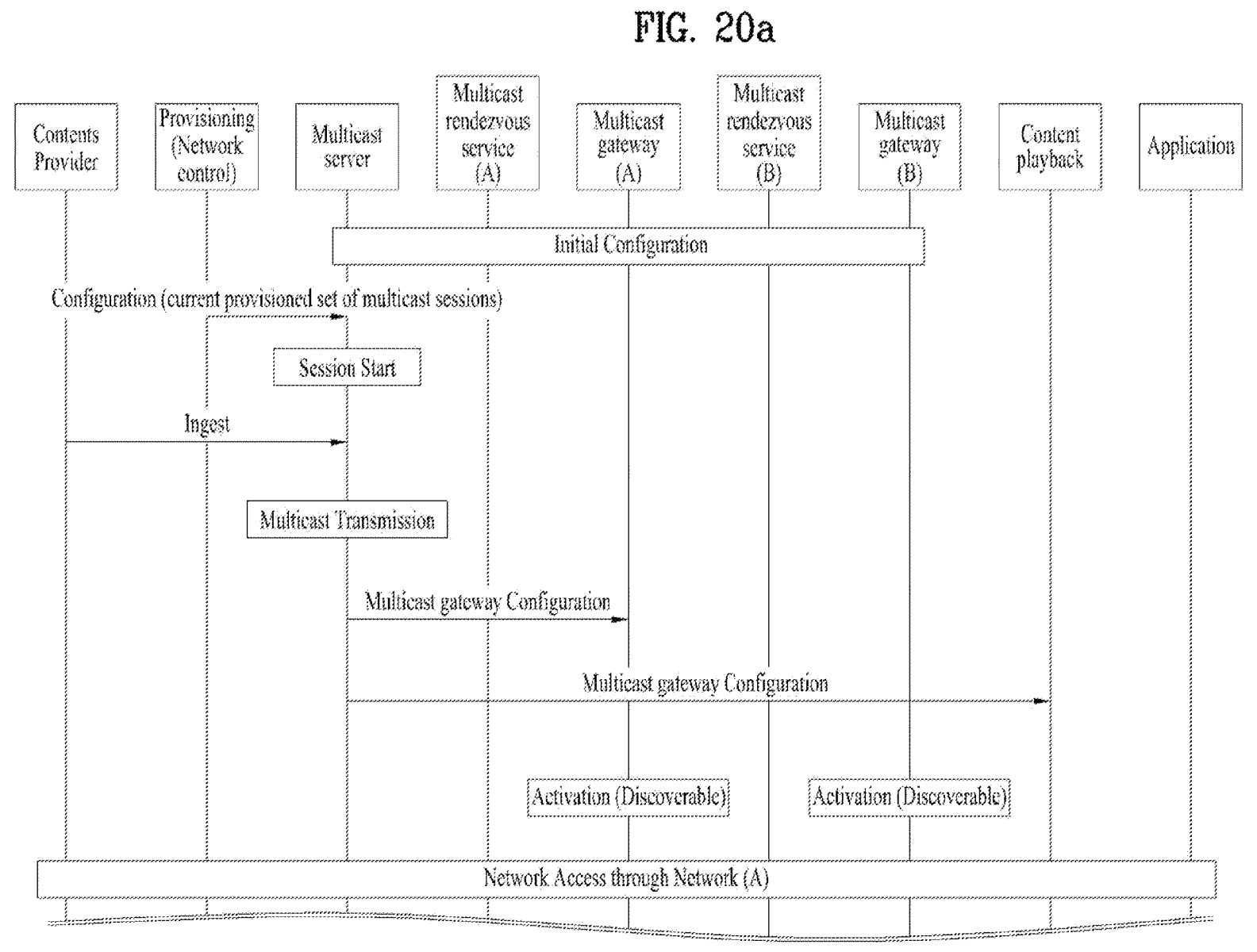
Figure 20B:
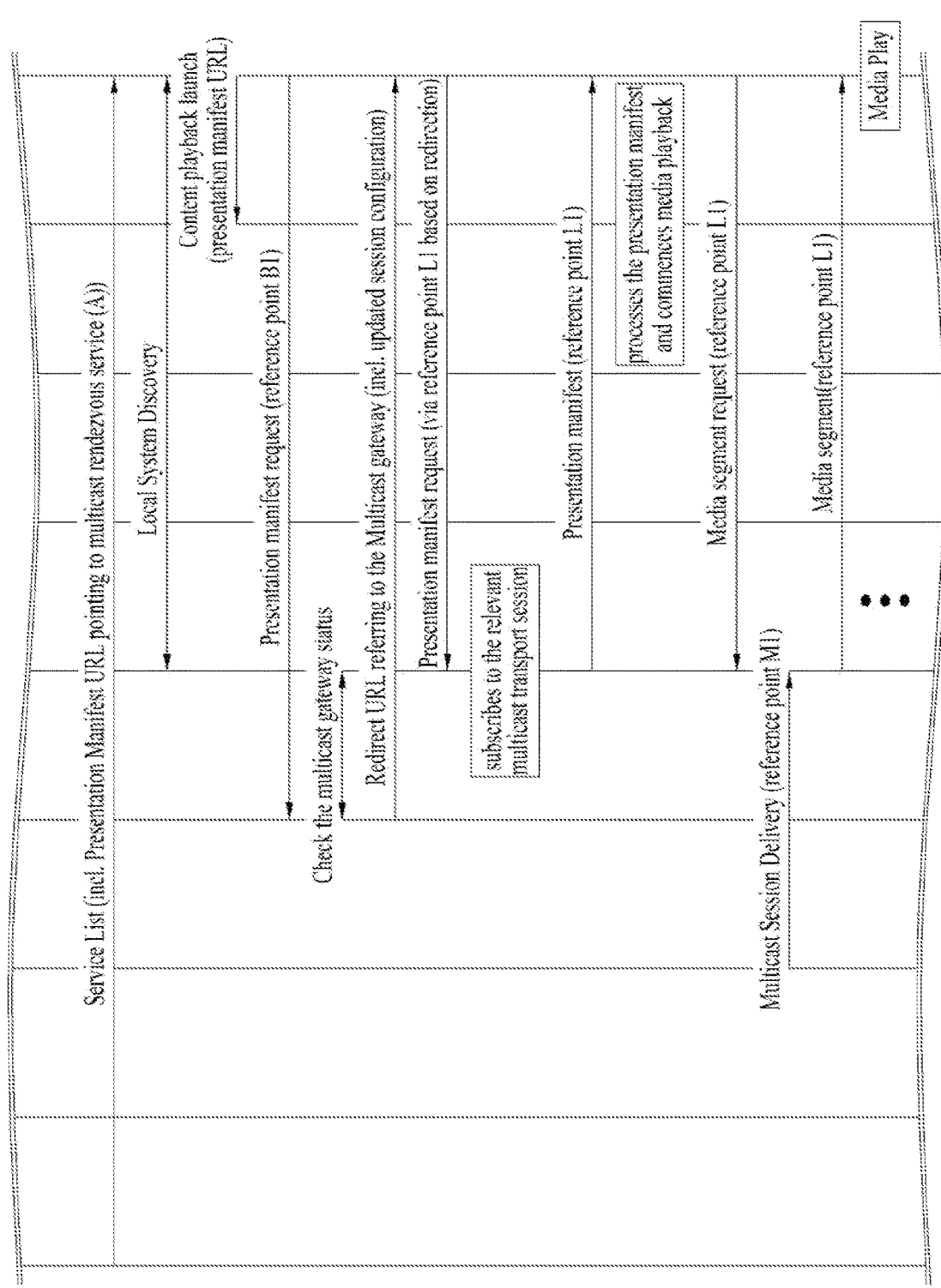
FIG. 20 shows is a flow diagram of network change according to embodiments.
Figure 20C:
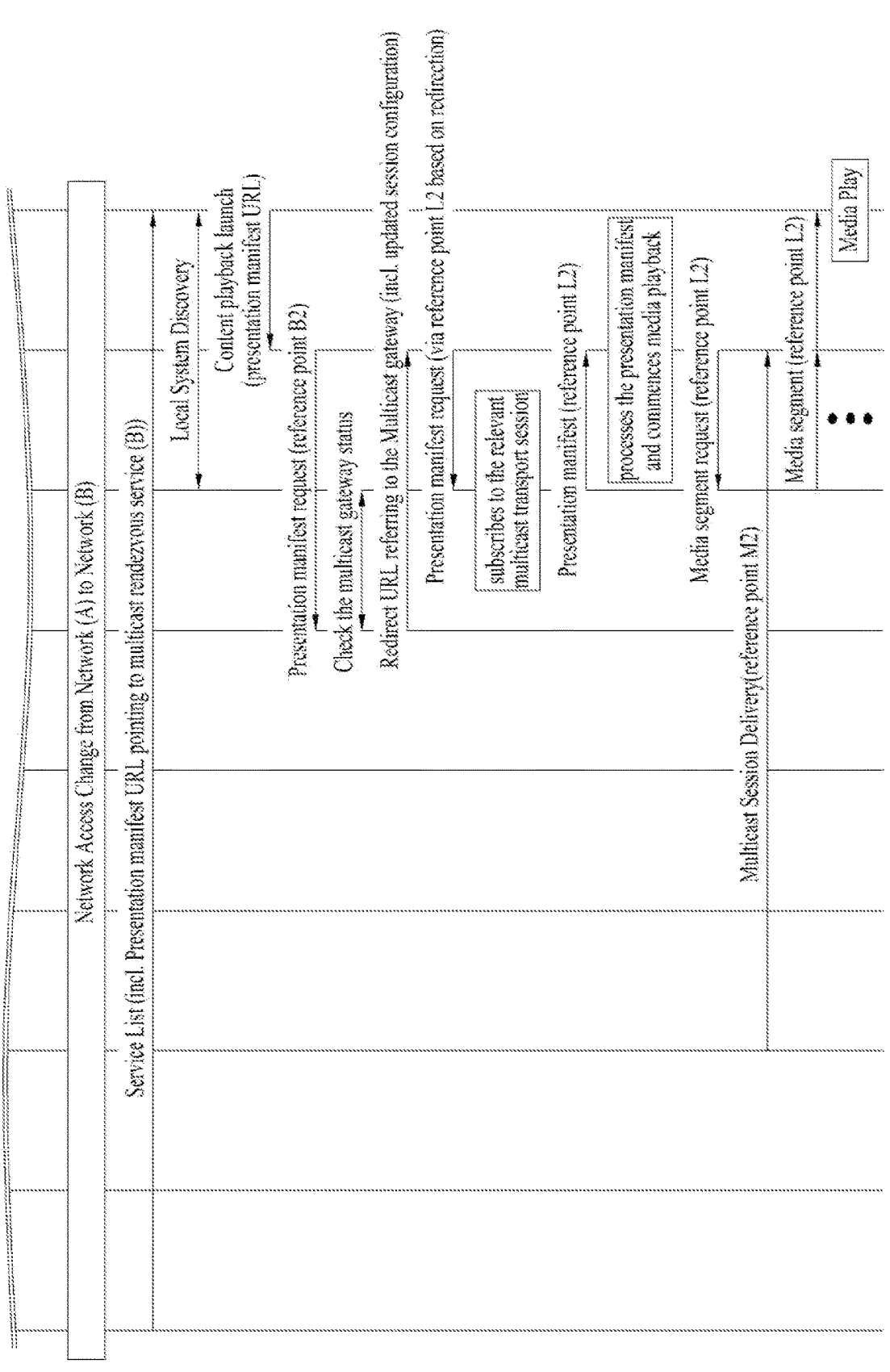

FIG. 20 shows is a flow diagram of network change according to embodiments.

The flow in the flow diagram of FIG. 20 may be carried out according to the embodiments shown in FIGS. 1 to 5, 8 to 19, and the like. Each component constituting the embodiments corresponds to hardware, software, a processor, and/or a combination thereof.

The figure shows the flow of the procedure of receiving the same service even after a network change is made, following the procedure of acquiring the manifest and receiving multicast media by the device for the architecture according to the embodiments.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to the multicast server through network control.

When the multicast session starts, the media segment is ingested from the content provider to the multicast server, multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include the url to request the presentation manifest mapped to the service ID.

When the user selects multicast contents to receive, the application may acquire the URL for requesting the initial presentation manifest through the service directory, or the like. In this case, the URL indicates the multicast rendezvous service (A).

The application may control the content playback function to start an operation for content reception. In this case, it may deliver the URL for the multicast rendezvous service (A).

The content playback function makes a request for the presentation manifest to the multicast rendezvous service (A) via the reference point B1 using the URL delivered from the application.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

Upon receiving the redirection message, the content playback function makes a request for a presentation manifest to the multicast gateway (A) via the reference point L1 according to the redirection.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server to the multicast gateway (A) via the interface M1.

The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

For the service being received, the application may acquire a URL for requesting the presentation manifest. In this case, the URL indicates the multicast rendezvous service (B).

The application may control the content playback function to start an operation for content reception. In this case, it may deliver the URL for the multicast rendezvous service (B).

The content playback function makes a request for the presentation manifest to the multicast rendezvous service (B) via the reference point B2 using the URL delivered from the application.

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

Upon receiving the redirection message, the content playback function makes a request for the presentation manifest to the multicast gateway (B) via the reference point L2 according to the redirection.

When the multicast gateway (B) has a pre-cached presentation manifest, it transmits the presentation manifest to the content playback function.

The content playback function requests a media segment for the contents based on the received presentation manifest.

Multicast streaming is transmitted from the multicast server to the multicast gateway (B) via the interface M2.

The content playback function may receive the requested media segment via the multicast gateway (B) and the media is played. When there is no separate control, the media continues to be played.

Figure 21:
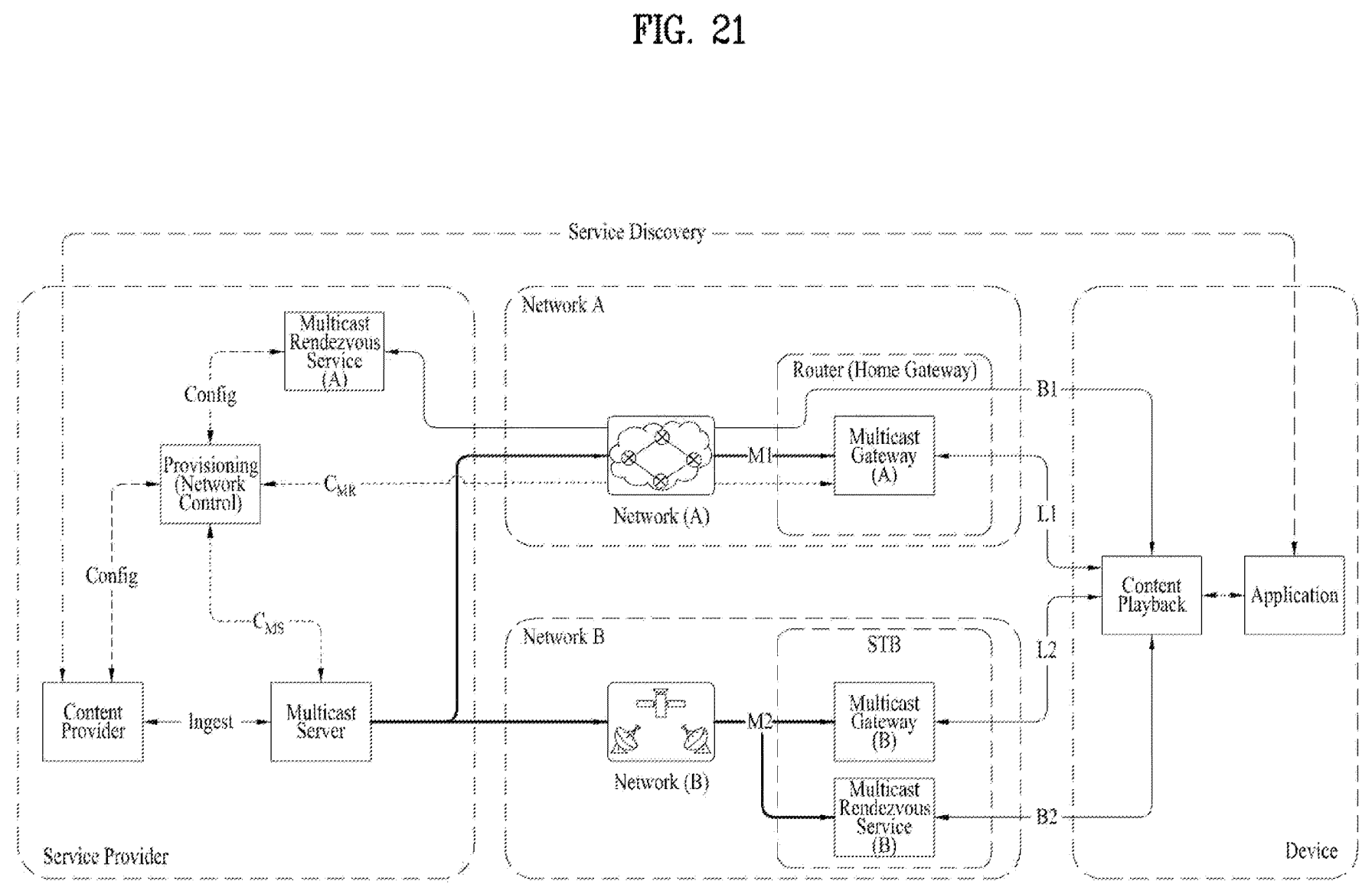

FIG. 21 illustrates an example in which the service of a single multicast server is provided for a plurality of heterogeneous networks, and a multicast gateway therefor configures each network according to the embodiments.

The figure illustrates an embodiment in which multicast rendezvous services are configured in regular deployment and co-located deployment when the service of a single multicast server is provided for multiple heterogeneous networks, and a multicast gateway therefor is configured in each network. The system according to the embodiments may include a service provider, network(s), and a device.

The service provider, network(s), and device are configured as shown in FIG. 21. Each component in FIG. 21 corresponds to hardware, software, a processor, and/or a combination thereof.

In the architecture according to the embodiments, a multicast server, a multicast gateway, and a multicast rendezvous service for each network provide a service to the content playback function connected to the respective networks. For example, the device may access a set-top box over a satellite broadcast network, while accessing Wi-Fi over the ISP network at the same time.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Figure 22A:
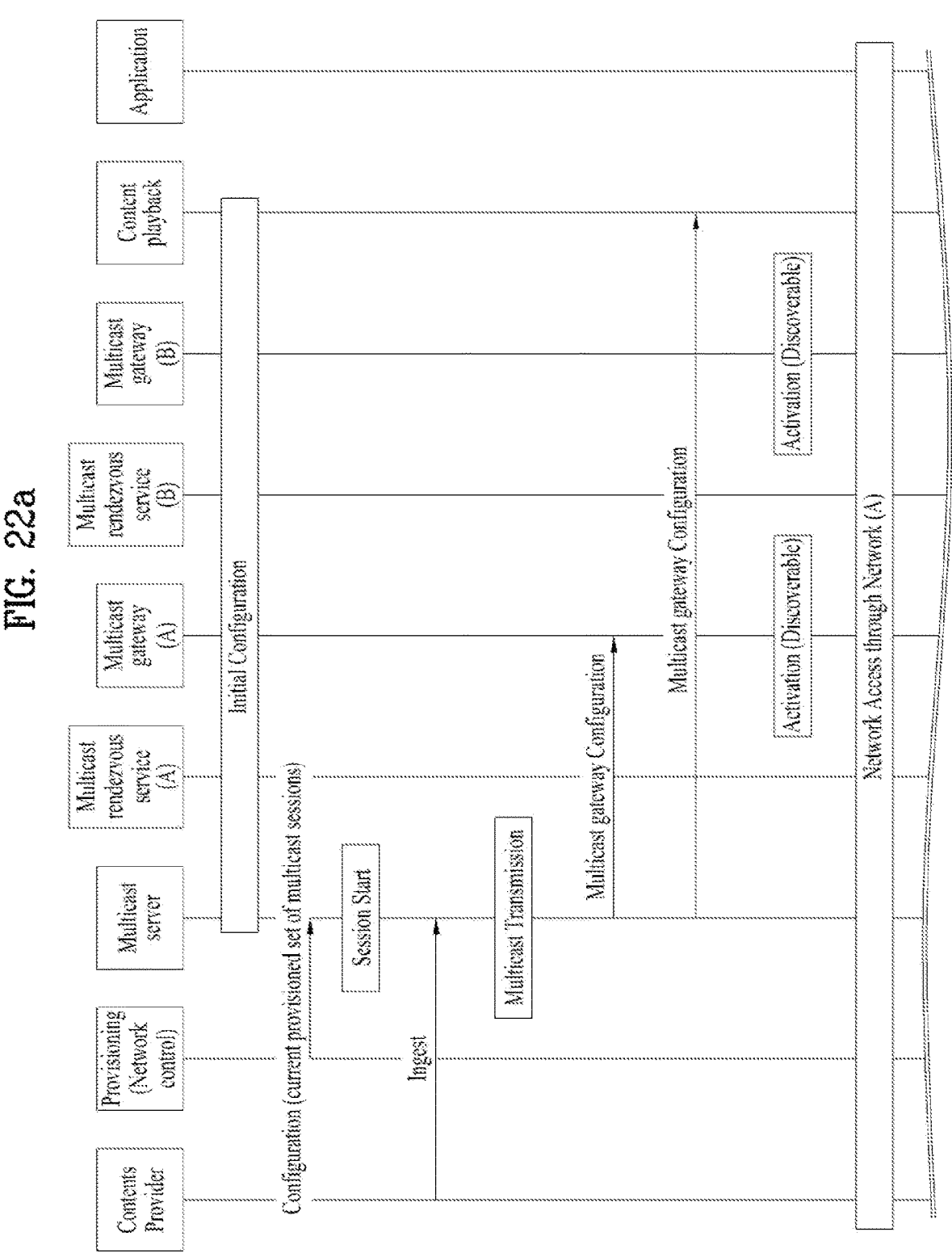
FIG. 22 is a flow diagram of network change according to embodiments.
Figure 22B:
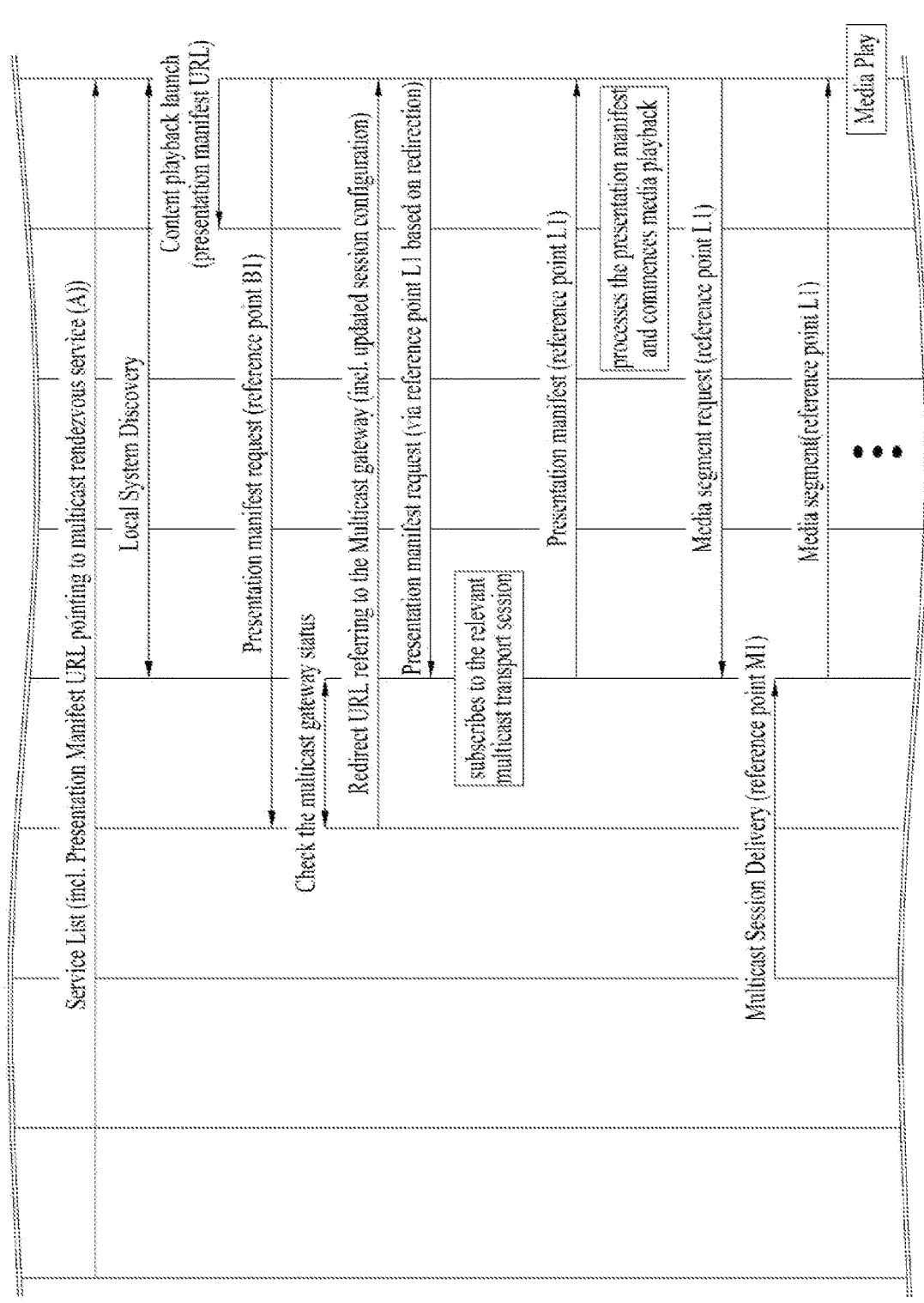
Figure 22C:
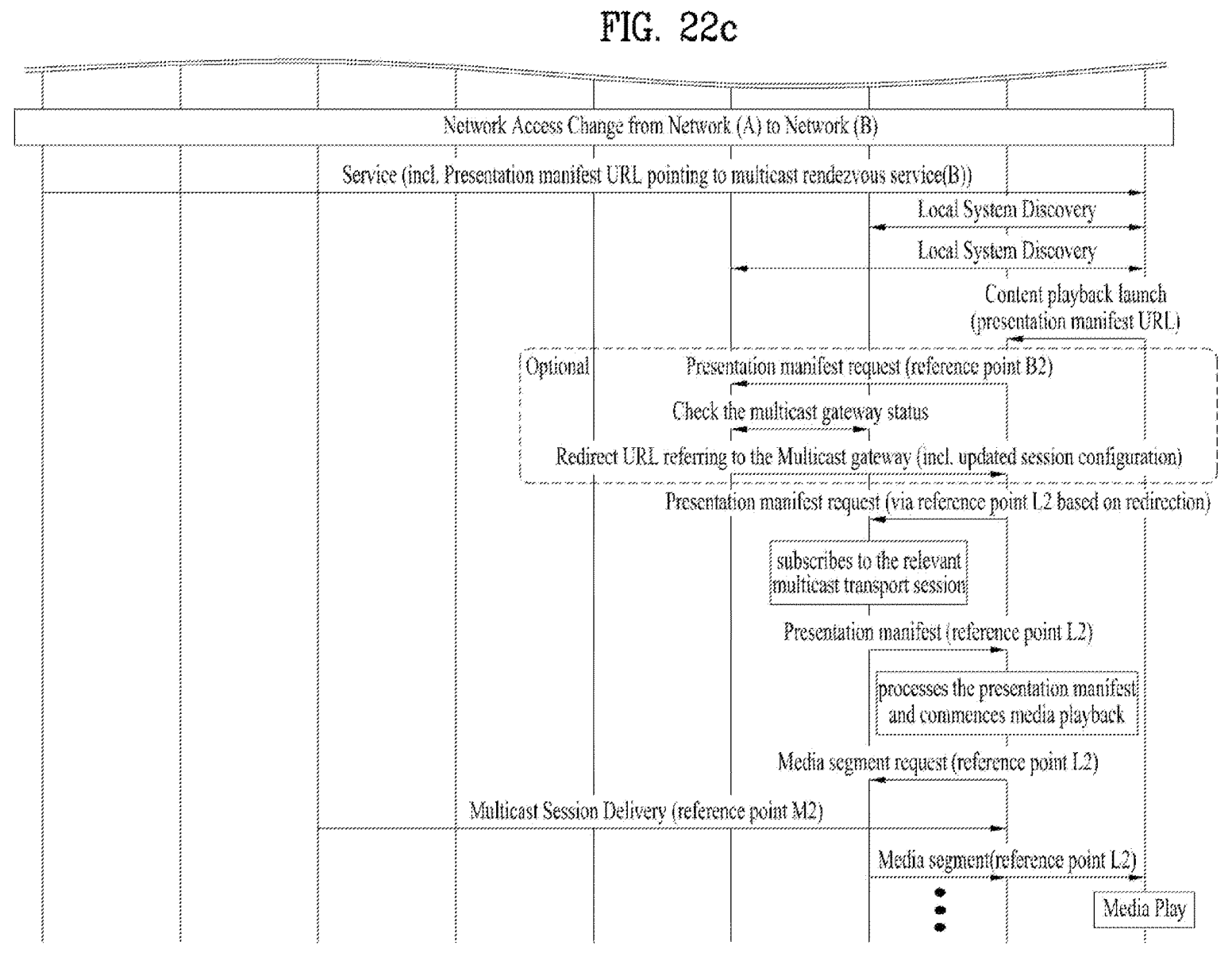

FIG. 22 is a flow diagram of network change according to embodiments.

The flow in the flow diagram of FIG. 22 may be carried out according to the embodiments shown in FIGS. 1 to 5, 8 to 21, and the like. Each component constituting the embodiments corresponds to hardware, software, a processor, and/or a combination thereof.

The figure shows the flow of the procedure of receiving the same service even after a network change is made, following the procedure of acquiring the manifest and receiving multicast media by the device for the architecture according to the embodiments.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to the multicast server through network control.

When the multicast session starts, the media segment is ingested from the content provider to the multicast server, multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include the url to request the presentation manifest mapped to the service ID.

When the user selects multicast contents to receive, the application may acquire the URL for requesting the initial presentation manifest through the service directory, or the like. In this case, the URL indicates the multicast rendezvous service (A).

The application may control the content playback function to start an operation for content reception. In this case, it may deliver the URL for the multicast rendezvous service (A).

The content playback function makes a request for the presentation manifest to the multicast rendezvous service (A) via the reference point B1 using the URL delivered from the application.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

Upon receiving the redirection message, the content playback function makes a request for a presentation manifest to the multicast gateway (A) via the reference point L1 according to the redirection.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server to the multicast gateway (A) via the interface M1.

The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

For the service being received, the application may acquire a URL for requesting the presentation manifest. In this case, the URL indicates the multicast gateway (B) and the rendezvous service (B).

When the user selects multicast contents to receive, the application may acquire the URL for requesting the initial presentation manifest through the service directory, or the like. In this case, the URL indicates the multicast gateway (B) or the multicast rendezvous service (B).

The application may control the content playback function to start an operation for content reception. In this case, it may deliver the URL for the multicast gateway (B) or the multicast rendezvous service (B).

Since the multicast gateway and the multicast rendezvous service are configured in the same device (co-located deployment), the following procedure may be optionally performed.

The content playback function makes a request for the presentation manifest to the multicast rendezvous service (B) via the reference point B2 using the URL delivered from the application.

The multicast rendezvous service (B) checks the status of the multicast gateway (B) configured in the same network.

When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

The content playback function receiving the redirection message follows the redirection.

Using the acquired URL, a request for a presentation manifest is made to the multicast gateway (B) via the reference point L2.

When the multicast gateway (B) has a pre-cached presentation manifest, it transmits the presentation manifest to the content playback function.

The content playback function requests a media segment for the contents based on the received presentation manifest.

Multicast streaming is transmitted from the multicast server to the multicast gateway (B) via the interface M2.

The content playback function may receive the requested media segment via the multicast gateway (B) and the media is played. When there is no separate control, the media continues to be played.

Figure 23:
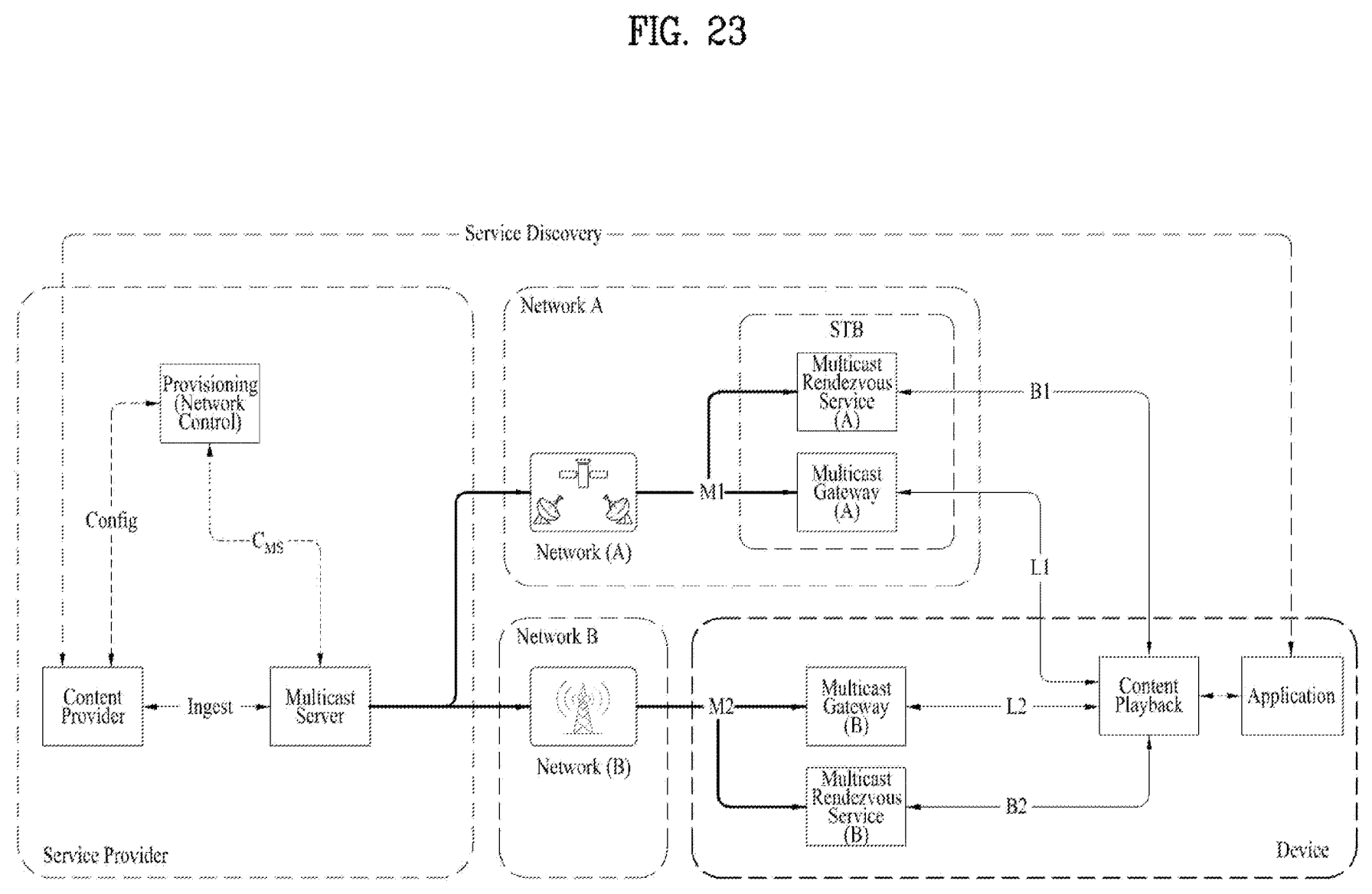

FIG. 23 illustrates an example in which all multicast rendezvous services are configured in co-located deployment when a multicast server and a multicast gateway are configured in each network according to the embodiments.

The figure illustrates an embodiment in which all multicast rendezvous services are configured in co-located deployment when a multicast server and a multicast gateway are configured in each network. The system according to the embodiments may include a service provider, network(s), and a device. The service provider, network(s), and device are configured as shown in FIG. 36. Each component in FIG. 36 corresponds to hardware, software, a processor, and/or a combination thereof. The server may be located outside the network.

In the architecture according to the embodiments, a multicast server, a multicast gateway, and a multicast rendezvous service for each network provide a service to the content playback function connected to the respective networks. For example, the device may receive a broadcast over a terrestrial broadcast network, while accessing a set-top box over a satellite broadcast network.

The content playback function in the device may be composed of two L interfaces L1 and L2 and two B interfaces B1 and B2. Media streaming may be received through the multicast gateway (A) via the interface L1, and initial access information about the initial multicast gateway (A) may be received via the interface B1. Media streaming may be received through the multicast gateway (B) via the interface L2, and initial access information about the multicast gateway (B) may be received via the interface B2. Here, the multicast gateway (B) and the multicast rendezvous service (B) are configured in the device, and therefore the interfaces L2 and B2 may be replaced with an interface inside the device.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

FIG. 24 is a flow diagram of network change according to embodiments.

The flow in the flow diagram of FIG. 24 may be carried out according to the embodiments shown in FIGS. 1 to 5, 8 to 23, and the like. Each component constituting the embodiments corresponds to hardware, software, a processor, and/ or a combination thereof.

The figure shows the flow of the procedure of receiving the same service even after a network change is made, following the procedure of acquiring the manifest and receiving multicast media by the device for the architecture according to the embodiments.

The flow related to the multicast server is carried out as follows.

Each function is deployed according to the architecture, and the configuration for multicast services is applied to the multicast servers, the multicast gateways, and the multicast rendezvous services.

The provisioning function delivers configuration information about a currently provisioned multicast session to the multicast server through network control.

When the multicast session starts, the media segment is ingested from the content provider to the multicast server, multicast transmission starts. Also, any multicast gateway capable of receiving the media segment is activated for the reception.

When the device accesses network A, it may operate as follows.

The application may receive a service list from the service provider over network A. To receive the service list, a service list acquisition method defined in network A may be used. For example, when a service directory is configured in the DVB-I network, the service list may be received through interaction between the service provider, the service directory, and the application. For ABR multicast operation, the service list may include the url to request the presentation manifest mapped to the service ID.

When the user selects multicast contents to receive, the application may acquire the URL for requesting the initial presentation manifest through the service directory, or the like. In this case, the URL indicates multicast gateway (A) or the multicast rendezvous service (A).

The application may control the content playback function to start an operation for content reception. In this case, it may deliver the URL for the multicast gateway (A) or the multicast rendezvous service (A).

Since the multicast gateway and the multicast rendezvous service are configured in the same device (co-located deployment), the following procedure may be optionally performed.

The content playback function makes a request for the presentation manifest to the multicast rendezvous service (A) via the reference point B1 using the URL delivered from the application.

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

The content playback function receiving the redirection message follows the redirection.

Using the acquired URL, a request for a presentation manifest is made to the multicast gateway (A) via the reference point L1.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server to the multicast gateway (A) via the interface M1.

The content playback function may receive the requested media segment via the multicast gateway (A) and the media is played. When there is no separate control, the media continues to be played.

In this state, when the device changes the access from network A to network B, it may operate as follows.

The application may receive a service list from the service provider over network B. To receive the service list, a service list acquisition method defined in network B may be used. In order to continuously receive the multicast session received over network A, session information related to the service ID may be exchanged. The received service list may include a url for requesting the presentation manifest mapped to the service ID.

Since the multicast gateway and the multicast rendezvous service are configured in the device, operations related to the interfaces L2 and B2 may be optionally performed.

For the service being received, the application may acquire a URL for requesting the presentation manifest. In this case, the URL indicates the multicast rendezvous service (B).

The application may control the content playback function to start an operation for content reception. In this case, it may deliver the URL for the multicast rendezvous service (B).

The content playback function makes a request for the presentation manifest to the multicast rendezvous service (B) via the reference point B2 using the URL delivered from the application.

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

Upon receiving the redirection message, the content playback function makes a request for the presentation manifest to the multicast gateway (B) via the reference point L2 according to the redirection.

When the multicast gateway (B) has a pre-cached presentation manifest, it transmits the presentation manifest to the content playback function.

The content playback function requests a media segment for the contents based on the received presentation manifest.

Multicast streaming is transmitted from the multicast server to the multicast gateway (B) via the interface M2.

The content playback function may receive the requested media segment via the multicast gateway (B) and the media is played. When there is no separate control, the media continues to be played.

Hereinafter, a further description will be given of the multicast signal processing method/apparatus of the embodiments capable of accessing multiple networks.

A multicast server may be located on each network.

Figure 25A:
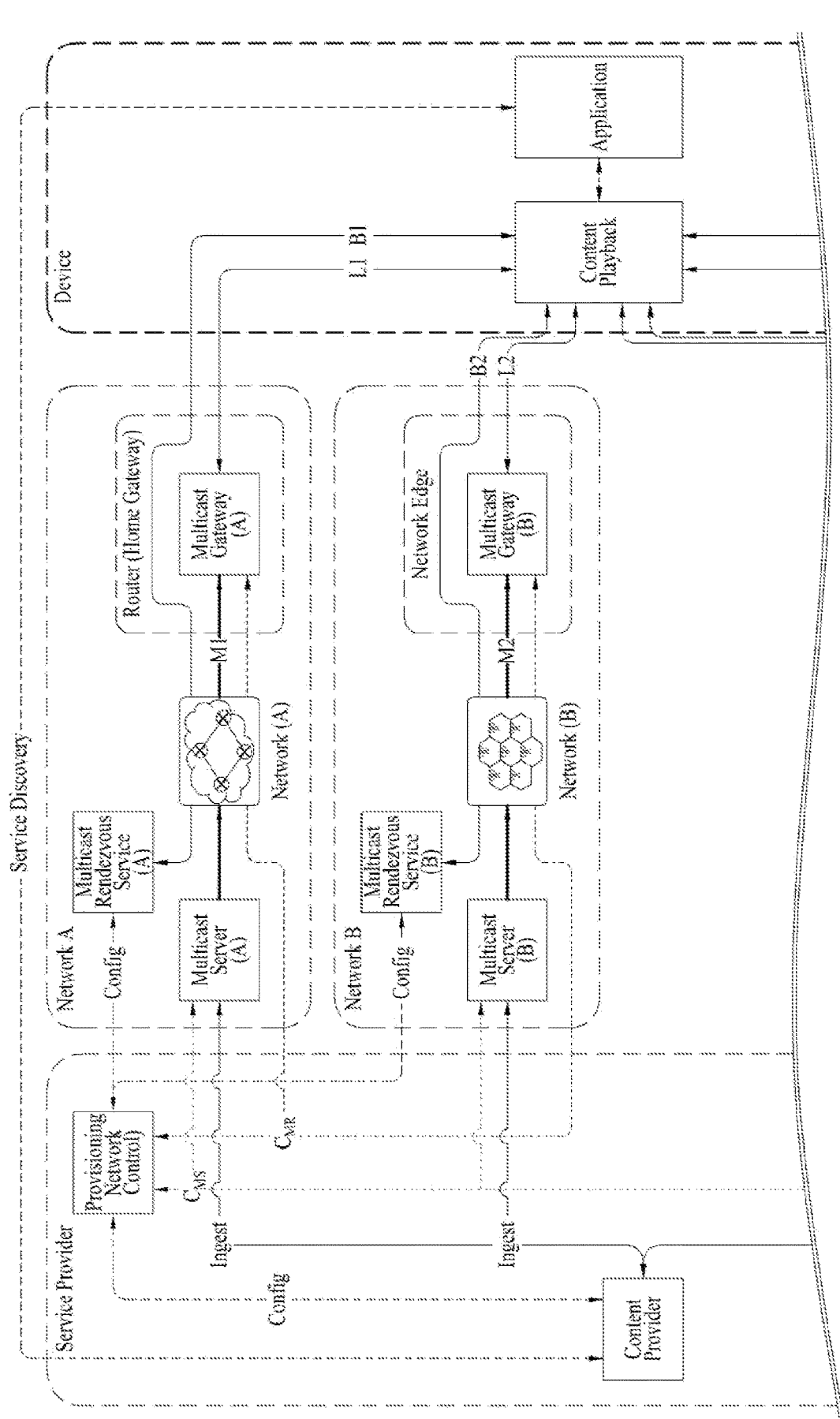
FIG. 25 illustrates an embodiment in which a device accesses various serviceable networks when a multicast server and a multicast gateway are configured in each network according to the embodiments.
Figure 25B:
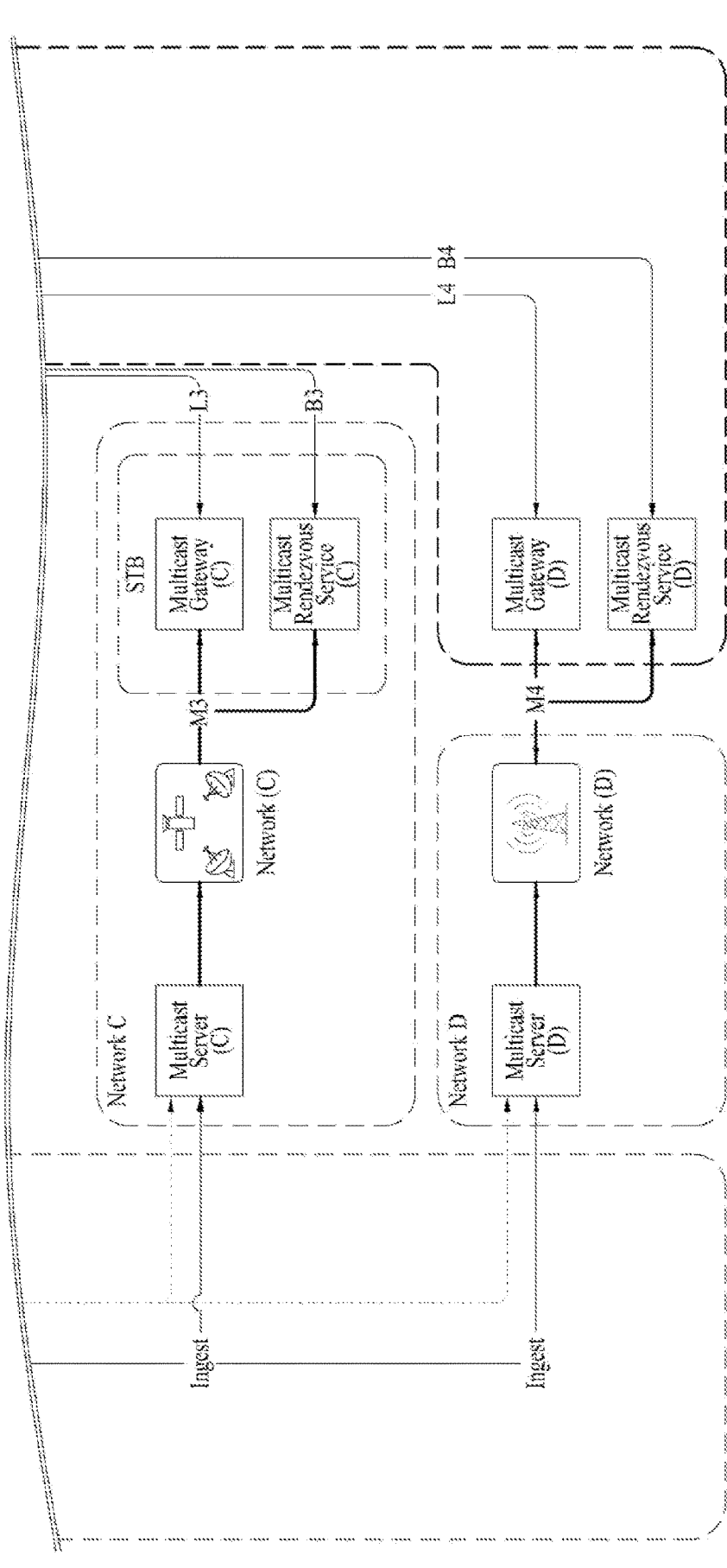

FIG. 25 illustrates an embodiment in which a device accesses various serviceable networks when a multicast server and a multicast gateway are configured in each network according to the embodiments.

Each component constituting the embodiments corresponds to hardware, software, a processor, and/or a combination thereof.

The figure illustrates an embodiment in which a device accesses various serviceable networks when a multicast server and a multicast gateway are configured in each network based on the above description. The system according to the embodiments may include a service provider, network(s), and a device. The service provider, network(s), and device according to the embodiments are configured as described below.

Figure 26A:
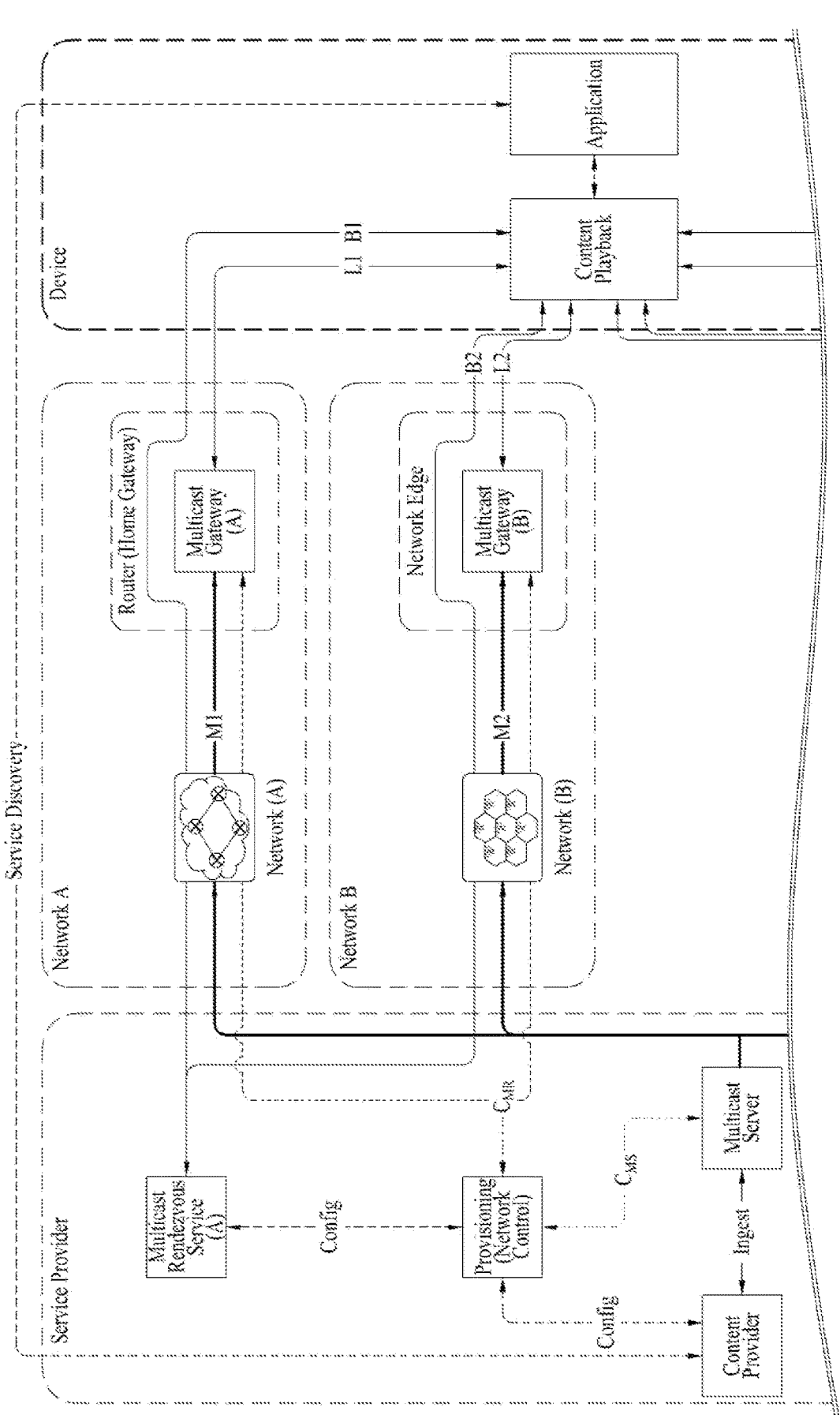
FIG. 26 illustrates a structure in which a single multicast server provides a service to a plurality of heterogeneous networks, and a multicast gateway therefor is configured in each network according to the embodiments.
Figure 26B:
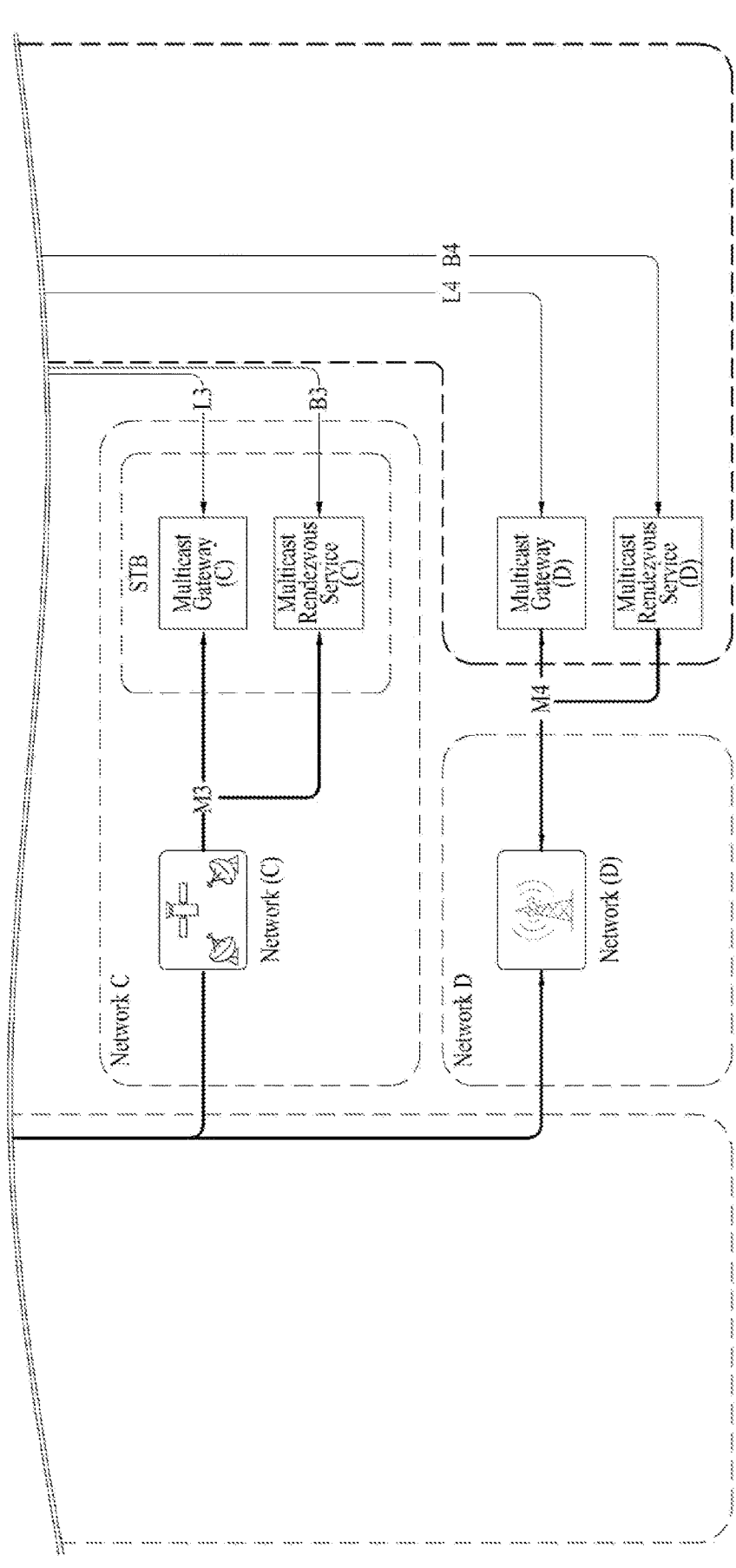

FIG. 26 illustrates a structure in which a single multicast server provides a service to a plurality of heterogeneous networks, and a multicast gateway therefor is configured in each network according to the embodiments.

The figure illustrates an embodiment in which a device accesses various serviceable networks when the service of a single multicast server is provided for multiple heterogeneous networks, and a multicast gateway therefor is configured in each network, as described above. The system according to the embodiments may include a service provider, network(s), and a device. The service provider, network(s), and device are configured as follows.

Each component constituting the embodiments corresponds to hardware, software, a processor, and/or a combination thereof.

The transmission/reception device according to the embodiments may efficiently control and provide DVB multicast ABR and 5G media streaming in various network environments based on the operations according to the embodiments.

Hereinafter, a reception operation and an operation for a reception device according to embodiments will be described.

For the architectures according to the above-described embodiments, the following protocol may be implemented.

Based on the described architecture according to the embodiments, elements and attributes necessary for a device capable of ABR multicast streaming by accessing multiple transport networks are defined.

The receiver according to the embodiments may perform a reverse process of the operation of the transmitter. The receiver may perform ABR multicast streaming received based on the following operation. The receiver may perform ABR multicast streaming based on the following network structure.

The following is an example of protocol stacks in reception devices.

FIG. 27 illustrates a protocol configuration for ABR multicast according to embodiments.

For multicast ABR transmission, multicast streaming may be transmitted from the multicast server via the interface M. In this case, ROUTE or FLUTE may be used as a multicast transmission protocol. The multicast gateway may use DASH or HLS for HTTP-based adaptive media streaming to the playback function via the interface L. In the playback function, a protocol for reception of HTTP-based adaptive media streaming from the multicast gateway, and a file format and a media codec for the received adaptive streaming may be configured. Here, the Layer 1 and Layer 2 protocols may be configured as optimal protocols for the respective networks.

In order to access multiple networks, embodiments may include the protocols described below.

Figure 28:
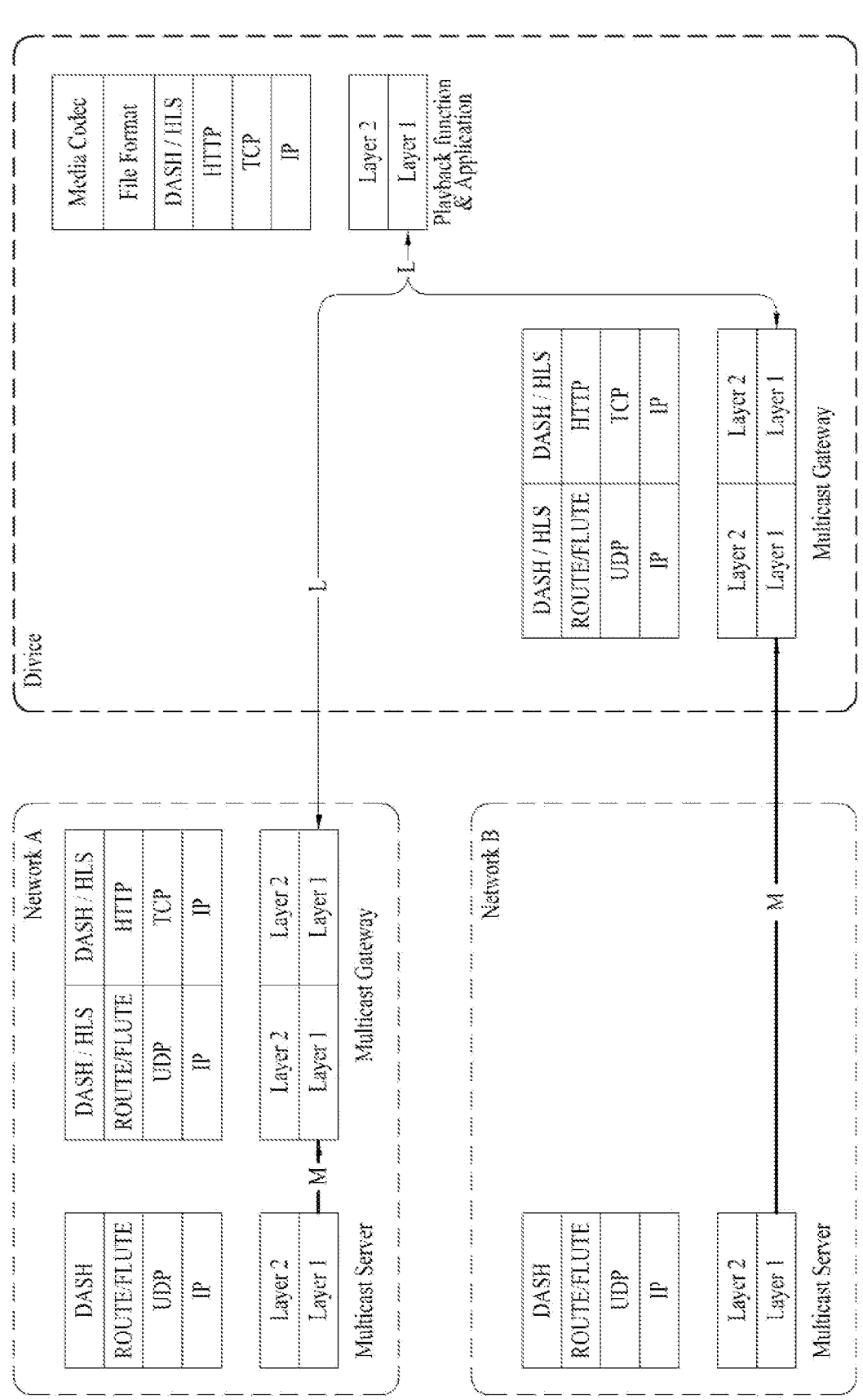
FIG. 28 illustrates an embodiment of a protocol that may be configured in a reception device to access a plurality of networks according to the embodiments.

FIG. 28 illustrates an embodiment of a protocol that may be configured in a reception device to access a plurality of networks according to the embodiments.

The figure shows a protocol implemented on the architectures according to the above-described embodiments when the multicast signal processing apparatus according to the embodiments is implemented as a reception device.

According to the embodiments, it is assumed that a multicast gateway for network A is configured on the network and a multicast gateway for network B is configured in the device.

According to the embodiments, the multicast gateway configured on the network to provide the service of ABR multicast streaming over network A receives multicast streaming from the multicast server, and transmits the same to the device via the interface L in a manner of HTTP-based adaptive media streaming. Therefore, in the device, a protocol stack for receiving adaptive media streaming via the interface L may be configured.

Also, in order to receive ABR multicast streaming over network B, a multicast gateway may be configured in the device. Thus, in the device, a protocol stack for receiving adaptive media streaming via the interface M for network B may be configured.

Accordingly, the protocols for the interface M and the interface L may be simultaneously configured in the receiver device for accessing multiple networks to receive the ABR multicast service. In this case, the multicast gateway function in the device may convert multicast streaming to HTTP-based adaptive media streaming in the same way as the multicast gateway configured on the network and deliver the converted streaming to the interface L in the device.

FIG. 28 shows a protocol according to embodiments.

The figure shows a protocol implemented on the architectures according to the above-described embodiments when the multicast signal processing apparatus according to the embodiments is implemented as a reception device.

According to the embodiments, it is assumed that a multicast gateway for network A is configured on the network and a multicast gateway for network B is configured in the device.

According to the embodiments, the multicast gateway configured on the network to provide the service of ABR multicast streaming over network A receives multicast streaming from the multicast server, and transmits the same to the device via the interface L in a manner of HTTP-based adaptive media streaming. Therefore, in the device, a protocol stack for receiving adaptive media streaming via the interface L may be configured.

Also, in order to receive ABR multicast streaming over network B, a multicast gateway may be configured in the device. Thus, in the device, a protocol stack for receiving adaptive media streaming via the interface M for network B may be configured.

Accordingly, the protocols for the interface M and the interface L may be simultaneously configured in the receiver device for accessing multiple networks to receive the ABR multicast service. In this case, the multicast gateway function in the device may convert multicast streaming to HTTP-based adaptive media streaming in the same way as the multicast gateway configured on the network and deliver the converted streaming to the interface L in the device.

FIG. 29 illustrates a protocol according to embodiments.

In the embodiments, it is assumed that a multicast gateway for network A is configured on the network and a multicast gateway for network B is configured in the device.

In the embodiments, the multicast gateway configured on the network to provide the service of ABR multicast streaming over network A receives multicast streaming from the multicast server, and transmits the same to the device via the interface L in a manner of HTTP-based adaptive media streaming. Therefore, in the device, a protocol stack for receiving adaptive media streaming via the interface L may be configured.

Also, in order to receive ABR multicast streaming over network B, a multicast gateway may be configured in the device. Thus, in the device, a protocol stack for receiving adaptive media streaming via the interface M for network B may be configured.

Accordingly, the protocols for the interface M and the interface L may be simultaneously configured in the receiver device for accessing multiple networks to receive the ABR multicast service. In this case, unlike the multicast gateway configured on the network, the multicast gateway function in the device may have an interface L configured in the device. The interface L may be configured directly as a protocol stack without a separate interface. For streaming received over network A, the device may operate as a playback function may be operated. For streaming received over network B, the device may operate as a multicast gateway. When operating as a multicast gateway, the interface L may be omitted, and the payload of the multicast protocol may be adaptive media streaming data.

Next, an operation of generating and transmitting/receiving a service list and a presentation manifest according to embodiments will be described.

Figure 30:
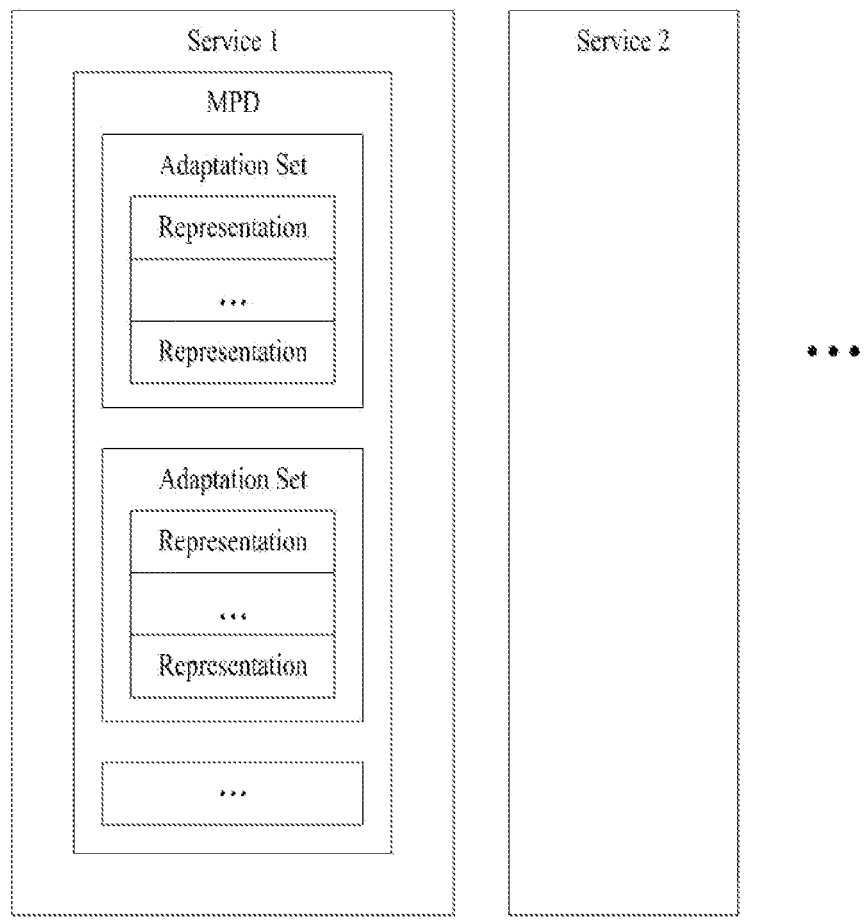
FIG. 30 illustrates a configuration of services and service-related information according to embodiments.

FIG. 30 illustrates a configuration of services and service-related information according to embodiments.

For the DASH-based ABR multicast service, a service provider according to the embodiments may configure a presentation manifest (e.g., MPD) along with a service list as follows. In terms of service provision, the service list and presentation manifest may not be redundantly configured for the same contents.

Figure 31:
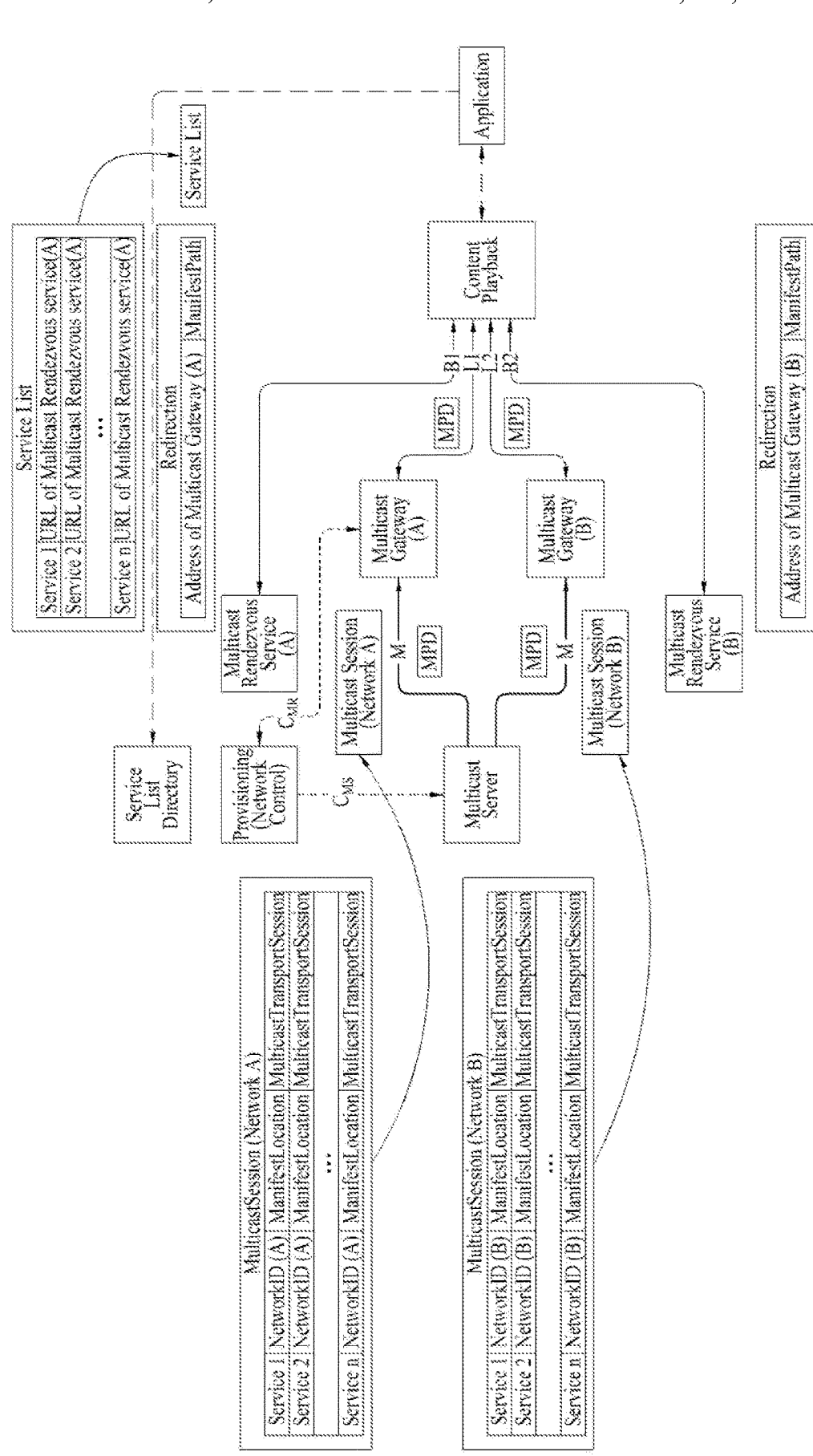
FIG. 31 illustrates a method of generating and transmitting a service list and presentation manifest for ABR multicast according to embodiments.

FIG. 31 illustrates a method of generating and transmitting a service list and presentation manifest for ABR multicast according to embodiments.

In order to support ABR multicast, the multicast signal processing method/apparatus according to the embodiments may generate and transmit/receive a service list and a presentation manifest as illustrated in FIG. 31.

Elements that may be transmitted may be determined according to the interface defined in the ABR multicast architecture. The application of the receiver device may receive a service list from the service list directory. The list may include a service id and a url for the multicast rendezvous service. When the content playback function makes a request for a manifest to the multicast rendezvous service through the url, it may acquire the address of the multicast gateway and the path for the manifest through the redirection message of the multicast rendezvous service, and receive a presentation manifest via the interface L. The multicast gateway may receive the presentation manifest (e.g., MPD) from the multicast server. To this end, it may acquire multicast session configuration information.

Figure 32:
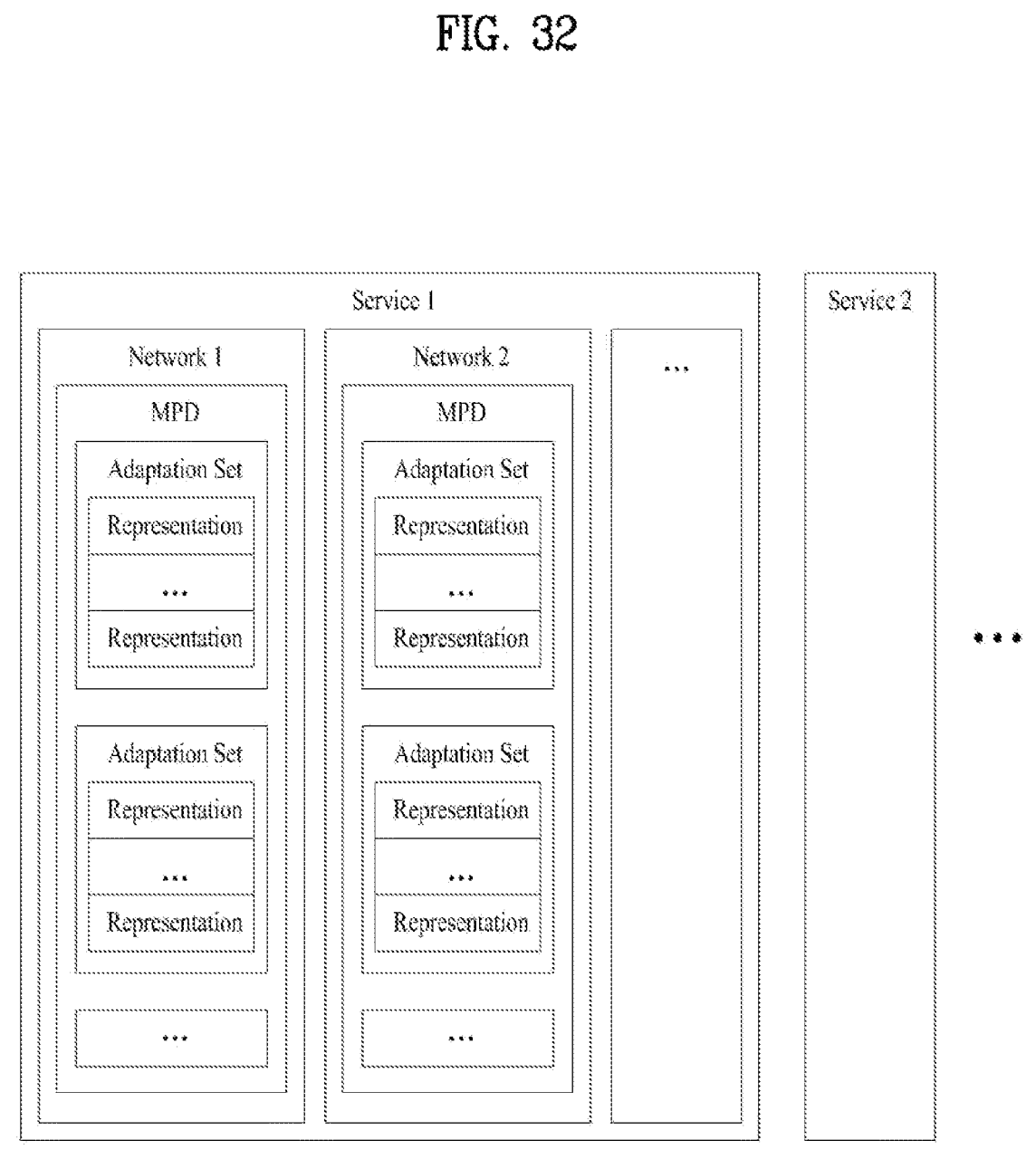

FIG. 32 illustrates service list and presentation manifest management according to embodiments.

The reception device according to the embodiments may manage the service list and the presentation manifest as shown in FIG. 32. For the service list and presentation manifest (e.g., MPD) configured in the structure according to the embodiments, the service list may be managed in the receiver capable of receiving the ABR multicast service over multiple networks as follows.

That is, MPDs for multiple networks such as network 1 and network 2 may be generated and transmitted/received for the same service.

In an embodiment, the adaptation sets provided over the respective networks may be different from each other in the device receiving the ABR multicast service using multiple networks. Accordingly, a presentation manifest is separately configured and managed for each network.

When the ABR multicast service reception function is configured in a TV or the like and broadcast contents are received simultaneously by a corresponding receiver, the service list according to the embodiments may be managed like a channel map.

FIG. 33 shows a service list according to embodiments.

FIG. 33 shows the syntax of a service list according to embodiments.

ServiceList—This is a root element that includes configuration information about a service.

@serviceIdentifier—An identifier for identifying the service.

PresentationManifestRequestURL—An element for information about a multicast rendezvous service when configured for one service through multiple multicast rendezvous services.

@NetworkType—The network type of the deployed multicast rendezvous service. It may be used to set priority when a device accesses networks at the same time.

@HostAddress—The address of the multicast rendezvous service.

@RendezvousServerType—An attribute for deployment of the multicast rendezvous service. For example, 0 is for regular deployment, and 1 is for co-located deployment.

MulticastTransportSession—The element for a multicast transport session may be optionally transmitted when the device includes a multicast gateway. When the Multicast-TransportSession element is not sent, information may be provided through multicast gateway configuration.

FIG. 34 shows a multicast session according to embodiments.

The figure shows an embodiment of the configuration of a multicast session element. The multicast session element is transmitted from the provisioning function to the multicast server and the multicast gateway. Accordingly, the CMS and CMR interfaces may be used, respectively. When the network supports only unidirectional transmission, the element may be delivered to the multicast server via the CMS interface, and then delivered from the multicast server to the multicast gateway via the interface M.

@serviceIdentifier: The service identifier for the logical service with which this session is associated.

@contentPlaybackAvailabilityOffset: Duration string. Availability time offset adjustment applied to the original presentation manifest when passed to instances of the content playback function.

@networkIdentifier: The identifier of the network over which the current multicast session is transmitted.

PresentationManifestLocator: The URL of a presentation manifest for the linear service.

@manifestId: Uniquely identifies this presentation manifest within the scope of a multicast session.

@contentType: The MIME content type of this presentation manifest.

MulticastTransportSession: A container for multicast transport session parameters.

@networkIdentifier—An identifier of the network over which the current multicast session is provided. The receiver may identify a network over which the same multicast service is received.

34

Manifest Request and Redirection According to Embodiments

In the above architecture, the syntax of the request URL of the HTTP message sent by the content playback function to the multicast rendezvous service is configured as follows.

http[s]://<Host>/<ManifestPath>[?<field>=<value> [&<field>=<value>]*]

Elements included in the URL according to the embodiments are shown in FIG. 35.

FIG. 35 shows elements included in a Request URL of an HTTP message according to embodiments.

Host: FQDN (or IP address) and optionally the port number of the multicast rendezvous service.

ManifestPath: The resource path for retrieving the presentation manifest from the specified host.

AToken: The value is an authentication token that authorizes access to the multicast rendezvous service, if required by the system operator. This may have been included in the original presentation manifest URL, or it may have been added by a third-party CDN broker as part of an earlier HTTP redirect URL, or it may be generated locally by the application.

Priority: Priority of retrieving presentation when deploying multiple networks.

MGstatus: The value is the current status of the multicast gateway. For example, 0=inactive, and 1=active.

MGid: The value is the port number of the multicast gateway, optionally preceded by its IP address. The format is [IP address]:port.

MGhost: The value is the multicast gateway host name.

Ori: The value is the host name (FQDN) of the original targeted host.

The application may substitute the original targeted host (FQDN) with the local multicast rendezvous service host name or address. Moreover, in case of relying on a third-party CDN broker, the latter indicates here the original targeted host name (FQDN) before redirecting the request to the multicast rendezvous service.

Priority—When the playback function makes a request for the manifest to the multicast rendezvous service, and the multicast rendezvous service is capable of redirecting the same to multiple multicast gateways, different priorities may be assigned to the networks in which the multicast gateways are configured, such that priority of multicast reception may be determined.

Upon receiving the request URL according to the embodiments, the multicast rendezvous service may send a 307 Temporary Redirect response. Here, the syntax of the Redirect URL in the Location response header is configured as follows:

http[s]://<Host>[/session ID]/<ManifestPath>[?conf= <multicast session.

Elements included in the URL according to the embodiments are disclosed below.

FIG. 36 shows information included in a Redirect URL of a Location response header according to embodiments.

Host: The IP address or FQDN of the multicast gateway and optionally the port number (e.g., "router.example:8088" or "192.0.2.1:8088").

Session ID: A unique presentation session identifier communicated and possibly generated by the multicast rendezvous service including one or more URL path elements.

ManifestPath: The resource path for retrieving the presentation manifest from the specified host.

RequestedPriority: Priority value requested from content playback.

conf: The multicast session parameters may take the form of a multicast gateway configuration instance document comprising one multicast session.

The document may be compressed using Gzip and base64url-encoded prior to inclusion as a URL query string parameter.

RequestedPriority—When the playback function makes a request for the manifest to the multicast rendezvous service, and the priorities for multiple multicast gateways are configured, the priority transmitted at the time of redirection transmission may be returned. The multicast rendezvous service may redirect the same to a multicast gateway having the highest possible priority that may be redirected.

When the presentation manifest is related to the multicast session in the multicast session configuration (the service is transmittable by multicast), the multicast rendezvous service may redirect the request to the multicast gateway as follows:

HTTP/1.1 307 Temporary Redirect
Server: <Multicast gateway>
Location: http[s]://<Multicast gateway>/<ManifestPath>
    [?<requestedPriority]*

The URL corresponding to the Location field in the HTTP header may include a query parameter for piggybacking a multicast gateway configuration instance document including a session identifier and a multicast session corresponding to the requested presentation manifest.

Hereinafter, operations of the content provider and the service provider according to the embodiments will be described.

The architecture according to the embodiments may include a content provider, a service provider, a network, and a device. Each component may correspond to hardware, software, a processor, and/or a combination thereof. The processor according to the embodiments may perform the operations according to the embodiments and may be connected to a memory to store information about the operations.

Figure 37A:
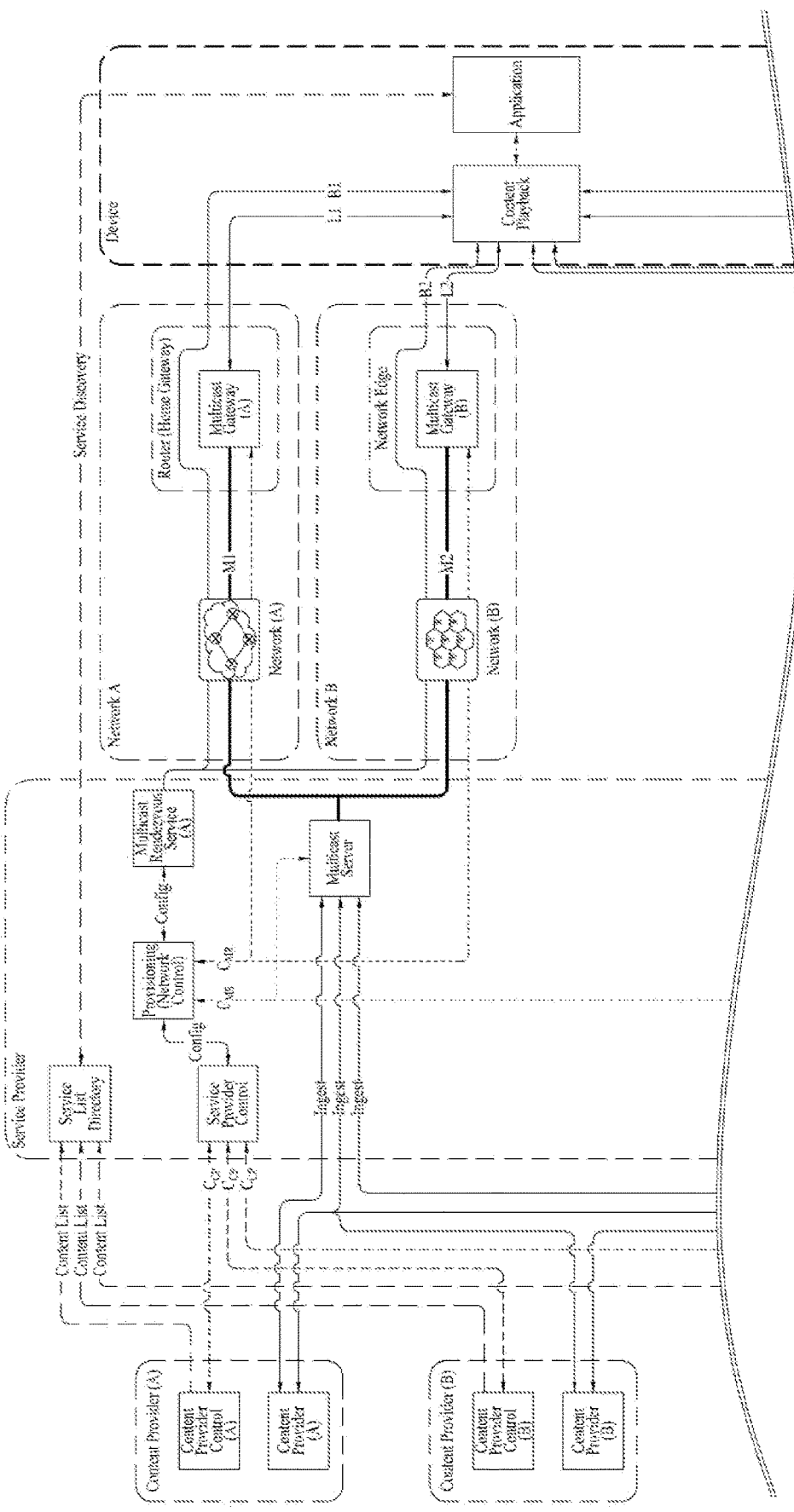
FIG. 37 illustrates multiple content providers according to embodiments.
Figure 37B:
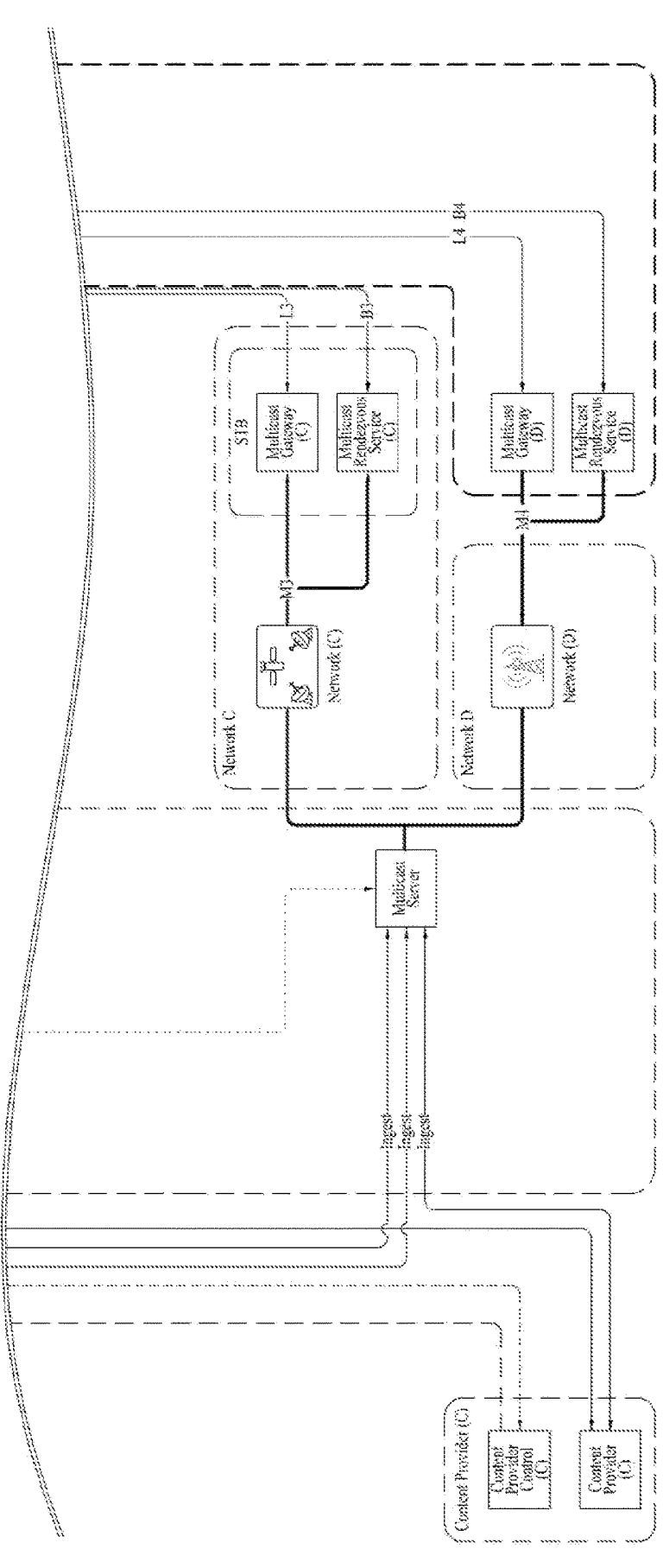

FIG. 37 illustrates multiple content providers according to embodiments.

The architecture according to the embodiments shows a structure in which a service is provided using content created by multiple content providers. In the architecture according to the embodiments, a multicast server, a multicast gateway, and a multicast rendezvous service for each network provide a service to the content playback function connected to the respective networks.

In this case, the service provider may provide a service to the receiver device using multiple networks. The service provider may configure a service list directory, and may acquire the content list to be provided through the content provider control function configured in each content provider. The received content list may configure the service list in a form suitable for the service. The service list is provided to the application.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Content provider server provides content to multicast server configured in the service provider (ingest). In this case, information on the ingested content may be transmitted from each content provider control function to the service provider control function. Based on this information, the service provider control function may configure multicast session configuration information and deliver the same to the multicast server and the multicast gateway.

Interfaces L and B may be configured for each network in the content playback function in the device. Media streaming may be received through multicast gateway (A), multicast gateway (B), multicast gateway (C), and multicast gateway (D) via the interfaces L1, L2, L3, and L4, and receive initial access information for the multicast gateway via the interfaces B1, B2, B3, and B4. Since the multicast gateway (D) and the multicast rendezvous service (D) are configured in the device, the interfaces L4 and B4 may be replaced with internal interfaces of the device.

Figure 38A:
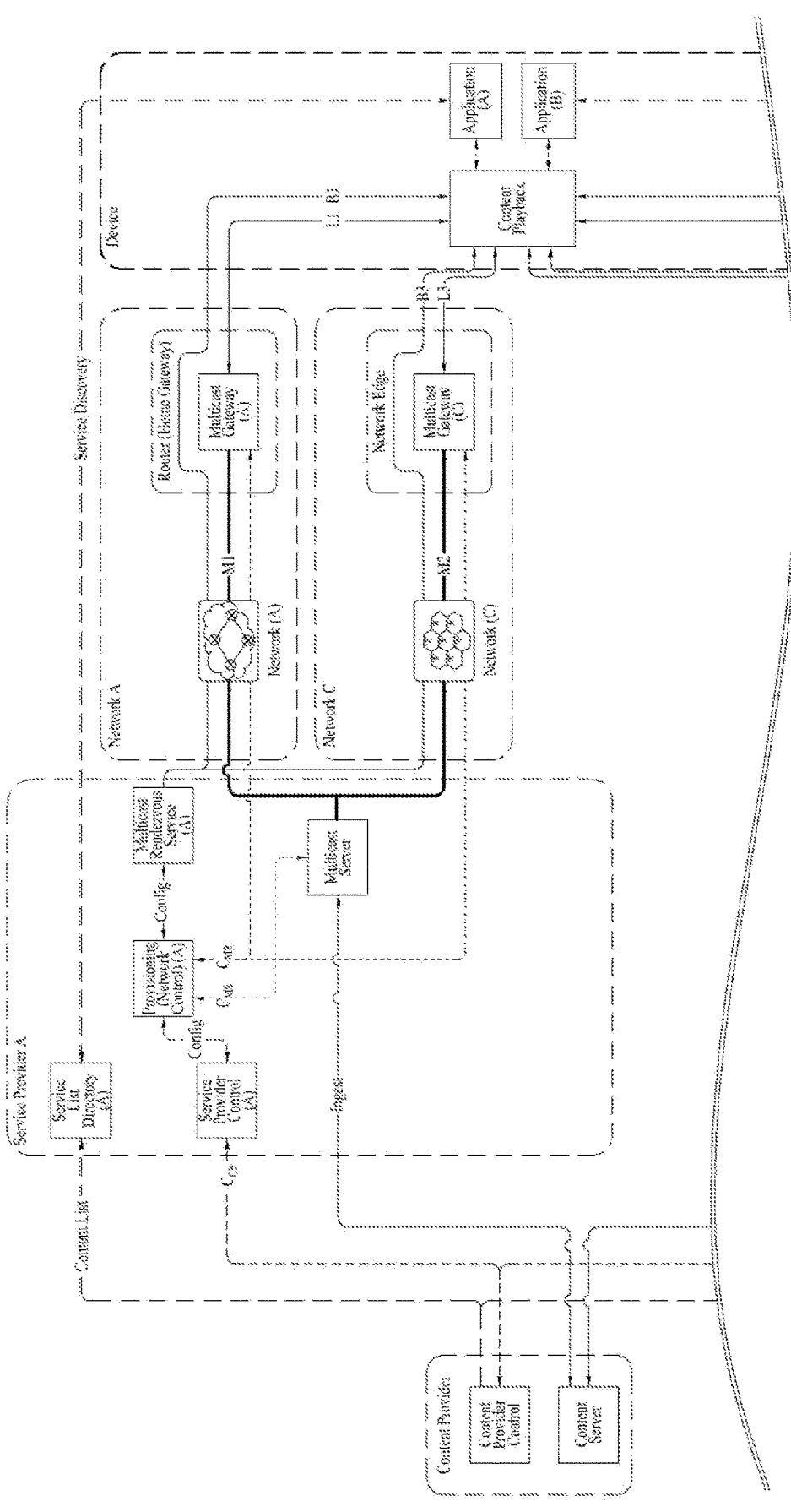
FIG. 38 illustrates multiple service providers according to embodiments.
Figure 38B:
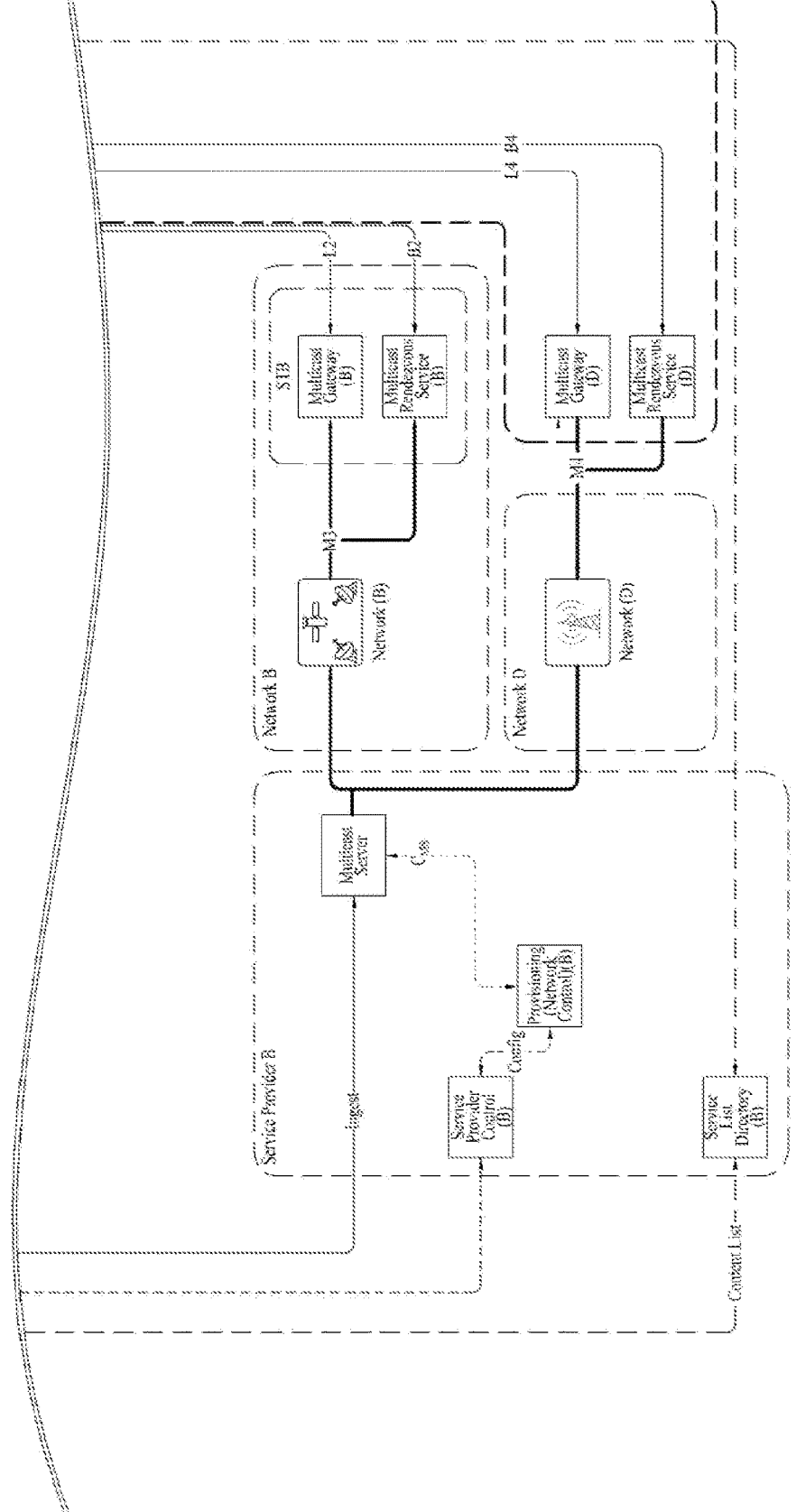

FIG. 38 illustrates multiple service providers according to embodiments.

The architecture according to the embodiments shows a structure in which a content provider is serviced through multiple service providers. In the architecture according to the embodiments, a multicast server, a multicast gateway, and a multicast rendezvous service for each network provide a service to the content playback function connected to the respective networks.

In this case, each service provider may provide a service to the receiver device using multiple networks. Each service provider may configure a service list directory, and may acquire a content list to be serviced through the content provider control function of the content provider. The received content list may configure the service list in a form suitable for the service. The service list is provided to the application.

The application acquires a list of multicast services and access information about the corresponding multicast rendezvous service via the service discovery interface. The service discovery interface may conform to a method defined separately between the service provider and the application. In addition, each network may support transmission and reception of data for the service discovery interface.

Content provider server provides content to multicast server configured in the service provider (ingest). In this case, information on the ingested content may be transmitted from the content provider control function to the service provider control function. Based on this information, the service provider control function may configure multicast session configuration information and deliver the same to the multicast server and the multicast gateway.

Interfaces L and B may be configured for each network in the content playback function in the device. Media streaming may be received through multicast gateway (A), multicast gateway (B), multicast gateway (C), and multicast gateway (D) via the interfaces L1, L2, L3, and L4, and receive initial access information for the multicast gateway via the interfaces B1, B2, B3, and B4. Since the multicast gateway (D) and the multicast rendezvous service (D) are configured in the device, the interfaces L4 and B4 may be replaced with internal interfaces of the device.

Figure 39A:
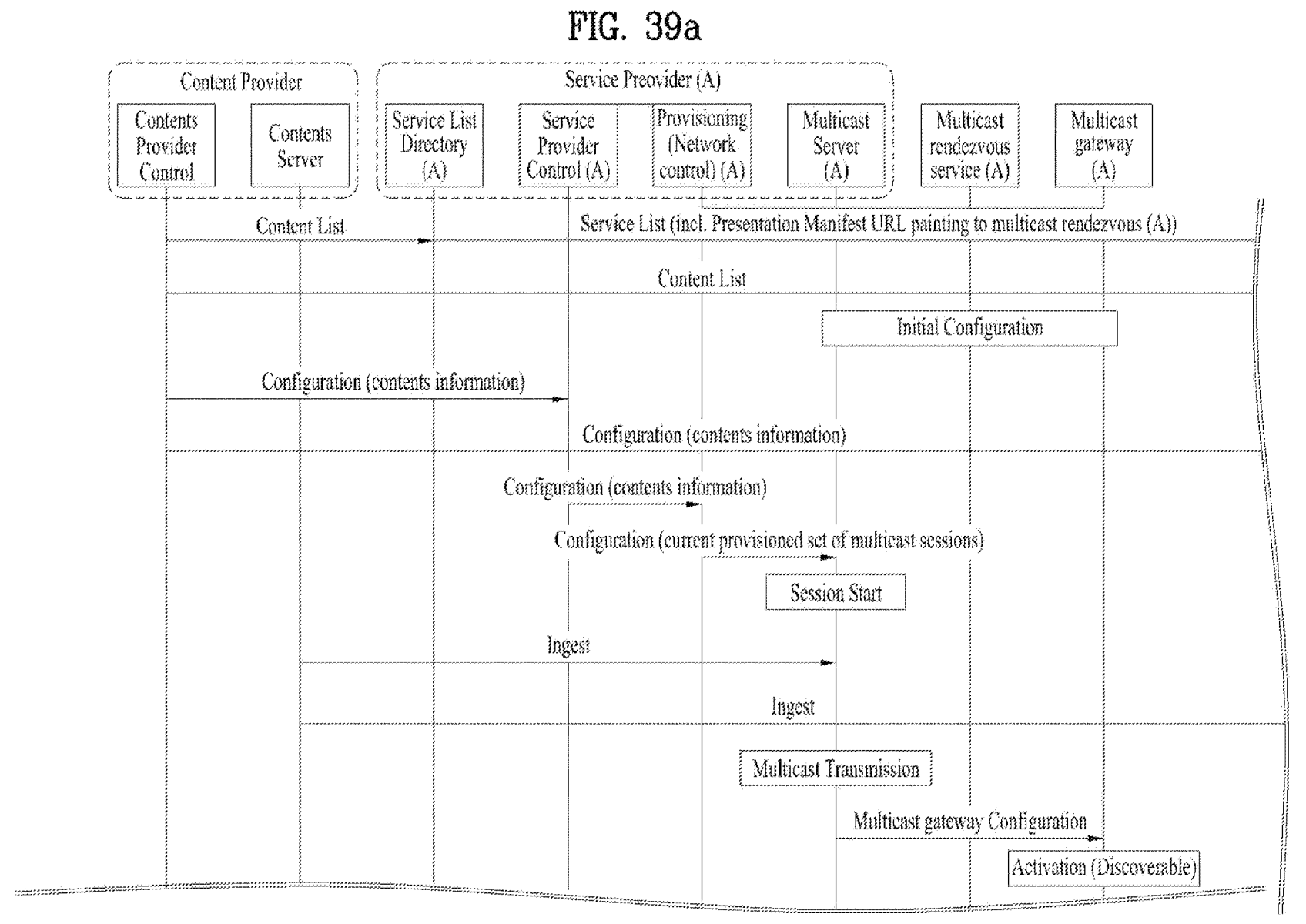
Figure 39B:
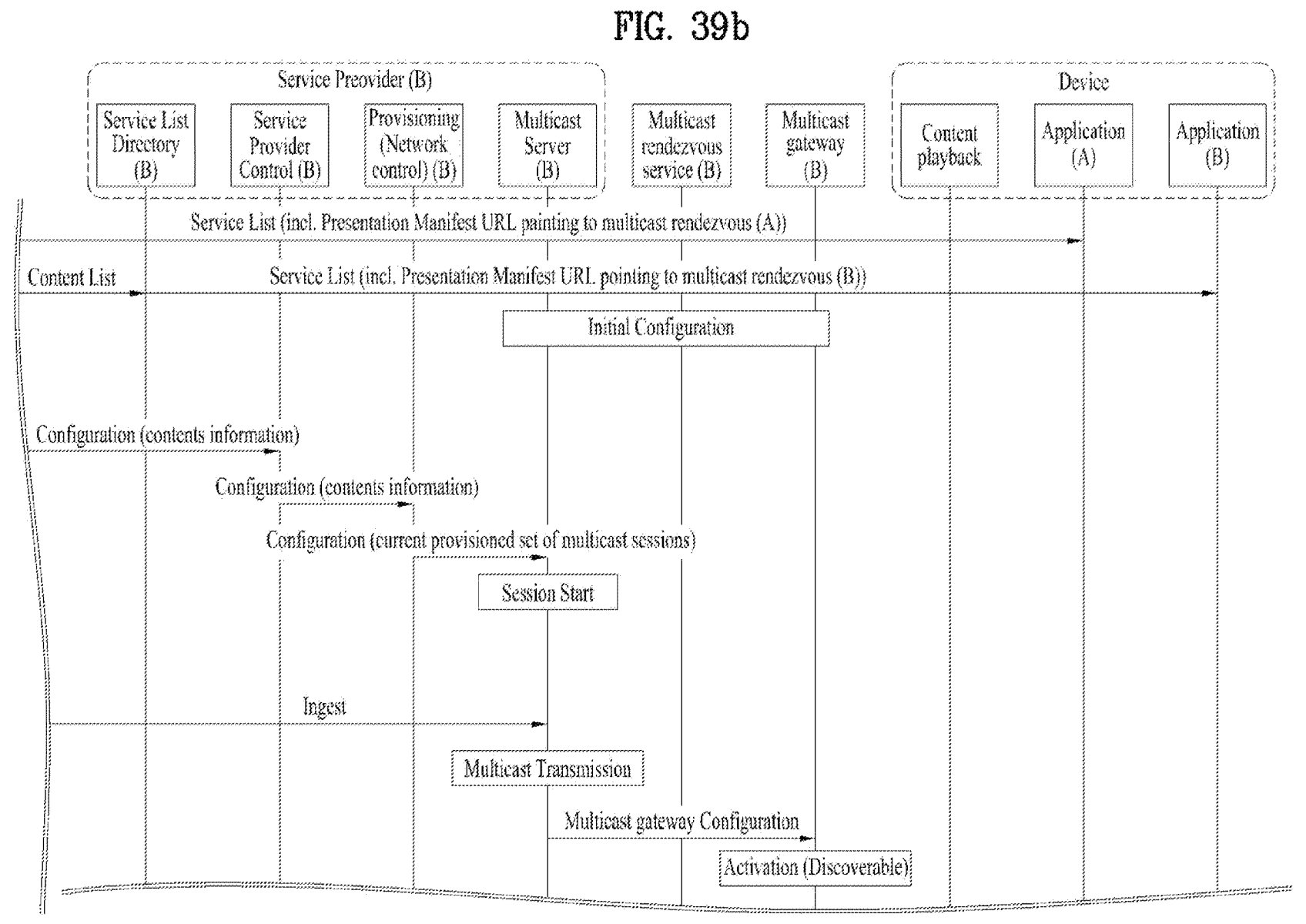
Figure 39E:
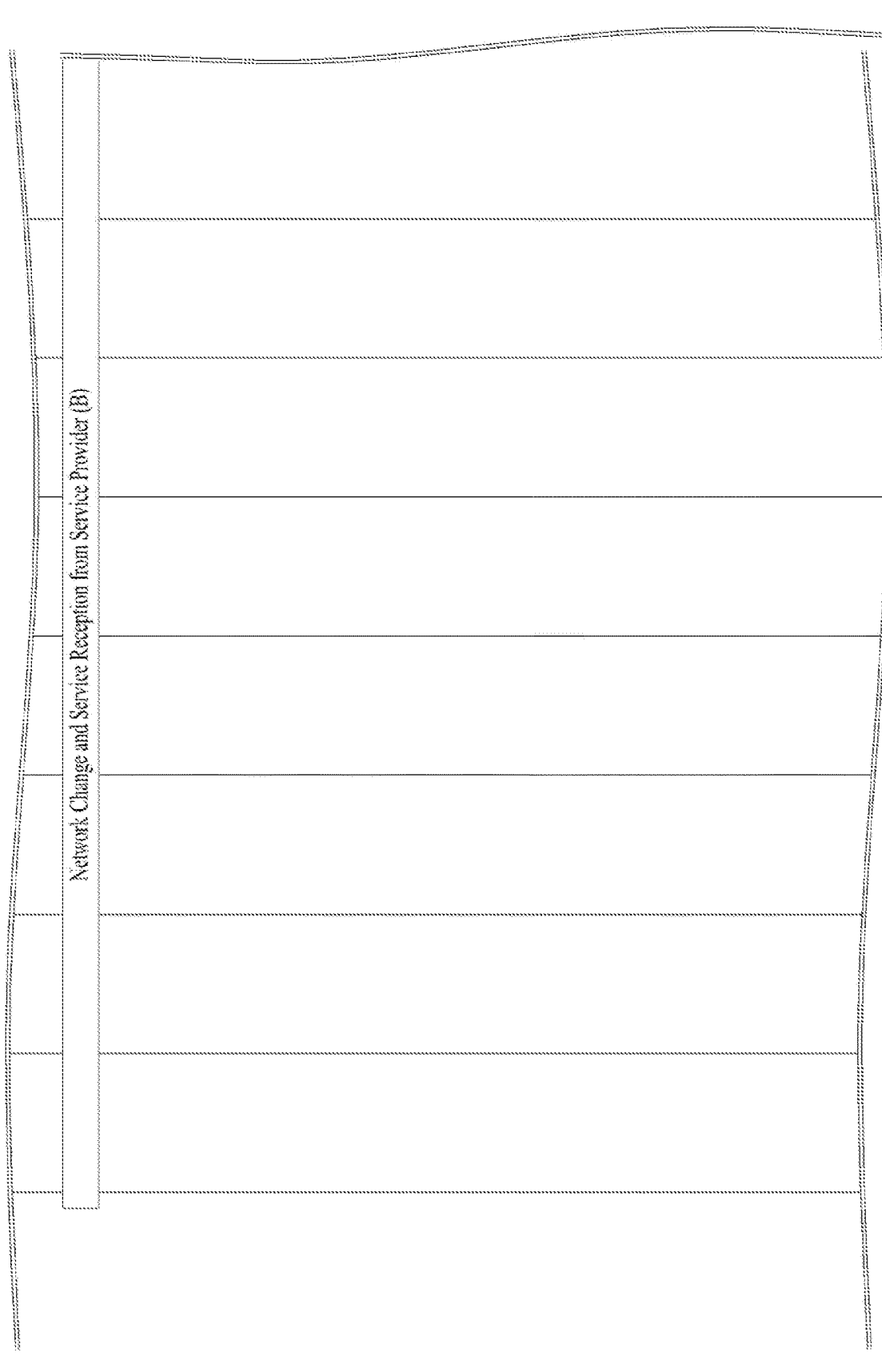
FIG. 39 is a flow diagram of service provider change according to embodiments.

FIG. 39 is a flow diagram of service provider change according to embodiments.

The figure shows the flow of the procedure of receiving the same content even after the service provider is changed, following the procedure of acquiring the manifest and receiving multicast media by the device for the architecture according to the embodiments.

The flow related to the content provider may carried out as follows.

The content provider control function passes the content list to the service provider control functions of the service provider A and the service provider B.

The service provider control function content list is reorganized into a service list, and the service list is transmitted to each associated application.

The flow related to the multicast server is carried out as follows (The operation is performed independently for each service provider).

Each function is deployed according to the architecture, and the configuration for multicast services is applied to the multicast servers, the multicast gateways, and the multicast rendezvous services.

The provisioning function delivers configuration information about a currently provisioned multicast session to the multicast server over network control.

When the multicast session starts, the media segment is ingested from the content provider to the multicast server, multicast transmission starts. Also, any multicast gateway capable of receiving the media segment is activated for the reception.

Upon receiving a service through the service provider A, the device may operate as follows.

Application (A) may receive a service list from service list directory (A) over network A. To receive the service list, a service list acquisition method defined in network A may be used. For example, when a service directory is configured in the DVB-I network, the service list may be received through interaction between the service provider, the service directory, and the application. For ABR multicast operation, the service list may include a url for requesting the presentation manifest mapped to the service ID.

When the user selects multicast contents to receive through Application (A), the application may acquire the URL for requesting the initial presentation manifest through the service directory, or the like. In this case, the URL indicates multicast gateway (A) or the multicast rendezvous service (A).

Application (A) may control the content playback function to start an operation for content reception. In this case, it may deliver a URL for the multicast gateway (A) or the multicast rendezvous service (A).

The content playback function makes a request for the presentation manifest to the multicast rendezvous service (A) via the reference point B1 using the URL delivered from the application (A).

The multicast rendezvous service (A) checks the status of the multicast gateway (A) configured in the same network. When a service for the requested presentation manifest is defined in the multicast configuration, the multicast rendezvous service (A) transmits a redirection URL for the multicast gateway (A) to the content playback function. In this case, an updated multicast session configuration may be included in the transmitted redirection message.

Upon receiving the redirection message, the content playback function makes a request for a presentation manifest to the multicast gateway (A) via the reference point L1 according to the redirection.

When the multicast gateway (A) has a pre-cached presentation manifest, it transmits the presentation manifest to the content playback function.

The content playback function requests a media segment for the contents based on the received presentation manifest.

Multicast streaming is transmitted from the multicast server (A) to the multicast gateway (A) via the interface M1.

The content playback function may receive the requested media segment via the multicast gateway (A) and the media is played. When there is no separate control, the media continues to be played.

In this state, when the device changes the access from service provider A to service provider B and changes the network to the network (B), it may operate as follows.

The Application (B) may receive a service list from the service list directory (B) over network B. To receive the service list, a service list acquisition method defined in network B may be used. For example, when a service directory is configured in the DVB-I network, the service list may be received through interaction between the service provider, the service directory, and the application. For ABR multicast operation, the service list may include a url for requesting the presentation manifest mapped to the service ID.

For the service being received, the Application (B) may acquire a URL for requesting the presentation manifest. In this case, the URL indicates the multicast gateway (B) and the rendezvous service (B).

When the user selects multicast contents to receive, the application may acquire the URL for requesting the initial presentation manifest through the service directory, or the like. In this case, the URL indicates the multicast gateway (B) or the multicast rendezvous service (B).

The application may control the content playback function to start an operation for content reception. In this case, it may deliver the URL for the multicast gateway (B) or the multicast rendezvous service (B).

When the multicast gateway and the multicast rendezvous service are configured in the same device (co-located deployment), the following procedure may be optionally performed.

The content playback function makes a request for the presentation manifest to the multicast rendezvous service (B) via the reference point B2 using the URL delivered from the application (B).

The multicast rendezvous service (B) checks the status of the multicast gateway (B) configured in the same network. When a service for the requested presentation manifest is defined in the multicast configuration, the multicast rendezvous service (B) transmits a redirection URL for the multicast gateway (B) to the content playback function. In this case, an updated multicast session configuration may be included in the transmitted redirection message.

The content playback function receiving the redirection message follows the redirection.

Using the acquired URL, a request for a presentation manifest is made to the multicast gateway (B) via the reference point L2.

When the multicast gateway (B) has a pre-cached presentation manifest, it transmits the presentation manifest to the content playback function.

The content playback function requests a media segment for the contents over the network (B) based on the received presentation manifest.

Multicast streaming is transmitted from the multicast server to the multicast gateway (B) via the interface M.

The content playback function may receive the requested media segment via the multicast gateway (B) and the media is played. When there is no separate control, the media continues to be played.

Figure 40:
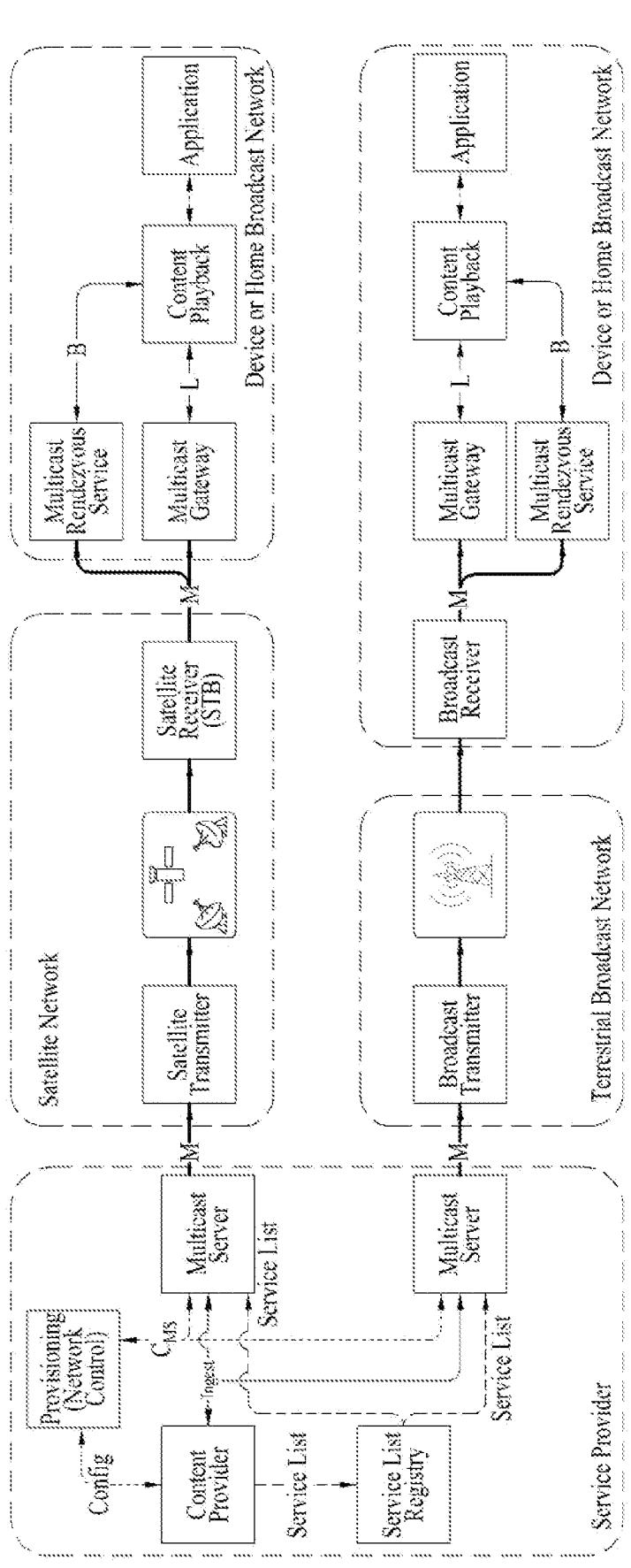
FIG. 40 illustrates an MABR network configuration for unidirectional delivery according to embodiments.

FIG. 40 illustrates an MABR network configuration for unidirectional delivery according to embodiments.

The method/apparatus according to the embodiments may support unidirectional delivery over the network of the MABR architecture according to the above-described embodiments. An example of multicast transport session mapping for the unidirectional delivery will be described.

In the architecture according to the embodiments, a multicast ABR service provider configures a multicast server for each network, and transmits multicast contents and configuration information to a multicast gateway and a multicast rendezvous service using a multicast interface (M). Here, the interface M may be configured over a unidirectional network that has no uplink channel. As this unidirectional network, a satellite (broadcast) network or a terrestrial broadcast network may be considered.

The multicast ABR contents and configuration information received by the multicast gateway and multicast rendezvous service may be passed to the content playback function using HTTP, or the like provided by the interface L, and the multicast gateway may operate as a server of the Home Broadcasting (HB) network.

Interfaces L and B may be configured in the content playback function in the device or HB network. Media streaming may be received through the multicast gateway via the interface L, and receive initial access information for the multicast gateway via the interface B. Here, when the multicast gateway and the multicast rendezvous service are configured in the same device, the interfaces L and the B may be replaced with internal interfaces of the device.

After the service list that may provide service access information (URI, etc.) is delivered from the content provider to a service list registry, the service list information managed by the service list registry may be delivered to the multicast service, and the multicast server may deliver the same to the multicast gateway via the interface M.

Figure 41:
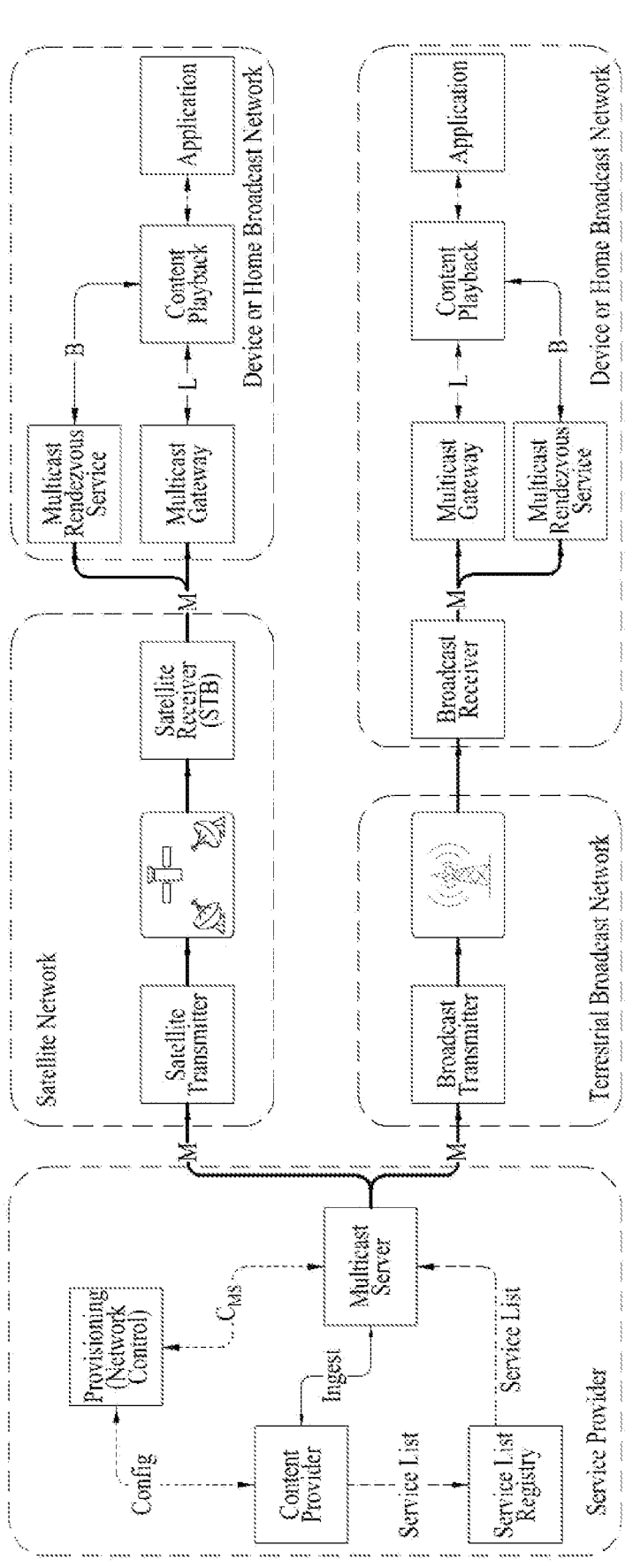
FIG. 41 illustrates an MABR network configuration for unidirectional delivery according to embodiments.

FIG. 41 illustrates an MABR network configuration for unidirectional delivery according to embodiments.

In the architecture according to the embodiments, a multicast ABR service provider configures a single multicast server, and transmits the same multicast contents and configuration information to a multicast gateway and a multicast rendezvous service using the same multicast interface (M). Here, the interface M may be configured over a unidirectional network that has no uplink channel. As this unidirectional network, a satellite (broadcast) network or a terrestrial broadcast network may be considered.

The multicast ABR contents and configuration information received by the multicast gateway and multicast rendezvous service may be passed to the content playback function using HTTP, or the like provided by the interface L, and the multicast gateway may operate as a server of the Home Broadcasting (HB) network.

Interfaces L and B may be configured in the content playback function in the device or HB network. Media streaming may be received through the multicast gateway via the interface L, and receive initial access information for the multicast gateway via the interface B. Here, when the multicast gateway and the multicast rendezvous service are configured in the same device, the interfaces L and the B may be replaced with internal interfaces of the device.

After the service list that may provide service access information (URI, etc.) is delivered from the content provider to a service list registry, the service list information managed by the service list registry may be delivered to the multicast service, and the multicast server may deliver the same to the multicast gateway via the interface M.

Figure 42:
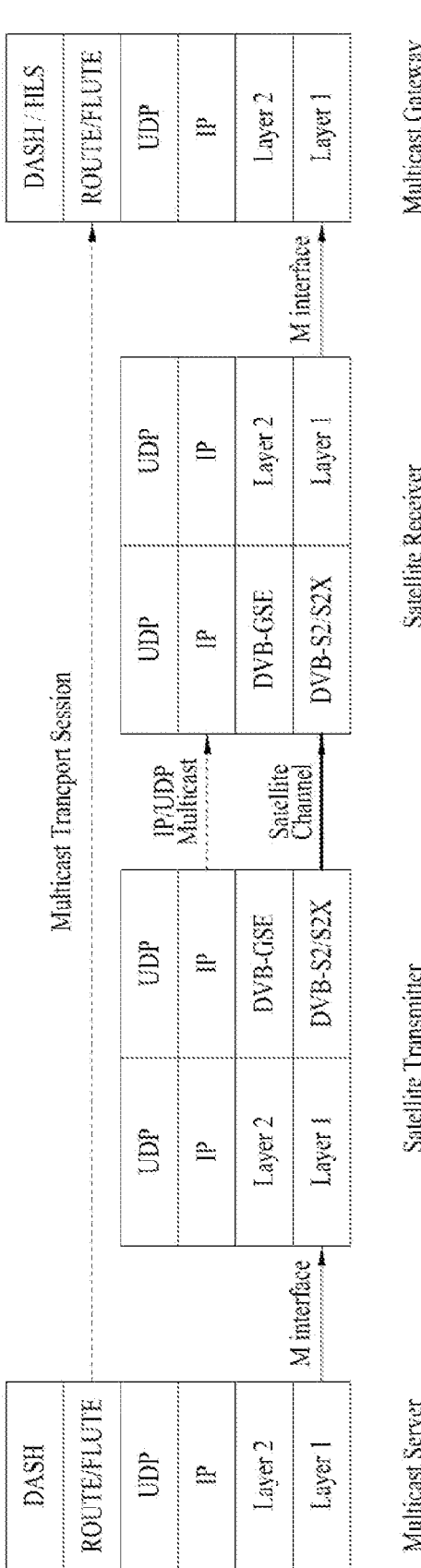
FIG. 42 illustrates an interface configuration according to embodiments.

FIG. 42 illustrates an interface configuration according to embodiments.

The M interface according to the embodiment shown in FIG. 41 and the like is configured as follows.

Based on the M interface including a unidirectional link, the method/apparatus according to the embodiments may perform unidirectional delivery. In this case, the unidirectional link may be configured with a satellite channel, the physical layer may be configured with DVB-S2 or DVB-S2X, and the data link layer may be configured with DVB-GSE.

When the multicast server transmits a multicast transport session to the multicast gateway through the protocol defined in the M interface, the satellite transmitter receives the session and transmits the same to a satellite receiver on the satellite channel. The satellite receiver delivers the session to the multicast gateway according to the protocol defined in the M interface. When the multicast transport session is transmitted on the satellite channel, it may be multiplexed into single signaling. In order to de-multiplex the multicast transport session and pass the same to the multicast gateway, the multicast transport session may be mapped to IP multicast transmitted on the satellite channel. In this case, data link layer signaling may be used to map the multicast transport session.

Figure 43:
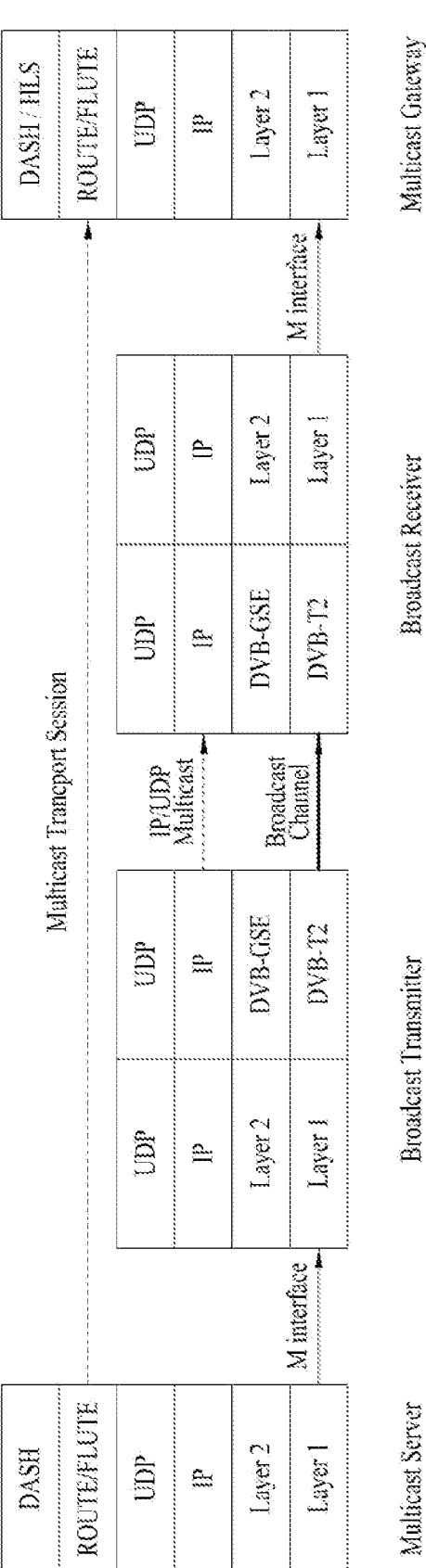
FIG. 43 illustrates an interface configuration according to embodiments.

FIG. 43 illustrates an interface configuration according to embodiments.

Based on the M interface including a unidirectional link, the method/apparatus according to the embodiments may perform unidirectional delivery. In this case, the unidirectional link may be configured with a broadcast channel, the physical layer may be configured with DVB-T2, and the data link layer may be configured with DVB-GSE.

When the multicast server transmits a multicast transport session to the multicast gateway through the protocol defined in the M interface, the broadcast transmitter receives the session and transmits the same to a broadcast receiver on the broadcast channel. The broadcast receiver delivers the session to the multicast gateway according to the protocol defined in the M interface. When the multicast transport session is transmitted on the broadcast channel, it may be multiplexed into single signaling. In order to de-multiplex the multicast transport session and pass the same to the multicast gateway, the multicast transport session may be mapped to IP multicast transmitted on the broadcast channel. In this case, data link layer signaling may be used to map the multicast transport session.

A DVB-DASH based service according to ETSI TS 103 285 may be included in the DVB-I service list according to the embodiments. The DVB-DASH based service of DVB-NIP may be carried using the DVB-MABR defined FLUTE/ROUTE protocol over the DVB broadcast network defined in ETSI TS 103 769.

Signaling and A/V services (using DVB-DASH ETSI TS 103 285) are carried on the broadcast RF channel via IP multicast. DVB-NIP IP multicast sessions are carried using the GSE-Lite profile as defined in clause D.2 of ETSI TS 102 606-1 or multi-protocol encapsulation as defined in ETSI EN 301 192 at the data link layer. DVB-S2X (ETSI 302 307-1, ETSI 302 307-2), DVB-S2 (ETSI 302 307-1) and DVB-T2 (ETSI TS 102 755) at the physical layer may also be used.

FIG. 44 illustrates a link control data (LCD) configuration according to embodiments.

Based on the logical layer control structure for multicast transport session mapping according to the embodiments, the method/apparatus according to the embodiments may perform unidirectional delivery.

GSE-LLC Structure

In the configuration for the interface M according to the embodiments, DVB-GSE LLC (Logical Layer Control) is used as an embodiment of a method of using data link layer signaling to map a multicast transport session.

DVB-GSE LLC consists of Link Control Data (LCD) and Network Control Data (NCD).

The syntax of the LCD may be configured as shown in FIG. 44.

PHY_descriptors( )—A descriptor for the modulation system of the physical layer.

number_of_links—Indicates the number of links or physical streams included in the modulation system of the physical layer.

link_id—An identifier for a physical link included in the modulation system of the physical layer.

link_association_descriptors( ) may be configured as described below.

FIG. 45 illustrates a link related descriptor according to embodiments.

modulation_system_type—Indicates the type of the broadcast modulation system. For example, it may be encoded as follows.

0x00—DVB-S2/S2X

0x01—DVB-T2 modulation_system_id—A unique identifier for the modulation system.

PHY_stream_id—This may be encoded according to modulation_system_type as follows:

modulation_system_type=0x00—Input Stream Identifier (ISI) of DVB-S2/S2X modulation_system_type=0x01—Physical layer pipe of DVB-T2

The NCD may be configured as described below.

FIG. 46 illustrates network control data (NCD) according to embodiments.

In the NCD structure, platform_descriptor( ), target_descriptor( ), and operational_descriptor may be defined for each signaling purpose.

Regarding target_descriptors( ), when the GSE has only IP address information, it may process multicast according to embodiments. Accordingly, target descriptors( ) according to the embodiments may address an issue by including information for multicast identification.

In the NCD structure, platform_descriptor( ), target_descriptor( ), and operational_descriptor may be defined for each signaling purpose.

Figure 47:
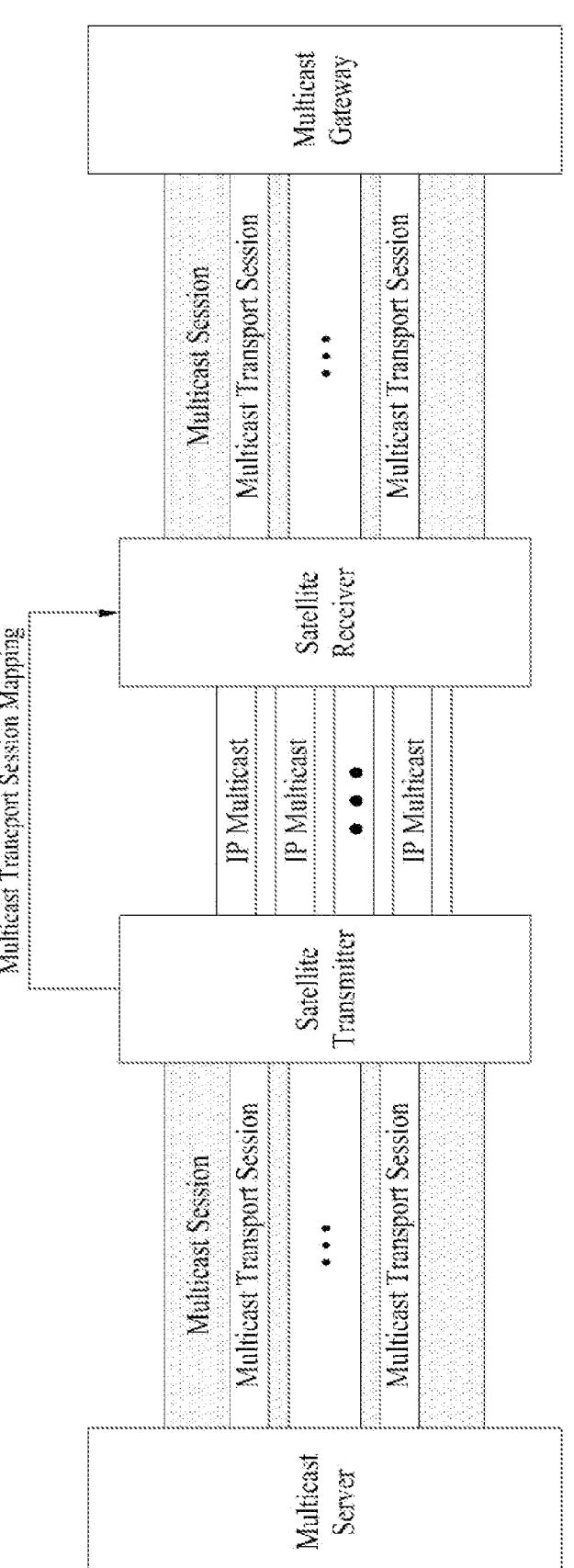
FIG. 47 illustrates a multicast transport session according to embodiments.

FIG. 47 illustrates a multicast transport session according to embodiments.

The method/apparatus according to the embodiments may perform transport session mapping based on a multicast transport session.

A multicast transport session transmitted from the multicast server may be defined as shown in FIG. 47.

The multicast transport session transmitted from the multicast server may be mapped to an IP multicast stream by a unidirectional delivery transmitter (satellite transmitter), and carry IP multicast stream information to a unidirectional delivery receiver (satellite receiver).

FIG. 48 illustrates a mABR IPv6 transport session descriptor according to embodiments.

When the method/apparatus according to the embodiments transmits a multicast transport session through IPv6, a descriptor as shown in FIG. 48 may be included in the target descriptor.

descriptor_tag—Corresponds to the identifier for the descriptor.

descriptor_length—Indicates the length of the descriptor.

multicast_transport_session_id_length—Indicates the length of the following multicast_transport_session_id in bytes.

multicast_transport_session_id—A unique identifier for a multicast transport session. It has the same value as the id included in the multicast ABR session configuration.

source_IPv6_address—Indicates the source IP address for the current multicast transport session transmitted over IPv6.

destination_IPv6_address—Indicates the group (destination) IP address for the current multicast transport session transmitted over IPv6.

source_UDP_port—Indicates the source UDP port for the current multicast transport session.

destination_UDP_port—Indicates the destination UDP port for the current multicast transport session.

By additionally defining source_UDP_port and destination_UDP_port in the GSE-related descriptor, the method/apparatus according to the embodiments may support multicast.

The transport session descriptor may be referred to as a multicast list descriptor and may further include the following information.

num_multicasts: This is a 16-bit field and indicates the number of multicasts.

multicast_stream_id: This is a 16-bit field and uniquely identifies an IP/UDP multicast stream within the physical link identified by link_id.

source_ip_address: This is a 32-bit field and indicates the source IPv4 address of the multicast carried on the physical link identified by link_id.

destination_ip_address: This is a 32-bit field and indicates the destination IPv4 address of the multicast carried on the physical link identified by link_id.

source_port: This is a 16-bit field and indicates the source UDP port number of the multicast carried on the physical link identified by link_id.

destination_port: This is a 16-bit field and indicates the destination UDP port number of the multicast carried on the physical link identified by link_id.

header_compression_flag: This is a 1-bit boolean field and indicates whether header compression is applied to the multicast stream identified by multicast_stream_id. 0 (zero) indicates that the multicast stream is delivered from the DVB-GSE layer without header compression. 1 (one) indicates that header compression is applied to the multicast stream of the DVB-GSE layer. When compressed flag is equal to 1, the ROHC-U descriptor or ROHC-U_multicast_descriptor is signaled.

reserved_for_future_use: This is a 7-bit field reserved for future use, and all bits thereof shall be set to 0.

FIG. 49 illustrates a mABR IPv4 transport session descriptor according to embodiments.

The method/apparatus according to the embodiments may include a descriptor as shown in FIG. 49 in a target descriptor when a multicast transport session is transmitted over IPv4.

descriptor_tag—Corresponds to the identifier for the descriptor.

descriptor_length—Indicates the length of the descriptor.

multicast_transport_session_id_length—Indicates the length of the following multicast_transport_session_id in bytes.

multicast_transport_session_id—A unique identifier for a multicast transport session. It has the same value as the id included in the multicast ABR session configuration.

source_IPv6_address—Indicates the source IP address for the current multicast transport session transmitted over IPv4.

destination_IPv6_address—Indicates the group (destination) IP address for the current multicast transport session transmitted over IPv4.

source_UDP_port—Indicates the source UDP port for the current multicast transport session.

destination_UDP_port—Indicates the destination UDP port for the current multicast transport session.

When multiple multicast transport sessions are mapped to a single link, multiple mABR_IPv6_transport_session_descriptor ( ) or mABR_IPv4_transport_session_descriptor ( ) may be included in the NCD loop.

The transport session descriptor may be referred to as a multicast list descriptor and may further include the following information.

num_multicasts: This is a 16-bit field and indicates the number of next multicasts.

multicast_stream_id: This is a 16-bit field and uniquely identifies an IP/UDP multicast stream within the physical link identified by link_id.

source_ip_address: This is a 128-bit field and indicates the source IPv6 address of the multicast carried on the physical link identified by link_id.

destination_ip_address: This is a 128-bit field and indicates the destination IPv6 address of the multicast carried on the physical link identified by link_id.

source_port: This is a 16-bit field and indicates the source UDP port number of the multicast carried on the physical link identified by link_id.

destination_port: This is a 16-bit field and indicates the destination UDP port number of the multicast carried on the physical link identified by link_id.

header_compression_flag: This is a 1-bit boolean field and indicates whether header compression is applied to the multicast stream identified by multicast_stream_id. 0 (zero) indicates that the multicast stream is delivered from the DVB-GSE layer without header compression. 1 (one) indicates that header compression is applied to the multicast stream of the DVB-GSE layer. When compressed flag is equal to 1, the ROHC-U descriptor or ROHC-U_multicast_descriptor is signaled.

reserved_for_future_use: This is a 7-bit field reserved for future use, and all bits thereof shall be set to 0.

The multicast list descriptor of FIGS. 48 and 49 conveys a list of multicasts carried in a physical link. This descriptor conveys a list of IPv4 multicasts carried in the physical link, and provides information for processing the UDP/IPv4 packets carrying the multicasts in the DVB-GSE layer. In addition, this descriptor conveys a list of IPv6 multicasts carried in the physical link and provides information for processing the UDP/IPv6 packets carrying the multicasts in the DVB-GSE layer.

Figure 50:
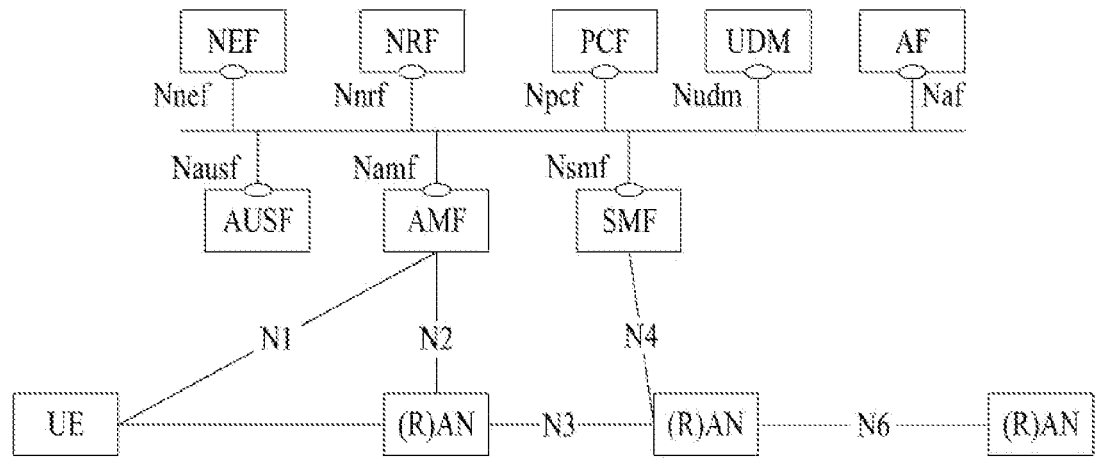
FIG. 50 illustrates a 5G system service based structure according to embodiments.

FIG. 50 illustrates a 5G system service based structure according to embodiments.

The method/apparatus according to the embodiments may be associated with the 5G system architecture as follows.

The 5G system may be composed of the following network functions (NF).

Abbreviations according to embodiments are as follows: Authentication Server Function (AUSF), Core Access and Mobility Management Function (AMF), Data network (DN), e.g. operator services, Internet access or 3rd party services, Structured Data Storage network function (SDSF), Unstructured Data Storage network function (UDSF), Network Exposure Function (NEF), NF Repository Function (NRF), Policy Control function (PCF), Session Management Function (SMF), Unified Data Management (UDM), User plane Function (UPF), Application Function (AF), User Equipment (UE), (Radio) Access Network ((R)AN).

The architecture for the non-roaming case of the 5G system is shown as a service-based interface. User plane data is transmitted through the DN, UPF, (R)AN, and UE, and the other functions may process control plane data.

Here, service-based interfaces are defined as follows: Namf: Service-based interface exhibited by AMF. Nsmf: Service-based interface exhibited by SMF. Nnef: Service-based interface exhibited by NEF. Npcf: Service-based interface exhibited by PCF. Nudm: Service-based interface exhibited by UDM. Naf: Service-based interface exhibited by AF. Nnrf: Service-based interface exhibited by NRF. Nausf: Service-based interface exhibited by AUSF.

Figure 51:
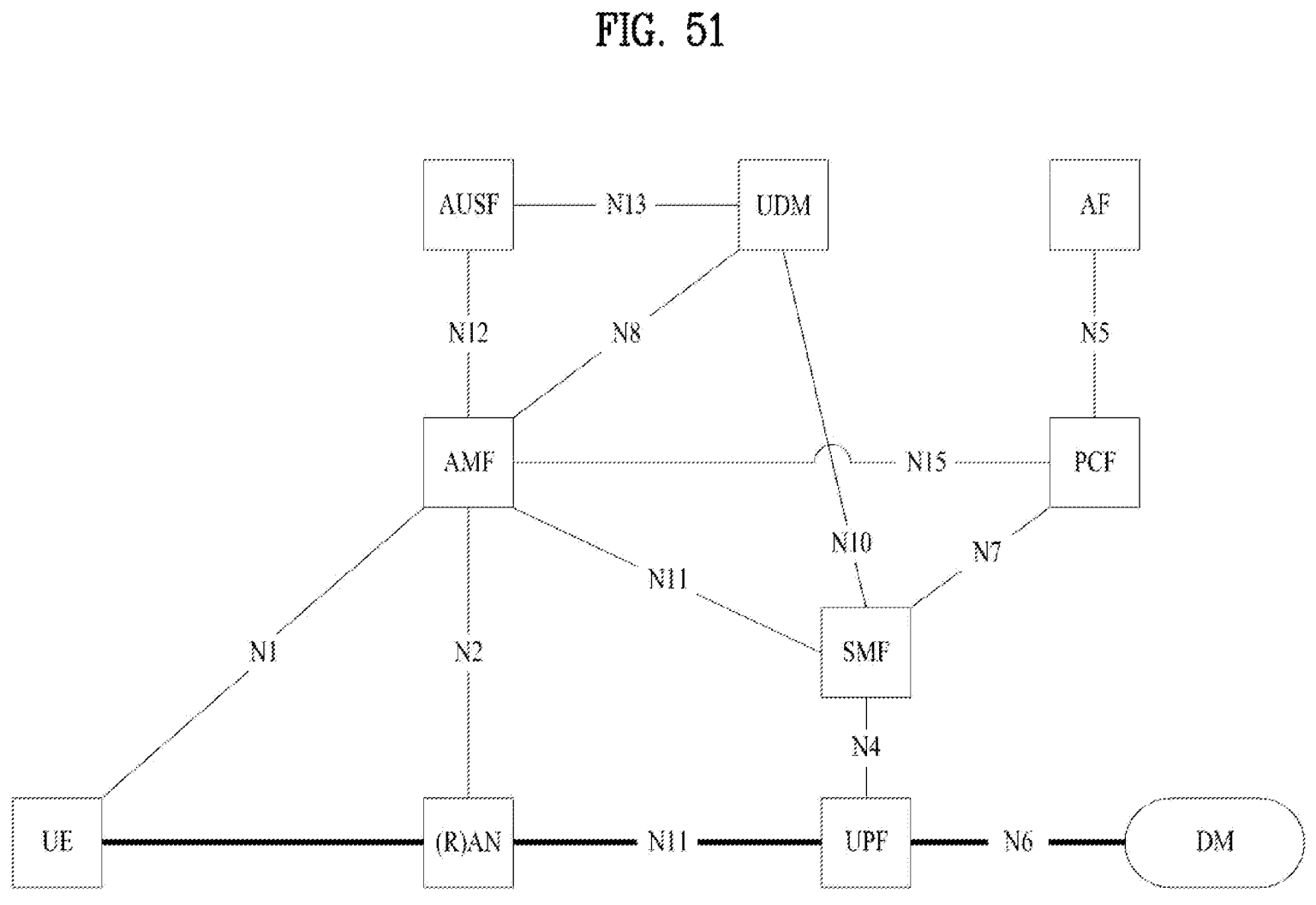

FIG. 51 illustrates a 5G system structure in a reference point representation according to embodiments.

FIG. 51 shows a 5G system architecture for a non-roaming case using a reference point indicating how multiple network functions interact.

User plane data is transmitted through the DN, UPF, (R)AN, and UE, and the other functions may process control plane data. Accordingly, data may be transmitted through N6 and N3, which are reference points between the corresponding functions, and the (R)AN and the UE may be connected wirelessly.

Here, the reference points may be defined as follows: N1: Reference point between the UE and the AMF. N2: Reference point between the (R)AN and the AMF. N3: Reference point between the (R)AN and the UPF. N4: Reference point between the SMF and the UPF. N5: Reference point between the PCF and an AF. N6: Reference point between the UPF and a Data Network. N7: Reference point between the SMF and the PCF. N7r: Reference point between the PCF in the visited network and the PCF in the home network. N8: Reference point between the UDM and the AMF. N9: Reference point between two Core UPFs. N10: Reference point between the UDM and the SMF. N11: Reference point between the AMF and the SMF. N12: Reference point between AMF and AUSF. N13: Reference point between the UDM and Authentication Server function the AUSF. N14: Reference point between two AMFs. N15: Reference point between the PCF and the AMF in case of non-roaming scenario, PCF in the visited network and AMF in case of roaming scenario. N16: Reference point between two SMFs, (in roaming case between SMF in the visited network and the SMF in the home network). N17: Reference point between AMF and EIR. N18: Reference point between any NF and UDSF. N19: Reference point between NEF and SDSF.

The reference points listed above may be defined by a separate protocol or by a message with a separate identifier on a common protocol. To this end, the interface of the control plane may be physically shared with other reference points, and the reference points may be identified using each protocol or message set.

Figure 52:
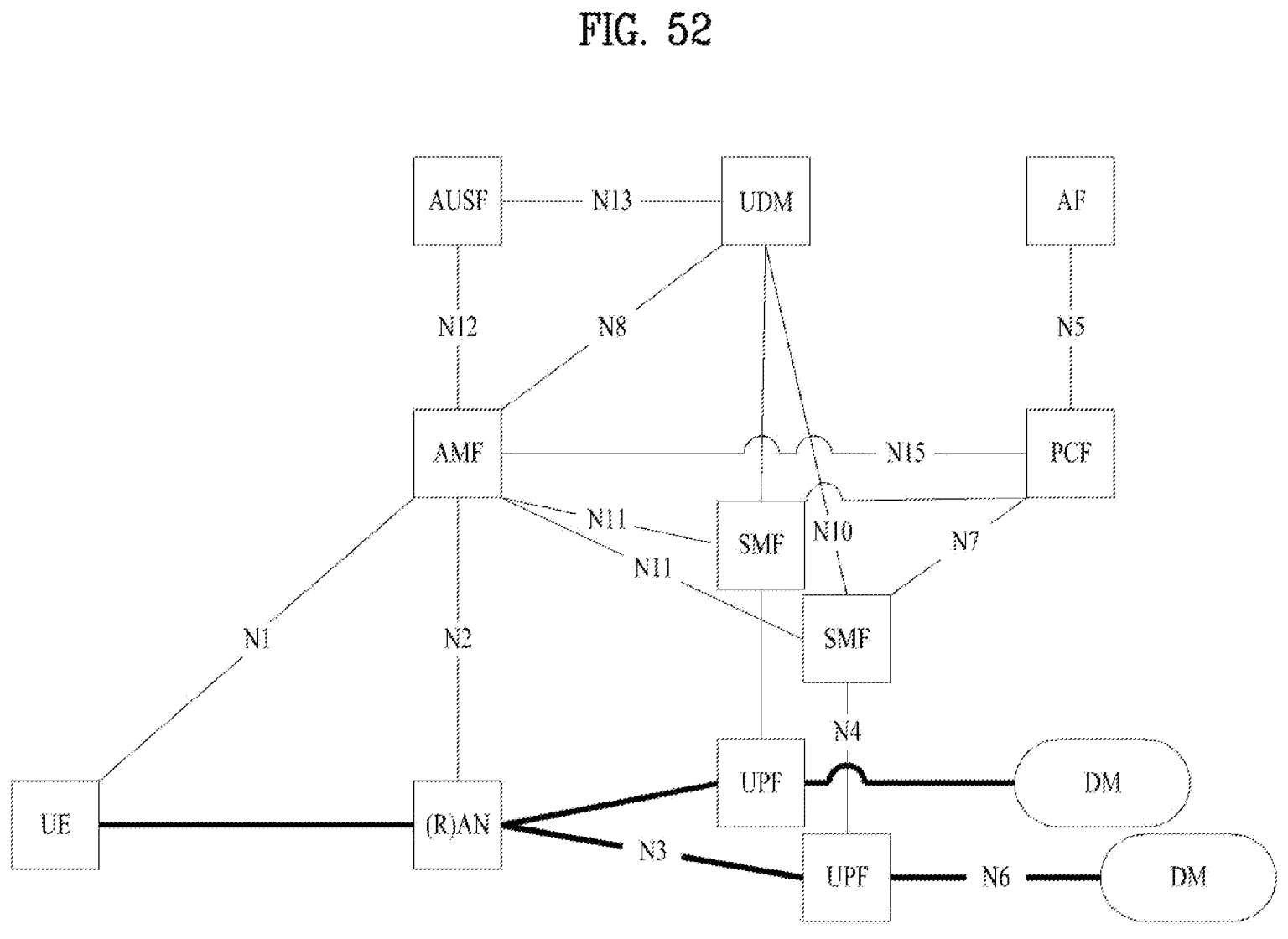

FIG. 52 illustrates a 5G system structure for multiple PDU sessions according to embodiments.

FIG. 51 shows a network structure for supporting two DNs based on the 5G system architecture described above. In order to access one DN, UPF and SMF for the DN may be configured separately. These functions may be connected to a control plane function through a corresponding reference point, respectively. Therefore, each DN may provide a separate PDU session, and the SMF may control the session.

While FIG. 52 illustrates that two or more DNs (Data Networks) are accessed at the same time, two or more DNs may be accessed depending on the network configuration.

Figure 53:
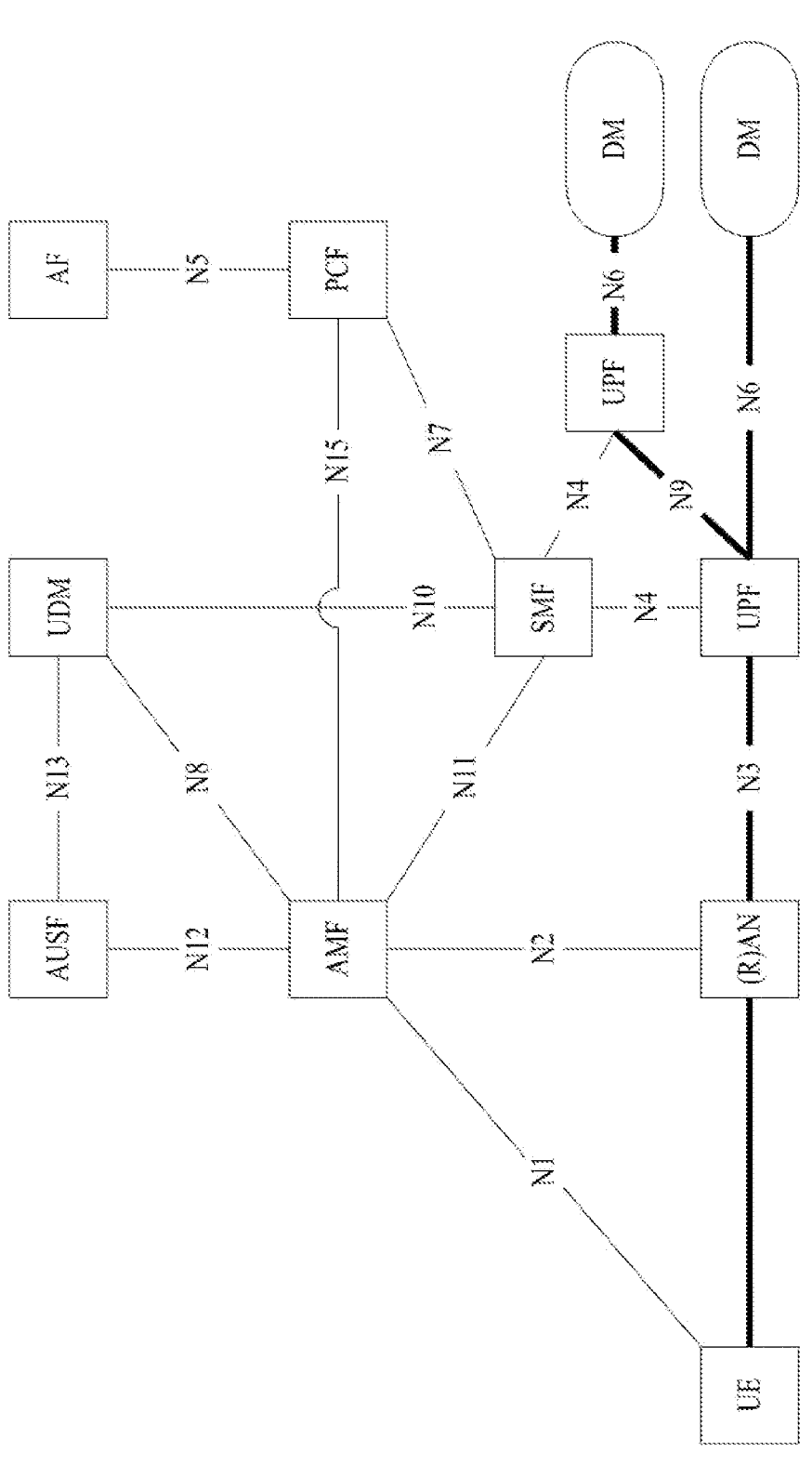
FIG. 53 illustrates a 5G system structure for access coexisting in two data networks according to embodiments.

FIG. 53 illustrates a 5G system structure for access coexisting in two data networks according to embodiments.

FIG. 53 may follow one PDU session option.

FIG. 53 illustrates a network architecture configured in a structure connected to two DNs such that a PDU session provided by each DN may operate as a single session using a single SMF.

Figure 54:
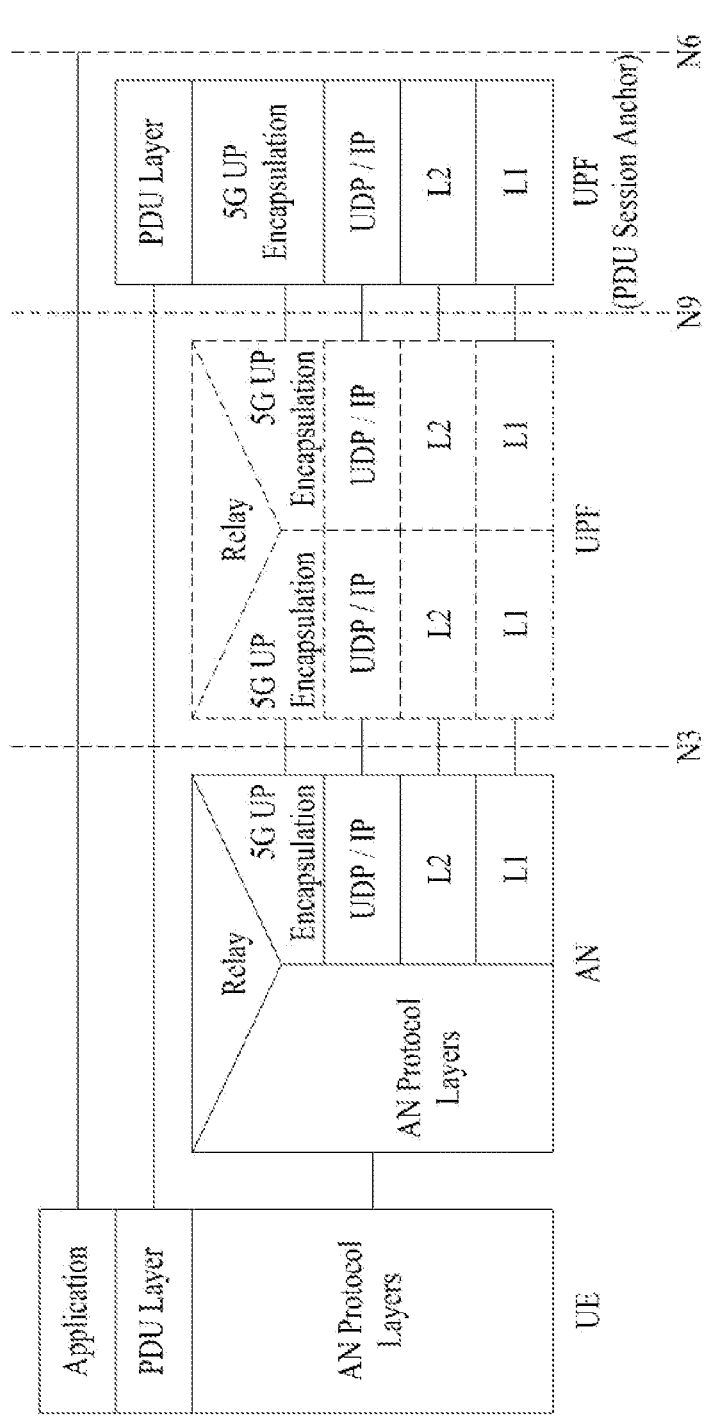
FIG. 54 illustrates a user plane protocol stack according to embodiments.

For such a network structure, a User Plane Protocol stack for one PDU session may be defined as shown in FIG. 54.

FIG. 54 illustrates a user plane protocol stack according to embodiments.

PDU layer: This layer corresponds to a PDU delivered between the UE and the DN through a PDU session. When the PDU session type is IPV6, the layer corresponds to an IPv6 packet. When the PDU session type is Ethernet, the layer corresponds to an Ethernet frame.

5G Encapsulation: This layer supports multiplexed traffic of different PDU sessions (which may correspond to different PDU session types) via N3 (i.e., between AN and 5GC) or N9 (i.e., between different UPFs of 5GC). It provides encapsulation at the PDU session level. This layer also performs markings related to QoS flows.

AN protocol stack: This protocol/layer set is AN specific. When the AN is a 3GPP RAN, the protocol/layer is defined by the 3GPP RAN.

The number of UPFs on the data path is not limited by the 3GPP specification. It may be on the data path of PDU sessions 0, 1, which do not support the PDU session anchor function for this PDU session, or multiple UPFs. In the case of IP, a UPF serving as a PDU session anchor in a type PDU session is an IP anchor point of the IP address/prefix assigned to the UE.

For the 5G architecture described above, each function is defined as follows.

Access and Mobility Management Function (AMF)

The Access and Mobility Management function (AMF) may include the following functions. A single AMF instance may support all or some of the following functions: RAN CP interface termination (N2); NAS (N1) termination; NAS encryption and integrity protection; registration management; connection management; accessibility management; mobility management; legitimate interception (for interface for AMF events and LI system); SM message transmission between the UE and the SMF. It provides transparent proxy for SM message routing, access authentication, access authorization, and SMS message transmission between the UE and the SMSF. Security Anchor Function (SEA). It interacts with the AUSF and the UE and receives an intermediate key established as a result of the UE authentication process. For USIM-based authentication, the AMF retrieves security data from the AUSF. Security Context Management (SCM). The SCM receives a key from the SEA, which is used to derive the access network specific key.

Also, the AMF may include the following functions to support non-3GPP access networks.

Supporting interfaces N3IWF and N2. Some information (e.g., 3GPP cell identification) and procedures (e.g., handover related procedure) defined through 3GPP access via these interfaces may not apply, and non-3GPP access-specific information that does not apply to 3GPP access may be applied.

Supporting NAS signaling with the UE via N3IWF. Some procedures supported by NAS signaling through 3GPP access may not apply to unreliable non-3GPP (e.g. paging) access.

Supporting authentication of UEs connected via N3IWF. Mobility, authentication and separate security context state management of UEs connected through non-3GPP access or connected simultaneously through 3GPP and non-3GPP accesses. It supports coordinated RM management context valid for 3GPP and non 3GPP accesses. It supports dedicated CM management context for UE for connection through non 3GPP access. Session Management Function (SMF).

The Session Management function (SMF) may include the following functions. A single SMF instance may support all or some of the following functions:

Session management, for example, session establishment, modification and release, including tunnel maintenance between the UPF and AN node; UE IP address assignment and management (including optional authorization); Selection and control of the UP function; The UPF configures traffic control to route traffic to an appropriate target; Termination of the interface to the policy control function; Control of some of the policy enforcement and QoS; Legitimate interception (for interface for SM events and LI system); End of the SM portion of the NAS message; Downlink data notification; Initiator of AN specific SM information sent to AN through AMF via N2; Determination of the SSC mode of the session; Roaming function: it handles local enforcement to apply QoS SLA (VPLMN); Charging data ingestion and charging interface (VPLMN); Legitimate interception (in VPLMN for interface for SM events and LI system); Support for interaction with an external DN for signaling for PDU session authorization/authentication by the external DN.

User Planar Function (UPF)

The User UPF may include the following functions. A single UPF instance may support all or some of the following functions:

Anchor point for Intra-/Inter-RAT mobility (if applicable), which is an external PDU session point of interconnection to the data network; Packet routing and forwarding; Packet inspection and user plane parts of policy rule enforcement; Legitimate eavesdropping (UP ingest); Traffic usage reporting; An uplink classifier to support routing traffic flows into a data network; A branch point to support the multi-home PDU session; QoS handling for the user plane (e.g. packet filtering, gating, UL/DL rate enforcement); Uplink traffic verification (SDF to QoS flow mapping); Transmission-level packet indication of uplink and downlink; Downlink packet buffering and downlink data notification trigger.

Policy Function (PCF)

The PCF may include the following functions.

It supports a unified policy framework to control network behavior. It provides a control plane function to apply policy rules. It implements a front-end to access subscription information related to policy decisions of a user data repository (UDR).

Network Exposure Function (NEF)

The NEF may include the following functions.

It provides a means of securely exposing the services and functions provided by the 3GPP network function for third parties, internal exposure/reexposure, application functions, and edge computing as described in Section 5.13.

The NEF receives information from another network function (based on the exposed function of the other network function). It may store received information as structured data using a standardized interface for the data storage network function (an interface to be defined in 3GPP). The stored information may be "re-exposed" by the NEF to other network functions and application functions and used for other purposes such as analysis.

NF Repository Function (NRF)

The NRF may include the following functions.

It supports a service retrieve function. It receives an NF discovery request from the NF instance, and provides information about the NF instance that is discovered (or to be discovered) to the NF instance. It maintains information about available NF instances and supporting services.

Figure 55:
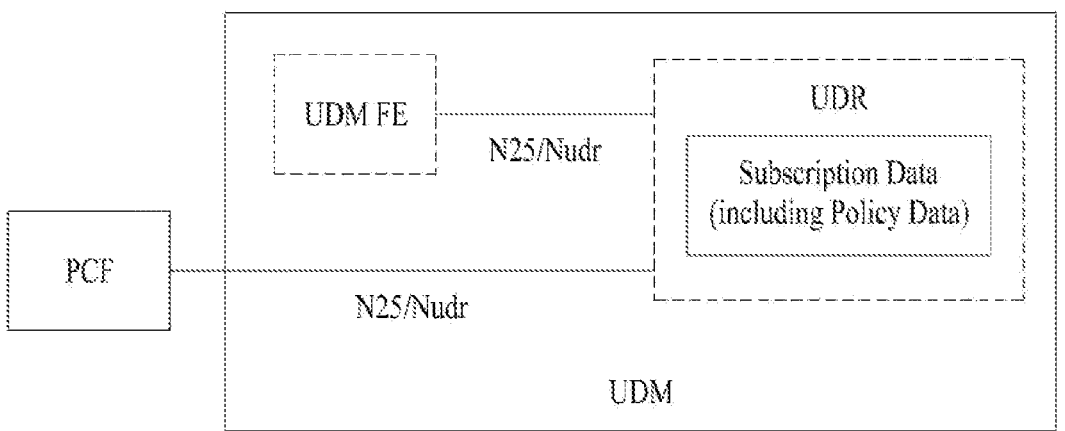
FIG. 55 illustrates Unified Data Management (UDM) according to embodiments.

FIG. 55 illustrates Unified Data Management (UDM) according to embodiments.

UDM may be divided into application front end (FE) and User Data Repository (UDR).

FIG. 55 shows a reference architecture for the UDM, which may include the following FE.

UDM FE: Responsible for credential processing, location management, subscription management, etc.

PCF: Responsible for policy control. The PCF is not part of the UDM as it is a standalone network function in the overall 5GC architecture. However, the PCF may request and provide policy subscription information to the UDR. For this reason, it is exposed in the UDM architecture.

The UDR stores data required for functions provided by the UDM-FE and policy profiles required for the PCF. Data stored in the UDR includes:

subscription identifier; security credentials; user subscription data including access and mobility related subscription data and session related subscription data; and policy data. The UDM-FE accesses the subscription information stored in the UDR and supports the following functions.

It implements processing of authentication credentials, user identification processing, granting access, registration/mobility management, subscription management, SMS management, the FE application logic, and does not require an internal UDR. Multiple different FEs may provide services to the same user in different transactions.

The N25/Nudr reference point/interface is defined for the front-end to read, update (including add, modify), delete, subscribe to data change notifications, and notify data changes of the UDR. N25 is the name of the P2P reference point and Nudr is the name of the service-based interface. Both the FE and the UDR are in HPLMN.

Authentication Server Function (AUSF)

The AUSF supports the following functions. The AUSF is supported.

Application Function (AF)

The AF interacts with the 3GPP core network to provide services. For example, it supports: application impact on traffic routing; access to network function exposure; and interaction with a policy framework for policy control. Based on operator deployment, an AF that is considered trusted by the operator may interact directly with the relevant network functions. An AF that do notes allow operators to directly access network functions should use an external exposure framework through the NEF to interact with the relevant network functions.

Figure 56:
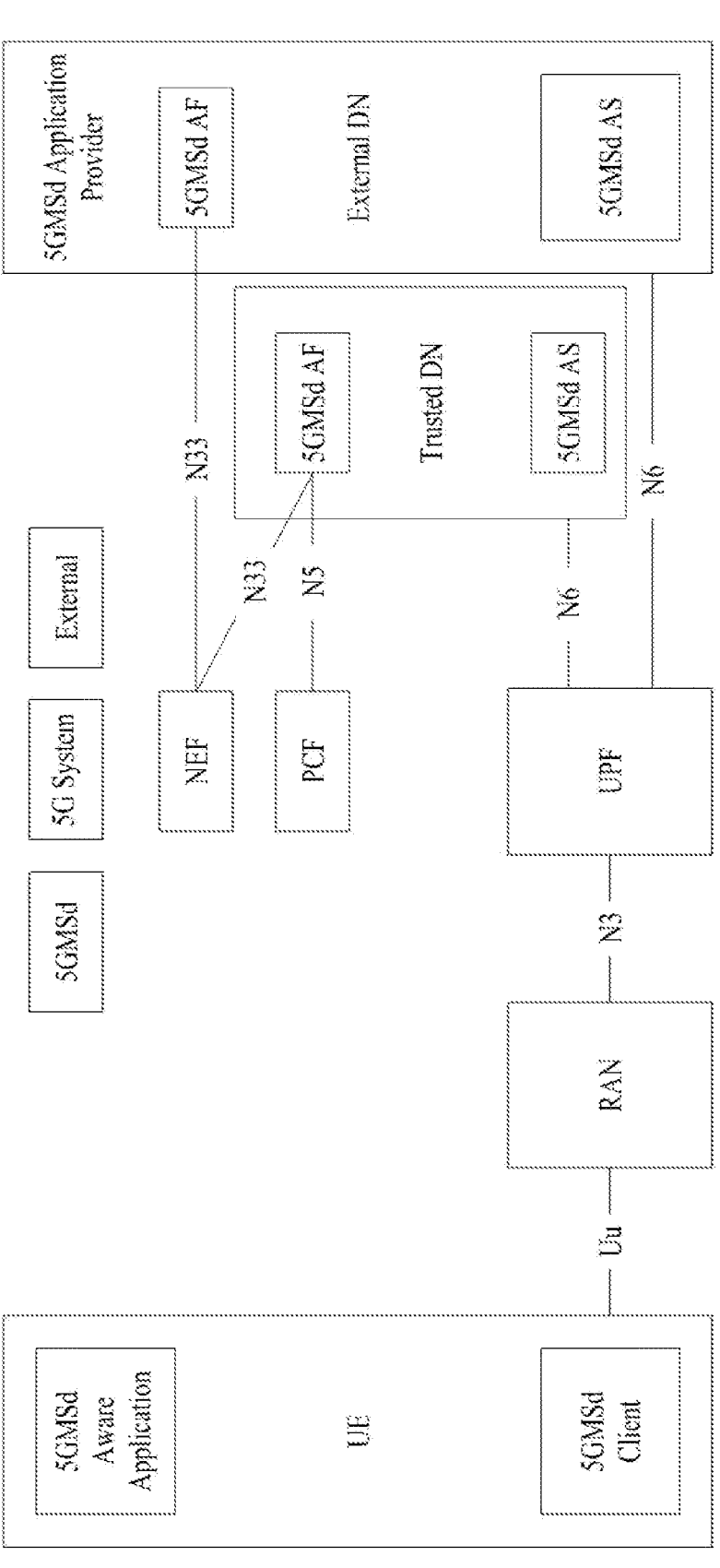
FIG. 56 illustrates an architecture for 5G media streaming according to embodiments.

FIG. 56 illustrates an architecture for 5G media streaming according to embodiments.

5G Downlink Media Streaming within the 5G System

FIG. 56 illustrates an architecture in which a function for downlink media streaming is configured in a 5G network.

In the structure of FIG. 56, for 5G media streaming, a 5GMSd aware application and a 5GMSd client are configured in the UE, and a 5GMSd AF and a 5GMSd AS may be configured in the data network (DN). Here, when the DN is configured in the network operated by the mobile network operator, it may be considered as a trusted DN. When the DN is configured outside the mobile network operator, it may be considered as an external DN (e.g. 3rd party CDN). Other functions and interfaces are additionally described in Annex A.

Figure 57:
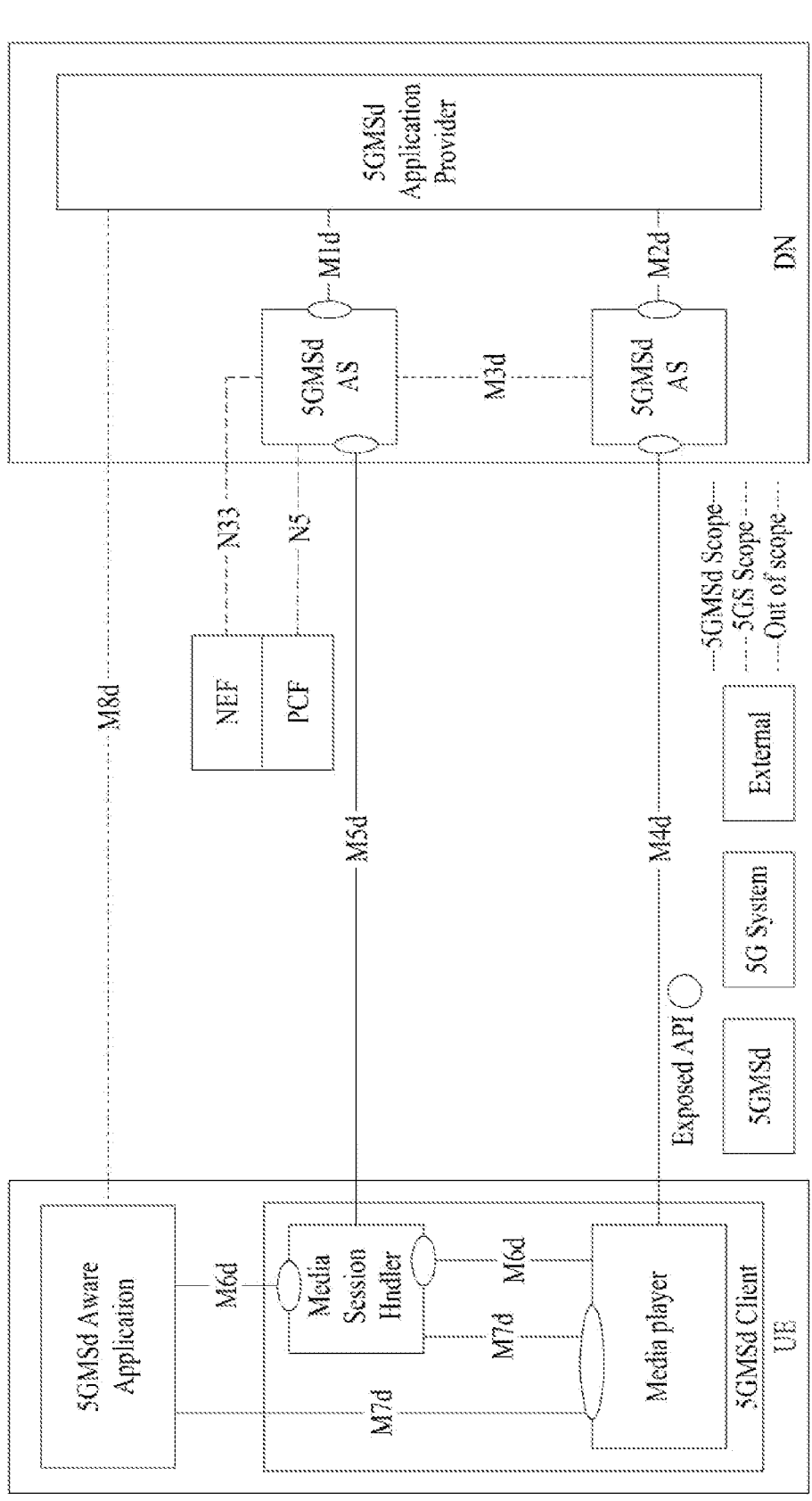
FIG. 57 illustrates a media architecture for unicast downlink media streaming according to embodiments.

FIG. 57 illustrates a media architecture for unicast downlink media streaming according to embodiments.

For the above-mentioned network architecture, a media architecture for unicast downlink media streaming may be defined as follows. Here, each function and interface define a logical interface in terms of media streaming.

The following functions are defined:

5GMSd Client on UE (5G Media Streaming Client for downlink): Receiver of 5GMS downlink media streaming service that may be accessed through well-defined interfaces/APIs. Alternatively, the UE may be implemented in a self-contained manner such that interfaces M6d and M7d are not exposed at all.

The 5GMSd client contains two subfunctions:

Media Session Handler: A function on the UE that communicates with the 5GMSd AF in order to establish, control and support the delivery of a media session. The Media Session Handler may expose APIs that can be used by the 5GMSd-Aware Application.

Media Player: A function on the UE that communicates with the 5GMSd AS in order to stream the media content and may provide APIs to the 5GMSd-Aware Application for media playback and to the Media Session Handler for media session control.

5GMSd Aware Application: The 5GMSd Client is typically controlled by an external media application, e.g. an App, which implements external application or content service provider specific logic and enables a media session to be established. The 5GMSd-Aware Application is not defined within the 5G Media Streaming specifications, but the function makes use of 5GMSd Client and network functions using 5GMSd interfaces and APIs.

5GMSd AS: An application server which hosts 5G media functions. Note that there may be different realizations of the 5GMSd AS (e.g., a Content Delivery Network (CDN)).

5GMSd Application Provider: External application or content-specific media functionality (e.g., media creation, encoding and formatting that uses 5GMSd to stream media to 5GMSd-Aware applications).

5GMSd AF: An application function that provides various control functions to the Media Session Handler on the UE and/or to the 5GMSd Application Provider. It may relay or initiate a request for different Policy or Charging Function (PCF) treatment or interact with other network functions via the NEF.

Interfaces for 5G downlink media streaming may be defined as follows.

M1d (5GMSd Provisioning API): External API, exposed by the 5GMSd AF to provision the usage of the 5G Media Streaming System and to obtain feedback.

M2d (5GMSd Ingest API): Optional external API exposed by the 5GMSd AS used when the 5GMSd AS in the trusted DN is selected to host content for the streaming service.

M3d: (Internal): Internal API used to exchange information for content hosting on a 5GMSd AS within the trusted DN.

M4d (Media Streaming APIs): APIs exposed by a 5GMSd AS to the Media Player to stream media content.

M5d (Media Session Handling API): APIs exposed by a 5GMSd AF to the Media Session Handler for media session handling, control and assistance, which include appropriate security mechanisms, e.g. authorization and authentication.

M6d (UE Media Session Handling APIs): APIs exposed by a Media Session Handler to the Media Player for client-internal communication, and exposed to the 5GMSd-Aware Application enabling it to make use of 5GMS functions.

M7d (UE Media Player APIs): APIs exposed by a Media Player to the 5GMSd-Aware Application and Media Session Handler to make use of the Media Player.

M8d: (Application API): Application interface used for information exchange between the 5GMSd-Aware application and the 5GMSd Application Provider, for example, to provide service access information to the 5GMSd-Aware Application. This API is external to the 5G system and not specified by 5GMS.

Multicast Adaptive Bitrate System Architecture

The method/apparatus according to the embodiments may be linked with a multicast adaptive bitrate system architecture as described below.

Figure 58:
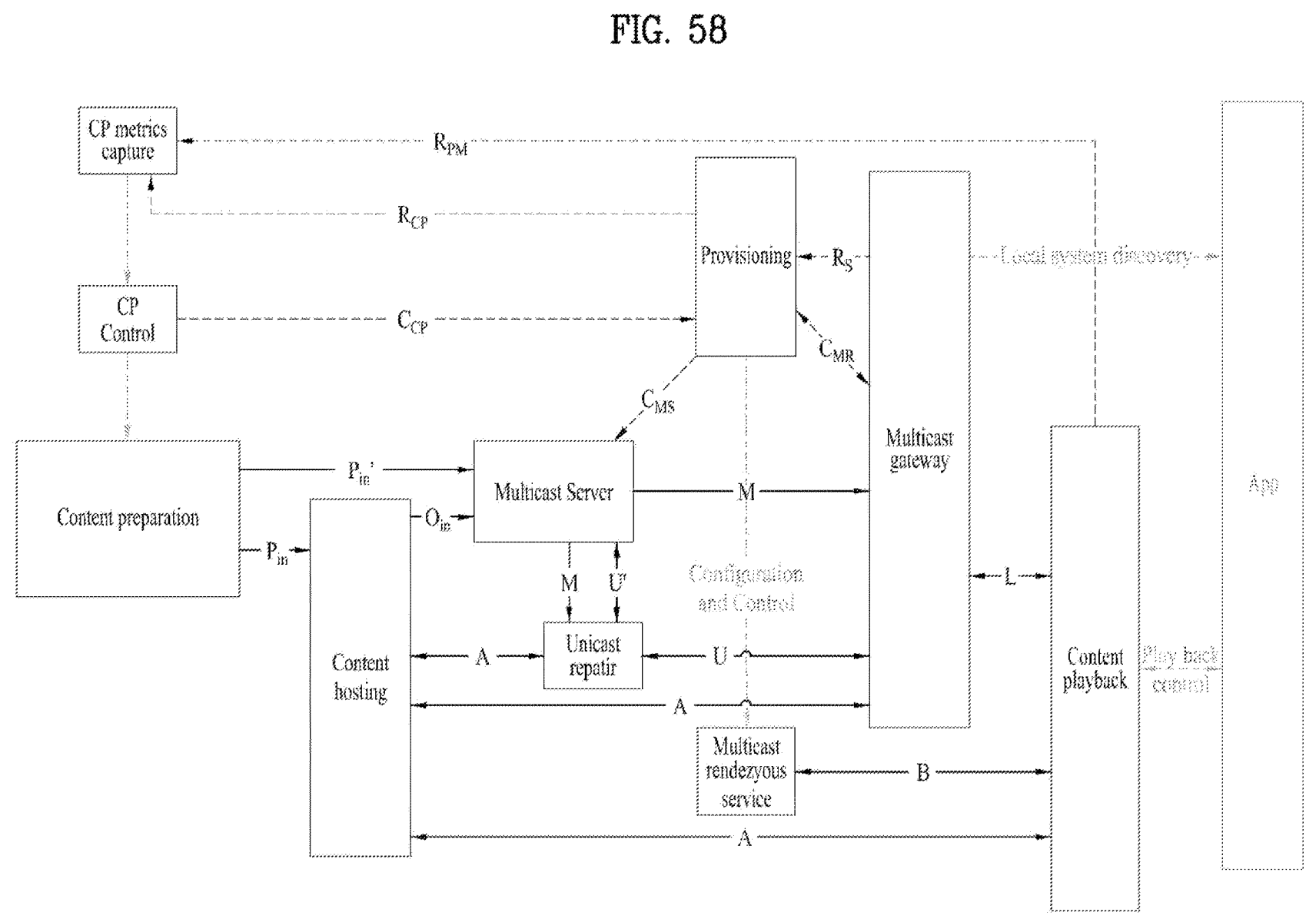

FIG. 58 shows a reference architecture according to embodiments.

Reference Points:

In the reference architecture of FIG. 58, the relationships between the logical functions may be defined by reference points. When such an architecture is actually deployed, they may be realized by a concrete interface, and necessary information may be exchanged between the relevant functions using a particular protocol.

Data Plane Reference Points:

In the above architecture, the following reference points are used to transport content.

L: Performs a unicast HTTP (and HTTPS) interaction between the content playback function and the multicast gateway. This interface includes the fetching of all specified types of content.

When a multicast gateway and a content playback function are co-located on a single end device, such as a set-top box, the interface L may be realized as a local API.

B: Responsible for bootstrap unicast HTTP(S) interaction directly between a content playback function and a multicast rendezvous service function. Used to request a presentation manifest at the start of a linear playback session.

A: HTTP(S) acquisition from a content hosting function of content not provided over reference point M.

Used by the content playback function to retrieve content out of the scope for reference point L.

Used in some deployments by a Unicast repair service function to retrieve content from a Content hosting function in order to effect content repair.

Also used by the Multicast gateway for retrieving content directly from a content hosting function via unicast when U is unable to perform content repair.

M: Responsible for multicast IP content transmission by a Multicast server function and reception by a Multicast gateway function and, in some deployments, reception by a Unicast repair service function.

U: Responsible for unicast interaction between a Unicast repair client in a Multicast gateway and a Unicast repair service. This interface may be used to carry the payloads used for content repair functions in addition to the requests for such payloads.

U': Responsible for the unicast interaction between a Unicast repair service and a Multicast server as an alternative to fetching repair content over A. This interface may be used to carry the payloads used for content repair functions in addition to the requests for such payloads.

Pin: Publication of content to a Content hosting function by a Content packaging subfunction. This may be implemented as a push interface, or content may be pulled on demand from a Content packaging function.

Oin: Ingest of content by a Multicast server function from a Content hosting function. This is typically implemented as a pull interface.

Pin': Ingest of content by a Multicast server directly from the Content packaging function. This is typically implemented as a push interface.

Control Plane Reference Points

In the above architecture, the following reference points are defined for transmission of control signaling and operational reporting information.

CMS: Control interface for configuration of a Multicast server function.

CMR: Control interface for configuration of a Multicast gateway function.

CCP: Control interface for configuration of a Provisioning function.

RS: Service reporting by a Multicast gateway function to a Service reporting capture function.

RCP: Service reporting by a Service reporting capture subfunction to a Content Provider metrics reporting capture function.

RPM: Reporting of playback metrics by a Content playback function to a Content Provider metrics reporting capture function.

Figure 59:
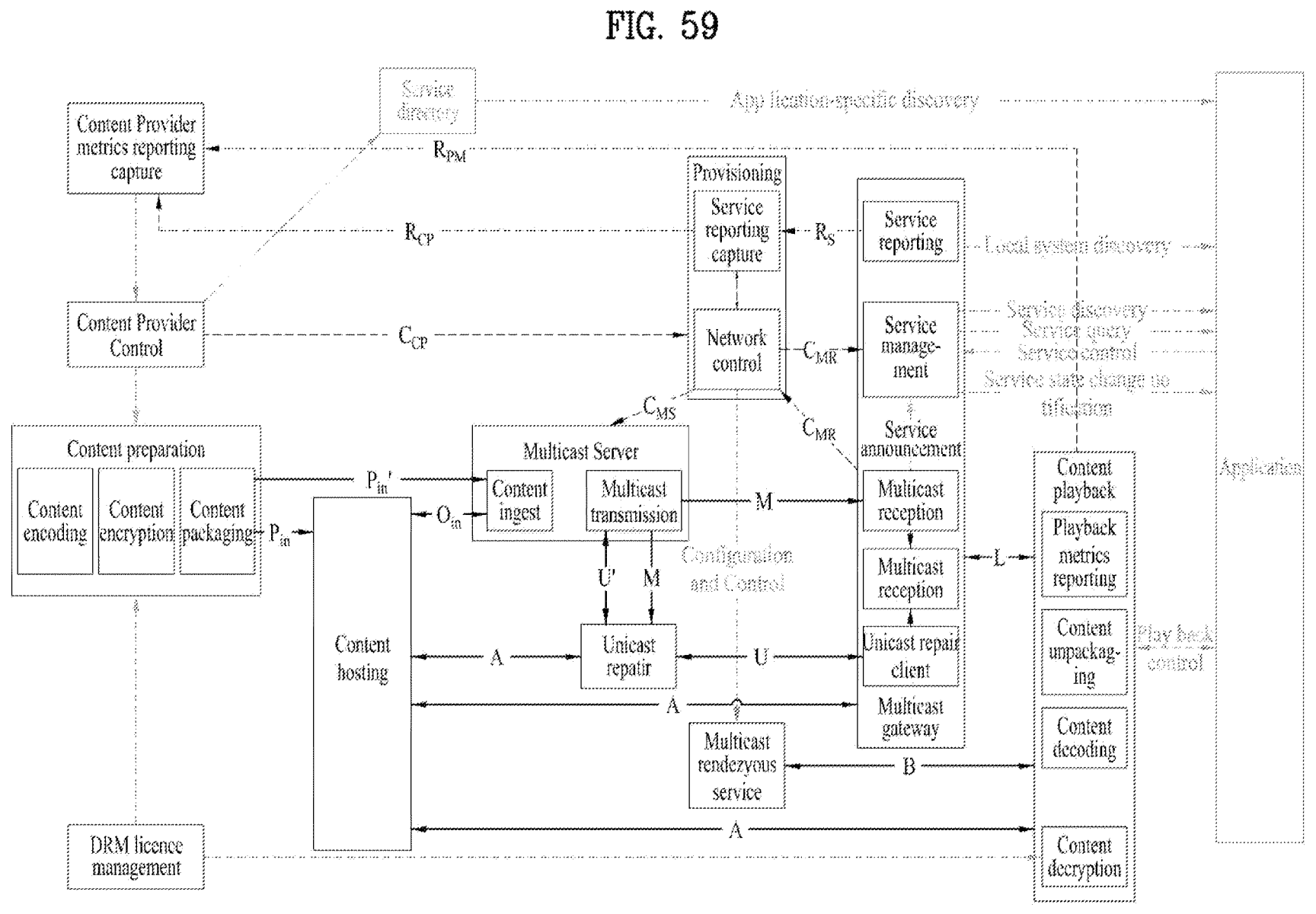

FIG. 59 shows a reference architecture according to embodiments.

Reference Architecture Diagram:

FIG. 29 shows a detailed diagram of a reference architecture.

The architecture includes the following functions.

Content Preparation

Content Encoding

The Content encoding function transforms source media streams into encoded media with the aim of reducing the bit rate. A single source media stream may be transformed into a number of different encoded representations to match delivery conditions. Virtual segment boundary markers may be placed in the encoded media representation to assist a Content playback function in adaptive operation according to the delivery conditions.

The output of the encoder is a cleartext stream formatted so as to be suitable for transmission to an encryption function or a packaging function. For example, it may be an MPEG elementary stream, an MPEG-2 TS, or an intermediate format having a similar purpose.

Content Encryption

The Content encryption function takes a cleartext stream as input and encrypts the same to form a ciphertext stream. The encryption keys may be obtained from the DRM license management function.

Content Packaging

The content packaging function ingests one or more encoded representations and organizes data according to a desired packaging format. In the context of dynamic adaptive streaming, the output of the packager is a sequence of packaged media segments with representation switching points that are aligned across different representations of the same source media stream. Examples of packaging formats may include ISO Base Media File Format (MP4) and fragmented MPEG-2 TS.

Content Hosting

Prepared content is made available by the Content hosting function for:

Unicast delivery to the Multicast server, which corresponds to content ingest via Oin;

Unicast repair service to the multicast gateway via interface A—for cashe misses via interface A;

the Content playback function that is not connecting through a multicast receiver-transmission via interface B.

The Content hosting function may be realized as simple web servers, as part of an origin cluster, or operating as a distributed CDN. As such, load balancing and request distribution techniques (e.g. DNS round-robin, HTTP 302 redirect) may be used to allow the client to receive content from an appropriate content server.

Multicast Server

The Multicast server function ingests content from the content sources. That is, a media stream may be input to the interface Oin. Generally, the protocol employed by the media player may be used. In the Multicast server, the payloads of the ingested media stream are encapsulated into delivery units of the multicast transport protocol and transmitted over the network. They are transmitted to the subscribed multicast gateway clients using IP multicast via the interface M. This entity may be configured according to configuration information received from the network control function via the interface CMS.

Content Ingest

Both push and pull content ingest methods are available for the Multicast server:

HTTP(S) Pull Ingest Via Interface Oin:

It is similar to a conventional adaptive streaming media player and downloads packaged media segments from the Content hosting function based on the description in the presentation manifest. In this case, the interface Oin may be functionally identical to the interface L although its detailed operation may differ. Segments may be packaged using MPEG-DASH or HLS. Segments from one or more representations described in the presentation manifest may be downloaded simultaneously. DVB DASH, MPEG-DASH, HLS, and other manifest formats may be supported.

HTTP(S) Push Ingest Via Interface Pin':

It may provide an HTTP(S) push interface such as Web-DAV (Web Distributed Authoring and Versioning). The Content packaging subfunction uploads media segments to the Content ingest function immediately as they are created. Segments may be packaged in a format such as MPEG-DAH or HLS.

RTP Push Ingest Via Interface Pin':

It provides an RTP-based push ingest mechanism to the Content packaging subfunction. The packager sends MPEG-2 TS packets using RTP. Segment boundaries are marked with virtual segment boundary markers.

Multicast Transmission

This function is responsible for transmitting streams received by the Content ingest subfunction in the payloads of IP multicast packets via the interface M.

Unicast Repair Service

The Unicast repair service offers a payload repair function to the Unicast repair client in the Multicast gateway via reference point U. The following repair modes may be considered.

The Unicast repair service receives multicast content transmitted through reference point M and locally caches a copy of the packet stream to satisfy repair requests from the Unicast repair client.

If the requested packet(s) cannot be satisfied from the Unicast repair service's cache, packet repair requests may be passed to the Multicast server via the interface U'.

Packet repair requests may be converted by the Unicast repair service to HTTP(S) requests on the Content hosting function using an interface identical to reference point A.

If requests for the same repair are received from multiple multicast gateways, it may be more efficient for the repair packets to be transmitted via reference point M.

Multicast Gateway

The main purpose of the multicast gateway is to provide packaged content segments to the Content playback function. The Multicast gateway may be realized as a forward proxy or as a local origin including reverse proxy. The Multicast gateway may be instantiated in user premises equipment like a home gateway device or IP connected set-top box (STB). It may also be located in an upstream network node as an alternative to the user premises equipment.

Content requests are received from one or more instances of the Content playback function via the interface L. As for the requested content, the content cached in the Asset storage subfunction is directly serviced, or the content acquired via the interface A is indirectly serviced. In this case, the content acquired via the interface A may be optionally cached in the Asset storage subfunction.

Service Management

The service management subfunction may collect multicast session configuration information about multicast content streams available receivable via the interface M and location of the Service reporting capture function. Such information may be received as follows:

Directly from the network control function via the interface CMR;

Indirectly via the Multicast reception subfunction (in the case where the information is transmitted via the interface M);

In unicast responses delivered from the content hosting function via the interface A.

Multicast Reception

The multicast reception subfunction receives, via the interface M, content streams requested by or configured for an end device. Content that has been received intact may also be cached in the Asset storage for later use. Content damaged in transit may be repaired using any specified mechanism(s) (e.g. Forward Error Correction, unicast repair by the Unicast repair client via U or unicast retrieval via A) before the multicast gateway caches the same. Irreparable content should not be served via the interface L.

Unicast Repair Client

Multicast packet loss detection is performed and the loss is recovered using Forward Error Correction information received via the interface M or using the unicast repair service (e.g. unicast packet retransmission or multicast segment loss signaling) via the interface U. For a packet not recovered in this way, unicast transmission via the interface A may be used.

Asset Storage

The Asset storage subfunction provides temporary storage of assets to be served via the interface L. The storage function is performed only by the multicast gateway.

Managed pre-positioned media content assets. For example, all or part of popular content or advertisement-related information may be stored in advance before being actually available to multiple users.

Temporary caching of linear media content segments.

Service Reporting

Service-related metrics (e.g. telemetry and analytics data) are reported to the Service reporting capture subfunction by the Service reporting subfunction via the interface RS.

Provisioning

The purposes of the Provisioning function are:

To collect service reporting information centrally from the deployed Multicast gateway instances; To configure resources in the network; To configure the Multicast server to use the configured network resources; To configure the Multicast gateway to use the configured network resources.

The Provisioning function may be linked with the Content Provider control function based on information delivered via the interface CCP.

Service Reporting Capture

Service reporting information captured by the Multicast gateway is supplied to the Service reporting capture function via the interface RS. The report may include metrics and other key indicators describing the performance of the service (e.g. cache hit ratio, viewership). The metrics may depend on which channels are requested, when channels are established and how many segments are in cache. The service reporting information may be used to improve service performance or to configure multicast channels.

The service reporting capture function may export service reporting information to the Content Provider metrics reporting capture function via the interface RCP. This information such as multicast content and bit rate may be included in the reporting information.

Network Control

The network control function may perform functions such as controlling, configuring and provisioning network resources. This may include resources for multicast transmission via the interface M and unicast operation via the interfaces U and A.

In a centralized system, the network control function may distribute configuration information about available multicast streams to the network resources and may additionally send this configuration information to the multicast server via the interface CMS or to the multicast gateway via the interface CMR. The configuration information about available multicast streams may be updated according to Content Provider control policy rules and/or the number of client requests Content Provider Control The content provider control function uses the interface CCP to enable the network control function to provide information about services available through the multicast delivery path M. A single Content Provider control function may interact with multiple Network Control functions, each or which is operated by a different network provider.

Content Playback

The content playback function is a function to manage the request, reception, decryption and presentation of content. It only supports unicast delivery via the interface L. Playback operates regardless of the delivery path through which the content is delivered.

The content playback function may be located separately from the Multicast gateway on an end device such as a smartphone. Alternatively, it may be combined with a multicast gateway in, for example, a set-top box or connected TV.

Additional functions of the Content playback function are:

To retrieve, via the interface B, a presentation manifest for the linear service;

To retrieve, via the interface B, any content that is not intended to be retrieved via the Multicast gateway.

Content Unpackaging

The Content unpackaging subfunction may extract elementary stream data from acquired transport objects and provide the same to the Content decryption and Content decoding subfunctions. For example, for ISO Base Media File Format segments, the subfunction may extract an appropriate media data box. In the case of MPEG-2 TS, the desired PID is filtered and the payloads of reassembled PES packets are extracted.

Content Decryption

If a Digital Rights Management system is in operation, the Content decryption subfunction obtains an appropriate decryption key from the DRM license management function and decrypts any encrypted elementary streams.

Content Decoding

The Content decoding subfunction parses and interprets the contents of elementary media streams, allowing them to be rendered for playback on, for example, a screen or loudspeakers.

Playback Metrics Reporting

The Playback metrics reporting subfunction may report information relating to the behaviour and quality of content playback to the Content Provider metrics reporting capture function via the interface RPM. The metrics may include HTTP request/response, initial playback delay, buffer level, representation switching events and network throughput. The playback metrics reported by this function may be directly related to the end user quality of experience (QoE) and may be used to optimize the quality either at the Content Provider or in the Network.

Multicast Rendezvous Service

The Multicast rendezvous service manages data records of multiple multicast gateway instances (including the current multicast gateway statuses, multicast session status and related data). The network control function may provide such related information to the multicast rendezvous service.

The Multicast rendezvous service handles the initial request for a presentation manifest received from the content playback function via reference point B. The multicast rendezvous service determines whether there is an active multicast session for the linear service corresponding to the requested presentation manifest. It alos determines whether there is a active multicast gateway suitable for use by the Content playback function for the request.

If at least the second condition is met, the Multicast rendezvous service may redirect the request to that Multicast gateway instance. Otherwise, the multicast rendezvous service redirects the request to the Content hosting function and the session will be operated using unicast DRM License Management The DRM license management function provides an appropriate encryption key to be used by the Content encryption function for core content protection, and provides a license to the Content decryption subfunction to enable the Content playback function to decrypt the protected content.

Application

The Application controls the Content playback function. Examples may include an embedded control application (EPG application) on a TV or set-top box, or a third-party application contributed by a content provider. The interface that the application uses to control the content playback generally involves passing a reference point in a presentation manifest (e.g. URL of an MPEG DASH MPD) to initiate playback of an individual linear service. The Application may interact with the service management subfunction of the multicast gateway in order to discover the existence of linear services and to control reception thereof by the multicast gateway. The Application may discover the existence of linear services through a private interaction with an application-specific Service directory function.

Service Directory

The Application may use a private Service directory in order to find available linear services. The Service directory function may be configured by the Content provider control function.

Figure 60:
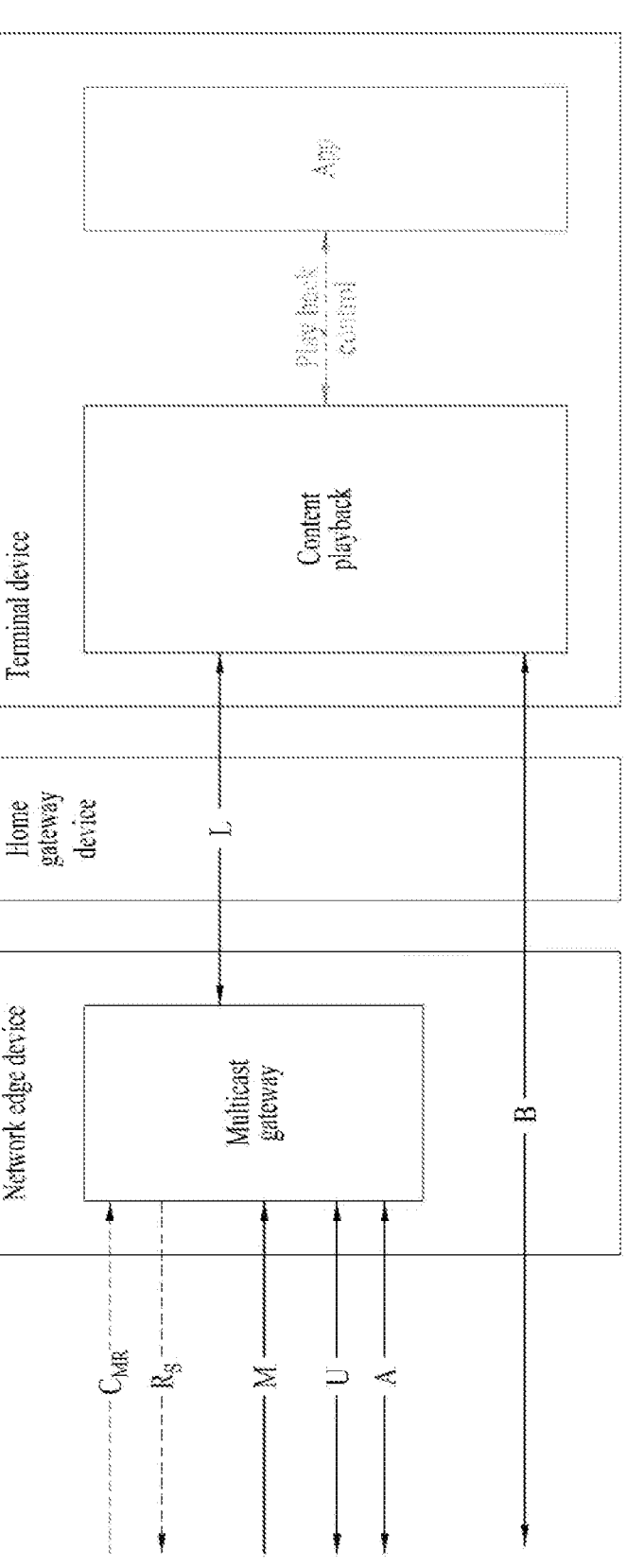
FIG. 60 illustrates a multicast gateway deployment model according to embodiments.

FIG. 60 illustrates a multicast gateway deployment model according to embodiments.

In the multicast ABR architecture described above, the multicast gateway function may be implemented in various nodes within the network. FIG. 60 shows a multicast gateway deployed in a network edge device.

When the multicast gateway is implemented in the network edge device, the terminal device does not support reception of IP multicast from the home network. The terminal device includes the content playback function, and an application to control linear playback is installed thereon.

The Multicast gateway provides a multicast-to-unicast conversion function to multiple home gateway devices. Therefore, traffic on the access network between the network edge device and the home gateway device is unicast.

Figure 61:
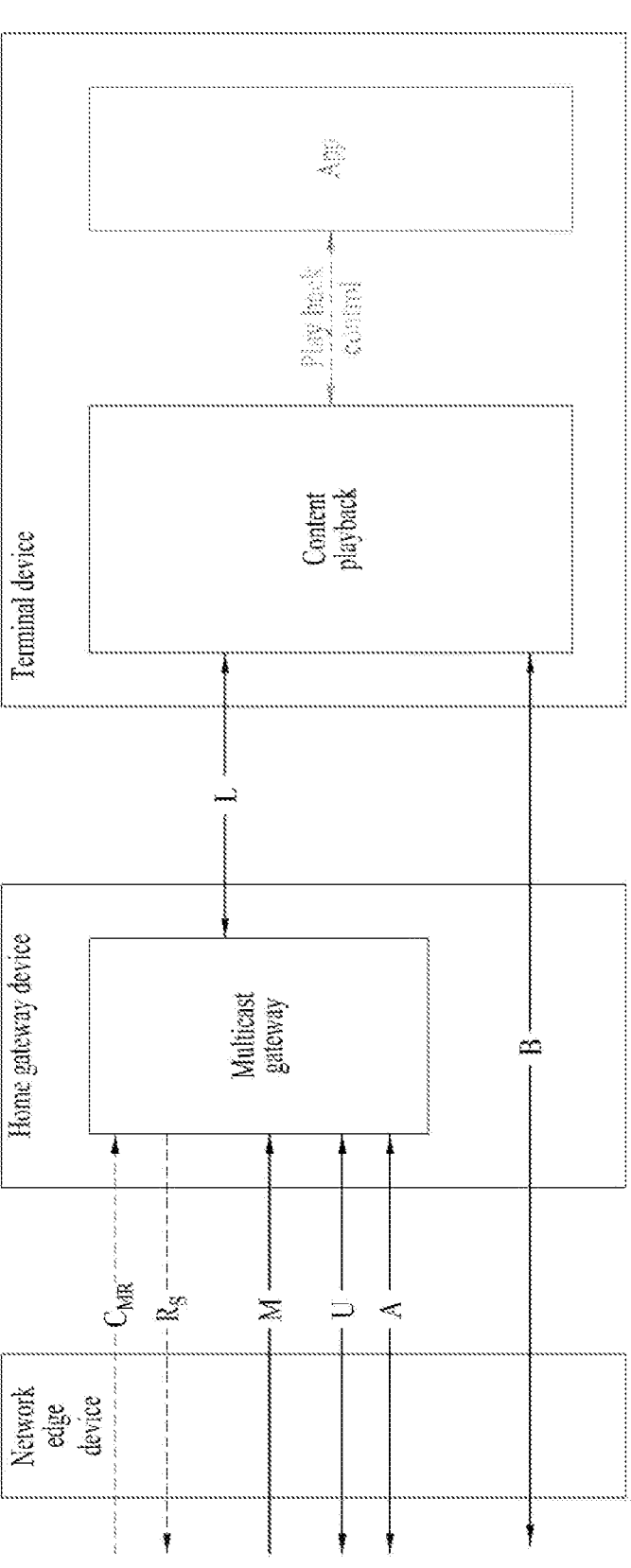
FIG. 61 illustrates a multicast gateway structure deployed in a home gateway device according to embodiments.

FIG. 61 illustrates a multicast gateway structure deployed in a home gateway device according to embodiments.

The Multicast gateway is deployed in a home gateway device, such as a router, which is typically supplied by the Internet Service Provider (ISP). In addition, the multicast gateway provides a multicast-to-unicast conversion function to multiple terminal devices in the same home network. Each of these terminal devices has an instance of the Content playback function, and a related application is installed thereon.

Figure 62:
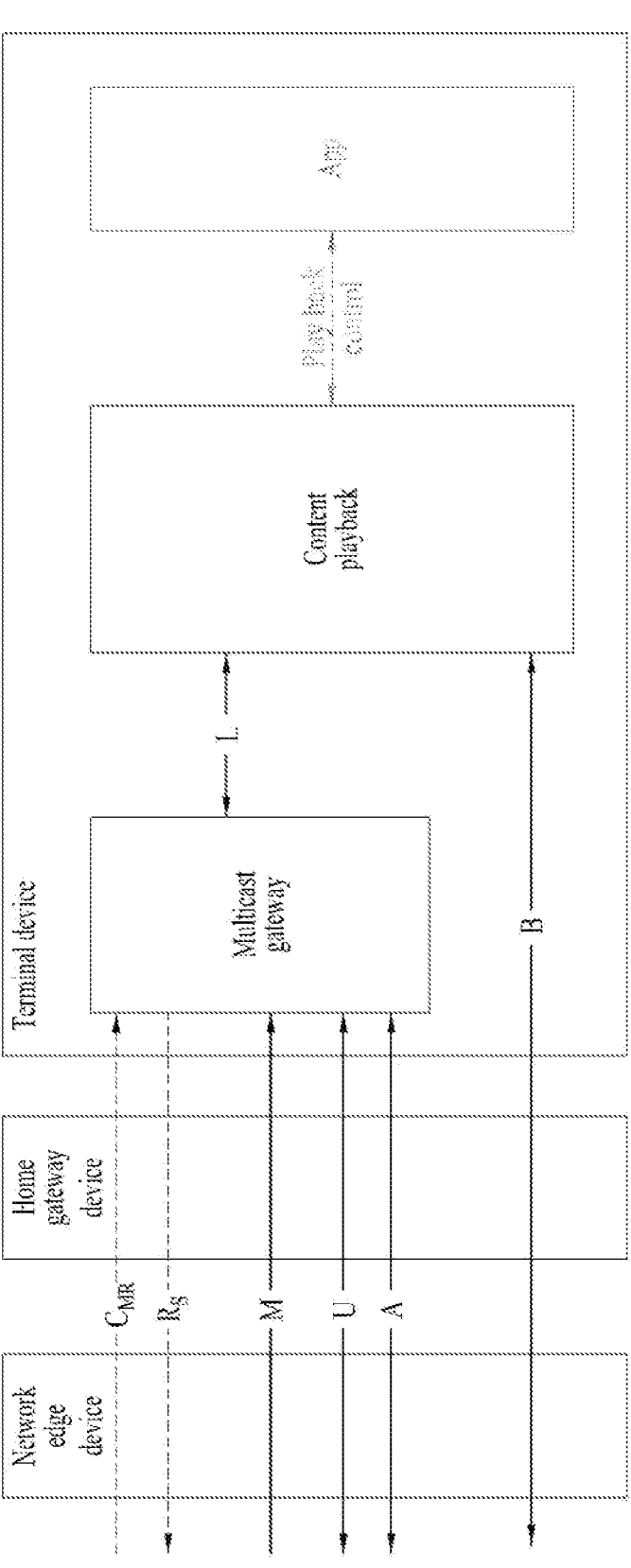
FIG. 62 illustrates a multicast gateway structure deployed in a terminal device according to embodiments.

FIG. 62 illustrates a multicast gateway structure deployed in a terminal device according to embodiments.

When the multicast gateway is implemented in the terminal device, the terminal device supports reception of IP multicast reception in the home network. Each terminal device includes both multicast gateway and content playback functions, and loads an application to control linear playback. For this deployment model, the multicast gateway function shall provide content services only to the host terminal device.

The home gateway device may perform only multicast group subscription related operations. This may result in unpredictable quality change when the home network does not fully support multicast delivery.

Figure 63:
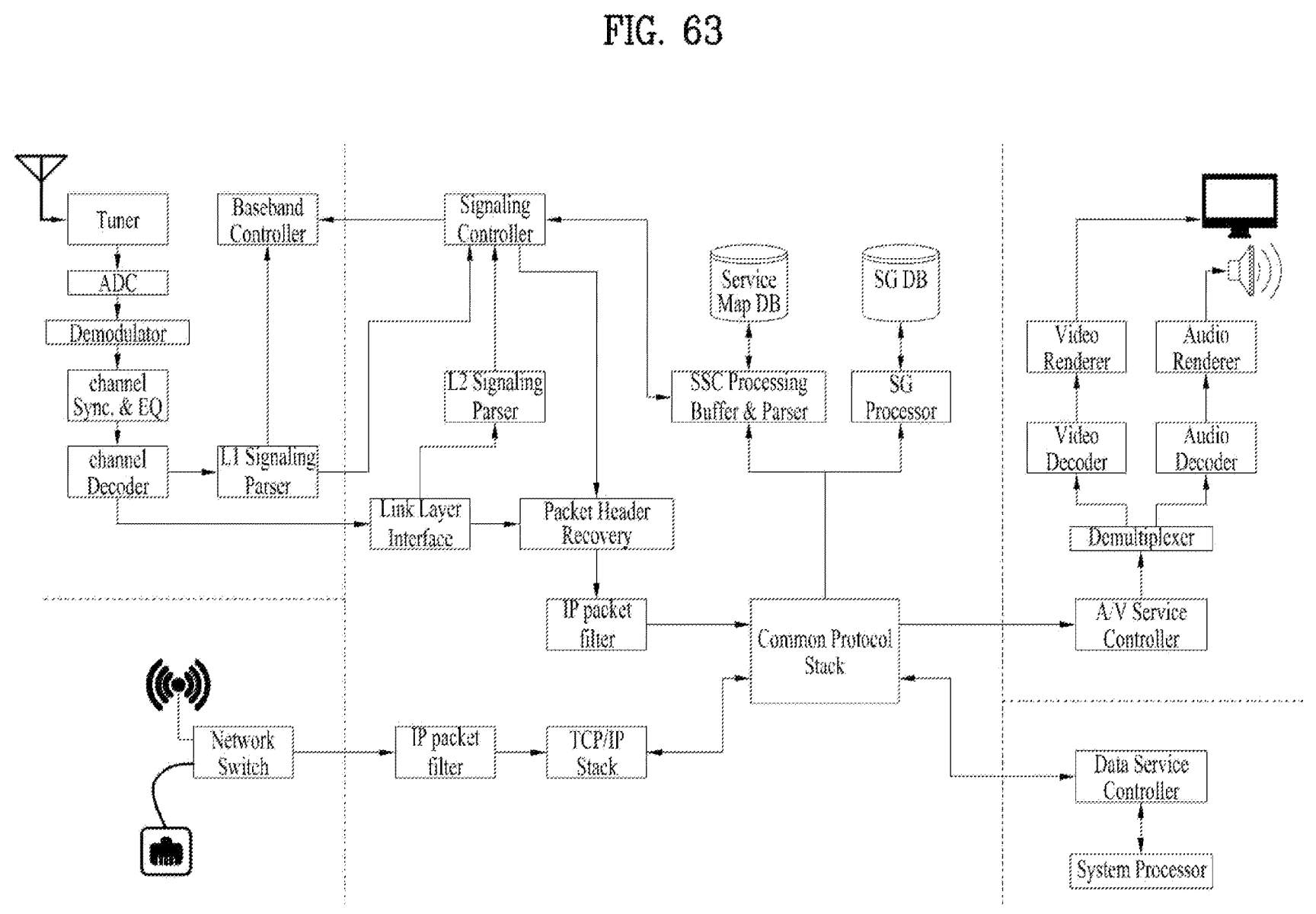

FIG. 63 illustrates a hybrid broadcast reception device according to embodiments.

The reception device according to the embodiments may be represented as shown in FIG. 63. Each component of the reception device according to the embodiments may correspond to hardware, software, a processor, and/or a combination thereof.

Abbreviations are defined as follows: 5GC: 5G Core Network; 5GMS: 5G Media Streaming; 5GMSd: 5G Media Streaming downlink; 5GMSu: 5G Media Streaming uplink; 5GS: 5G Systems; AF: Application Function; ABR: Adaptive Bit Rate; AMF: Access and Mobility Function; API: Application Programming Interface; App: Application; AS: Application Server; CAPIF: Common API Framework; CDN: Content Delivery Network; DASH: Dynamic and Adaptive Streaming over HTTP; DN: Data Network; DNAI Data Network Application Identifier; DNN: Data Network Name; DRM: Digital Rights Management; EPC: Evolved Packet Core; EPS: Evolved Packet System; EUTRAN: Evolved Universal Terrestrial Radio Access Network; FLUS: Framework for Live Uplink Streaming; FQDN: Fully-Qualified Domain Name; GPU: Graphics Processing Unit; GSM: Global System for Mobile communication; HPLMN: Home Public Land Mobile Network; HTTP: HyperText Transfer Protocol; HTTPS: HyperText Transfer Protocol Secure; LTE: Long-Term Evolution; MBMS: Multimedia Broadcast Multicast System; MNO: Mobile Network Operator; MPD: Media Presentation Description;

MSISDN: Mobile Station International Subscriber Directory Number; NA: Network Assistance; NEF: Network Exposure Function; NR: New Radio; NSMF: Network Slice Management Function; NSSAI: Network Slice Selection Assistance Information; NSSP: Network Slice Selection Policy; OAM: Operations; Administration and Maintenance; OTT: Over-The-Top; PCC: Policy and Charging Control; PCF: Policy and Charging Function; PDU: Packet Data Unit; PSS: Packet-switched Streaming Service; RAN: Radio Access Network; SBA: Service based Architecture; SLA: Service Level Agreement; TCP: Transmission Control Protocol; URL: Unique Resource Identifier; URSP: UE Route Selection Policy; AAC: Advanced Audio Coding; ABR: Adaptive Bit Rate; API Application Programmer's Interface; BMFF: Base Media File Format; CDN: Content Delivery(Distribution) Networ; CMAF: Common Media Application Format; CP: Content Provider; DASH: Dynamic Adaptive Streaming over HTTP; DNS: Domain Name System; DRM: Digital Rights Management; EPG: Electronic Programme Guide; IGMP: Internet Group Management Protocol. IP: Internet Protocol; ISO: International Organization for Standardization; HLS: HTTP Live Streaming; HTTP: HyperText Transfer Protocol; HTTPS: Secure HyperText Transfer Protocol; MBMS: Multimedia Broadcast Multicast Services (pertaining to 3GPP); MPD: Media Presentation Description (pertaining to MPEG-DASH); MPEG: Moving Pictures Experts Group; OTT: Over The Top; PID: Packet Identifier (pertaining to MPEG-2 Transport Stream); RTCP: RTP Control Protocol; RTP: Real-time Transport Protocol; STB: Set-Top Box; TCP: Transmission Control Protocol; UDP: User Datagram Protocol; URL: Uniform Resource Locator (pertaining to HTTP).

The apparatus according to the above-described embodiments may efficiently utilize various networks in broadcast and multicast transmissions based on the operation/configuration and/or signaling information according to the embodiments.

Furthermore, the method/apparatus according to the above-described embodiments may reduce the load on the network in various streaming sessions, reduce the implementation cost, and efficiently provide ABR Multicast services in connection with various networks and/or devices. In order to provide these effects, the architecture and flow according to the embodiments are required.

Operations according to the embodiments described in the present disclosure may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

Figure 64A:
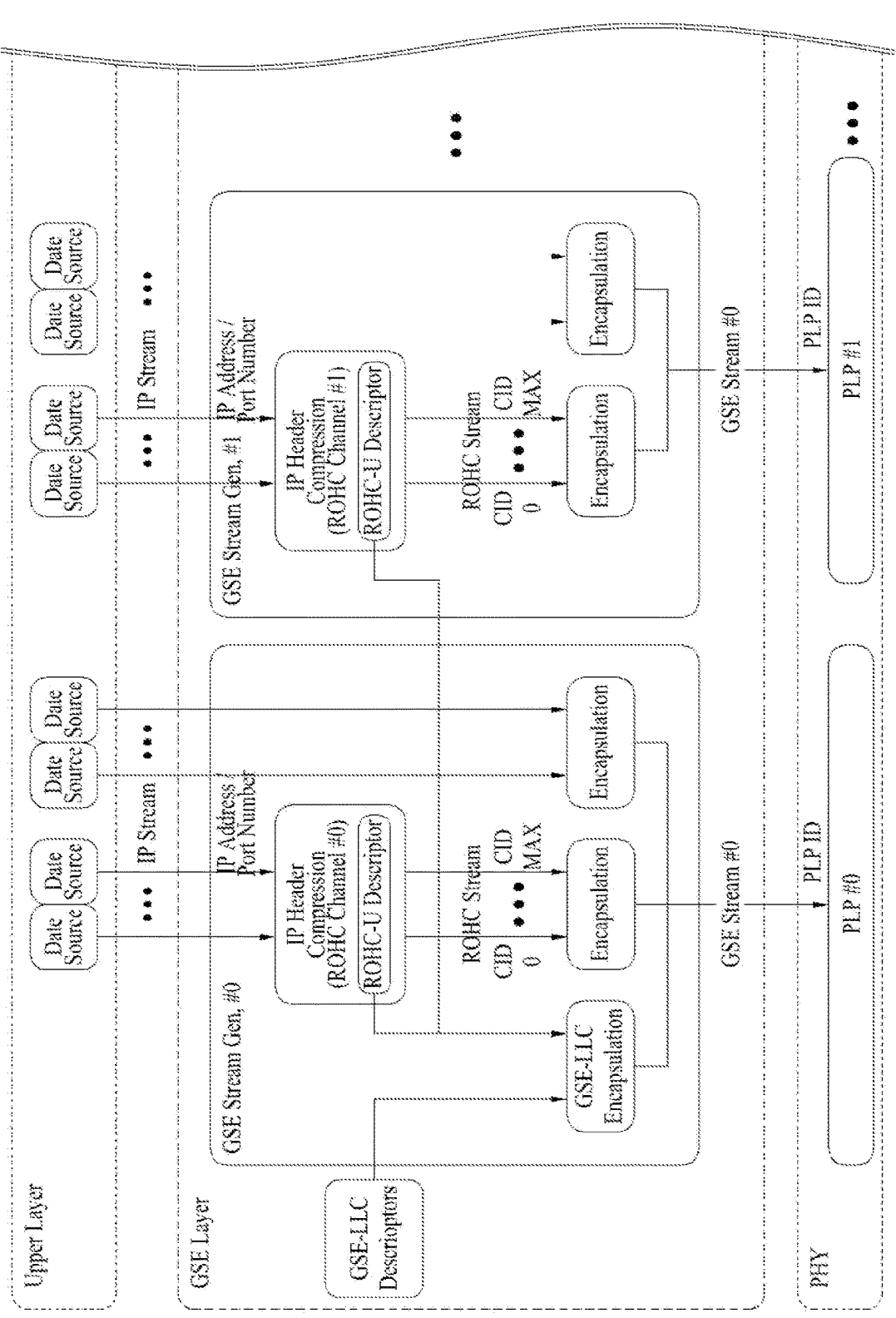
FIG. 64 illustrates a multicast GSE layer structure according to embodiments.
Figure 64B:
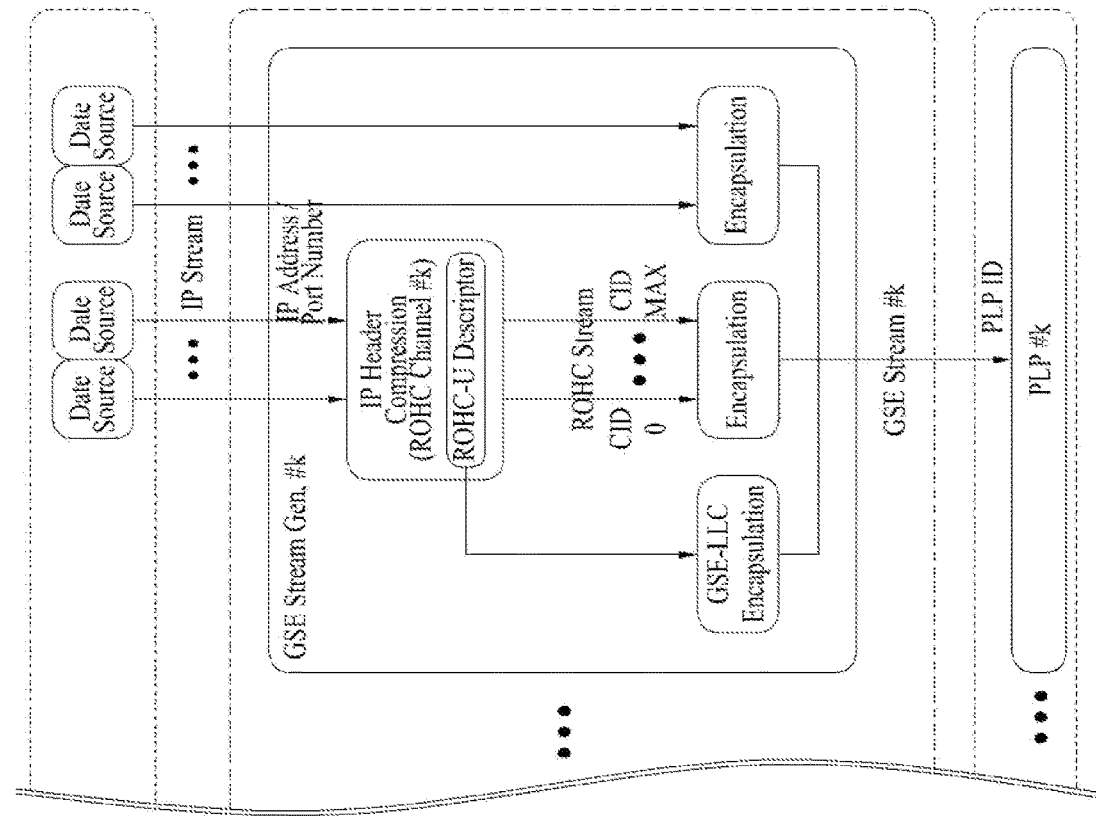

FIG. 64 illustrates a multicast GSE layer structure according to embodiments.

The method/apparatus according to the embodiments may process a multicast signal through a GSE layer structure for a native IP system.

The GSE layer structure according to the embodiments may include an upper layer, a GSE layer, and a physical layer.

The upper layer may process the data and pass the processed data to the GSE layer. The GSE layer may receive an IP stream from the upper layer.

The GSE layer may generate a GSE stream from the stream received from the upper layer. The GSE layer may generate multiple GSE streams. The GSE stream generation operation may include IP header compression, GSE-LLC descriptor generation, GSE-LLC encapsulation, encapsulation of a header compressed ROHC stream, and encapsulation of a header uncompressed IP stream.

The layer may receive IP data from the upper layer, and may or may compress the IP header. When the IP header is compressed, the header may be compressed based on the ROHC scheme, and a ROHC-U descriptor related to the header compression may be generated. The ROHC-U descriptor may be encapsulated together with the GSE-LLC descriptor and passed to the physical layer. The ROHC compressed stream may have a value among CID 0 to MAX. The IP header compression may be performed based on IP address information and/or port number.

The GSE stream may be delivered by the PLP of the physical layer. The GSE stream is delivered by the PLP having the PLP ID.

Figure 65:
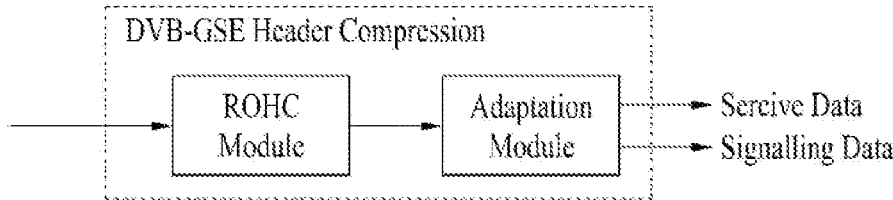
FIG. 65 illustrates a DVB-GSE Robust Header Compression (ROHC) profile and a DVB-GSE header compressor according to embodiments.

FIG. 65 illustrates a DVB-GSE ROHC profile and a DVB-GSE header compressor according to embodiments. GSE-ROHC (102 606-3)

The method/apparatus according to the embodiments may perform ROHC compression according to the DVB Native IP (NIP) standard. For header compression, use of a protocol may be considered. The ROUTE/FLUTE protocol over UDP/IP may be used. RTP and ESP may be used. The method/apparatus according to the embodiments may minimize the types of protocols for efficient protocol use. FIG. 65 shows ROHC profiles for DVB-GSE according to a profile identifier.

The method/apparatus according to the embodiments may support multiple IP streams. When a change in the static field of the received IP stream is detected by the ROHC compressor, the ROHC compressor may perform context re-initialization (CONTEXT_REINITIALIZATION). A new value of CONTEXT ID (CID) may be assigned to the compressed IP stream. The new CID value may be unique in the system. This unique value may not be used by other ROHC compressors in the system.

The ROCH compressor and decompressor according to DVB-GSE may be driven in a unidirectional mode.

Referring to FIG. 65, the adaptation mode corresponds to an additional procedure after the operation of the ROHC compressor. A static chain may be extracted from an IR packet and the IR packet may be converted into an IR-DYN packet. The signaling data may be delivered through the ROHC compression flow.

Whether to apply the adaptation mode or not may be selected. Due to transmission of signaling data robutst to errors, separate transmission of context information may be useful within a multiple PLP structure. In some cases, it is not beneficial to use the adaptation mode. This is a case where the context data and the corresponding ROHC flow are transmitted by the same PLP.

ROHC parameters may be generated. The maximum value of MAX_CID may be 127. The number of ROHC streams may be limited. The size of the CID field in the ROHC header may be 1 byte.

Figure 66:
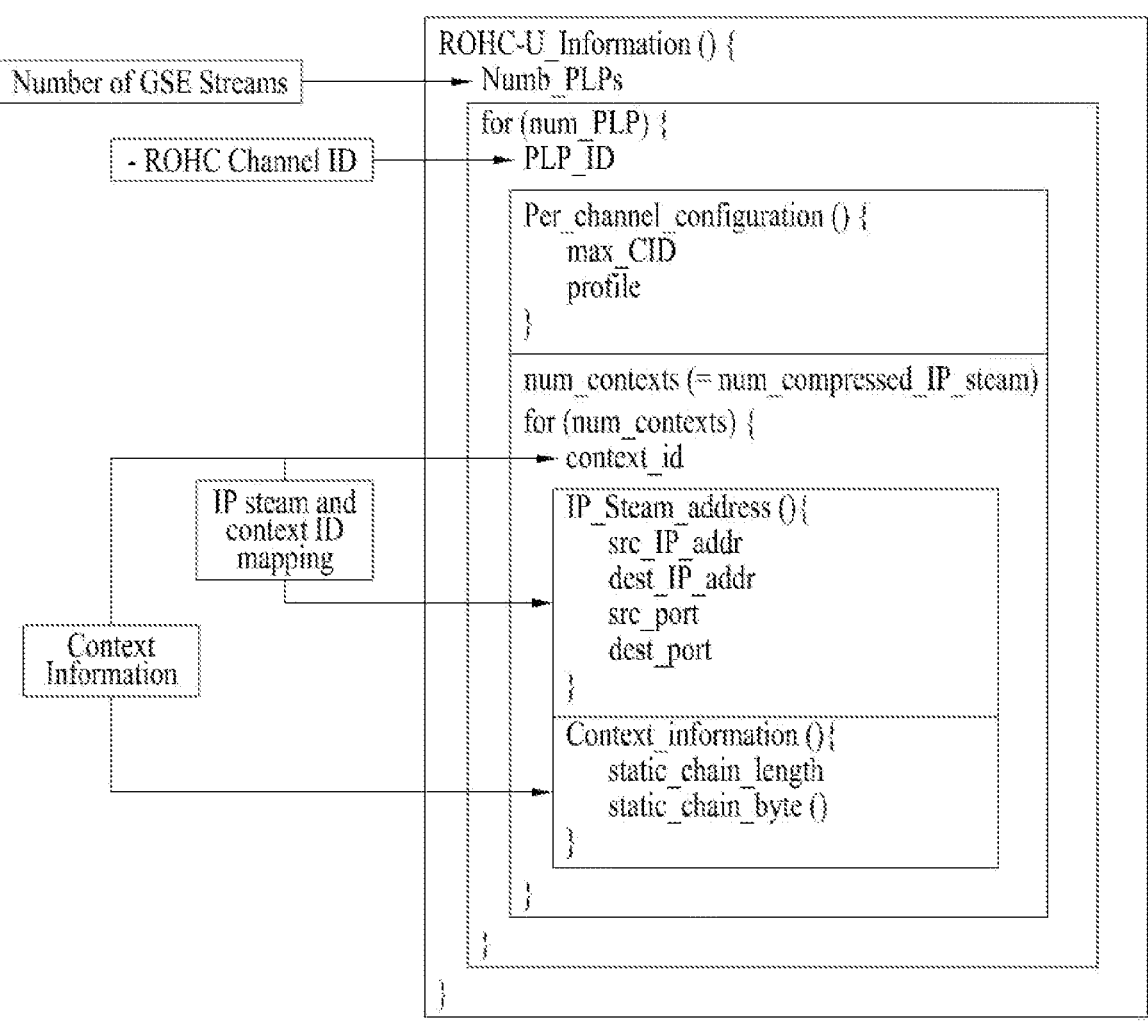
FIG. 66 illustrates ROHC-U information according to embodiments.

FIG. 66 illustrates ROHC-U information according to embodiments.

GSE-LLC (102 606-2)

The method/apparatus according to the embodiments may generate a multicast (GSE stream) mapping descriptor. The multicast mapping descriptor is newly required. The conventional descriptor cannot support the method of identifying the UDP port for GSE-LLC. Multicast-link ID (GSE stream ID) mapping may be provided.

The ROHC-U descriptor is for multiple streams and UDP, and may be generated as shown in FIG. 66. Multicast-ROHC channel-context ID-context information mapping may be presented.

The ROHC-U descriptor according to the embodiments may support multiple IP streams.

A link represents a virtual network interface on the receiver. It may be associated with exactly one IP flow. Since the same data stream is available on one or more modulation system streams, the link may be associated with a modulation system stream and a ROHC-U information instance, which are specified by a modulation system type, a modulation system ID, and a physical stream ID. For example, it may be specified by a specific PLP in the DVB-T2 system. Because the same data is carried on the link, receivers may be free to switch between instances of a particular link.

IP Flow: A data stream may be carried on a given link. Because the same data is available from various locations, an IP flow may be associated with one or more links. The IP flow may be described, targeting parameters. For example, an IP source and/or destination address may be described. The IP flow may be described by operation parameters such as ROHC-U header compression parameters. A connection between an IP flow and a link may be established by a link ID.

The ROUC-U information for the NIP includes the number of PLPs from which the number of GSE streams may be known. It includes PLP ID related to ROHC channel ID. It includes a CIDmax value and a profile per channel parameter of ROHC. It includes IP stream address information per context ID. The ID stream address information includes a source IP address, a destination IP address, source port information, and destination port information. The context ID and the IP stream address information are mapped to each other. Context information per context ID is included. The context information includes static chain length information and static chain byte information.

Embodiments may further include a NIP specific link layer protocol, a layer architecture, selection for use of ROHC, and a bootstrapping procedure in the link layer. IP streams to which ROHC is not applied may be individually delivered. The delivery option may be identified through signaling information. Bootstrapping may receive the GSE stream and filter the requested IP/UDP stream.

Figure 67A:
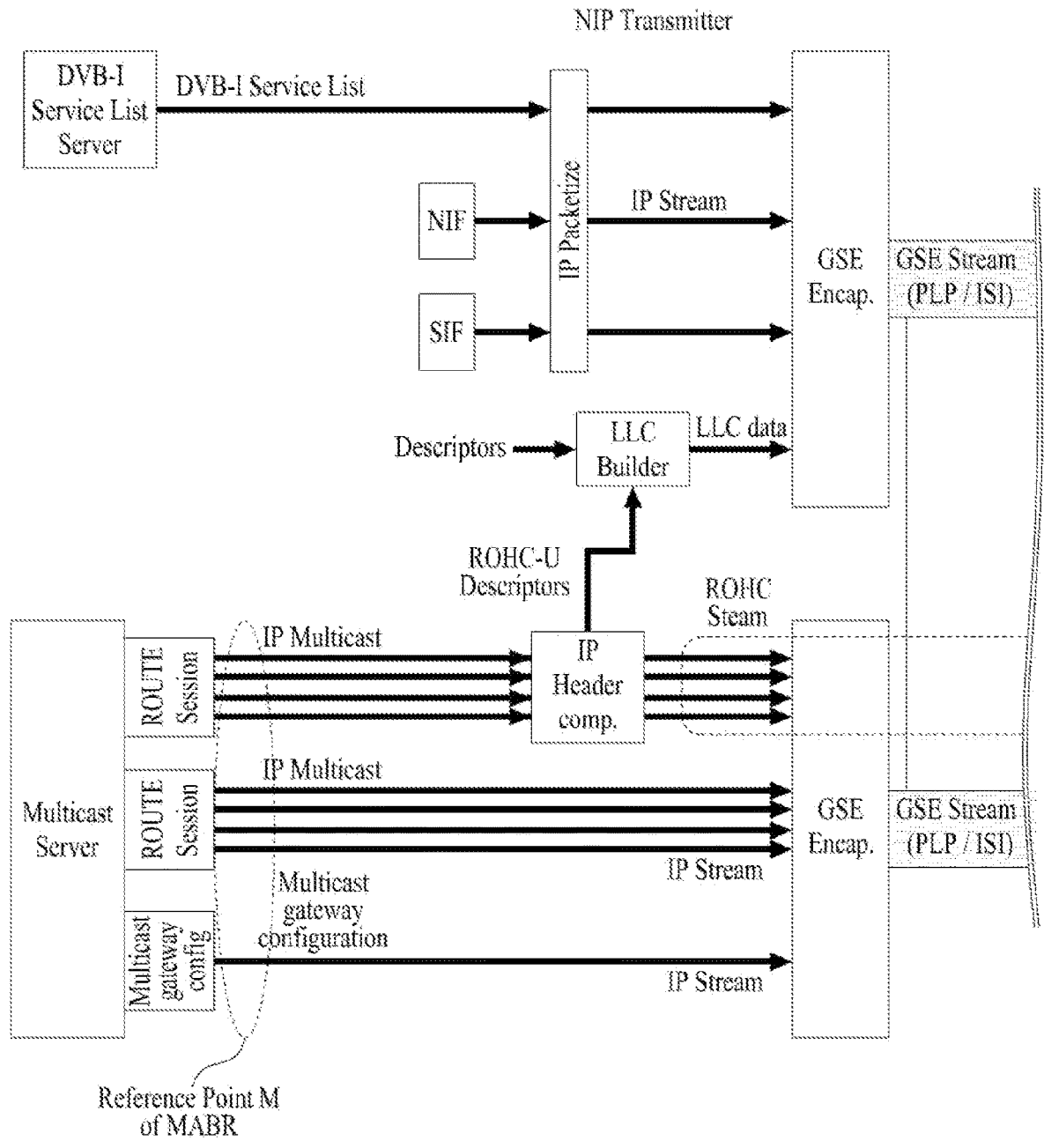
FIG. 67 illustrates a transmission device and a reception device according to the embodiments.
Figure 67B:
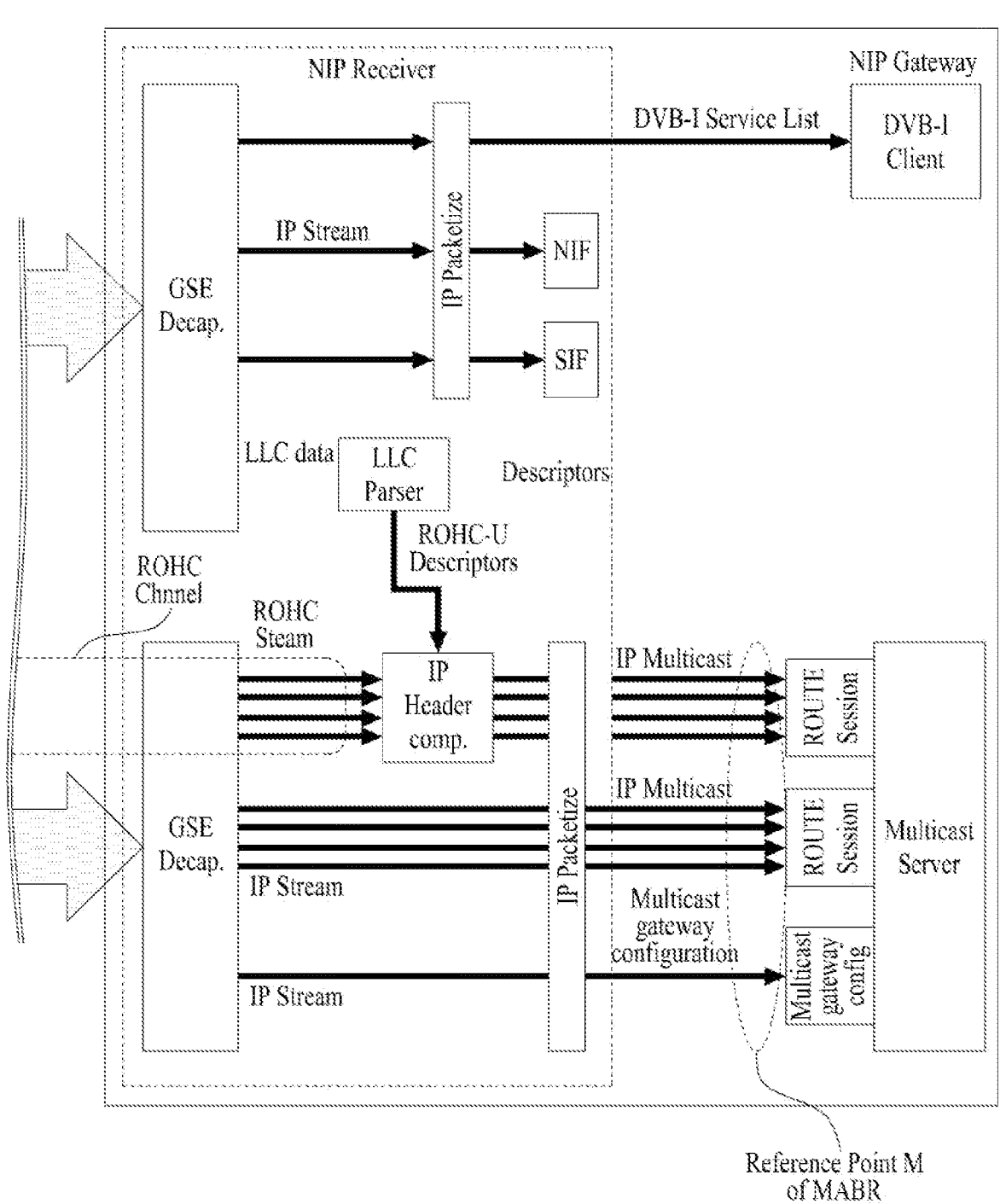

FIG. 67 illustrates a transmission device and a reception device according to the embodiments.

The apparatus according to the embodiments may include an NIP transmitter and an MIP receiver as shown in FIG. 67.

The NIP transmitter may receive a DVB-I service list from a DVB-I service list server. A GSE stream may be transmitted by the PLP by encapsulating an IP stream including an IP packet. LLC data containing a descriptor including information about the GSE layer and a ROHC-U descriptor may be generated and transmitted by the PLP.

The NIP transmitter may receive IP multicasts from the multicast server based on the ROUTE session, and may receive an IP stream including multicast gateway configuration information. A ROHC stream may be generated through IP header compression according to the embodiments.

The NIP receiver may receive the GSE stream and parse the IP stream. It may deliver a DVB-I service list to the DVB-I client. It may filter the IP stream and forward IP multicast and multicast gateway configurations to the multicast gateway. Multicast configuration related operations may be processed based on interface M, which is a reference point of MABR.

The NIP stream according to the embodiments may be the same as the GSE-Lite stream or MPE stream. The NIP stream is interpreted as a term referring to a stream including IP multicast data delivered by the DVB-NIP broadcast system.

Multicast data transmitted on a broadcast channel is mainly generated by a multicast server, but may also be generated by a NIP signaling server related to each NIP stream. Every NIP stream may have only a single connected multicast server. The Multicast server may create multicast transport sessions, each consisting of one or more multicast streams.

Figure 68:
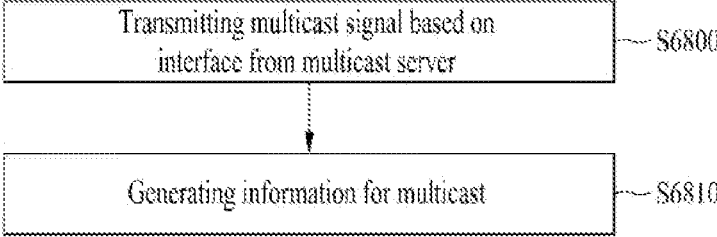
FIG. 68 illustrates a multicast transmission method according to embodiments.

FIG. 68 illustrates a multicast transmission method according to embodiments.

S6800: The multicast transmission method according to the embodiments may include transmitting a multicast signal from a multicast server based on an interface.

S6810: The multicast transmission method may further include generating information for multicast.

Figure 69:
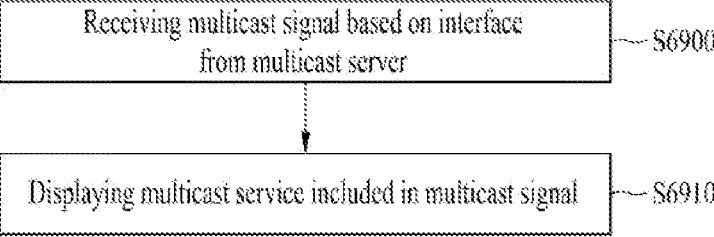
FIG. 69 illustrates a multicast reception method according to embodiments.

FIG. 69 illustrates a multicast reception method according to embodiments.

S6900: The multicast reception method according to the embodiments may include receiving a multicast signal from a multicast server based on an interface.

S6910: The multicast reception method may further include playing a multicast service included in the multicast signal.

The multicast processing method according to FIGS. 68 and 69 may be carried out in the multicast ABR structure illustrated in FIGS. 1 to 4 and the like, based on the flow diagram shown in FIG. 5, information for multicast illustrated in FIGS. 6 and 7, and the like.

The multicast processing method according to FIGS. 68 and 69 may process a multicast signal based on the 5G network illustrated in FIGS. 8 to 10 and 54 to 63.

The multicast processing method according to FIGS. 68 and 69 may process the multicast signal based on the multiple networks illustrated in FIGS. 11 to 26 and the like.

The multicast processing method according to FIGS. 68 and 69 may process the multicast signal based on multiple networks on the protocol and structure illustrated in FIGS. 27 to 32 and the like.

In the multicast processing method according to FIGS. 68 and 69, the information for multicast shown in FIGS. 33-36 and the like may be generated and transmitted, and the receiver may receive and play multicast media content based on the information for multicast.

In the multicast processing method according to FIGS. 68 and 69, a multicast signal may be generated, transmitted, and processed in the system shown in FIGS. 37 to 39 and the like.

The multicast processing method according to FIGS. 68 and 69 may include an operation of mapping between a multicast transport session and a physical layer. In order to process the multicast signal through such inter-session mapping, the protocol of FIGS. 42 and 43 is configured in the structure shown in FIGS. 40, 41 and 47, and mapping information for multicast of FIGS. 44 to 46, 48, and 49 is generated, transmitted and received.

In the multicast processing method according to FIGS. 68 and 69, multicast may be processed through the GSE (link layer) structure of FIG. 64, data of an upper layer may be compressed as shown in FIGS. 65 and 66, and related link layer signaling information may be generated and transmitted. In addition, in the multicast processing method according to FIGS. 68 and 69, information indicating the relationship between the GSE and the PLP may be generated as shown in FIG. 67, such that the reception device may receive the multicast signal and play the multicast media data.

Regarding FIG. 41, the interfaces according to the embodiments may constitute a DVB-NIP standard broadcast system. A apparatus for receiving a multicast signal may include a multicast gateway configured to receive a multicast signal based on an interface from a multicast server; and a content playback configured to display a multicast service in the multicast signal. The multicast signal reception apparatus may receive the multicast signal according to a native Internet protocol.

Regarding FIG. 42, the interface of the embodiments is configured according to the DVB-NIP protocol. The interface may include a protocol including a multicast transport session, a User Datagram Protocol/Internet Protocol (UDP/IP), a Generic Stream Encapsulation (GSE) layer, and a physical layer.

Regarding FIG. 48, embodiments may generate the following signaling information. This information may be referred to as signaling information, metadata, ABR transport session descriptor, IP Multicast List descriptor, and the like. Logical Layer Control (LLC) information may be carried in the GSE layer. The LLC information may include a multicast descriptor, wherein the multicast descriptor may include source address information, destination address information, source UDP port information, and destination UDP port information.

Regarding FIG. 64, a GSE layer may be defined for DVB-NIP. In embodiments, a Physical Layer Pipe (PLP) carrying a GSE stream may be received from the GSE layer. The GSE stream may include GSE data in which IP header compressed IP data is encapsulated, GSE data in which IP header non-compressed IP data is encapsulated, a descriptor for a multicast, and a Robust Header Compression (ROHC) descriptor related to IP header compression.

Regarding FIG. 44, an LLC table for DVB-NIP may be defined. In the embodiments, logical link control (LLC) information may be received from the GSE layer. The logical link control information may include network control data (NCD) and link control data (LCD). The NCD may include a descriptor for a multicast, and the LCD may include a link identifier for a physical layer. Thereby, mapping between sessions may be indicated and multicast media may be received.

Regarding FIG. 67, the embodiments may include a parser configured to parse the LLC information; and a decompressor configured to receive a Robust Header Compression (ROHC) stream included in a GSE stream of the GSE layer and to decompress an IP header.

A reception method according to embodiments may include receiving a multicast signal from a multicast server based on an interface; and displaying a multicast service included in the multicast signal.

A transmission method according to embodiments may include transmitting a multicast signal from a multicast server based on an interface, wherein the interface may include a protocol including a multicast transport session, a User Datagram Protocol/Internet Protocol (UDP/IP), a Generic Stream Encapsulation (GSE) layer, and a physical layer; and generating a logical layer control (LLC) information in the GSE layer.

Accordingly, the issues related to absence of link technology between terrestrial broadcasting and satellite broadcasting, and absence of session information and interface configuration for multicast media transmission may be addressed. That is, to transmit a media object of DVB ABR multicast in a unidirectional delivery network such as a link between terrestrial broadcasting and satellite broadcasting defined in the DVB standard, an interface and signaling flow for interworking a multicast transport session with a broadcast stream may be provided.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications may be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or"

used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in the present disclosure may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related contents have been described in the best mode for carrying out the embodiments.

US 12,689,533 B2

63

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. An apparatus for receiving a signal, the apparatus comprising:
a multicast gateway configured to receive a multicast signal from a multicast server; and
a content playback configured to display a service in the multicast signal,
wherein the multicast signal includes a multicast transport session carrying the service,
wherein the service is processed based on a User Datagram Protocol/Internet Protocol (UDP/IP), a Generic Stream Encapsulation (GSE) protocol, and a physical layer protocol,
wherein the signal includes Logical Layer Control (LLC) information which is based on the GSE protocol,
wherein the LLC information includes a multicast descriptor, wherein the multicast descriptor includes source address information, destination address information, source UDP port information, and destination UDP port information.

2. The apparatus of claim 1, the apparatus being further configured to:
receive a Physical Layer Pipe (PLP) carrying a GSE stream including
GSE data in which IP header compressed IP data is encapsulated,
GSE data in which IP header not compressed IP data is encapsulated, a descriptor for a multicast, and
Robust Header Compression (ROHC) descriptor related to an IP header compression from a GSE layer.

3. The apparatus of claim 1, the apparatus being further configured to:
receive the LLC information from a GSE layer,
wherein the LLC information further includes Network Control Data (NCD) and Link Control Data (LCD),
wherein the NCD includes a descriptor for a multicast,
wherein the LCD includes a link identifier for a physical layer.

4. The apparatus of claim 3, the apparatus further comprising:
a parser configured to parse the LLC information; and
a decompressor configured to receive a Robust Header Compression (ROHC) stream in a GSE stream in the GSE layer, and decompress a IP header.

5. The apparatus of claim 1, wherein the multicast descriptor further includes index information for multicast.

6. A method of receiving a signal, the method comprising:
receiving a multicast signal from a multicast server; and
displaying a service in the multicast signal,
wherein the multicast signal includes a multicast transport session carrying the service,
wherein the service is processed based on a User Datagram Protocol/Internet Protocol (UDP/IP), a Generic Stream Encapsulation (GSE) protocol, and a physical layer protocol,
wherein the signal includes Logical Layer Control (LLC) information which is based on the GSE protocol,
wherein the LLC information includes a multicast descriptor, wherein the multicast descriptor includes source address information, destination address information, source UDP port information, and destination UDP port information.

7. The method of claim 6, the method further comprising:
receiving a Physical Layer Pipe (PLP) carrying a GSE stream including
GSE data in which IP header compressed IP data is encapsulated,
GSE data in which IP header non-compressed IP data is encapsulated, a descriptor for a multicast, and
Robust Header Compression (ROHC) descriptor related to an IP header compression from a GSE layer.

8. The method of claim 6, the method further comprising:
receiving the LLC information from a GSE layer,
wherein the LLC information further includes Network Control Data (NCD) and Link Control Data LCD,
wherein the NCD includes a descriptor for a multicast,
wherein the LCD includes a link identifier for a physical layer.

9. The method of claim 8, the method further comprising:
parsing the LLC information; and
receiving a Robust Header Compression (ROHC) stream in a GSE stream in the GSE layer, and decompressing a IP header.

10. The method of claim 6, wherein the multicast descriptor further includes index information for multicast.

11. A method of transmitting a signal, the method comprising:
transmitting a multicast signal from a multicast server,
wherein the multicast signal includes a multicast transport session carrying a service,
wherein the service is processed based on a User Datagram Protocol/Internet Protocol (UDP/IP) a Generic Stream Encapsulation (GSE) protocol, and a physical layer protocol; and
generating Logical Layer Control, LLC, information based on the GSE protocol,
wherein the LLC information includes a multicast descriptor, wherein the multicast descriptor includes source address information, destination address information, source UDP port information, and destination UDP port information.

* * * * *